US009495678B2

(12) United States Patent
Fukushima et al.

(10) Patent No.: US 9,495,678 B2
(45) Date of Patent: Nov. 15, 2016

(54) CONTENT PROVIDING/OBTAINING SYSTEM

(75) Inventors: Osamu Fukushima, Kanagawa (JP); Hajime Fujii, Saitama (JP); Hiroshi Ozaki, Saitama (JP)

(73) Assignee: SONY CORPORATION, Tokyo (JP)

( * ) Notice: Subject to any disclaimer, the term of this patent is extended or adjusted under 35 U.S.C. 154(b) by 1189 days.

(21) Appl. No.: 12/272,709

(22) Filed: Nov. 17, 2008

(65) Prior Publication Data

US 2009/0083081 A1    Mar. 26, 2009

Related U.S. Application Data

(62) Division of application No. 10/258,032, filed as application No. PCT/JP02/01547 on Feb. 21, 2002.

(30) Foreign Application Priority Data

| Feb. 22, 2001 | (JP) | 2001-045905 |
| Jan. 29, 2002 | (JP) | 2002-020766 |
| Jan. 29, 2002 | (JP) | 2002-020770 |

(51) Int. Cl.
*G06Q 20/38*    (2012.01)
*G06Q 10/02*    (2012.01)
(Continued)

(52) U.S. Cl.
CPC ............ *G06Q 20/382* (2013.01); *G06Q 10/02* (2013.01); *G06Q 30/02* (2013.01);
(Continued)

(58) Field of Classification Search
CPC ................................................ G06Q 20/382
(Continued)

(56) References Cited

U.S. PATENT DOCUMENTS

| 5,659,742 A | * | 8/1997 | Beattie | ............. G06F 17/30017 |
| 5,873,076 A | * | 2/1999 | Barr | ........................ G06Q 40/12 705/26.61 |

(Continued)

FOREIGN PATENT DOCUMENTS

| CA | 2180891 | 1/1997 |
| CA | 2246780 | 3/1999 |

(Continued)

OTHER PUBLICATIONS

Hirotsugu Shimoda, "Kaso Shogyo Kukan no Kachi, Chika o Takameru Niha", Computopia, Jun. 1, 1996, vol. 31, No. 357, pp. 102-105.

(Continued)

*Primary Examiner* — Calvin L Hewitt, II
*Assistant Examiner* — Christina Sherr
(74) *Attorney, Agent, or Firm* — Oblon, McClelland, Maier & Neustadt, L.L.P.

(57) ABSTRACT

A content providing apparatus previously receives customer identification information and content identification information as customer reservation information via a terminal device, and sends customer desired content data corresponding to the content identification information to a content obtaining apparatus, to provide a customer with the customer desired content data via the content obtaining apparatus more easily, thus making it possible to significantly improve the usability of a content obtaining/providing system. In addition, a content providing server sends three-dimensional images to a portable dedicated terminal in response to a preview request sent from the portable dedicated terminal, and then sends commercial data corresponding to a preview request sent according to the display state of the three-dimensional images to reproduce it, to make the customer view and preview the content to allow the cus- (Continued)

tomer to accurately judge whether the content meets his/her taste, thus making it possible to select content data light-heartedly.

12 Claims, 62 Drawing Sheets

(51) Int. Cl.
    *G06Q 30/02*     (2012.01)
    *G06Q 30/06*     (2012.01)
    *G06Q 40/00*     (2012.01)

(52) U.S. Cl.
    CPC ...... *G06Q 30/0281* (2013.01); *G06Q 30/0601* (2013.01); *G06Q 30/0645* (2013.01); *G06Q 40/12* (2013.12)

(58) Field of Classification Search
    USPC ..................................................... 705/50–59
    See application file for complete search history.

(56) References Cited

U.S. PATENT DOCUMENTS

| | | | |
|---|---|---|---|
| 5,892,900 A | * | 4/1999 | Ginter ................. G06Q 20/382 726/26 |
| 5,956,038 A | | 9/1999 | Rekimoto |
| 5,995,104 A | | 11/1999 | Kataoka et al. |
| 6,012,044 A | * | 1/2000 | Maggioncalda et al. ... 705/36 R |
| 6,134,532 A | | 10/2000 | Lazarus et al. |

FOREIGN PATENT DOCUMENTS

| | | | | |
|---|---|---|---|---|
| CH | 1215189 | | 4/1999 | |
| EP | 97-7669 | | 2/1997 | |
| EP | 0902383 | | 3/1999 | |
| EP | 0 938 075 A1 | | 8/1999 | |
| EP | 075386 | | 3/2002 | |
| JP | 10- 507020 | | 9/1994 | |
| JP | 7-114451 | | 5/1995 | |
| JP | 1995-182837 | | 7/1995 | |
| JP | 8-16612 | | 1/1996 | |
| JP | 8-298490 | | 11/1996 | |
| JP | 09-006574 | | 1/1997 | |
| JP | 09-006577 | | 1/1997 | |
| JP | 9-35584 | | 2/1997 | |
| JP | 9-81781 | | 3/1997 | |
| JP | 09-097349 | | 4/1997 | |
| JP | 10-91057 | | 4/1998 | |
| JP | 10-319951 | | 12/1998 | |
| JP | 11-110106 | | 4/1999 | |
| JP | 11-161716 | | 6/1999 | |
| JP | EP 0 398 075 | * | 8/1999 | ............... G10H 1/36 |
| JP | EP 0 938 075 A1 | * | 8/1999 | ............... G10H 1/36 |
| JP | 11-345261 | | 12/1999 | |
| JP | 2000-20555 | | 1/2000 | |
| JP | 2000-67067 | | 3/2000 | |
| JP | 2000-099612 | | 4/2000 | |
| JP | 2000-123557 | | 4/2000 | |
| JP | 2000-132566 | | 5/2000 | |
| JP | 2000-200127 | | 7/2000 | |
| JP | 2000-242699 | | 9/2000 | |
| JP | 2000-250839 | | 9/2000 | |
| JP | 2000-268046 | | 9/2000 | |
| JP | 2000-306003 | | 11/2000 | |
| JP | 2000-315215 | | 11/2000 | |
| JP | 2000-347675 | | 12/2000 | |
| JP | 2002-020766 | | 1/2002 | |

OTHER PUBLICATIONS

Nikkei Multimedia, No. 39, Sep. 15, 1998, p. 194-195.
Japanese Office Action for counterpart patent application, JP-2002-020766, Nov. 13, 2008.

* cited by examiner

| NAME OF COMPANY | XXX PLANNING CORPORATION |  |
|---|---|---|
| TELEPHONE NUMBER | XX-XXXX-XXXX |  |
| E-MAIL ADDRESS | XXX@XX... |  |
| GENRE (SELECT) | AA |  |
| MESSAGES | IF YOU WANT A CAR, PLEASE ENTRUST OUR COMPANY! |  |
| CONTRACT CONDITION (SELECT) | 6 |  |

(B)

| ADVERTISER/COMPANY ID | 888888 |  |
|---|---|---|
| NAME OF COMPANY | XXX PLANNING CORPORATION |  |
| TELEPHONE NUMBER | XX-XXXX-XXXX |  |
| E-MAIL ADDRESS | XXX@XX... |  |
| GENRE (SELECT) | AA |  |
| MESSAGES | IF YOU WANT A CAR, PLEASE ENTRUST OUR COMPANY! |  |
| CONTRACT CONDITION (SELECT) | 6 |  |

(A)

| NAME | TARO YAMADA |
|---|---|
| SEX (SELECT) | 1 |
| AGE | 45 |
| INTERESTING GENRE (SELECT) | AA |
| COMMENTS | I WANT A RED VAN. |
| CONTRACT CONDITION (SELECT) | 1 |
| E-MAIL ADDRESS | XXX@XXX···. |

(B)

| CUSTOMER ID | 999999 |
|---|---|
| NAME | TARO YAMADA |
| SEX (SELECT) | 1 |
| AGE | 45 |
| INTERESTING GENRE (SELECT) | AA |
| COMMENTS | I WANT A RED VAN. |
| CONTRACT CONDITION (SELECT) | 1 |
| E-MAIL ADDRESS | XXX@XXX···. |

FIG. 13

| CONDITION NUMBER | CONTENTS OF CONTRACT CONDITION |
|---|---|
| 1. | THE ADVERTISER/COMPANY PAYS A PART OF CUSTOMER'S COMMUNICATION CHARGE. |
| 2. | THE ADVERTISER/COMPANY MAKES A DISCOUNT ON CUSTOMER'S PURCHASES. |
| 3. | THE POINTS OF INTERNET MILEAGE WILL BE USED FOR PAYMENTS BY CONVERTING IT INTO MONEY IN PURCHASE. |
| 4. | THE CUSTOMER CAN GET A GIFT FROM THE ADVERTISER/COMPANY ACCORDING TO THE POINTS OF THE INTERNET MILEAGE. |
| 5. | THE CUSTOMER PROMISES THE ADVERTISER/COMPANY TO ACCESS THEIR SITE FOR A PREDETERMINED TIME OR LONGER EVERY MONTH. |
| 6. | THE CUSTOMER PROMISES THE ADVERTISER/COMPANY PURCHASE FOR A PREDETERMINED AMOUNT OR OVER EVERY MONTH. |

FIG. 14

| CUSTOMER ID | 999999 | | |
|---|---|---|---|
| NAME | TARO YAMADA | | |
| ACCESSED GENRE | A A | B B | |
| ACCESS COUNTER | 101 | 5 | |
| STATE OF PURCHASE | ¥5000 | | |
| INTERNET MILEAGE | 5101 | 5 | |
| SEX (SELECT) | 1 | | |
| AGE | 4 5 | | |
| INTERESTING GENRE (SELECT) | A A | | |
| COMMENTS | I WANT A RED VAN. | | |
| CONTRACT CONDITION (SELECT) | 1 | | |
| E-MAIL ADDRESS | × × ×@× × × · · · .. | | |

| NAME OF COMPANY | XXX PLANNING CORPORATION | | |
|---|---|---|---|
| TELEPHONE NUMBER | XX-XXXX-XXXX | | |
| E-MAIL ADDRESS | XXX@XX··· | | |
| GENRE (SELECT) | AA | | |
| MESSAGES | IF YOU WANT A CAR, PLEASE ENTRUST OUR COMPANY! | | |
| CONTRACT CONDITION (SELECT) | 6 | | |

FIG. 17

| NAME | TARO YAMADA | | |
|---|---|---|---|
| ACCESSED GENRE | A A | | |
| ACCESS COUNTER | 101 | | |
| STATE OF PURCHASE | ¥5000 | | |
| INTERNET MILEAGE | 5101 | | |
| SEX (SELECT) | 1 | | |
| AGE | 4 5 | | |
| INTERESTING GENRE (SELECT) | A A | | |
| COMMENTS | I WANT A RED VAN. | | |
| CONTRACT CONDITION (SELECT) | 1 | | |
| E-MAIL ADDRESS | ×××@×××····.. | | |

FIG. 18

| ADVERTISER/COMPANY ID | 888888 |
|---|---|
| NAME OF COMPANY | XXX PLANNING CORPORATION |
| TELEPHONE NUMBER | XX-XXXX-XXXX |
| E-MAIL ADDRESS | XXX@XX··· |
| GENRE (SELECT) | AA |
| MESSAGES | IF YOU WANT A CAR, PLEASE ENTRUST OUR COMPANY! |
| CONTRACT CONDITION (SELECT) | 6 |
| CUSTOMER ID THAT CONCLUDED CONTRACT | 999999 |

FIG. 19

| CUSTOMER ID | 999999 | | |
|---|---|---|---|
| NAME | TARO YAMADA | | |
| ACCESSED GENRE | A A | | |
| ACCESS COUNTER | 101 | | |
| STATE OF PURCHASE | ¥5000 | | |
| INTERNET MILEAGE | 5101 | | |
| SEX (SELECT) | 1 | | |
| AGE | 4 5 | | |
| INTERESTING GENRE (SELECT) | A A | | |
| COMMENTS | I WANT A RED VAN. | | |
| CONTRACT CONDITION (SELECT) | 1 | | |
| E-MAIL ADDRESS | x x x @ x x x · · · | | |
| ADVERTISER/COMPANY ID THAT CONCLUDED CONTRACT | 888888 | 777777 | |

FIG. 20

| TITLE | CONTENT ID | RANKING POINTS | DATE POINTS | TOTAL POINTS |
|---|---|---|---|---|
| Klmnopqr | 8888888 | 2 | 1 | 3 |
| Abxjz | 3333333 | 1 | 1 | 2 |
| Dwhist | 5555555 | 3 | 3 | 6 |
| Nsbdca | 1111111 | 10 | 9 | 19 |
| ⋮ | ⋮ | ⋮ | ⋮ | ⋮ |
| Micsft | 9999999 | 5 | 8 | 13 |

620

(A)

| TITLE(SINGLE) | PACKAGE ID (SINGLE) | RANKING POINTS | DATE POINTS | TOTAL POINTS | SALE PRICE |
|---|---|---|---|---|---|
| Kabcd | 33335555 | 5 | 1 | 6 | 1000 |
| Snjpy | 1111999 | 1 | 3 | 4 | 1000 |
| Axbmc | 7778888 | 9 | 3 | 12 | 1000 |
| Micts | 4444666 | 10 | 10 | 20 | 1000 |
| ⋮ | ⋮ | ⋮ | ⋮ | ⋮ | ⋮ |
| Xbojn | 2222444 | 5 | 1 | 6 | 800 |

621

(B)

| TITLE(ALBUM) | PACKAGE ID (ALBUM) | RANKING POINTS | DATE POINTS | TOTAL POINTS | SALE PRICE |
|---|---|---|---|---|---|
| Acxbmdy | 4444444 | 10 | 9 | 19 | 3600 |
| Nomstfc | 7777777 | 5 | 9 | 14 | 3000 |
| Abedar | 6666666 | 7 | 3 | 10 | 2800 |
| Epdmc | 2222222 | 10 | 10 | 20 | 3500 |
| ⋮ | ⋮ | ⋮ | ⋮ | ⋮ | ⋮ |
| Xjyahs | 5555333 | 6 | 1 | 7 | 3200 |

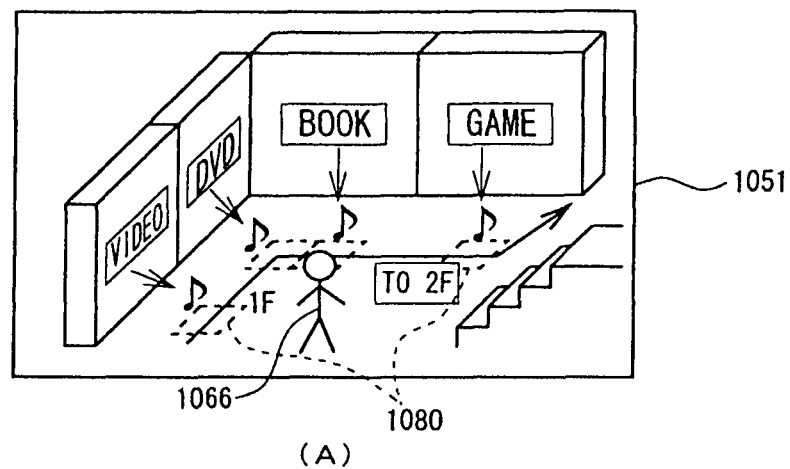
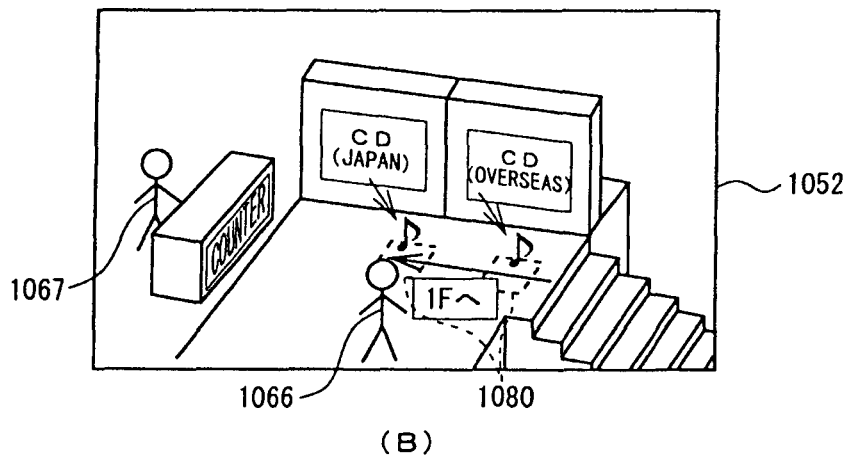
FIG. 65

CONTENT PROVIDING/OBTAINING SYSTEM

CROSS-REFERENCE TO RELATED APPLICATIONS

This is a Divisional of application Ser. No. 10/258,032, filed on Oct. 18, 2002, the contents of which are incorporated herein by reference. application Ser. No. 10/258,032 is the U.S. National Stage of International Application No. PCT/JP02/01547 filed on Feb. 21, 2002, and claims priority to JP 2002-020770, filed on Jan. 29, 2002; JP 2002-020766, filed on Jan. 29, 2002, and JP 2001-045905 filed on Feb. 22, 2001.

TECHNICAL FIELD

The present invention relates to a content providing/obtaining system, and is suitably applied, for example, to a data providing system for providing various content data such as music and movie, and data on various kinds of distribution information such as advertisement (hereinafter, these are referred to as distribution data) to customers by using the Internet.

BACKGROUND ART

In recent years, the Internet being a computer communication network that had been used by many institutes etc., for research and study in the world scale, has been quickly popularized also among companies and customers as a tool for computer communications, by using it in business such as selling products, the distribution of content data, the advertisement of companies and products.

By using the Internet for business, a customer can buy desired products and can obtain desired content data with a personal computer, for instance, while staying at home. And the customer also can obtain various kinds of distribution data such as the advertisement of a company and products with the personal computer.

By the way, to obtain content as data, it is necessary to use the distribution of content data carried out via the Internet by using a device having a function of recording and reproducing content data and capable of connecting to the Internet and obtaining content (hereinafter, referred to as content obtaining apparatus).

Therefore, it is considered that if a data providing system capable of providing content data for customers who do not have a content obtaining apparatus, the usability of the data providing system could be significantly improved, as compared with existing systems which provide content data using the Internet. Such system, however, has not been realized, which is a problem.

In addition, a data providing server which provides content data using the Internet shows customers a title list of content data so that they select desired content data from the shown title list.

However, from only such a title list of content data provided by the data providing server, customers who uses the Internet do not know the contents of the content data unless the customer actually obtains and reproduces the content data, which means that they realize that content data does not match with their taste after obtaining content data. Therefore, content data is not selected lightheartedly, which is a problem.

DESCRIPTION OF THE INVENTION

The present invention has been made in view of the above points and intends to propose a content providing/obtaining system which offers significantly improved usability.

To solve such problem, in a content providing/obtaining system of this invention composed of a content providing apparatus which provides content data and a content obtaining apparatus which obtains the content data provided by the content providing apparatus, the content providing apparatus is provided with a content data storage means for storing a plurality of content data; a customer reservation information receiving means for receiving customer identification information on a customer accessing the content providing apparatus via a prescribed terminal device and content identification information on customer desired content data desired by the customer, as customer reservation information; a search means for searching the content data storage means for the customer desired content data corresponding to the content identification information; and a sending means for sending the customer desired content data found by the search means, to the content obtaining apparatus. And the content obtaining apparatus is provided with an interface means capable of accessing the content providing apparatus only; a content data recording means for recording customer desired content data received via the interface means from the content providing apparatus on a storage medium; and a reproducing/outputting means for reproducing and outputting the customer desired content data from the storage medium.

Therefore, according to this invention, the content providing apparatus previously receives customer identification information and content identification information as customer reservation information via a terminal device, and transmits the customer desired content data corresponding to the content identification information to the content obtaining apparatus, so as to provide customer desired content data in addition to the content obtaining apparatus which can access the content providing apparatus only, to a customer more easily, which can significantly improve the usability of the content providing/obtaining system.

Further, this invention has been made in view of above points, and intends to propose a content providing/obtaining system which can make the selection of content data easier.

In order to solve the above problem, in the content providing/obtaining system of this invention composed of a content providing apparatus which provides content data and a content obtaining apparatus which obtains content data provided by the content providing apparatus, the content providing apparatus sends the content obtaining apparatus three-dimensional images in response to an image request sent from the content obtaining apparatus to make the images displayed, in order that a customer can select customer desired content data out of a plurality of content data, and then when receiving a preview request sent from the content obtaining apparatus according to the display state of the three-dimensional images, sends the preview data of the content based on the content data corresponding to the received preview request, to the content obtaining apparatus to make the preview data displayed.

Therefore, according to this invention, the customer can confirm the contents of content by viewing and previewing the content based on the content data to judge whether the content matches his/her own taste, thus making it possible to select content data lightheartedly.

BRIEF DESCRIPTION OF THE DRAWINGS

FIG. 12 is a schematic diagram showing the construction of advertiser/company registration information.

FIG. 13 is a schematic diagram showing the construction of customer registration information.

FIG. 14 is a schematic diagram showing the contract conditions between a customer and an advertiser/company.

FIG. 17 is a schematic diagram showing the format of advertiser/company introduction information.

FIG. 18 is a schematic diagram showing the format of customer introduction information.

FIG. 19 is a schematic diagram showing the format of advertiser/company information updated by the conclusion of a contract.

FIG. 20 is a schematic diagram showing the format of customer registration information updated by the conclusion of a contract.

FIG. 47 is a schematic diagram showing the formats of data tables in a packaged media database.

FIG. 65 is a schematic diagram for explaining the reproduction of commercial data for each genre on a content selection screen.

BEST MODE FOR CARRYING OUT THE INVENTION

An embodiment of the present invention will be described in detail with reference to the accompanying drawings.

(1) Usage Pattern of the Internet in Data Providing System

Figure 1:
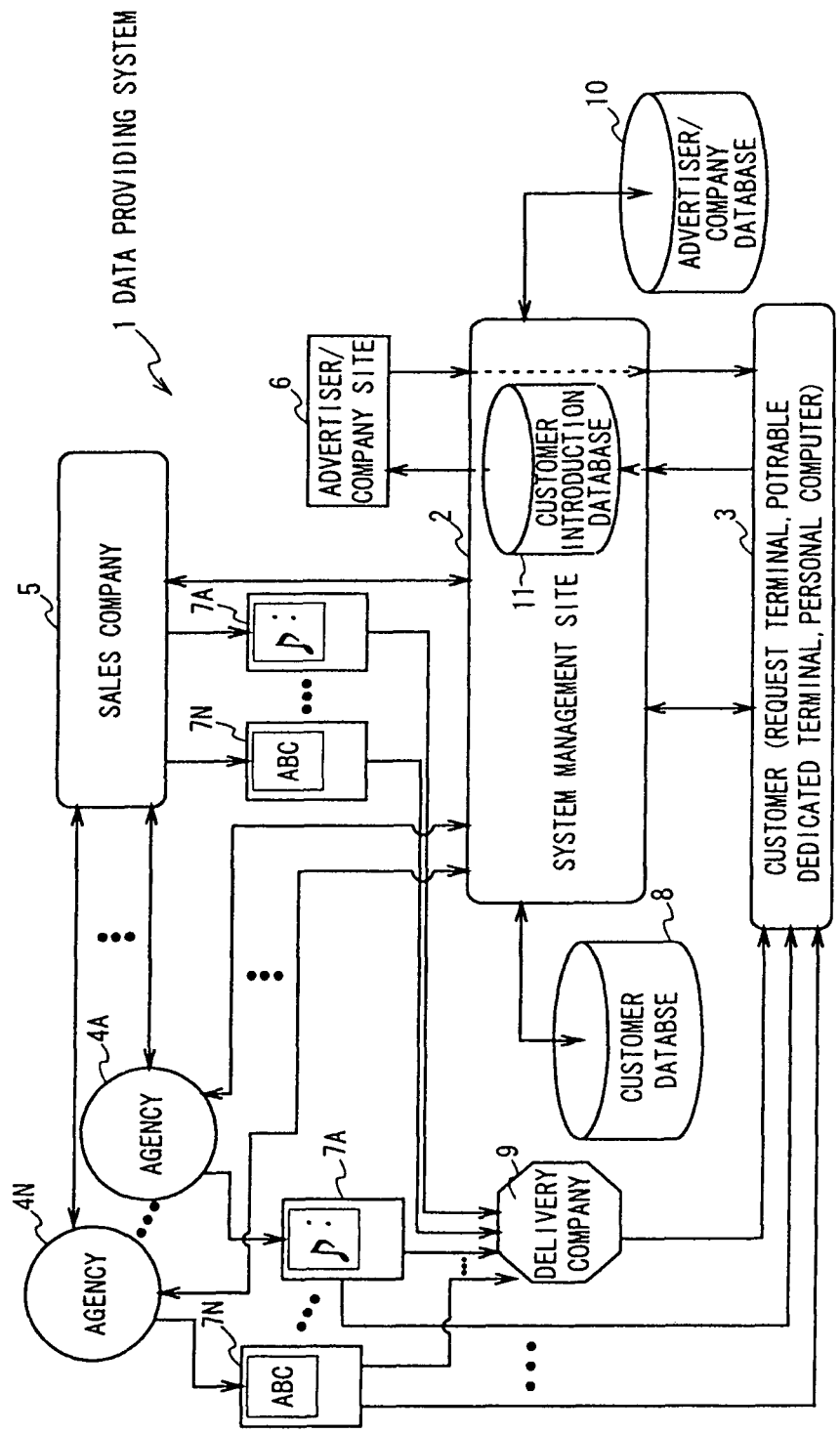
FIG. 1 is a conceptual view showing a usage pattern of the Internet in a data providing system.

As shown in FIG. 1, in a data providing system 1, a system management site 2 which generally control the data providing system can communicate via the Internet (not shown) with a customer 3, plural kinds of shops 4A to 4N such as retail stores, rental shops where the customer 3 goes (hereinafter, this is referred to as agencies), a sales company 5 that sells products, which will be described later, to these agencies 4A to 4N, and a site for providing distribution data 6 opened by an advertiser or a company (hereinafter, this is referred to as advertiser/company site).

Figure 2:
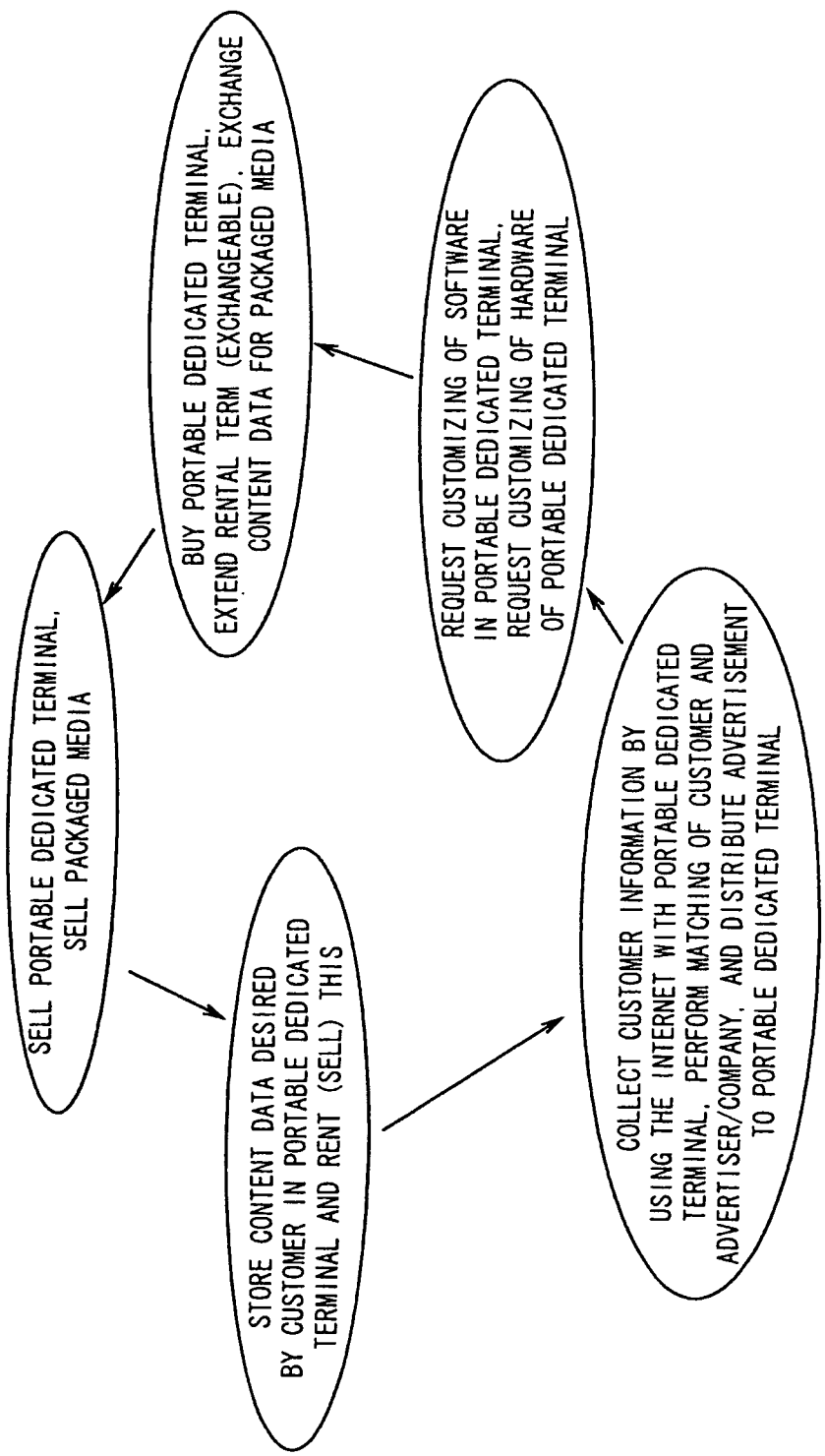
FIG. 2 is a schematic diagram showing a usage pattern of a portable dedicated terminal rented to a customer.

In this case, as shown in FIG. 2 together with FIG. 1, the agencies 4A to 4N are rental shops that sell and rent content (composed of audio data, video data, text data, etc.) such as music, movie, game software, novel, photograph, comic, as commercial packaged media such as CDs (Compact Discs), DVDs (Digital Versatile Discs) and CD-ROM (Compact Disc-Read Only Memories), books (hard-cover novels, photo books, image books, comic books), or shops that deal in content, like preparatory schools for selling and renting the content (composed of text data, etc.) of reference books, question books, literatures for entrance examination, etc., as commercial packaged media of books.

If an agency 4A-4N desires to use the Internet in a state where it will start new business or has already started business and are in business, it notifies the system management site 2 of the desire with a personal computer or the like.

If the use of the Internet is requested from the agency 4A-4N, the system management site 2 obtains agency information such as name, kind of content dealing in, bank account number from the agency 4A-4N, and registers the agency.

Then, the system management site 2 provides the agency 4A-4N with plenty of content data, from among various kinds of content data of music, movie, game software, novel, photograph, comic, reference book, question book, literature, etc. that have been previously stored in a content database (not shown), for each of kinds specified by the agency 4A-4N, so that the agency 4A-4N can generate its own content database of these content data.

In addition, the sales company 5 sells portable dedicated terminals 7A to 7N only for recording and reproducing content data, to the agencies 4A to 4N according to the instructions from the system management site 2, and also sells commercial packaged media such as CDs, DVDs, CD-ROMs, books, to be dealt in at the agencies 4A to 4N.

On the other hand, the customer 3 who wants to use the Internet accesses the above system management site 2, for instance, by operating a request terminal (not shown) dedicated to the system management site installed in a stand such as KIOSK, and makes a notification of the desire of using the Internet.

If the use of the Internet is wanted by the customer 3, the system management site 2 obtains personal information (hereinafter, this is referred to as customer information) such as his/her name, sex, age, bank account number from the customer 3, and the register the customer, and then generates a customer database 8 of the above customer information as customer registration data.

The agencies 4A to 4N offer two systems, a sales system and rental system, for plural kinds of content data to the customer 3. When content specifying information that specifies desired content data and system specifying data representing one of the systems in obtaining the above content data are given from the customer 3 by using a request terminal via the system management site 2, the agency 4A-4N accepts the reservation for purchase or rental of the content data in response to this.

When accepting the reservation from the customer 3 in this manner, the agency 4A-4N executes electronic accounting for the purchase (sale price) and the rental (rental term) of the content data with the customer registration information on the customer 3 (the account number of the customer 3) read from the customer database 8 in the system management site 2. Then, the agency 4A-4N reads the desired content data according to the request from the content database, and records this in a predetermined storage medium provided in the portable dedicated terminal 7A-7N.

Now, the agencies 4A to 4N allow the customer 3 to use also the portable dedicated terminals 7A to 7N by one of sales and rental systems. When content data is requested, the agency 4A-4N simultaneously executes electronic accounting for the purchase (sale price) and the rental (rental term) of the portable dedicated terminal 7A-7N with the customer registration information.

Therefore, for instance, when the customer 3 wants to use the portable dedicated terminal 7A-7N by rental, the agency 4A-4N rents the portable dedicated terminal 7A-7N storing the content data in response to the request by the customer 3, by directly giving it to the customer at its shop or by delivering it by a delivery company 9 depending on the delivery system requested by the customer 3.

Thereby, the customer 3 who previously reserved the purchase or rental of content data and a portable dedicated terminal 7A-7N by the request terminal can enjoy the content data by reproducing it with the above portable dedicated terminal 7A-7N as soon as he/she gets the portable dedicated terminal 7A-7N.

Such portable dedicated terminal 7A-7N can access only the agency 4A-4N that has stored the content data, via the system management site 2 by a communication function installed therein, and can execute processing for the purchase and rental of content data (including accounting).

Therefore, when the customer 3 newly requests the purchase or rental of content data with the portable dedicated terminal 7A-7N in rental, the agency 4A-4N can transmit the requested content data to the portable dedicated terminal 7A to 7N in rental via the system management site 2, and thereby the content data can be recorded therein. Thus, content data can be easily distributed via the Internet also to the customer 3 who does not have a device connectable to the Internet (hereinafter, this is referred to as Internet connectable device) such as a personal computer, similarly to the customer 3 who has such an Internet connectable device.

By the way, the system management site 2 relays the request for the purchase and rental of content data sent from the portable dedicated terminals 7A to 7N and the request terminal to the agencies 4A to 4N, so that it updates the customer registration information by adding the contents of that request to the customer registration information in the customer database 8 as additional customer information. Thus, the system management site 2 can know about customer 3's taste (for example, the genre of content data that the customer 3 obtained), the state of using the Internet, and the like, from the customer registration information.

Furthermore, the system management site 2 obtains advertiser/company information composed of advertiser name information and company name information, business content information that represents the genre of the above provided distribution data and so on, from advertisers and companies that provide various kinds of distribution data at an advertiser/company site 6, and generates an advertiser/company database 10 of this as advertiser/company registration information.

If the customer 3 sends release permission information representing that he/she permits to open his/her customer information to the advertisers and companies, with the portable dedicated terminal 7A-7N in rental as customer's permission data, the system management site 2 searches the advertiser/company database 10 based on the customer registration information on the customer 3 who transmitted the customer's permission data, to select advertisers and companies that provide distribution data meeting the customer 3's taste, and then introduces the selected advertisers and companies to the customer 3 via the portable dedicated terminal 7A-7N.

As a result, when the customer 3 selects an advertiser/company that he/she wants to contract with from among the advertisers/companies introduced to him/her, the system management site 2 provides the selected advertiser/company with a part of his/her customer registration information as investment information to introduce the customer 3 to the advertiser/company.

Thereby, the system management site 2 can allow the customer 3 using the Internet and the advertiser/company selected by the above customer 3 to mutually negotiate and close a contract. When the contract has been concluded, various distribution data such as the advertisement of products desired by the above customer 3 will be sent from the advertiser/company site 6 to the portable dedicated terminal 7A to 7N that the customer 3 rents, via the system management site 2.

In this manner, in the data providing system 1, only the advertisers/companies providing customer desired distribution data can be introduced to the customer 3, and the customer 3 can easily select desired one. At the same time, even if the customer 3 does not own an Internet connectable device, he/she can be efficiently provided with only desired distribution data via the portable dedicated terminal 7A to 7N in rental.

In this connection, if the customer's permission data is sent from the customer 3, the system management site 2 introduces the customer 3 who is beneficial for the advertiser/company to the advertiser/company. Therefore, it is designated that when the system management site 2 transmits the investment information to the advertiser/company, it receives a consideration for that from the above advertiser/company.

In addition, when the system management site 2 introduces advertisers/companies to the customer 3, it generates a customer introduction database 11 of the investment information on the above customer 3, regardless of the presence or absence of an advertiser/company that the customer 3 wants to contract with, so as to use the above customer introduction database 11 at the time of selecting advertisers/companies to be introduced to the customer 3 after that.

When the customer 3 accessed an agency 4A-4N to request content data with the portable dedicated terminal 7A-7N via the system management site 2, the agency 4A-4N sends a content selection screen used to select the above content data, to the portable dedicated terminal 7A to 7N so that the customer 3 can select desired content data on that content selection screen.

The agency 4A-4N customizes the content selection screen to be displayed on the display part of the portable dedicated terminal 7A-7N, according to requests from the customer 3. Thus, when the content data is requested, a content selection screen which meets the customer 3's request can be displayed on the display part of the portable dedicated terminal 7A-7N.

In this connection, if the customer 3 specifies his/her favorite color on a case while renting the portable dedicated terminals 7A to 7N, the agency 4A-4N exchanges the portable dedicated terminal 7A-7N in rental to another portable dedicated terminal 7A-7N in his/her favorite color. Therefore, in addition to customizing software, also the hardware of a case can be customized.

When the customer 3 requested the agency 4A-4N to customize the case of the portable dedicated terminal 7A-7N in rental (that is, to change the color of the case), the agency 4A-4N transfers all data in the portable dedicated terminal 7A-7N that the customer 3 is renting (that is, the content data, the desired distribution data given from the advertiser, etc.) to another portable dedicated terminal 7A-7N in customer 3's specified color, and changes them.

By the way, when the customer 3 rents content data with a portable dedicated terminal 7A-7N, the agency 4A-4N lets the customer 3 arbitrary select the rental term of the above portable dedicated terminal 7A-7N and the rental term of the content data when the rental starts, and these rental terms once selected can be freely extended according to a request by the customer 3.

The agency 4A-4N monitors the end of the rental term of the content data being rented to the customer 3. If the rental term of the content data expires before the expiration of the rental term of the portable dedicated terminal 7A-7N, the agency 4A-4N gives this information to the portable dedicated terminal 7A-7N being rented to the customer 3.

If terminating the rental of the content data according to the period is replied from the portable dedicated terminal 7A-7N being rented to the customer 3 via the system management site 2, the agency 4A-4N prompts the customer 3 to bring the portable dedicated terminal 7A-7N to the above agency 4A-4N. when the customer 3 takes that portable dedicated terminal 7A-7N, the content data is deleted from the internal storage medium, which means the return of the content data.

On the other hand, if extending the rental term of the content data is replied from the portable dedicated terminal 7A-7N being rented to the customer 3 via the system management site 2, then the agency 4A-4N monitors the end of that extended rental term of the above content data.

If the rental term of the content data has expired and the customer 3 does not bring the portable dedicated terminal 7A-7N, for instance, the agency 4A-4N sends a delete command to delete the content data of which the rental term has expired, to the portable dedicated terminals 7A to 7N for return. Thus, in the portable dedicated terminal 7A-7N, the specified content data is deleted from the internal storage medium to prevent its illegal use.

When the portable dedicated terminal 7A-7N in rental is returned from the customer 3, the agency 4A-4N deletes the content data from the storage medium of the above portable dedicated terminal 7A-7N to rent the portable dedicated terminal 7A-7N again.

If the customer 3 requests the exchange of the content (that is, content data of a single tune) which the customer 3 owns by purchase or rental with the portable dedicated terminal 7A-7N for packaged media storing the same content data (that is, single CD), the agency 4A-4N transmits equivalent exchange information composed of a price of the time when the customer 3 obtained the content data (that is, purchase price or rental price), the sale price of the packaged media, and the difference between both these prices, to the portable dedicated terminal 7A-7N via the system management site 2.

Then when the customer 3 notifies the agency 4A-4N of the approval of exchanging them with the portable dedicated terminal 7A-7N via the system management site 2, the agency 4A-4N performs electronic accounting only for the difference between the price to obtain the content data being owned by the customer 3 and the sale price of the packaged media, read from the customer database 8 of the system management site 2 because the purchase price or the rental price for the content data owned by the customer 3, which is the same as the content data stored in the packaged media, has been already paid. Then, the agency 4A-4N gives the packaged media to the customer 3 by hand at the shop or by deliver by the delivery company 9 from the sales company 5.

In this manner, the agency 4A-4N almost equalizes the content data owned by the customer 3 with the packaged media in exchange value, and thereby exchanges the content data for the above packaged media (hereinafter, this exchange is referred to as equivalent exchange). Thereby, it is prevented that the content data bought or rented with the portable dedicated terminal 7A-7N is wasted when that portable dedicated terminal 7A to 7N is returned, and packaged media can be provided by minimum investment without making the customer 3 wastefully invest in both of content data and packaged media.

In this connection, the system management site 2 collects charges for the use of the Internet from the customer 3 every time when the customer 3 uses the Internet (that is, every time when he/she buys or rents content data or the portable dedicated terminals 7A to 7N). However, the system management site 2 gives points for a privilege such as a discount to the customer 3 according to the usage state of the Internet and stores them in the customer database 8.

Therefore, the agency 4A-4N allows the customer 3 to use the points that he/she has obtained, as a part of or all of the payment in the electronic accounting when the customer 3 buys and rents content data and the portable dedicated terminal 7A-7N, when the customer 3 exchanges content data for packaged media, etc.

Furthermore, the agency 4A-4N can accept payment by cash and a prepaid card at the shop, instead of the electronic accounting at the time when the customer 3 buys or rents the portable dedicated terminal 7A-7N, when the customer 3 exchanges content data for packaged media or the like.

The agency 4A-4N executes the electronic accounting for the purchase of the portable dedicated terminal 7A-7N in response to the purchase request of the portable dedicated terminal 7A-7N given from the customer 3 with the request terminal or the portable dedicated terminal 7A to 7N in rental via the system management site 2, and then the agency 4A-4N directly hands that portable dedicated terminal 7A to 7N to the customer 3 or delivers it to the customer 3 from the sales company 5 by the delivery company 9.

In this connection, when the customer 3 requests the purchase of the portable dedicated terminal 7A to 7N, the agency 4A-4N sells the portable dedicated terminal 7A to 7N having a case in a color specified by the customer 3.

Figure 3:
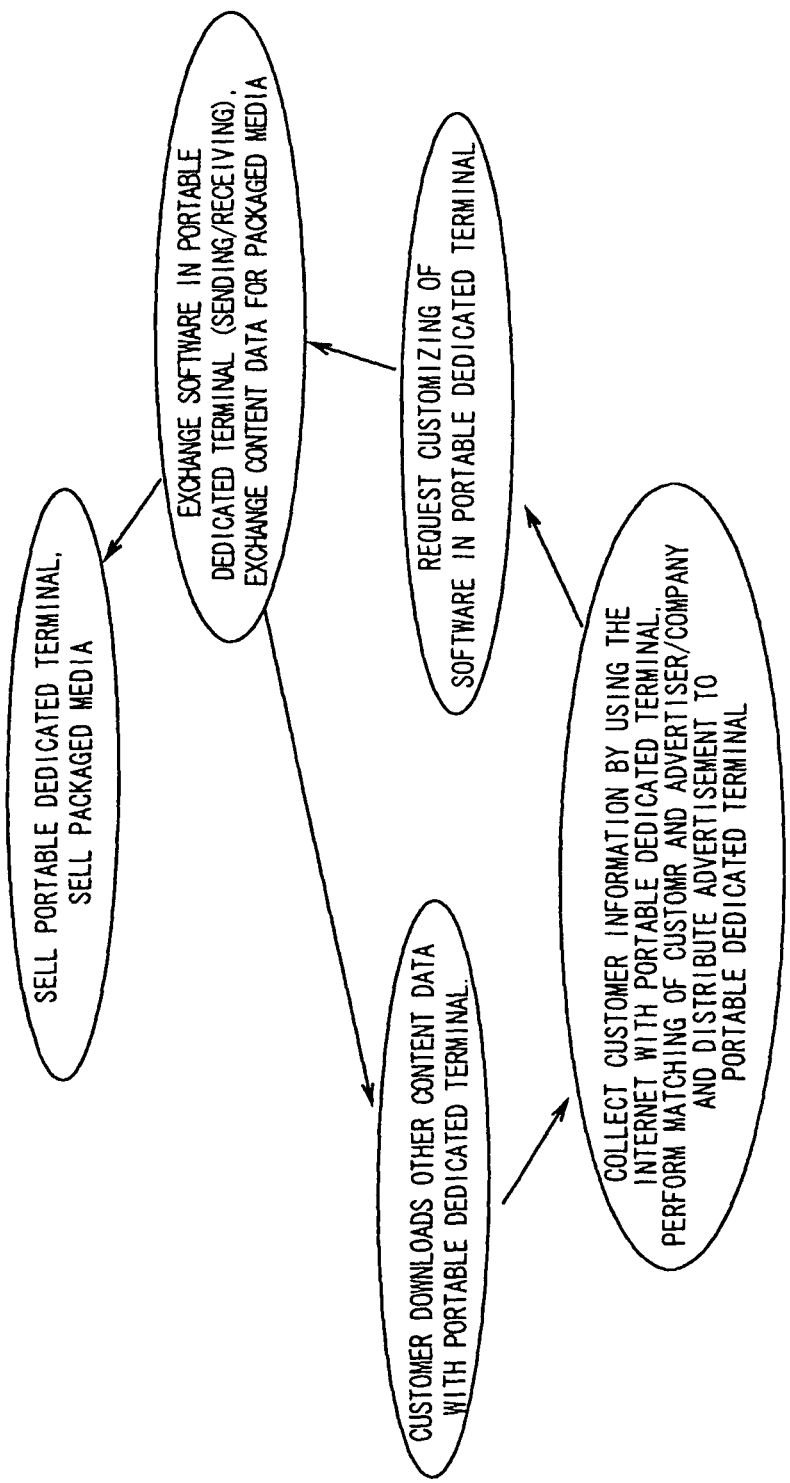
FIG. 3 is a schematic diagram showing a usage pattern of a portable dedicated terminal sold to a customer.

As shown in FIG. 3, the customer 3 who bought the portable dedicated terminal 7A-7N can buy or rent desired content data only from the agency 4A-4N that sold the portable dedicated terminal 7A to 7N, with the portable dedicated terminal 7A-7N via the Internet, and can obtain desired distribution data by contracting with an advertiser and a company similarly to the case described above with reference to FIG. 2.

Furthermore, the customer 3 who bought the portable dedicated terminal 7A to 7N can customize a content selection screen that will be sent from the agency 4A-4N when the customer 3 requests the purchase or rental of content data with the above portable dedicated terminal 7A-7N, and also can exchange content data owned by the customer 3 by purchase or rental, for packaged media storing the same content data, with almost equalizing the content data owned by the customer 3 with the packaged media in exchange value.

In the above data providing system 1, the customer 3 can use the Internet also by using an Internet connectable device such as a personal computer instead of the portable dedicated terminal 7A-7N, similarly to the case described above with reference to FIGS. 2 and 3.

As described above, in the data providing system 1, both of a business system using the Internet and such an existing business system that products are practically sold and rented at retail stores or the like are compatibly used. Therefore, a new business model can be realized, in which the customer 3 who does not have an Internet connectable device and the agencies 4A to 4N having the feeling of crisis in the popularization of the Internet can freely and easily use the Internet for business.

(2) First Embodiment

Figure 4:
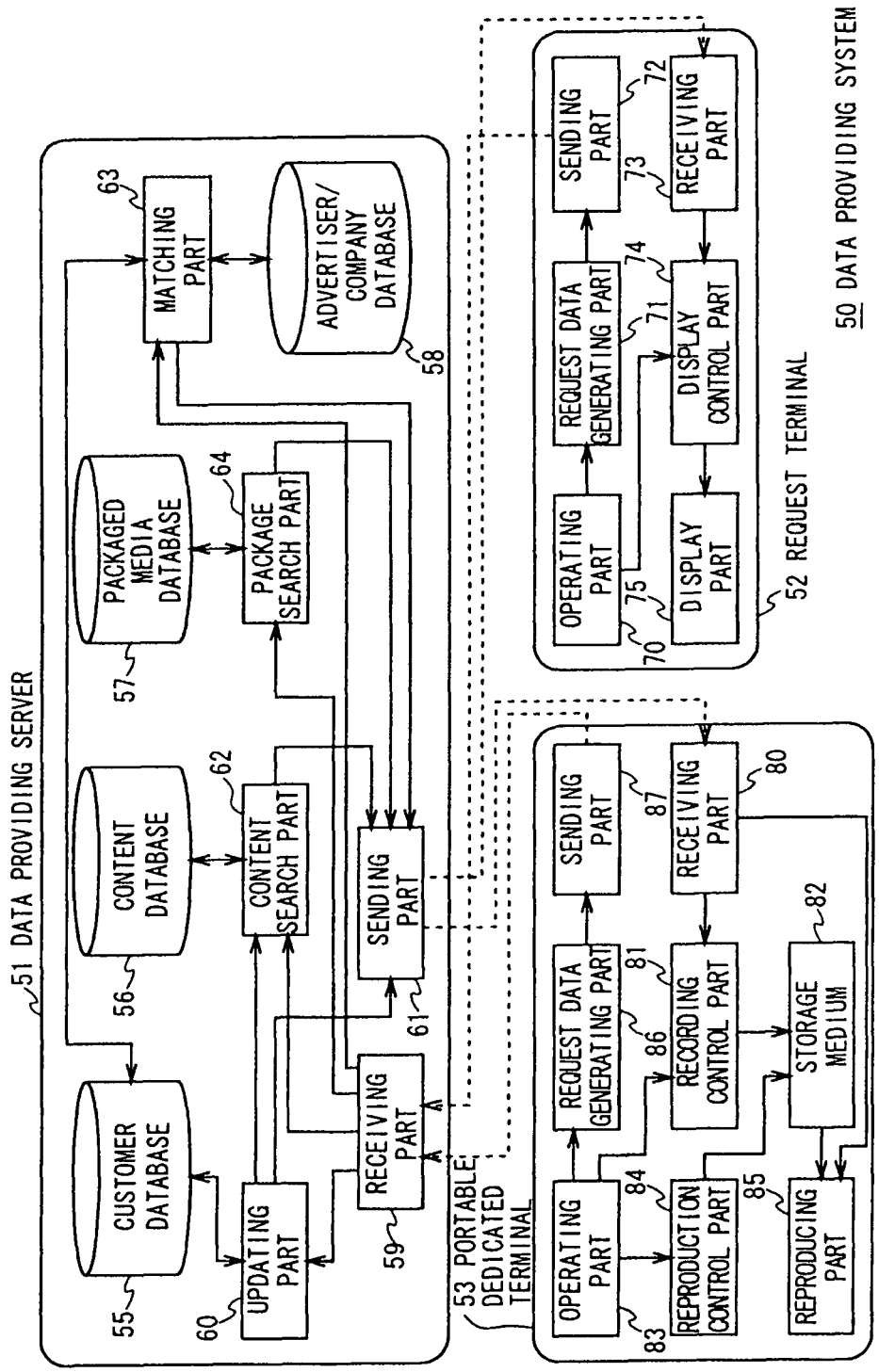
FIG. 4 is a block diagram showing a first embodiment of the construction of the data providing system according to this invention.

Referring to FIG. 4, reference numeral 50 generally shows a data providing system according to a first embodiment, in which a request terminal 52 corresponding to the customer 3 described above with reference to FIGS. 1 to 3 (that is, the request terminal used by the customer 3) and a portable dedicated terminal 53 only for an agency 4A-4N corresponding to the portable dedicated terminal 7A-7N described above with reference to FIGS. 1 to 3 are connected via the Internet to a data providing server 51 corresponding to the system management site 2, agencies 4A to 44N, and sales company 5 described above with reference to FIGS. 1 to 3.

The data providing server 51 has a customer database 55 for storing customer registration information and customer registration screen data, a content database 56 for storing a lot of content data, content selection screen data and so on, a packaged media database 57 for storing a data table by listing the sale price and rental price of content data, and the sale prices, the titles, etc., of packaged media that the content data can be exchanged for, and an advertiser/company database 58 for storing advertiser/company registration information obtained from advertisers and companies which open advertiser/company sites.

When registration request data that requests the customer registration is sent from the request terminal 52, the data providing server 51 receives this by a receiving part 59, reads the customer registration screen data from the customer database 55 based on that registration request data by an updating part 60, and sends the read customer registration screen data from a sending part 61 to the request terminal 52.

When customer information entered on the customer registration screen based on the customer registration screen data is sent from the request terminal 52 as customer information data, the data providing server 51 receives this by the receiving part 59, and stores the customer information based on that customer information data as customer registration information by the updating part 60 to register the customer. Thus, the above customer can use the Internet.

When transmission request data that requests content data is sent from the request terminal 52 according to operations by the registered customer, the data providing server 51 receives this by the receiving part 59, reads the content selection screen data from the content database 56 based on that transmission request data by a content search part 62, and transmits the read content selection screen data from the sending part 61 to the request terminal 52.

As a result, When desired content data is selectively specified on the content selection screen based on the content selection screen data, one of the systems, purchase or rental, for each of the content data and a portable dedicated terminal 53 is selectively specified, and thereby reservation data that represents these specified information (hereinafter, this is referred to as customer reservation information) is transmitted from the request terminal 52, the data providing server 51 receives this by the receiving part 59.

At this time, the data providing server 51 reads the specified content data from the content database 56 based on the reservation data by the content search part 62, and transmits the read content data from the sending part 61 to the portable dedicated terminal 53 that is not yet delivered to the customer, to record it therein.

In this manner, the data providing server 51 can prepare the portable dedicated terminal 53 storing the content data according to customer request, for purchase or rental. Thus, the portable dedicated terminal 53 can be sold and rented to the customer by hand or by delivery.

Then, if transmission request data that requests content data is sent from the portable dedicated terminal 53 sold or rented to the customer, the data providing server 51 receives this by the receiving part 59, reads content selection screen data from the content database 56 based on the transmission request data by the content search part 62, and transmits the read content selection screen data from the sending part 61 to the portable dedicated terminal 53 of the customer.

As a result, when desired content data is specified on the content selection screen based on the content selection screen data and information on how the content data is to be obtained by purchase or rental is specified, and thereby content specifying data representing these specified information (hereinafter, this is referred to as specifying information) is transmitted from the portable dedicated terminal 53 sold or rented to the customer, the data providing server 51 receives this by the receiving part 59.

At this time, the data providing server 51 reads the specified content data from the content database 56 based on that content specifying data by the content search part 62, and transmits the read content data from the sending part 61 to customer's portable dedicated terminal 53 to record it therein.

In this manner, the data providing server 51 lets the customer use content distribution via the Internet lightheartedly and freely obtain desired content data with the portable dedicated terminal 53.

By the way, the data providing server 51 issues customer identification information unique to each customer (hereinafter, this is referred to as customer ID) at the time of the customer registration, adds this to customer information, and then stores the customer information and customer ID in the customer database 55 as customer registration information to manage the stored customer registration information with the customer ID.

The data providing server 51 transmits the customer ID issued to the customer at the time of customer registration, from the sending part 61 to the request terminal 52 to notify the customer of this. After that, the data providing server makes the customer use the customer ID for the time when the customer makes various requests to various agencies with the request terminal 52 or the portable dedicated terminal 53, so as to identify the customer who made a request of these various agencies by the customer ID.

When the data providing server 51 receives various data (e.g. content specifying data) from the request terminal 52 or the portable dedicated terminal 53 sold or rented to the customer by the receiving part 59, the data providing server 51 sends the contents of that data (information such as the title and the rental term of the content data that the customer will buy or rent) to the customer database 55 as additional customer information by the updating part 60 to add that additional customer information to the customer registration information on the customer who requested the content data, and to thereby update the customer registration information.

Thereby, the data providing server 51 can know customer's taste and so on based on the customer registration information in the customer database 55.

Then, if customer's permission data meaning that the customer permits the data providing server 51 to open the customer information to the advertisers/companies is transmitted from the portable dedicated terminal 53 sold or rented to the customer, the data providing server 51 receives this by the receiving part 59, reads the customer registration information on the customer who permitted the open of the customer information, from the customer database 55 based on that customer's permission data by a matching part 63, and searches advertiser/company registration information in the advertiser/company database 58 based on the read customer registration information.

As a result of the retrieval of advertiser/company registration information by the matching part 63, if advertisers/companies that provide distribution data meeting customer's taste are selected, the data providing server 51 generates advertiser/company introduction data based on advertiser/company registration information on the selected advertisers/companies, and sends this from the sending part 61 to customer's portable dedicated terminal 53, in order to introduce the advertisers/companies providing distribution data meeting customer's taste, to him/her.

In this manner, the data providing server 51 allows the customer to easily select an advertiser/company that will provide him/her with desired distribution data, from among many advertisers/companies, and also it enables the advertisers/companies to efficiently and exactly provide the customer with distribution data as he/she requested.

If customizing request data to customize a portable dedicated terminal 53 which the customer bought or rented is transmitted, the data providing server 51 receives this by the receiving part 59, reads customizing registration screen data previously stored in the content database 56, based on the received customizing request data by the content search part 62, and sends this from the sending part 61 to the customer's portable dedicated terminal 53.

As a result, if screen customizing information for the content selection screen that was entered on the customizing registration screen based on the customizing registration screen data is sent from the portable dedicated terminal 53 sold or rented to the customer, the data providing server 51 receives this by the receiving part 59, and gives the screen customizing information to the customer database 55 to add this to the customer registration information on the above customer and to thereby update that customer registration information by the updating part 60.

Thereafter, if transmission request data is sent from the portable dedicated terminal 53 by the customer who requested the customizing of the content selection screen, the data providing server 51 receives this by the receiving part 59, reads the screen customizing information added to his/her customer registration information, from the customer database 55 by the updating part 60, and supplies this to the content search part 62.

The data providing server 51 reads the content selection screen data from the content database 56 by the content search part 62, converts this based on the screen customizing information, and sends thus obtained customized screen data from the sending part 61 to customer's portable dedicated terminal 53.

In this manner, the data providing server 51 customizes the content selection screen based on the customized screen every time when transmission request data is sent from the portable dedicated terminal 53 by the customer who requested the data providing server 51 to customize the content selection screen. Thus, the customer can select content data on the customized screen.

In this connection, in the portable dedicated terminal 53 rented to the customer, also information to customize the color of the case of the portable dedicated terminal 53 can be selected on the customizing registration screen. If case customizing information to specify the color of the case is sent from that portable dedicated terminal 53, the data providing server 51 receives this by the receiving part 59, and supplies this to the customer database 55, and adds this to the customer registration information on the above customer and thereby update the customer registration information by the updating part 60.

Thus, thereafter, when the data providing server 51 rents or sells the portable dedicated terminal 53 to the customer, it hands the portable dedicated terminal 53 in a color specified by the case customizing information.

Furthermore, if equivalent exchange request data to request to equivalently exchange the content data (e.g. single tune) bought or being rented for packaged media (e.g. single CD) is sent from the portable dedicated terminal 53 sold or rented to the customer, the data providing server 51 receives this by the receiving part 59.

The data providing server 51 reads the customer registration information on the customer requesting the equivalent exchange, from the customer database 55 based on that equivalent exchange request data and detects the usage pattern of the content data requested to be equivalently exchanged (that is, purchase or rental) by the updating part 60. Then, the data providing server 51 searches a data table in the packaged media database 57 based on that equivalent exchange request data and the result detected by the updating part 60, by a package search part 64. Thereby, the price of the content data that the customer owns, and the sale price and the title of the packaged media storing the above content data are detected for the equivalent exchange.

Then, the data providing server 51 calculates a balance between thus detected price of the content data that the customer owns and sale price of the packaged media by the package search part 64, and transmits the above calculated balance from the sending part 61 to customer's portable dedicated terminal 53 as search result information, with these price of the content data and sale price and title of the packaged media.

The purchase price or the rental price of the content data stored in the packaged media has been already paid by the customer in the form of purchase or rental with the portable dedicated terminal 53. Thus, if exchange acceptance data to accept the equivalent exchange is sent from the portable dedicated terminal 53 sold or rented to the customer, the data providing server 51 electronically perform accounting only for the balance between the price of the content data that the customer owns and the sale price of the packaged media. And then, the customer gets the packaged media directly or by delivery.

In this manner, in the data providing server 51, content data that the customer owns and the packaged media to be exchanged are almost equalized in exchange value, and then they are equivalently exchanged. Therefore, the data providing server 51 can provide the customer with the packaged media by exchanging the content data that the customer bought or rented with the portable dedicated terminal 53 for the packaged media by a minimum investment.

In this connection, the data providing server 51 issues points to give a privilege such as discount to the customer according to the usage state by a point issuing part, not shown, every time when the customer uses the Internet with the request terminal 52 or the portable dedicated terminal 53. The above issued points are transmitted to the customer database 55 by the updating part 60, so as to be sequentially added to the customer registration information on the customer and to thereby update the above customer registration information.

When the customer requested the use of points in the equivalent exchange or the like, instead of money, the data providing server 51 balances the difference between the price of the content data that the customer owns and the sale price of the packaged media by using the points issued to the above customer.

Furthermore, when content data has been rented to the customer, the data providing server 51 constantly searches the customer registration information in the customer database 55 by the updating part 60 to detect whether or not the rental term of the content data in rental expires. If the rental term of the above content data expires soon, the data providing server 51 sends confirmation screen data to confirm whether the rental finishes, from the sending part 61 to customer's portable dedicated terminal 53.

If a rental finish notification indicating that the rental of the content data will finish according to the term is sent from the portable dedicated terminal 53 sold or rented to the customer, the data providing server 51 receives this by the receiving part 59, adds the rental finish notification to the corresponding customer registration information in the customer database 55 and thereby updates the customer registration information by the updating part 60. And the data providing server 51 sends coming-to-shop request screen data to prompt the customer to return the content data (that is, to delete the content data from the portable dedicated terminal 53) at the agency, from the sending part 61 to the above portable dedicated terminal 53.

On the contrary, as a result of sending the confirmation screen data to the portable dedicated terminal 53, if a rental extension notification to extend the rental term of the content data is transmitted, the data providing server 51 receives this by the receiving part 59, adds the rental extension notification to the corresponding customer registration information in the customer database 55 and thereby updates the customer registration information by the updating part 60.

If its rental term has expired and the content data has not been returned, the data providing server 51 adds delete information to forcibly delete the content data to the corresponding customer registration information in the customer database 55 and updates the customer registration information by the updating part 60. At the same time, the data providing server 51 transmits the delete command of the content data of which the rental term has expired, from the sending part 61 to the portable dedicated terminal 53, to delete that content data in the above portable dedicated terminal 53.

On the other hand, when the customer enters a customer registration request via an operating part 70, the request terminal 52 generates registration request data representing that registration request, by a request data generating part 71, and sends this from a sending part 72 to the data providing server 51.

As a result, when the request terminal 52 receives the customer registration screen data from the data providing server 51 by a receiving part 73, it transmits the received customer registration screen data from a display control part 74 to a display part 75, to display the customer registration screen based on the customer registration screen data.

Then, in the request terminal 52, when customer information is entered on the customer registration screen by the operations of the operating part 70 by the customer, the request terminal 52 sends that customer information from the sending part 72 to the data providing server 51 as customer information data by the request data generating part 71.

If a request for content data is entered by the customer with the operating part 70, the request terminal 52 generates transmission request data representing the transmission request by the request data generating part 71, and sends the generated transmission request data from the sending part 72 to the data providing server 51.

As a result, when the request terminal 52 receives the content selection screen data from the data providing server 51 by the receiving part 73, the request terminal 52 transmits the received content selection screen data from the display control part 74 to the display part 75 to display the content selection screen based on the content selection screen data.

Then, when the customer enters customer reservation information on the content selection screen by operating the operating part 70, the request terminal 52 generates reservation data by the request data generating part 71, and sends this from the sending part 72 to the data providing server 51.

Thereby, the portable dedicated terminal 53 before being sold or rented to the customer receives the content data sent from the data providing server 51, by a receiving part 80, and records this on a storage medium 82 by a recording control part 81, so that the portable dedicated terminal 53 will be sold and rented to the customer in this state.

In the portable dedicated terminal 53 that has been sold and rented to the customer, if a reproduction command is entered by the customer with an operating part 83, the portable dedicated terminal 53 reproduces the content data from the storage medium 82 based on that reproduction command by a reproduction control part 84, and transmits the above reproduced content data to a reproducing part 85 composed of a display control part, a display part and a speaker, etc, so as to make the customer enjoy the content.

If a request for transmission of content data is entered by the customer with the operating part 83, the portable dedicated terminal 53 generates transmission request data representing that transmission request by a request data generating part 86, and sends the above generated transmission request data from a sending part 87 to the data providing server 51.

As a result, the portable dedicated terminal 53 receives content selection screen data from the data providing server 51 by the receiving part 80, it transmits this to the reproducing part 85 to display a content selection screen based on the content selection screen data.

Then, if content data is selectively specified (including specification of purchase or rental) on the content selection screen according to the operations of the operating part 83, the portable dedicated terminal 53 generates content specifying data by the request data generating part 86, and transmits this from the sending part 87 to the data providing server 51.

When the portable dedicated terminal 53 receives the content data from the data providing server 51 by the receiving part 80, the portable dedicated terminal 53 records this on the storage medium 82 by the recording control part 81. Thus, thereafter, that content data will be reproduced from the storage medium 82 by a reproduction control part 84 according to the operations of the operating part 83.

Furthermore, if the customer permits the release of the customer information with the operating part 83, the portable dedicated terminal 53 generates customer's permission data representing the permission, by the request data generating part 86, and sends this from the sending part 87 to the data providing server 51.

As a result, when the portable dedicated terminal 53 receives advertiser/company introduction data from the data providing server 51 by the receiving part 80, the portable dedicated terminal 53 transmits the received advertiser/company introduction data to the reproducing part 85 to display it. In this state, the customer selects a desired advertiser/company by operating the operating part 83.

Then, the portable dedicated terminal 53 sends information on the advertiser and company selected by the customer to the data providing server 51 via the request data generating part 86 and the sending part 87 in order. As a result, if the customer concludes a contract with the advertiser/company selected, the portable dedicated terminal 53 receives desired distribution data such as advertisement, sent from the advertiser/company site, by the receiving part 80, and records this on the storage medium 82 by the recording control part 81.

The portable dedicated terminal 53 reproduces that distribution data from the storage medium 82 by the reproduction control part 84 according to the operations of the operating part 83, and transmits the above reproduced distribution data to the reproducing part 85. Thus, the customer can enjoy the distribution data given from the advertiser/company site.

In addition to this, if the customer enters a customizing request with the operating part 83, the portable dedicated terminal 53 generates customizing request data representing the customizing request by the request data generating part 86, and sends this from the sending part 87 to the data providing server 51.

As a result, when the portable dedicated terminal 53 receives customizing registration screen data from the data providing server 51 by the receiving part 80, the portable dedicated terminal 53 transmits this to the reproducing part 85 to display a customizing registration screen based on that customizing registration screen data.

If screen customizing information to customize the content selection screen is entered on the customizing registration screen according to the operations of the operating part 83, the portable dedicated terminal 53 sends the entered screen customizing information to the data providing server 51 sequentially via the request data generating part 86 and the sending part 87.

Also case customizing information to customize the color of the case of the portable dedicated terminal 53 can be entered on the customizing registration screen according to the operations of the operating part 83. If that case customizing information is entered, the portable dedicated terminal 53 also sends this from the sending part 87 to the data providing server 51 via the request data generating part 86.

In this manner, the portable dedicated terminal 53 can request the data providing server 51 to customize the content selection screen and the case of the portable dedicated terminal 53. Therefore, after the customer requested such customizing, he/she can selectively specify content data with the customized select screen, which was obtained by processing the content selection screen based on the screen customizing information, displayed by the reproducing part 85, and also he/she can exchange the portable dedicated terminal 53 for a portable dedicated terminal 53 in a color that he/she specified.

Furthermore, in the portable dedicated terminal 53, if the customer enters an equivalent exchange request with the operating part 83, the portable dedicated terminal 53 generates equivalent exchange request data representing that equivalent exchange request by the request data generating part 86, and sends this from the sending part 87 to the data providing server 51.

As a result, if search result information on the equivalent exchange is sent from the data providing server 51, the portable dedicated terminal 53 receives this by the receiving part 80, and transmits this to the reproducing part 85 to display the purchase or rental price of the content data that the customer owns by purchase or rental, the sale price and title of packaged media, and the difference between these prices, based on that search result information.

If customer approves the equivalent exchange with the operating part 83, the portable dedicated terminal 53 generates exchange approval data representing the approval by the request data generating part 86, and sends this from the sending part 87 to the data providing server 51. Then, electronic accounting for the difference between the price of the content data that the customer owns and the sale price of the packaged media is performed by a method that the customer specified (that is, payment by money or payment by points). Therefore, the customer can obtain the packaged media by a minimum investment.

In this connection, if confirmation screen data for content data of which the rental term expires soon is sent from the data providing server 51, the portable dedicated terminal 53 receives this by the receiving part 80, and transmits this to the reproducing part 85 to display a confirmation screen based on that confirmation screen data, to thereby notify the customer that the rental term of the content data will expires soon, on the above confirmation screen.

Then, at this time, if the termination or extension of the rental term is specified by the customer with the operating part 83, the portable dedicated terminal 53 notifies the data providing server 51 of it from the sending part 87 via the request data generating part 86.

Furthermore, if the rental term of the content data has expired before the content data is returned and a command to delete the content data is sent from the data providing server 51, the portable dedicated terminal 53 receives this by the receiving part 80, and deletes the content data of which the rental term has expired from the storage medium 82 based on that delete command by the recording control part 81. Thus, illegal use (reproduction) of the content data can be prevented.

According to the above configuration, in this data providing system 50, content data specified by the customer is recorded in a portable dedicated terminal 53, which is only for a agency specified by the above customer, according to reservation data sent from a request terminal 52 that the customer operates by the data providing server 51, and the portable dedicated terminal 53 are sold or rented to the customer.

Then, if content specifying data is given from the customer with the portable dedicated terminal 53, this data providing server 51 reads content data from the content database 56 according to the content specifying data, and sends the read content data to that portable dedicated terminal 53 to record this therein.

Furthermore, in the data providing server 51, customer registration information on the customer who bought or is renting the portable dedicated terminal 53 is registered in the customer database 55. The customer registration information is updated according to the usage state of the portable dedicated terminal 53 every time when the above customer uses the portable dedicated terminal 53 for the purchase or the rental of content data. If the customer permits the release of the customer information with the portable dedicated terminal 53, the data providing server 51 searches advertiser/company registration information in the advertiser/company database 58 based on the customer registration information, to select advertisers/companies that provide distribution data meeting customer's taste to introduce them to the customer.

If customizing of a content selection screen is requested from the customer with the portable dedicated terminal 53, the data providing server 51 customizes the content selection screen according to the request, and provides the customer portable dedicated terminal 53 with the customized screen obtained by customizing the above content selection screen to make the customer select content data.

In addition, if the equivalent exchange of content data bought or rented for packaged media is requested from the customer with the portable dedicated terminal 53, the data providing server 51 provides the customer with the packaged media, under the payment of the difference between the price of the content data that the customer owns and the sale price of the packaged media.

Accordingly, in this data providing system 50, even if a customer does not have a device capable of accessing the Internet, he/she can previously reserve the purchase or rental of a portable dedicated terminal 53 capable of recording and reproducing content data, with a request terminal 52 installed in a KIOSK or the like, and after the customer gets the reserved portable dedicated terminal 53, he/she can obtain content data which is distributed, with the portable dedicated terminal 53.

In this data providing system 50, by using that portable dedicated terminal 53, the customer can easily select content data on a customized screen that has been customized according to his/her request, and also the customer can exchange content data obtained by distribution for packaged media storing the content data by a minimum investment. Furthermore, the customer can easily select an advertiser/company that provides distribution data meeting his/her own taste from many advertiser/company sites, so as to use the distribution of the distribution data.

As a result, in the data providing system 50, also customers who do not have a device capable of accessing the Internet can easily use the system while sufficiently enjoying the convenience of the Internet.

In this data providing system 50, customers use the portable dedicated terminal 53, which is only for an agency, by purchase and rental. It can easily get the customers who use agencies as well as the Internet. Thus, the agencies can easily use and can enter into the Internet.

According to the above configuration, in the data providing server 51, the portable dedicated terminal 53, which is only for an agency, capable of recording and reproducing content data is sold or rented to a customer according to reservation data sent from the request terminal 52. Content data is distributed according to content specifying data sent from the above sold or rented portable dedicated terminal 53 and is recorded in that portable dedicated terminal 53. In addition, advertisers/companies are selected based on customer registration information according to customer's permission sent from that portable dedicated terminal 53, to be introduced to the customer. A content selection screen is customized according to a customizing request sent from the above portable dedicated terminal 53, and given to that portable dedicated terminal 53. And content data that the customer owns by distribution and packaged media storing the above content data are almost equalized in exchange value in order to equivalently exchange them, according to an equivalent exchange request sent from that portable dedicated terminal 53. Thereby, customers who do not have an Internet accessible device can easily use the system while sufficiently enjoying the convenience of the Internet. And the system allows an agency to easily get customers, by the portable dedicated terminals 53 which are only for the agency using the Internet. Thus, a data providing system that can further popularize the Internet can be realized.

Note that, in the aforementioned first embodiment, the customer requests customer registration and the purchase or rental of the portable dedicated terminal 53 with the request terminal 52. This invention, however, is not only limited to this and also the customer may request the customer registration and the purchase or rental of the portable dedicated terminal 53 with a device capable of accessing the Internet such as a personal computer, instead of the request terminal 52. Thereby, not only customers who do not a device capable of accessing the Internet but also customers who have such devices can enjoy the convenience of the Internet more than now by using the portable dedicated terminal 53.

(3) Second Embodiment

Figure 5:
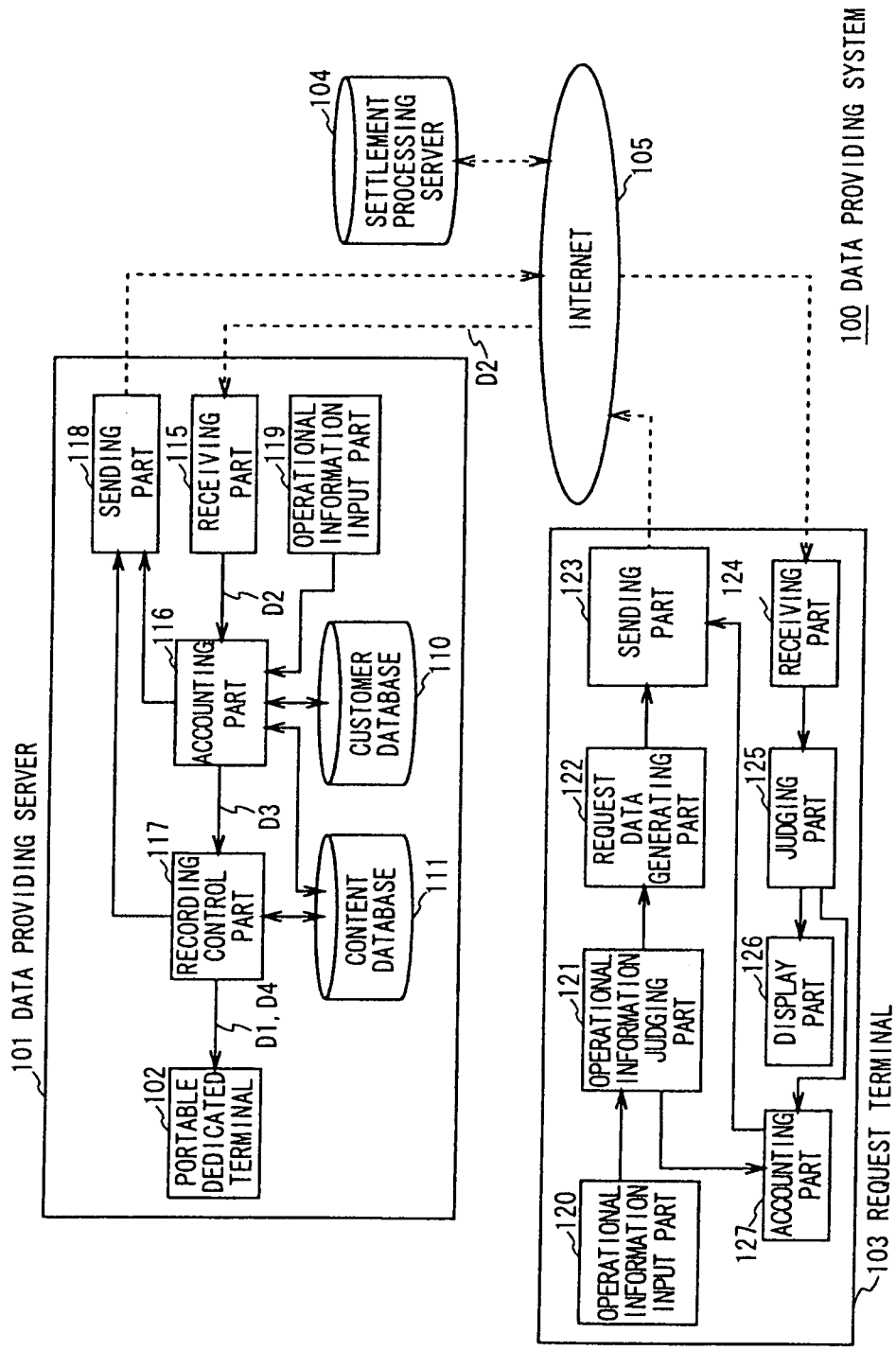
FIG. 5 is a block diagram showing the construction of a data providing system according to a second embodiment.

FIG. 5 shows a data providing system 100 according to a second embodiment. A portable dedicated terminal 102 similar to the portable dedicated terminals 7A to 7N described above with reference to FIGS. 1 to 3 is directly connected to a data providing server 101 that corresponds to the system management site 2 and the agencies 4A to 4N described above with reference to FIGS. 1 to 3. A request terminal 103 that corresponds to the customer 3 described above with reference to FIGS. 1 to 3 (that is, request terminal used by the customer 3) and a settlement processing server 104 are connected to the above data providing server 101 via the Internet 105.

The data providing server 101 has a customer database 110 and a content database 111. The customer database 110 stores customer registration information generated by executing a customer registration similar to the customer registration described above with reference to FIGS. 1 to 4 (composed of customer's name, customer ID, bank account number, etc.).

Furthermore, the data providing server 101 stores a lot of content data in the content database 111, and also a data table generated by listing content additional information composed of content identification information unique to each of the content data (hereinafter, this is referred to as content ID), titles (for example the title of a tune), prices (sale price and rental price), etc.

If customer reservation information to reserve the rental of content data (hereinafter, specially this is referred to as rental reservation data) is sent as rental reservation request data from the request terminal 103 via the Internet 105 by operations by the customer wanting the rental of the content data, the data providing server 101 receives this by a receiving part 115, converts the received rental reservation request data into recording control data by an accounting part 116, and transmits this to a recording control part 117.

Now, the data providing server 101 generates rental reservation acceptance data including dedicated terminal identification information (hereinafter, this is referred to as dedicated terminal ID) unique to the portable dedicated terminal 102 for recording the content data that the customer requested to rent, by the recording control part 117, and transmits this to the request terminal 103 from a sending part 118 via the Internet 105 to notify the customer that it has accepted the reservation of the rental of the customer desired content data.

In addition, the data providing server 101 reads the content data requested to be rented by the customer, from the content database 111 based on the recording control data by the recording control part 117, and sends the read content data to the portable dedicated terminal 102 having the dedicated terminal ID which the customer was notified of.

Thereby, the data providing server 101 records the customer desired content data on a storage medium installed in that portable dedicated terminal 102.

In this manner, the data providing server 101 records the content data requested by the customer on the portable dedicated terminal 102 having a content data recording/reproducing function. Then, when the customer comes to, for example, an agency having the above data providing server 101 installed therein, the content data requested to be rented is handed to the customer with the portable dedicated terminal 102.

Therefore, in the data providing server 101, content data can be rented to the customer with the portable dedicated terminal 102 according to a rental term, so that the customer can enjoy the content data by reproducing it with the portable dedicated terminal 102.

Figure 6:
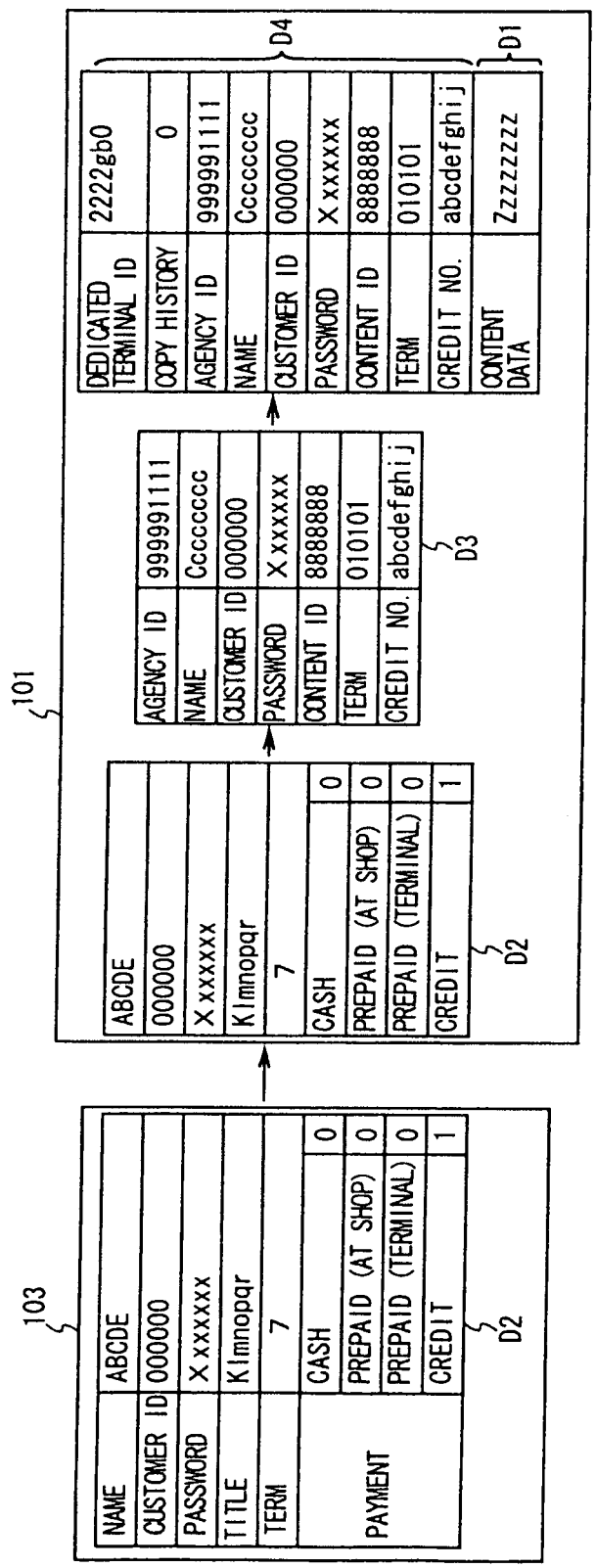
FIG. 6 is a schematic diagram showing a data format of header data to be added to content data.

By the way, as shown in FIGS. 5 and 6, rental reservation request data D2 sent from the request terminal 103 has information such as customer's name, customer ID, password, the title of content data D1 requested to be rented, rental term, payment method of rental charge (payment by cash or prepaid card at shop, payment by prepaid card with request terminal, payment by credit).

When the data providing server 101 receives the rental reservation request data D2 from the request terminal 103 by the receiving part 115, the data providing server 101 extracts information on the payment method of the rental charge (hereinafter, this is referred to as payment data) from the rental reservation request data D2 by the accounting part 116.

In a case where the payment information specifies payment by credit, the data providing server 101 reads the customer registration information on the customer who is requesting to rent the content data D1, from the content database 110 based on the customer ID included in the rental reservation request data D2 by the accounting part 116, and searches a data table in the content database 111 based on the title of the content data D1 included in the above rental reservation request data D2 to read the additional information on the content data D1 requested to be rented by the customer.

The data providing server 101 executes accounting based on the rental charge for the portable dedicated terminal 102 and the bank account number of the agency, which have been previously stored, and the rental reservation request data D2, the customer registration information, and the additional information on the content data D1, by the accounting part 116. Thereby, the data providing server 101 generates accounting information representing the amount of charge to the customer according to the rental term of the content data D1, the account numbers of the agency and the customer, etc., and sends this from the sending part 118 to the settlement processing server 104 via the Internet 105.

When the electronic settlement processing based on the accounting information completes and a settlement completion notification is sent from the settlement processing server 104, the data providing server 101 receives this by the receiving part 115, and recognizes this by the accounting part 116.

Thereby, the data providing server 101 generates recording control data D3 by adding the agency ID to the rental reservation request data D2 with the accounting part 116, and sends the generated recording control data D3 to the recording control part 117.

In this connection, when the recording control data D3 is generated by the accounting part 116, the data providing server 101 changes customer's name included in the rental reservation request data D2 to the coded customer's name registered as the customer registration information, changes the title of the content data D1 to the content ID, codes the number of days of the rental term, and adds customer's account number.

When the recording control data D3 is transmitted from the accounting part 116 to the recording control part 117, the data providing server 101 generates rental reservation acceptance data by the recording control part 117, and sends this from the sending part 118 to the request terminal 103.

Then, the data providing server 101 generates header data D4 based on the recording control data D3 by adding the dedicated terminal ID of the portable dedicated terminal 102 which stores the content data D1 requested to be rented by the customer, and copy history information showing the copy history at the time when the above content data D1 is illegally copied, to the above recording control data D3 by the recording control part 117. Then, the data providing server 101 adds the header data D4 to the content data D1 requested to be rented by the customer and records this in the portable dedicated terminal 102.

Thereby, the data providing server 101 can easily recognize from the header data D4 that the portable dedicated terminal 102 and the content data D1 rented to the customer were rented at its own shop.

Furthermore, the portable dedicated terminal 102 rented to the customer monitors whether or not the rental term of the content data D1 has expired, according to information on the rental term included in the header data D4. In the case where the rental term has passed and the content data D1 has not been returned (that is, in the case where the content data D1 was not returned with the portable dedicated terminal 102), the portable dedicated terminal 102 does not allow the content data D1 to be reproduced, which prevents the rented content data D1 from being illegally used after the expiration of the rental term.

Furthermore, when the content data D1 in rental was illegally copied while it is rented to the customer, the portable dedicated terminal 102 records the number of copies as copy history information in the header data D4. Thereby, when the portable dedicated terminal 102 is returned to the agency, the agency can know from the copy history information in the header data D4 that the customer illegally copied the content data D1.

On the other hand, in the case where payment by a prepaid card with the request terminal 103 is specified by the rental reservation request data D2 sent from the request terminal 103, the data providing server 101 executes accounting based on the rental charge for the portable dedicated terminal 102, the rental reservation request data D2 and the additional information on the content data D1, by the accounting part 116. The data providing server 101 calculates the amount of charge to the customer according to the rental term of the content data D1, and sends information on the calculated amount of charge as accounting data from the sending part 118 to the request terminal 103 via the Internet 105.

When the data providing server 101 receives payment-by-prepaid completion data sent from the request terminal 103 by the receiving part 115 after the payment by prepaid card completes based on the accounting data, the data providing server 101 generates recording control data D3 by adding the agency ID to the rental reservation request data D2 storing information representing that the payment by prepaid card has completed with the request terminal 103, instead of customer's account number, by the accounting part 116, and transmits this to the recording control part 117.

When the recording control data D3 is transmitted from the accounting part 116 to the recording control part 117, the data providing server 101 sends rental reservation acceptance data from the sending part 118 to the request terminal 103 by the recording control part 117, similarly to the above. At the same time, the data providing server 101 generates header data D4 based on that recording control data D3, and records this in the portable dedicated terminal 102 with the content data D1.

Furthermore, when payment by cash or a prepaid card at the shop is specified by the rental reservation request data D2 sent from the request terminal 103, the data providing server 101 generates recording control data D3 by adding the agency ID to the rental reservation request data D2 including information representing that the payment by cash or prepaid card at the shop has completed instead of customer's account number, by the accounting part 116, and sends this to the recording control part 117.

Also in this case, the data providing server 101 transmits the recording control data D3 from the accounting part 116 to the recording control part 117 similarly to the above, and sends rental reservation acceptance data from the sending part 118 to the request terminal 103 by the above recording control part 117. At the same time, the data providing server 101 generates header data D4 based on that recording control data D3, and records this in the portable dedicated terminal 102 with the content data D1.

In this connection, in the data providing server 101, a slot for a prepaid card is provided on the accounting part 116. When the payment by prepaid card at a shop is specified, an amount of charge to the customer according to the rental term of the content data D1 has been computed by the accounting part 116. And when the customer inserts his/her prepaid card into the slot when the customer visits to receive the portable dedicated terminal 102, the prepaid card settles the rental charge to the customer.

Note that, the above data providing server 101 also can cope with the case where the customer comes to the shop and requested to rent content data D1. In this case, a clerk in the shop enters rental information having the contents similar to the rental reservation request data D2 described above with reference to FIG. 6, with an operational information input part, in order to transmit the entered rental information to the accounting part 116. Thus, the content data D1 is recorded in the portable dedicated terminal 102 similarly to the aforementioned rental reservation with the request terminal 103.

On the other hand, if rental reservation information similar to the contents of the aforementioned rental reservation request data D2 is entered by the customer with an operational information input part 120, the request terminal 102 (FIG. 5) generates the aforementioned rental reservation request data D2 based on that rental reservation data by a request data generating part 112 via an operational information judging part 121, and sends this from a sending part 123 to the data providing server 101 via the Internet 105.

When rental reservation acceptance data is sent from the data providing server 101 via the Internet 105, the request terminal 103 receives this by a receiving part 124, and transmits this from a judging part 125 to a display part 126 to notify the customer of the completion of the acceptance of the rental reservation of the desired content data requested by the customer, and also of the dedicated terminal ID of the portable dedicated terminal 102 that will be rented with the above content data D1.

In this connection, in the request terminal 103, an accounting part 127 has a slot for a prepaid card. When payment by prepaid card with the above request terminal 103 is specified by the customer with the operational information input part 120, the operational information judging part 121 recognizes this and notifies the accounting part 127 of this.

The request terminal 103 receives account data which was sent in response to sending the rental reservation request data D2 to the data providing server 101, by the receiving part 124, recognizes the received account data by the judging part 125, and transmits this to the accounting part 127.

When a prepaid card owned by the customer is inserted into the slot of the accounting part 127, the request terminal 103 settles the rental charge to the customer by that prepaid card based on the account data by the above accounting part 127. And then, the request terminal 103 generates payment-by-prepaid completion data, and sends this from the sending part 123 to the data providing server 101 via the Internet 105.

Figure 7:
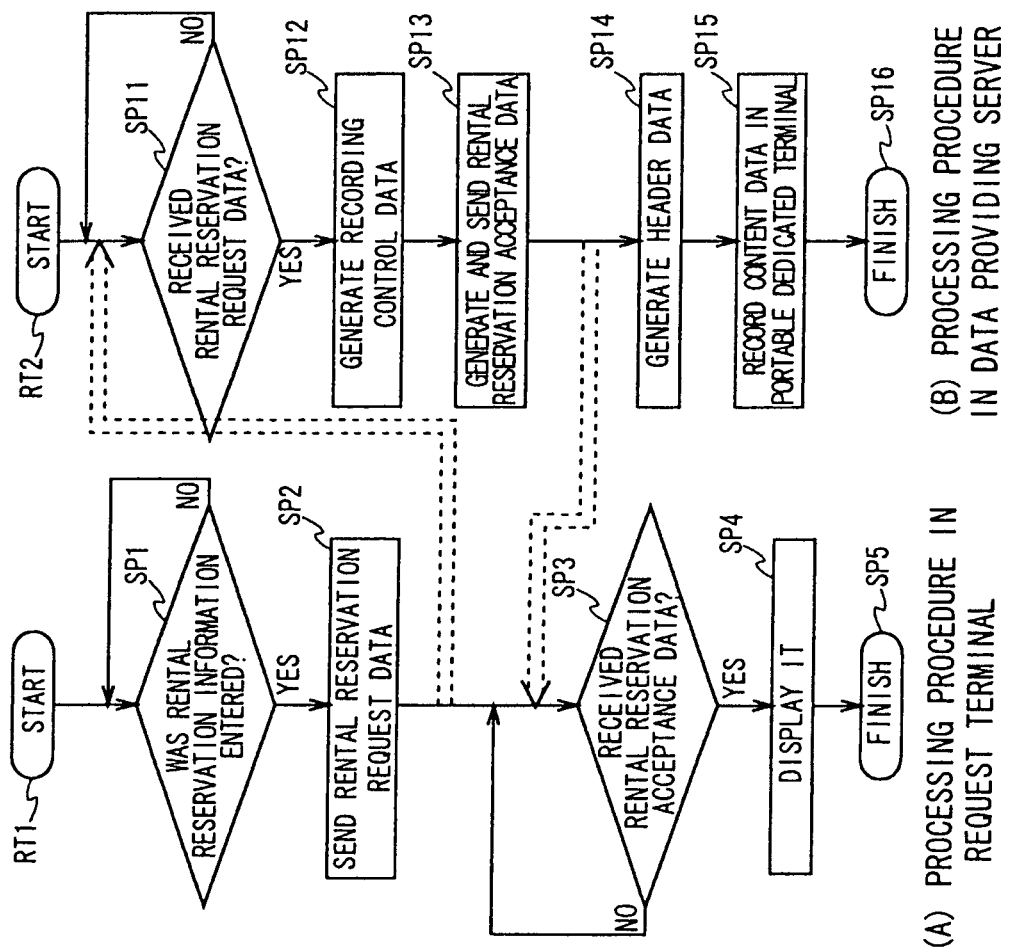
FIG. 7 is a flowchart showing a rental reservation processing procedure in the data providing system.

Now, a rental reservation processing procedure by the data providing server 101 and the request terminal 103 in the data providing system 100 will be described except for payment for a rental charge (that is, accounting). As shown in FIG. 7(A), the request terminal 103 enters routine RT1 from the starting step, and proceeds to step SP1.

In step SP1, the request terminal 103 waits for the customer to enter rental reservation information with the operational information input part 120. When the rental reservation information is entered, the request terminal 103 proceeds to the next step SP2 to generate rental reservation request data D2 by the request data generating part 122, sends this from the sending part 123 to the data providing server 101 via the Internet 105, and precedes to step SP3.

At this time, as shown in FIG. 7(B), the data providing server 101 enters routine RT2 from the starting step, and proceeds to the next step SP11. In step SP11, the data providing server 101 waits for rental reservation request data D2 to be transmitted from the request terminal 103. When the data providing server 101 receives the rental reservation request data D2 sent from the request terminal 103, by a receiving part 115, the data providing server 101 proceeds to step SP12.

In step SP12, the data providing server 101 generates recording control data D3 with the rental reservation request data D2 by the accounting part 116, and proceeds to the next step SP13.

In step SP13, the data providing server 101 generates rental reservation acceptance data and sends this from the sending part 118 to the request terminal 103 via the Internet 105, and proceeds to step SP14.

At this time, in step SP3, the request terminal 103 waits for rental reservation acceptance data to be transmitted from the data providing server 101. When the request terminal 103 receives the rental reservation acceptance data from the data providing server 101 with the receiving part 124 in step SP3, the request terminal 103 proceeds to the next step SP4.

In step SP4, the request terminal 103 transmits the rental reservation acceptance data and displays this on the display part 126 to notify the customer of the completion of the acceptance of the rental reservation of the content data D1 with the dedicated terminal ID of the portable dedicated terminal 102 that will be rented with the above content data D1, and proceeds to the next step SP5 to finish the processing in the above request terminal 103.

On the other hand, in step SP14, the data providing server 101 generates header data D4 based on the recording control data D3 and proceeds to step SP15. In step SP15, the data providing server 101 adds the header data D4 to the content data D1 requested by the customer by the recording control part 117 and records this on the storage medium in the portable dedicated terminal 102. Then, the data providing server 101 proceeds to step SP16 to finish the processing in the above data providing server 101. In this manner, the data providing system 100 finishes the rental reservation processing for the content data D1.

According to the above configuration, in this data providing system 100, a lot of content data D1 has been stored in the content database 111 in the data providing server 101 installed at an agency. When the customer requests the reservation of the rental of desired content data D1 with the request terminal 103, the data providing server 101 records that content data D1 in the portable dedicated terminal 102. And then, when the customer comes to the agency, the reserved content data D1 is rented to the customer with the portable dedicated terminal 102.

Accordingly, in this data providing system 100, even if the customer does not have a device having a function to record and reproduce content data D1 and is capable of accessing the Internet to the content data D1, like a personal computer (hereinafter, this is referred to as content obtaining apparatus), an agency can easily provide the customer with content as data with the portable dedicated terminal 102.

Furthermore, in the data providing system 100, when content data D1 is to be rented, the customer can previously reserve the rental of the desired content data D1 with the distant request terminal 103. Therefore, an agency can smoothly hand the portable dedicated terminal 102 with the content data D1 to the customer who comes to the agency without making the customer wait during the recording of the content data D1 in the portable dedicated terminal 102.

Moreover, in this data providing system 100, also when the customer reserves the rental of the content data D1 by operating the request terminal 103, the customer is notified of the acceptance of the rental reservation at a time point that the recording control data D3 to record the content data D1 in the portable dedicated terminal 102 is generated. Therefore, the customer can make a reservation for the rental of the content data D1 without waiting in front of the portable dedicated terminal 102 while the content data D1 is recorded in the portable dedicated terminal 102.

In this connection, it has been already described that a content obtaining apparatus is necessary to use the distribution of content data D1 via the Internet 105. However, knowledge of the Internet 105 used in that distribution of the content data D1 is also needed. Therefore, a person who does not have knowledge of the Internet 105 is sometimes hard to easily receive the distribution of the content data D1.

To obviate this, if the customer uses the data providing system 100 according to the second embodiment, although he/she uses the Internet 105 to reserve the rental of the content data D1, he/she reserves the rental of the content data D1 using the request terminal 103 which is used only to directly access a data providing server 151 with simple operations. Therefore, in addition to the customers who do not have a content obtaining apparatus, the customers who do not have knowledge of the Internet 105 can easily obtain content data D1.

According to the above configuration, the customer reserves the rental of desired content data D1 at the data providing server 101 that has the content database 111 storing a lot of content data D1, with the request terminal 103. That requested content data D1 is recorded in the portable dedicated terminal 102 by the above data providing server 101, and the portable dedicated terminal 102 is rented to the customer with the above content data D1, which can provide the customer who does not have a content obtaining apparatus with content data much easily. Thus, a data providing system which offers significantly improved usability can be realized.

Note that, in the aforementioned second embodiment, the portable dedicated terminal 102 which is only for an agency is rented with content data D1. This invention, however, is not limited to this and the portable dedicated terminal 102 may be sold to the customer and the content data D1 may be recorded in the above portable dedicated terminal 102 for rental or for purchase. Thereby, when the customer requests the purchase of content data D1, the content data D1 likewise bought can be recorded and stored in the portable dedicated terminal 102 that the customer had bought. Thus, the usability of the data providing system 100 can be further improved.

In the aforementioned second embodiment, content data D1 requested to be rented by the customer is recorded in the portable dedicated terminal 102 which is only for an agency. This invention, however, is not limited to this and content data D1 that the customer wants to rent or buy may be recorded in a portable recording/reproducing device such as a portable telephone, a portable MD (Mini Disc trademark by Sony Corp.) player that the customer carried. Thereby, also customers who have a content obtaining apparatus can easily use the data providing system, and the versatility of the above data providing system can be improved.

Furthermore, in the aforementioned second embodiment, content data D1 is recorded in the portable dedicated terminal 102 at an agency according to customer's reservation data from the request terminal 103. This invention, however, is not limited to this and, for instance, content data D1 may be recorded using the Internet or the like, in the portable dedicated terminal 102 in a manufacture company, sales company or the like. Thereby, even if the portable dedicated terminal 102 is directly handed to the customer from a factory or the like, the content data D1 can be accurately rented.

(4) Third Embodiment

Figure 8:
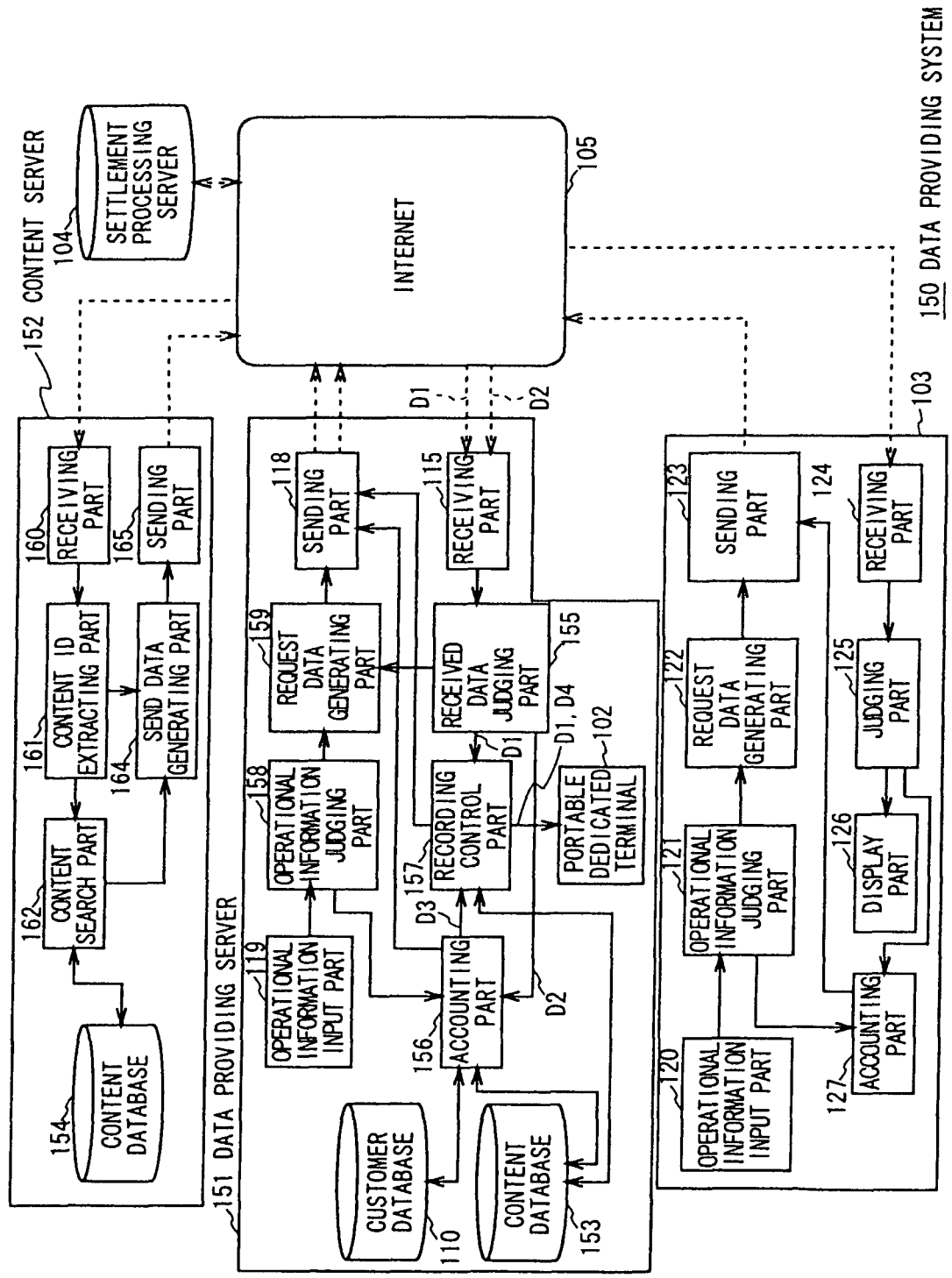
FIG. 8 is a block diagram showing the configuration of a data providing system according to a third embodiment.

FIG. 8 in which the same reference numerals are added to corresponding parts in FIG. 5 shows a data providing system 150 according to a third embodiment. The data providing system 150 is constructed similarly to the data providing system 100 according to the second embodiment except for the construction of a data providing server 151 corresponding to the system management site 2 and the agencies 4A to 4N described above with reference to FIGS. 1 to 3 and the construction where a content server 152 corresponding to the system management site 2 described above with reference to FIGS. 1 to 3 is connected to the above data providing server 151 via the Internet 105.

In this case, the content server 152 has a content database 154 storing a lot of content data D1 more than the content data D1 stored in a content database 153 in the data providing server 151, and a data table generated by listing the additional information on the above content data D1 (composed of content ID, title, sale price, rental price, etc.).

In the content database 153 stored in the data providing server 151, a part of the much content data D1 stored in the content database 154 in the content server 152 is stored, and also a new data table generated by associating information representing the content data D1 stored in the data providing server 151 with the data table stored in the content database 154 in the content server 152 is stored.

Furthermore, the data providing server 151 is provided with a received data judging part 155 for judging the type of data received by the receiving part 115, and when the receiving part 115 receives rental reservation request data D2 sent from the request terminal 103 via the Internet 105, the data providing server 151 transmits the received rental reservation request data D2 from the received data judging part 155 to an accounting part 156.

The data providing server 151 searches a data table in the content database 153 based on that rental reservation request data D2 by the accounting part 156, and judges whether or not content data D1 wanted to rent by the customer has been stored in the content database 153.

As a result, if it is confirmed by the accounting part 156 that the content data D1 wanted to rent by the customer has been stored in the content database 153, then the data providing server 151 generates recording control data D3 by the accounting part 156 and transmits this to a recording control part 157.

Thereby, the data providing server 151 sends rental reservation acceptance data from the sending part 118 to the request terminal 103 by the recording control part 157. At the same time, the data providing server 151 generates header data D4 based on that recording control data D3 and records this in the portable dedicated terminal 102 with the content data D1.

Figure 9:
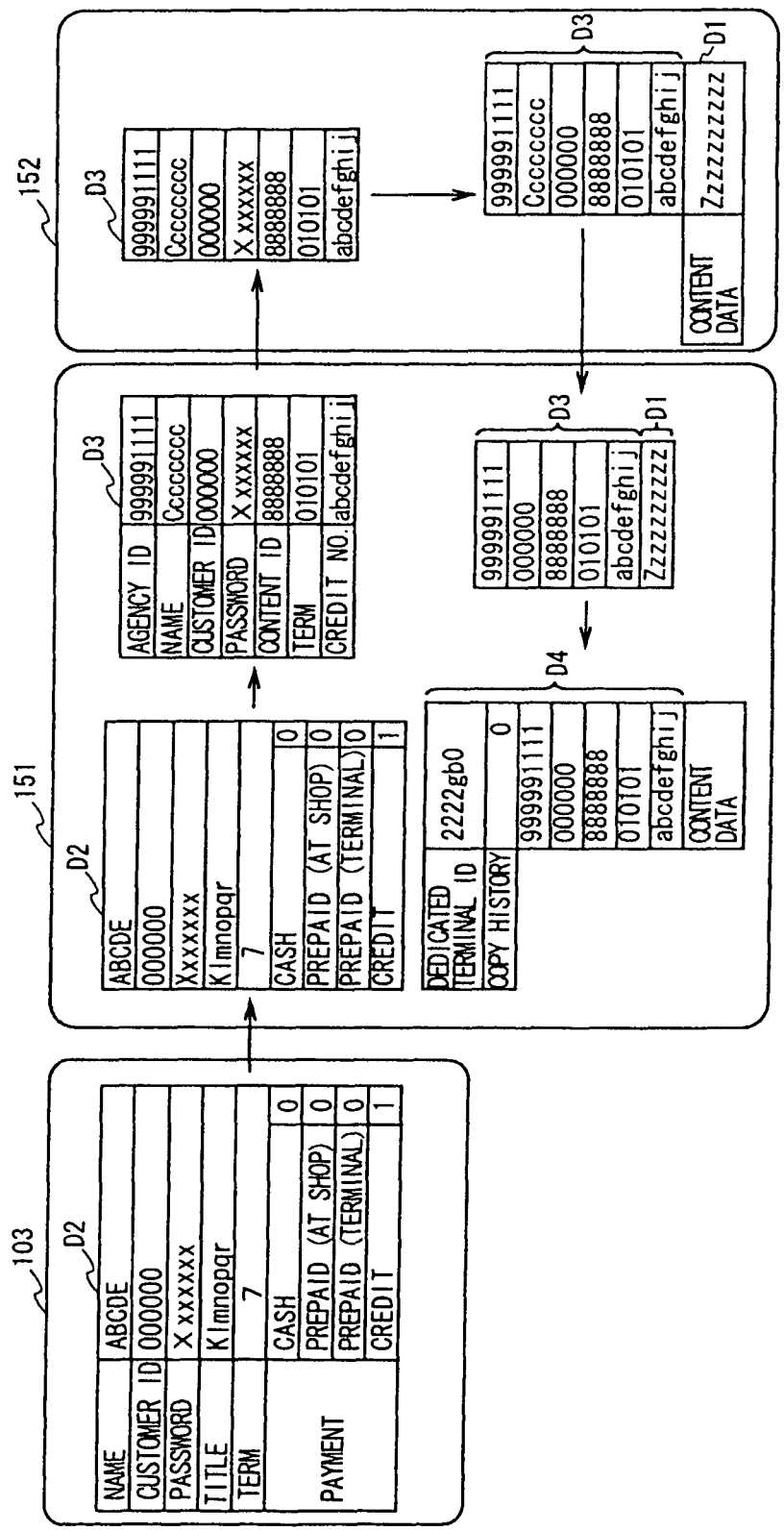
FIG. 9 is a schematic diagram showing a data format of content transmission request data for obtaining content data from a content server.

On the contrary, as shown in FIGS. 8 and 9, if is it confirmed by the accounting part 156 that the content data D1 requested by the customer has not been stored in the content database 153, then the data providing server 151 generates recording control data D3 with the rental reservation request data D2 by the accounting part 156, similarly to the accounting part 116 of the data providing server 101 (FIG. 5) according to the second embodiment described above with reference to FIGS. 5 and 6 (it also executes accounting), and transmits the recording control data D3 from the sending part 118 to the content server 152 via the Internet 105 as content transmission request data.

As a result, when the requested content data D1 is sent from the content server 152 via the Internet 105 with the content transmission request data, the data providing server 151 receives this by the receiving part 115, takes them in the received data judging part 155, and transmits them from the received data judging part 155 to the recording control part 157.

The data providing server 151 generates header data D4 by adding the information on the dedicated terminal ID and copy history to the content transmission request data (i.e. recording control data D3) by the recording control part 157, and records the generated header data D4 in the portable dedicated terminal 102 together with the content data D1 obtained from the content server 152.

In this manner, even if the rental of the content data D1 that has not been stored in the content database 153 is requested, the data providing server 151 can rent the content data D1 to the customer by obtaining this from the content server 152.

In this connection, when this data providing server 151 obtains the content data D1 from the content server 152, it takes more time for processing for accepting the rental reservation, comparing to the case where the content data D1 requested by the customer has been stored in the content database 153 in the data providing server 151.

Therefore, the data providing server 151 generates rental reservation acceptance data by the received data judging part 155 and sends this to notifies the customer of the acceptance of the rental reservation at the time point that the content data D1 is obtained from the content server 152.

Furthermore, when the customer comes to an agency and requested the rental of content data D1, a clerk of the agency inputs rental information having the same contents as the rental reservation request data D2 which is entered with an operational information input part 119. The data providing server 151 transmits this from the operational information judging part 158 to the accounting part 156. Thus, the content data D1 is recorded in the portable dedicated terminal 102 similarly to the aforementioned rental reservation with the request terminal 103.

When content information including a content ID to newly store the content data D1 in the content database 153 is entered via the operational information input part 119, the data providing server 151 transmits the content information from an operational information judging part 158 to a request data generating part 159, generates content request data representing that content information by the above request data generating part 159, and sends this from the sending part 118 to the content server 152 via the Internet 105.

When the desired content data D1 and its additional information are sent from the content server 152, the data providing server 151 receives this by the receiving part 115, and transmits the above received content data D1 and additional information from the received data judging part 155 to the recording control part 157 to store them in the content database 153 by the above recording control part 157.

Thereby, although it relatively takes a time to obtain the content data D1 from the content server 152, content data, for example, of which the rental is relatively requested among the content data D1 not stored in the content database 153, is obtained from the content server 152 and is stored in the content database 153, so that the data providing server 151 can rapidly deal with the rental request by the customer.

On the other hand, when the content transmission request data is sent from the data providing server 151 via the Internet 105, the content server 152 (FIG. 8) receives this by a receiving part 160, extracts the content ID from that content transmission request data by a content ID extracting part 161, and transmits this to a content search part 162 and also transmits the above content transmission request data to a send data generating part 164.

The content server 152 searches the content database 154 based on that content ID by the content search part 162, reads the corresponding content data D1, and transmits this to the send data generating part 164. At the same time, the content server 152 adds the content transmission request data to that content data D1 by the send data generating part 164, and sends them from a sending part 165 to the data providing server 151 via the Internet 105.

Furthermore, when the content request data is sent from the data providing server 151 via the Internet 105, the content server 152 receives this by the receiving part 160, extracts the content ID from that content request data by the content ID extracting part 161, and transmits this to the content search part 162.

The content server 152 searches the content database 154 based on that content ID by the content search part 162 and reads corresponding content data D1 and additional information, and sends them from the sending part 165 to the data providing server 151 via the send data generating part 164 and the Internet 105.

In this manner, the content server 152 can provide the data providing server 151 with the content data D1.

Figure 10:
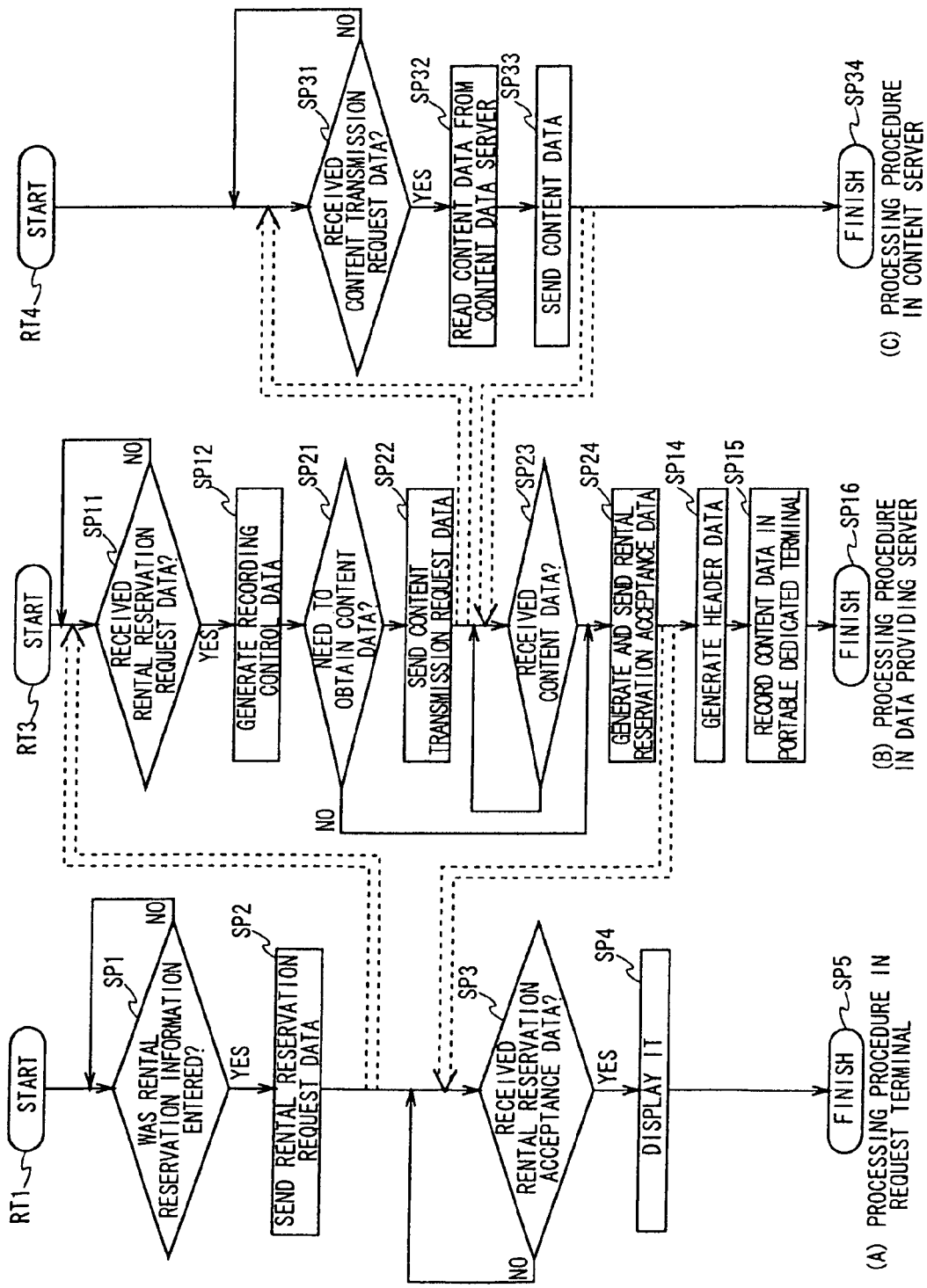
FIG. 10 is a flowchart showing a rental reservation processing procedure in the data providing system.

Now, rental reservation processing procedures in the data providing server 151, the request terminal 103 and the content server 152 in the data providing system 150 will be described except for the payment of rental charges (i.e. accounting). As shown in FIG. 10(A), first, the request terminal 103 enters routine RT1 from the starting step and executes similar processing to the case described above with reference to FIG. 7(A).

On the other hand, as shown in FIG. 10(B) in that the same reference numerals are applied to corresponding parts in FIG. 7(B), the data providing server 151 enters routine RT3 from the starting step and sequentially executes processing in steps SP11 and SP12. And then, the data providing server 151 proceeds to step SP21, and in step SP21, it searches a data table in the content database 153 by the accounting part 156 to judge whether the content data D1 wanted to rent by the customer is needed to obtain from the content server 152.

Obtaining an affirmative result in this step SP21 means that the content data D1 wanted to rent by the customer has not been stored in the content database 153 in the data providing server 151. At this time, the data providing server 151 proceeds to step SP22 to send the recording control data D3 generated by the accounting part 156 as content transmission request data from the sending part 118 to the content server 152 via the Internet 105, and proceeds to step SP23.

Now, as shown in FIG. 10(C), the content server 152 enters routine RT4 from the starting step, and proceeds to the next step SP31. In step SP31, the content server 152 waits for the content transmission request data to be transmitted from the data providing server 151. When the content server 152 receives the content transmission request data from the data providing server 151 by the receiving part 160, the content server 152 proceeds to step SP32.

In step SP32, the content server 152 extracts the content ID from the content transmission request data by the content ID extracting part 161, searches the content database 154 based on the content ID by the content search part 162 and thereby reads the content ID having that content ID from the content database 154. Then, the content server 152 proceeds to step SP33.

In step SP33, the content server 152 adds the content transmission request data to the content data D1 read from the content database 154 by the send data generating part 164, sends them from the sending part 165 to the data providing server 151 via the Internet 105, and proceeds to the next step SP34 to finish the above processing in the content server 152.

On the other hand, in step SP23, the data providing server 151 waits the content data D1 to be transmitted from the content server 152. When the data providing server 151 receives the content data D1 from the above content server 152 by the receiving part 115 (receiving the content transmission request data as well as the content data D1), the data providing server 151 proceeds to step SP24.

In step SP24, the data providing server 151 transmits the received content data D1 and content transmission request data from the received data judging part 155 to the recording control part 157, and also generates rental reservation acceptance data by the above received data judging part 155 and sends this from the sending part 118 to the request terminal 103 via the Internet 105. Then, the data providing server 151 sequentially executes the processing at steps SP14 and SP15, and then, the data providing server 151 proceeds to step SP25 to finish the processing by the above data providing server 151. In this manner, the data providing server 151 finishes the rental reservation processing for the content data D1.

In this connection, obtaining a negative result in the aforementioned step SP21 means that the content data D1 wanted to rent by the customer has been stored in the content database 153 in the data providing server 151. At this time, the data providing server 151 proceeds to step SP24 to generate rental reservation acceptance data by the recording control part 157 that received the recording control data D3 from the accounting part 156, and sends this from the sending part 118 to the request terminal 103 via the Internet 105, and then, the data providing server 151 proceeds to step SP14.

According to the above configuration, in this data providing system 150, the content server 152 having the content database 154 storing much more content data D1 than the above data providing server 151 is connected to the data providing server 151 having the content database 153 storing a lot of content data D1 via the Internet 105.

In this data providing system 150, when the data providing server 151 receives the rental reservation request data D2 from the request terminal 103 operated by the customer, the data providing server 151 judges whether or not the content data D1 wanted to rental by the customer has been stored in the content database 153 in the above data providing server 151. And if the content data D1 wanted by the customer has not been stored, the data providing server 151 obtains that content data D1 from the content server 152, and records this in the portable dedicated terminal 102 that will be rented to the customer.

Accordingly, in this data providing system 150, the scale of the content database 153 to be provided in the data providing server 151 can be relatively small. And even if the scale of the content database 153 is miniaturized, various content data D1 that will be requested by customers can accurately rent.

In this connection, in this data providing system 150, since the scale of the content database 153 to be provided in the data providing server 151 can be miniaturized, agencies that install the above data providing server 151 can largely reduce investment in equipment.

According to the above configuration, to the data providing server 151 having the content database 153 storing a lot of content data D1, the content server 152 having the content database 154 storing much more content data D1 than the above data providing server 151 is connected. In the data providing server 151 which receives a rental request from the customer, if content data D1 wanted to rent has not been stored in the content database 153, the data providing server 151 obtains that content data D1 from the content server 152 to rent this to the customer. Thereby, in addition to the effects obtained by the aforementioned second embodiment, the scale of the content database 153 to be provided in the data providing server 151 can be largely miniaturized. And even if the scale of the content database 153 is miniaturized, a data providing system capable of accurately renting various content data D1 requested by customers can be realized.

Note that, in the aforementioned third embodiment, a part of a lot of content data D1 stored in the content database 154 in the content server 152 is stored in the content database 153 in the data providing server 151. This invention, however, is not only limited this but also different content data D1 may be stored in the content database 154 in the content server 152 and the content database 153 in the data providing server 151. Furthermore, different content data D1 may be separately stored in content databases in many data providing servers 151 and content servers 152. Thereby, the scale of the content databases to be provided in the data providing servers 151 and the content servers 152 can be generally further miniaturized.

In the aforementioned third embodiment, the data providing server 151 obtains content data D1 from the content server 152. This invention, however, is not only limited this but also a changer for automatically selecting and reproducing the content data D1 from packaged media that was bought by the agency for rental or purchase may be installed in the agency, and the data providing server 151 may obtain the content data D1 from that changer, or the content server 152 may be used together with that changer.

Still further, in the aforementioned third embodiment, the portable dedicated terminal 102 which is only for an agency is rented to the customer together with content data D1. This invention, however, is not only limited this but also the portable dedicated terminal 102 may be sold to the customer, and the content data D1 may be recorded in the above portable dedicated terminal 102 for rent or for purchase.

Furthermore, in the aforementioned third embodiment, content data D1 wanted to rent is recorded in the portable dedicated terminal 102 which is only for an agency. This invention, however, is not only limited this but also the content data D1 wanted to rent or wanted to buy may be recorded in a portable recording/reproducing device or the like such as a portable telephone, a portable MD player carried into the agency by the customer.

(5) Fourth Embodiment

Figure 11:
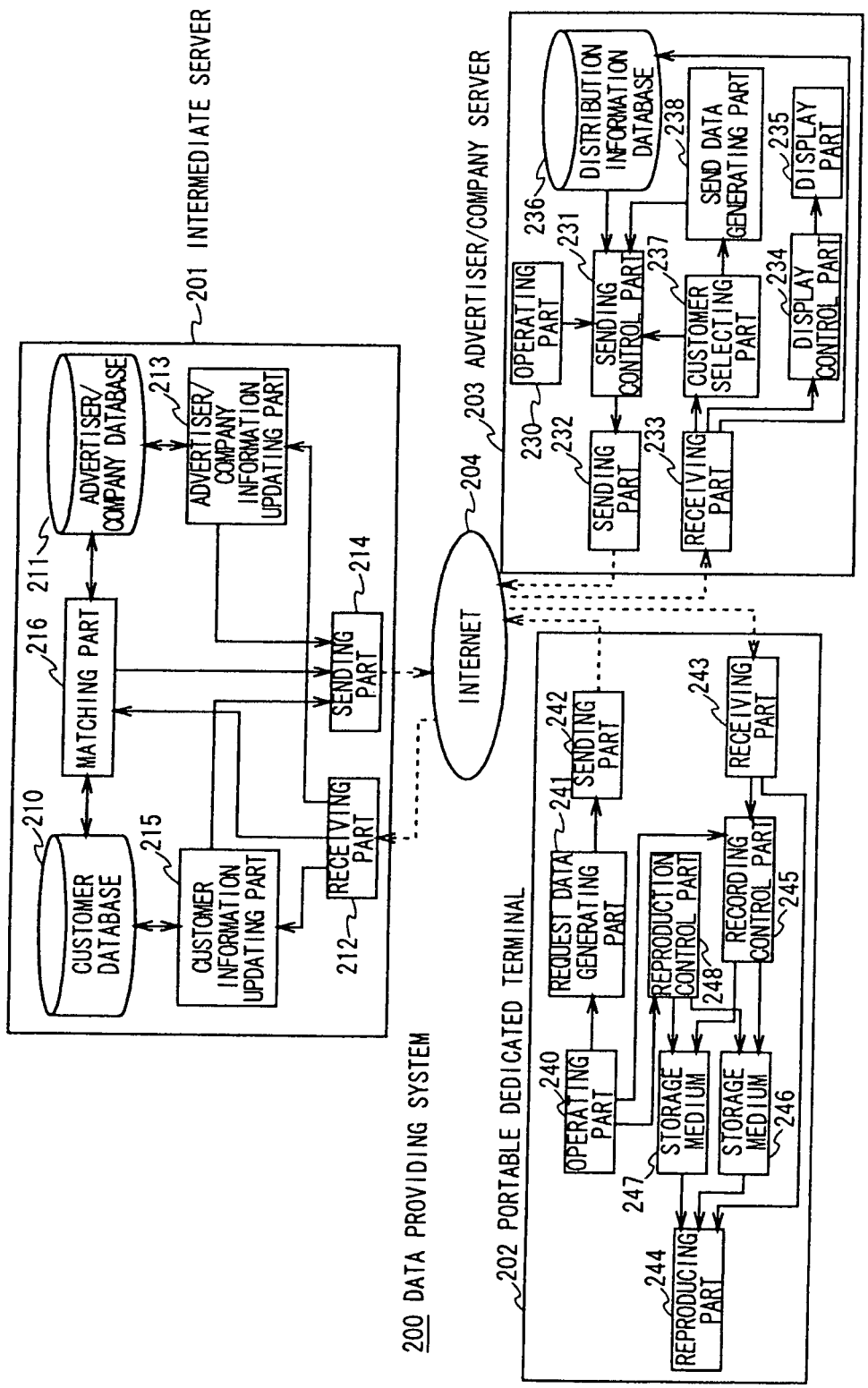
FIG. 11 is a block diagram showing the construction of the data providing system according to a fourth embodiment.

FIG. 11 shows a data providing system 200 according to a fourth embodiment. The data providing system 200 is constructed by connecting a portable dedicated terminal 202 corresponding to the portable dedicated terminals 7A to 7N described above with reference to FIGS. 1 to 3 and an advertiser/company server 203 corresponding to the advertiser/company site 6 described above with reference to FIGS. 1 and 3 to an intermediate server 201 corresponding to the system management site 2 described above with reference to FIGS. 1 to 3 via the Internet 204.

The intermediate server 201 has a customer database 210 for registering customers who use the Internet 204 via the above intermediate server 201, and an advertiser/company database 211 for registering advertisers and companies that want to provide distribution data such as advertisement to customers by using the Internet 204.

In the intermediate server 201, the advertiser/company database 211 previously stores advertiser/company registration screen data. When registration request data that requests registration is sent from the advertiser/company server 203 of an advertiser/company that wants an advertiser/company registration, the intermediate server 201 receives this by a receiving part 212, reads advertiser/company registration screen data from the advertiser/company database 211 based on that registration request data by an advertiser/company information updating part 213, and sends this from a sending part 214 to the advertiser/company server 203 via the Internet 204.

As a result, when advertiser/company information entered by an operator on an advertiser/company registration screen based on the advertiser/company registration screen data, as shown in FIG. 12(A), is sent from the advertiser/company server 203 as advertiser/company registration information data, the intermediate server 201 receives this by a receiving part 212.

Here, as shown in FIG. 12(A), the advertiser/company information to be given from the advertiser/company server 203 to the intermediate server 201 is composed of various information peculiar to each advertiser and company, such as company's name (i.e., advertiser's name information and company's name information), telephone number and e-mail address, distribution genre information representing a genre that the contents of distribution data to be provided belong to (e.g., Japanese cars or imported cars, rock music or classic music, Hollywood movies or Japanese movies, etc.), business content information represented by comments such as a catchphrase by the advertiser/company, and a condition number representing conditions for concluding a contract with the customer, and this information is generated by direct inputs by an operator in the advertiser/company or by selection from various items shown by the intermediate server 201.

When obtaining such advertiser/company information, the intermediate server 201 issues unique advertiser/company identification information to the advertiser and company that requested registration (hereinafter, this is referred to as advertiser/company ID) by the advertiser/company information updating part 213, and sends this from the sending part 214 to the advertiser/company server 203 of that advertiser/company requesting the registration via the Internet 204.

In addition to this, as shown in FIG. 12(B), the intermediate server 201 adds the advertiser/company ID to the advertiser/company information obtained from the above advertiser/company by the advertiser/company information updating part 213, and stores this as advertiser/company registration information in the advertiser/company database 211 to register the above advertiser/company. In this manner, the intermediate server 201 accepts a registration request from advertisers and companies at any time, and executes advertiser/company registration processing.

On the other hand, in the intermediate server 201, the customer database 210 previously stores customer registration screen data. When registration request data that requests registration is sent from the portable dedicated terminal 202 by operations by the customer who wants registration, the intermediate server 201 receives this by the receiving part 212, reads customer registration screen data from the customer database 210 based on that registration request data by a customer information updating part 215, and sends the above read customer registration screen data from the sending part 214 to the portable dedicated terminal 202 via the Internet 204.

As a result, when customer information entered on the customer registration screen based on the customer registration screen data by operations by the customer who wants the registration, as shown in FIG. 13(A), is transmitted from the portable dedicated terminal 202, the intermediate server 201 receives this by the receiving part 212.

Now, as shown in FIG. 13(A), the customer information to be given from the customer to the intermediate server 201 is composed of various personal information such as his/her name, sex and age, information about interesting genres (e.g., Japanese cars or imported cars, rock music or classic music, Hollywood movies or Japanese movies, etc.) (hereinafter, this is referred to as customer's favorite genre information), and taste information to represent his/her own taste or the like by comments, condition number representing conditions for contracting with an advertiser/company, and e-mail address that has been previously allotted to the portable dedicated terminal 202 used by the customer. This information is generated by direct inputs by the customer or by selection from among various items shown by the intermediate server 201.

In this connection, the conditions for concluding a contract between the customer and an advertiser/company includes, as shown in FIG. 14, "A part of customer's communication charge is paid by the advertiser/company.", "The advertiser/company discounts products which the customer buys.", "The points of Internet mileage that the customer got will be used in payment for purchases of products or the like.", "A present is given from the advertiser/company to the customer according to the points of the Internet mileage that the customer got.", "The customer accesses the site of the contracted advertiser/company for a predetermined time or longer every month.", "The customer purchase products or the like from the advertiser/company for a predetermined amount or over every month.", and these conditions are represented by the condition number from one to six.

When obtaining the aforementioned customer information, the intermediate server 201 issues a customer ID to the customer by the customer information updating part 215, and sends this from the sending part 214 to the portable dedicated terminal 202 of the customer via the Internet 204 to make the portable dedicated terminal 202 store this.

At this time, as shown in FIG. 13(B), the intermediate server 201 adds the customer ID to the customer information by the customer information updating part 215, and stores this in the customer database 210 as customer registration information to register the customer. In this manner, the intermediate server 201 accepts a registration request from customers at any time, and executes customer registration processing.

Thereafter, when content specifying data including the customer ID is sent from the portable dedicated terminal 202 to request the distribution of content data, to various agencies by operations by the customer who did customer registration, the intermediate server 201 once receives this by the receiving part 212.

The intermediate server 201 searches the customer database 210 based on the customer ID included in the content specifying data with the customer information updating par 215, to detect customer registration information on the customer, adds this to the content specifying data as additional customer information, and updates this. Then, the intermediate server 201 sends that content specifying data from the sending part 214 to the agencies via the Internet 204.

Figures 15, 16:
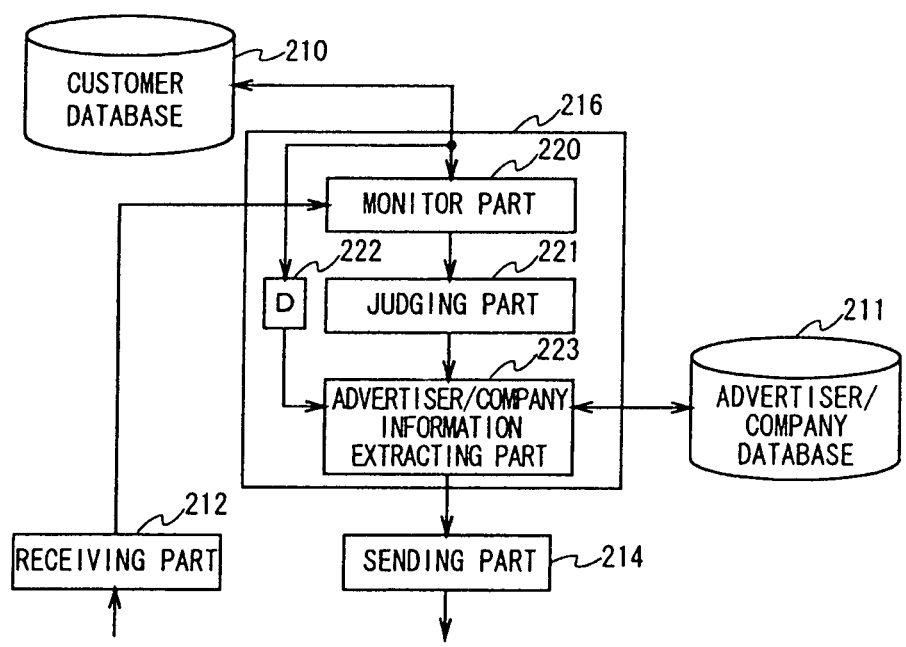
FIG. 15 is a schematic diagram showing the format of customer registration information updated by the use of the Internet by a customer.
FIG. 16 is a block diagram showing the construction of a matching part.

In this manner, the intermediate server 201 relays content data to be sent from the portable dedicated terminal 202 to an agency every time when the customer uses the agencies via the Internet 204, so that as shown in FIG. 15, the intermediate server 201 adds accessed genre information representing the genre of the content data that the customer obtained from the agency, access counter information representing the number of obtained times of the content data of that genre, and information about the amount of money that the customer paid to obtain the above content data, to the customer registration information, and sequentially updates the contents of that customer registration information, by the customer information updating part 215.

In this connection, the intermediate server 201 issues points to give the customer a privilege such as a discount (Internet mileage) every time when the customer uses an agency with the portable dedicated terminal 202, by the customer information updating part 215 according to the usage state (purchase of content data, rental price, duration of using the Internet, etc.). Also that points will be added to the customer registration information every issue.

Thereby, the intermediate server 201 can grasp customer's taste and so on, based on the customer registration information in the customer database 210.

By the way, when customer's permission data (including customer ID) to permit the release of his/her own customer information to advertisers/companies in order to contract with an advertiser/company to obtain distribution data is sent from the portable dedicated terminal 202 by customer's operations, the intermediate server 201 (FIG. 11) receives this by the receiving part 212, and takes this in a matching part 216.

In this case, as shown in FIG. 15, the matching part 216 takes the customer's permission data in a monitor part 220. In the monitor part 220, the customer registration information on the customer who has permitted the release is read from the customer database 210 based on the customer ID included in the customer's permission data, and transmitted to the judging part 221, and also to an advertiser/company information extracting part 223 via a delay part 222.

The matching part 216 determines with the judging part 221 whether there are genres having the number of obtained times more than a predetermined threshold (for example, 100 times) as the genres of content data that the customer obtained, from the accessed genre information and the access counter information in the customer registration information.

If there are genres having the number of obtained times more than the threshold value, in the customer registration information, the matching part 216 determines the above genres as genres meeting the current customer's taste and judges that the customer can be introduced to advertisers/companies, by the judging part 221. Then, the matching part 216 notifies the advertiser/company information extracting part 223 of the genres having the number of obtained times more than the threshold value as customer's taste information.

The matching part 216 compares distributed genre information included in advertiser/company registration information in the advertiser/company database 211 with the customer's taste information for search, and reads the advertiser/company registration information (FIG. 12(B)) of advertisers/companies that provides distribution data of the genres shown by the above customer's taste information, by the advertiser/company information extracting part 223. Then, the matching part 216 generates advertiser/company introduction information to introduce the advertisers/companies to the customer, excluding he advertiser/company ID from the read advertiser/company registration information, as shown in FIG. 17.

The matching part 216 sends the advertiser/company introduction information from the sending part 214 to the portable dedicated terminal 202 via the Internet 204 as advertiser/company introduction data, according to an e-mail address shown in the customer registration information supplied from the delay part 222, by the advertiser/company information extracting part 223, so as to introduce the advertisers/companies that provide distribution data meeting customer's own taste to the customer.

On the contrary, if there is no genre showing the number of obtained times more than the threshold value in the customer registration information, the matching part 216 judges that the customer can not be introduced to advertisers/companies since his/her taste is not clear, by the judging part 221, and notifies the advertiser/company information extracting part 223 of the judgement result.

The matching part 216 generates advertiser/company introduction impossibility information representing that an advertiser/company providing distribution data meeting customer's taste could not be found by the advertiser/company information extracting part 223, and sends this from the sending part 214 to the portable dedicated terminal 202 via the Internet 204 as advertiser/company introduction impossibility data, according to the e-mail address shown in the customer registration information supplied from the delay part 222, so as to notify the customer that an advertiser/ company providing distribution data meeting customer's own taste could not be found at the present time.

As a result of introducing the advertisers/companies to the customer, if selected advertiser/company data (including the customer ID) showing advertisers/companies that the customer selected from among the introduced advertisers/companies is sent from the portable dedicated terminal 202 by customer's operations, the intermediate server 201 receives this by the receiving part 212, and takes this in the advertiser/company information extracting part 223 from the monitor part 220 of the matching part 216 via the judging part 221.

In a case where the advertiser/company introduction information is generated, the matching part 216 temporarily stores the customer registration information and customer's taste information used for the above generation, in the advertiser/company information extracting part 223.

Therefore, when taking the selected advertiser/company data in the advertiser/company information extracting part 223, the matching part 216 generates customer introduction information by selectively using the taste information, from the customer registration information (FIG. 13(B)) based on that customer's taste information as shown in FIG. 18, in order to introduce the customer to the advertisers/companies, and sends this as customer introduction data from the sending part 214 via the Internet 204 to the advertiser/company server 203 of each advertise/company selected by the customer, according to the selected advertiser/company data.

Thereby, the intermediate server 201 shown in FIG. 11 can introduce the advertisers/companies that provides useful distribution data for the customer, to the customer requesting the introduction of advertisers/companies. At the same time, also to the advertisers/companies, the intermediate server 201 can introduce the customer who needs the provision of their distribution data.

In this connection, as a result of introducing the advertisers/companies to the customer, if advertiser/company selection impossible data representing that the customer could not find an advertiser/company to contract with is sent from the portable dedicated terminal 202, the intermediate server 201 receives this by the receiving part 212, forbids the matching part 216 to generate customer introduction information, and waits for customer's permission data to be transmitted from the portable dedicated terminal 202 of the above customer again.

Note that, when the intermediate server 201 introduces the customer to an advertiser/company, it collects a charge for the introduction of the customer from the advertiser/company.

As a result of sending the customer introduction data to the advertiser/company server 203 by the intermediate server 201, if contract conclusion data is sent from the advertiser/company server 203 because the advertiser/company has contracted with the customer, the intermediate server 201 receives this by the receiving part 212, and then sends this from the sending part 214 to the portable dedicated terminal 202 via the Internet 204, so as to notify the customer that the contract with the advertiser/company has been concluded.

At this time, as shown in FIG. 19, the intermediate server 201 adds contracting customer ID information representing the customer ID of the customer who contracted with the above advertiser/company to the advertiser/company registration information in the advertiser/company database 211 based on the contract conclusion data, and updates the advertiser/company registration information, by the advertiser/company information updating part 213. At the same time, as shown in FIG. 20, the intermediate server 201 adds contracted advertiser/company ID information representing the advertiser/company ID of the advertiser/company that contracted with the above customer to the customer registration information in the customer database 210 based on that contract conclusion data, and updates the customer registration information, by the customer information updating part 215.

Thereby, the intermediate server 201 can grasp the contracting state between customers and advertisers/companies from thus updated customer registration information and advertiser/company registration information, so as not to introduce the advertiser/company which has already a contract with the customer when the customer who has a contract with the advertiser/company permits the release of the customer information to contract with a new advertiser/company.

Furthermore, as the result of that the intermediate server 201 sends the customer introduction data to the advertiser/company server 203, if contract inconclusion data is sent from the advertiser/company which abandoned a contract with the customer, the intermediate server 201 receives this by the receiving part 212, and sends this from the sending part 214 to the portable dedicated terminal 202 via the Internet 204, so as to notify the customer that the contract with the advertiser/company was not concluded.

In this connection, when the advertiser/company introduction information and customer introduction information described above with reference to FIGS. 17 and 18 are generated, the intermediate server 201 excludes the contracting customer ID information and the contracting advertiser/company ID information from the original advertiser/company registration information and customer registration information, so as to prevent personal information unnecessary for the contract from leaking to the advertiser/company and the customer.

On the other hand, as shown in FIG. 11, when an operator enters a registration request with an operating part 230, the advertiser/company server 203 sends the registration request as registration request data, from a sending part 232 to the intermediate server 201 via the Internet 204, by a sending control part 231.

The advertiser/company server 203 receives advertiser/company registration screen data from the intermediate server 201 by a receiving part 233, and transmits this from a display control part 234 to a display part 235, to display an advertiser/company registration screen based on that advertiser/company registration screen data on the above display part 235.

Then, when the operating part 230 is operated by the operator with the advertiser/company registration screen displayed on the display part 235, the advertiser/company server 203 sends the advertiser/company information that was entered on the advertiser/company registration screen according to the operations of the above operating part 230, described above with reference to FIG. 12(A), as advertiser/company registration information data, from the sending part 232 to the intermediate server 201 via the Internet 204, by the sending control part 231.

The advertiser/company server 203 receives the advertiser/company ID sent from the intermediate server 201 that finished the registration of the advertiser/company, via the Internet 204 by the receiving part 233, and stores this in a distribution information database 236. Thereafter, when accessing the intermediate server 201, the advertiser/company server 203 uses that advertiser/company ID for identification.

After registration at the intermediate server 201, if the customer introduction information described above with reference to FIG. 17 is sent as customer introduction data, from the above intermediate server 201 via the Internet 204, the advertiser/company server 203 receives this by the receiving part 233 and takes this in a customer selecting part 237.

In this case, the advertiser/company server 203 judges by the customer selecting part 237 whether a contract should be concluded with the customer that was introduced from the intermediate server 201, by referring to the contract conditions and the usage state of the Internet, etc., based on the customer introduction data.

When the advertiser/company server 203 has decided to contract with the customer with the customer selecting part 237, the advertiser/company server 203 generates contract conclusion data by a send data generating part 238, and sends this to the intermediate server 201 sequentially via the sending control part 231, the sending part 232 and the Internet 204.

At this time, the advertiser/company server 203 notifies the sending control part 231 of the decision of a contract with the customer, by the customer selecting part 237. The advertiser/company server 203 properly reads distribution data meeting the taste of the contracting customer from among various distribution data previously stored in the distribution information database 236 by the sending control part 231, and sends the above read distribution data from the sending part 232 to customer's portable dedicated terminal 202 via the Internet 204.

In this manner, the advertiser/company server 203 can properly provide distribution data meeting customer's taste to the contracting customer.

In this connection, when the advertiser/company server 203 has decided not to contract with the customer, with the customer selecting part 237, the advertiser/company server 203 generates contract inconclusion data by the send data generating part 238, and sends this to the intermediate server 201 sequentially via the sending control part 231, the sending part 232 and the Internet 204.

In the portable dedicated terminal 202, if the customer wanting registration at the intermediate server 201 inputs a registration with an operating part 240, the portable dedicated terminal 202 generates registration request data by a request data generating part 241, and sends this from a sending part 242 to the intermediate server 201 via the Internet 204.

The portable dedicated terminal 202 receives customer registration screen data sent from the intermediate server 201 via the Internet 204 by a receiving part 243, and transmits this to a reproducing part 244 composed of a display control part, a display part, a speaker, etc, in order to display a customer registration screen based on that customer registration screen data by the above reproducing part 244.

Then, if the operating part 240 is operated by the customer in the state where the customer registration screen is displayed by the reproducing part 244, the portable dedicated terminal 202 sends the customer information inputted on the customer registration screen by operations of the above operating part 240, described above with reference to FIG. 13(A), as customer registration information data, from the sending part 242 to the intermediate server 201 via the Internet 204, by the request data generating part 241.

The portable dedicated terminal 202 receives the customer ID from the intermediate server 201 that finished the registration of the customer, via the Internet 204 by the receiving part 243, and takes the received customer ID in a recording control part 245.

The portable dedicated terminal 202 can recognize various data taken in the recording control part 245 from the receiving part 243, based on an identifier that has been previously added to that data, by the above recording control part 245.

When the portable dedicated terminal 202 obtained a customer ID, the customer ID is recorded on a storage medium for customer 246 by the recording control part 245. Thereafter, when accessing the intermediate server 201 and accessing an agency via the intermediate server 201, the portable dedicated terminal 202 uses that customer ID to make the intermediate server 201 and the agency recognize the customer.

When the customer is registered at the intermediate server 201, the portable dedicated terminal 202 sends specifying information on desired content data entered by customer's operations with the operating part 240 as content specifying data accompanied with the customer ID, from the sending part 242 to the agency via the intermediate server 201, by the request data generating part 241.

Then, when the portable dedicated terminal 202 receives requested content data from the agency by the receiving part 243, the portable dedicated terminal 202 recognizes this by the recording control part 245, and records this in an storage medium for agency 247. Thereafter, the portable dedicated terminal 202 reproduces the content data from the storage medium for agency 247 by the reproduction control part 248, according to the operations of the operating part 240, and transmits the above reproduced content data to the reproducing part 244. Thus, the customer can enjoy the content.

If the customer enters permission information for permitting the release of the customer information with the operating part 240, the portable dedicated terminal 202 generates customer's permission data representing that permission information by the request data generating part 241, and sends this from the sending part 242 to the intermediate server 201 via the Internet 204.

As a result, when advertiser/company introduction data is sent from the intermediate server 201 via the Internet 204, the portable dedicated terminal 202 receives this by the receiving part 243, and transmits this to the reproducing part 244 to show the customer the advertisers/companies introduced from the intermediate server 201 on an advertiser/company introduction screen based on that advertiser/company introduction data.

If the customer selects desired advertiser/company with the operating part 240, the portable dedicated terminal 202 generates selected advertiser/company data representing that selected advertiser/company by the request data generating part 241, and sends this from the sending part 242 to the intermediate server 201 via the Internet 204.

As a result, when contract conclusion data is sent from the intermediate server 201 via the Internet 204 because the advertiser/company has contracted with the customer, the portable dedicated terminal 202 receives this by the receiving part 243, and transmits this to the reproducing part 244, to notify the customer of the conclusion of the contract with the advertiser/company.

When distribution data is sent from the advertiser/company server 203 that contracted with the customer, the portable dedicated terminal 202 receives this by the receiving part 243, and recognizes the above received distribution data by the recording control part 245 and records this on the storage medium for customer 246. Thereafter, the portable dedicated terminal 202 reproduces the distribution data from that storage medium for customer 246 by the reproduction control part 248, according to the operations of the operating part 240, and transmits the above reproduced distribution data to the reproducing part 244 to show the customer various information based on that distribution data.

On the contrary, if the advertiser/company abandoned a contract with the customer and contract inconclusion data is sent from the intermediate server 201, the portable dedicated terminal 202 receives this by the receiving part 243, and transmits this to the reproducing part 244 to notify the customer that the contract with the advertiser/company was not concluded.

In this connection, as the result of that the portable dedicated terminal 202 sent the customer's permission data to the intermediate server 201, if advertiser/company introduction impossibility data is sent, the portable dedicated terminal 202 receives this by the receiving part 243, and transmits this to the reproducing part 244 to notify the customer that the intermediate server 201 could not find an advertiser/company which can be introduced to the customer at the present time.

As the result of that the advertisers/companies introduced from the intermediate server 201 were shown to the customer, if selection impossibility information representing that the customer could not find an advertiser/company to contract with, out of the introduced advertisers/companies is entered by the above customer with the operating part 240, the portable dedicated terminal 202 generates advertiser/company selection impossibility data representing that selection impossibility information by the request data generating part 241, and sends this from the sending part 242 to the intermediate server 201 via the Internet 204.

By the way, as already described above, this portable dedicated terminal 202 has the storage medium for customer 246 and the storage medium for agency 247. The data (customer ID and distribution data) obtained from the intermediate server 201 and the advertiser/company server 203 other than the agencies is recorded on the storage medium for customer 246 by separating that from the data (content data) obtained from the above agencies.

Thereby, in the advertiser/company server 203, when the content data rented from the agency is deleted from the storage medium for agency 247 on the expiration of the rental term, it can be almost prevented that the customer erroneously erases data such as the customer ID and the distribution data obtained for himself/herself from the servers other than the agencies with the above content data.

Now, an advertiser/company registration processing procedure by the intermediate server 201 and the advertiser/company server 203 in the data providing system 200 will be collectively described. First, as shown in FIG. 21(A), the advertiser/company server 203 enters routine RT10 from the starting step and proceeds to step SP101.

In step SP101, the advertiser/company server 203 waits for a registration request to be entered via the operating part 230. When the registration request is entered, the advertiser/company server 203 proceeds to step SP102.

In step SP102, the advertiser/company server 203 sends the registration request as registration request data, from the sending part 232 to the intermediate server 201 by the sending control part 231, and proceeds to step SP103.

Figure 21:
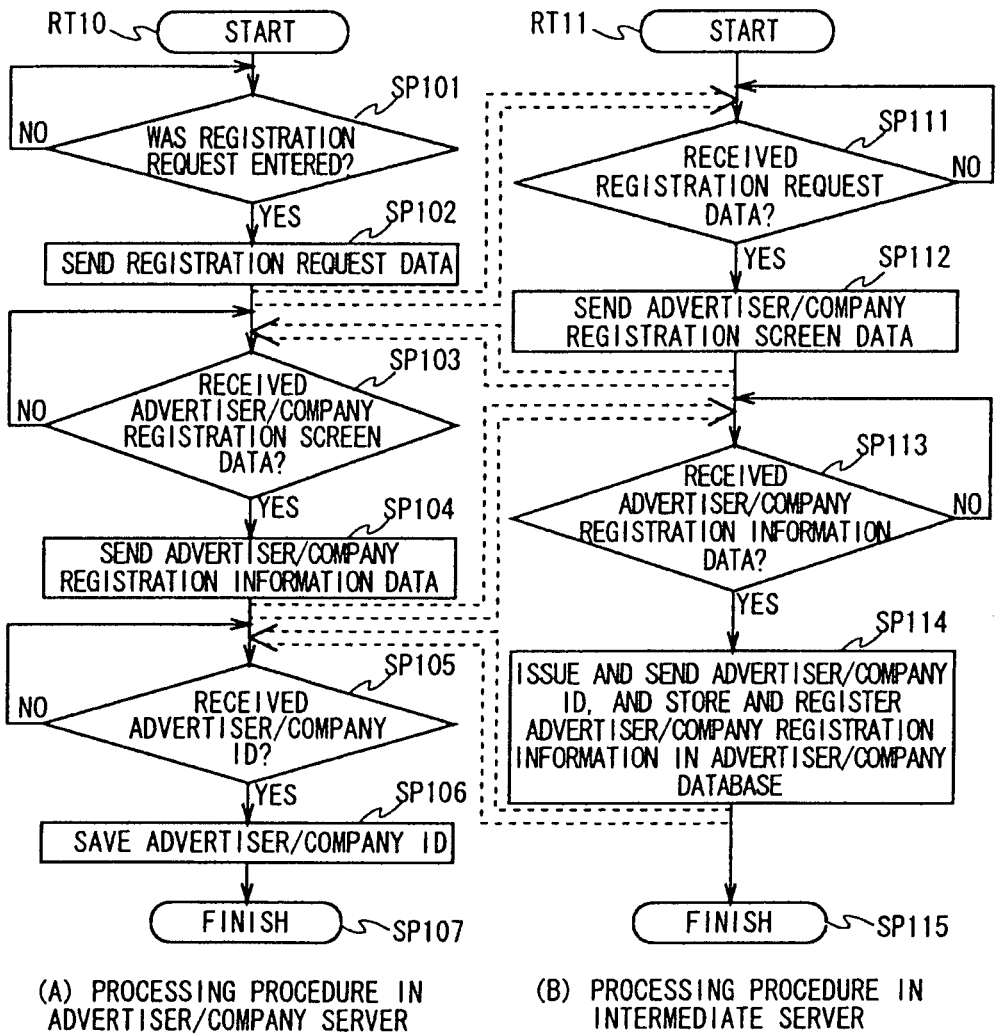
FIG. 21 is a flowchart showing an advertiser/company registration processing procedure in the data providing system.

At this time, as shown in FIG. 21(B), the intermediate server 201 enters routine RT11 from the starting step, and proceeds step SP111 to wait for the registration request data to be sent from the advertiser/company server 203. When the intermediate server 201 receives the registration request data from the above advertiser/company server 203, by the receiving part 212, the intermediate server 201 proceeds to step SP112.

In step SP112, the intermediate server 201 reads advertiser/company registration screen data from the advertiser/company database 211 based on the received registration request data by the advertiser/company information updating part 213, and sends this from the sending part 214 to the advertiser/company server 203, and proceeds to step SP113.

At this time, in step SP103, the advertiser/company server 203 waits for the advertiser/company registration screen data to be sent from the intermediate server 201. When the advertiser/company server 203 receives the advertiser/company registration screen data by the receiving part 233, the advertiser/company server 203 proceeds to step SP104.

In step SP104, the advertiser/company server 203 sends advertiser/company information, which was entered on an advertiser/company registration screen based on the advertiser/company registration screen data by the operator with the operating part 230, as advertiser/company registration information data, from the sending part 232 to the intermediate server 201 by the sending control part 231, and proceeds to step SP105.

At this time, in step SP113, the intermediate server 201 waits for the advertiser/company registration information data to be sent from the advertiser/company server 203. When the intermediate server 201 receives the advertiser/company registration information data by the receiving part 212, the intermediate server 201 proceeds to step SP114.

In step SP114, the intermediate server 201 issues an advertiser/company ID to the advertiser/company that has requested a registration, by the advertiser/company information updating part 213, and sends this from the sending part 214 to the advertiser/company server 203. At the same time, the intermediate server 201 adds the advertiser/company ID to the advertiser/company information based on the advertiser/company registration information data obtained from the above advertiser/company server 203 and takes this as advertiser/company registration information, and records this in the advertiser/company database 211 and registers the above advertiser/company that has requested the registration. Then, the intermediate server 201 proceeds to step SP115 to finish the processing in the intermediate server 201.

Furthermore, in step SP105, the advertiser/company server 203 waits for the advertiser/company ID to be transmitted from the intermediate server 201. When the advertiser/company server 203 receives the above advertiser/company ID by the receiving part 233, the advertiser/company server 203 proceeds to step SP106 to store that advertiser/company ID in the distribution information database 236. Then, the advertiser/company server 203 proceeds to the next step SP107 to finish the processing in the advertiser/company server 203. In this manner, the data providing system 200 finishes all the advertiser/company registration processing procedures in the intermediate server 201 and the advertiser/company server 203.

An advertiser/company introduction processing procedures by the intermediate server 201 and the portable dedicated terminal 202 in this data providing system 200 will be collectively described. First, as shown in FIGS. 22(A) and 23(A), the portable dedicated terminal 202 enters routine RT12 from the starting step, and proceeds to step SP121.

In step SP121, the portable dedicated terminal 202 waits the customer to enter a registration request with the operating part 240. When the registration request is entered, the portable dedicated terminal 202 proceeds to step SP122.

In step SP122, the portable dedicated terminal 202 sends the registration request as registration request data, from the sending part 242 to the intermediate server 201 by the request data generating part 241, and proceeds to step SP123.

Figure 22:
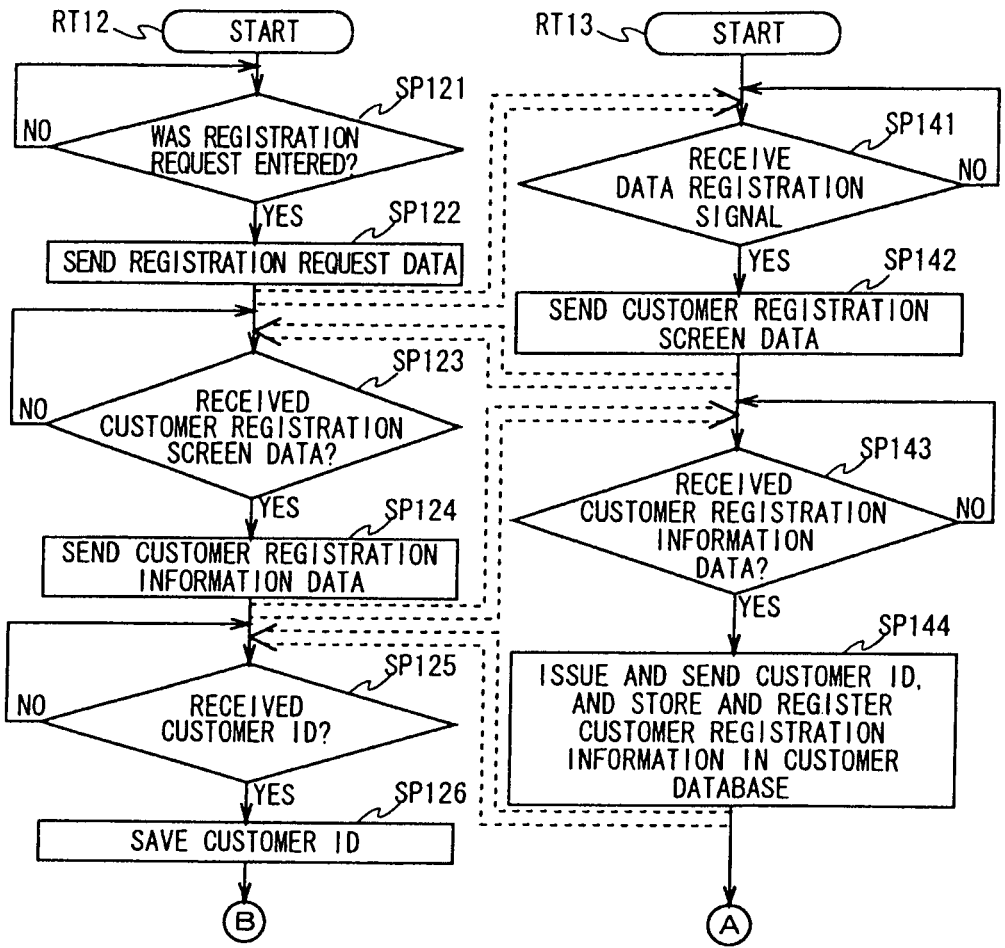
FIG. 22 is a flowchart showing an advertiser/company introduction processing procedure in the data providing system.
Figure 23:
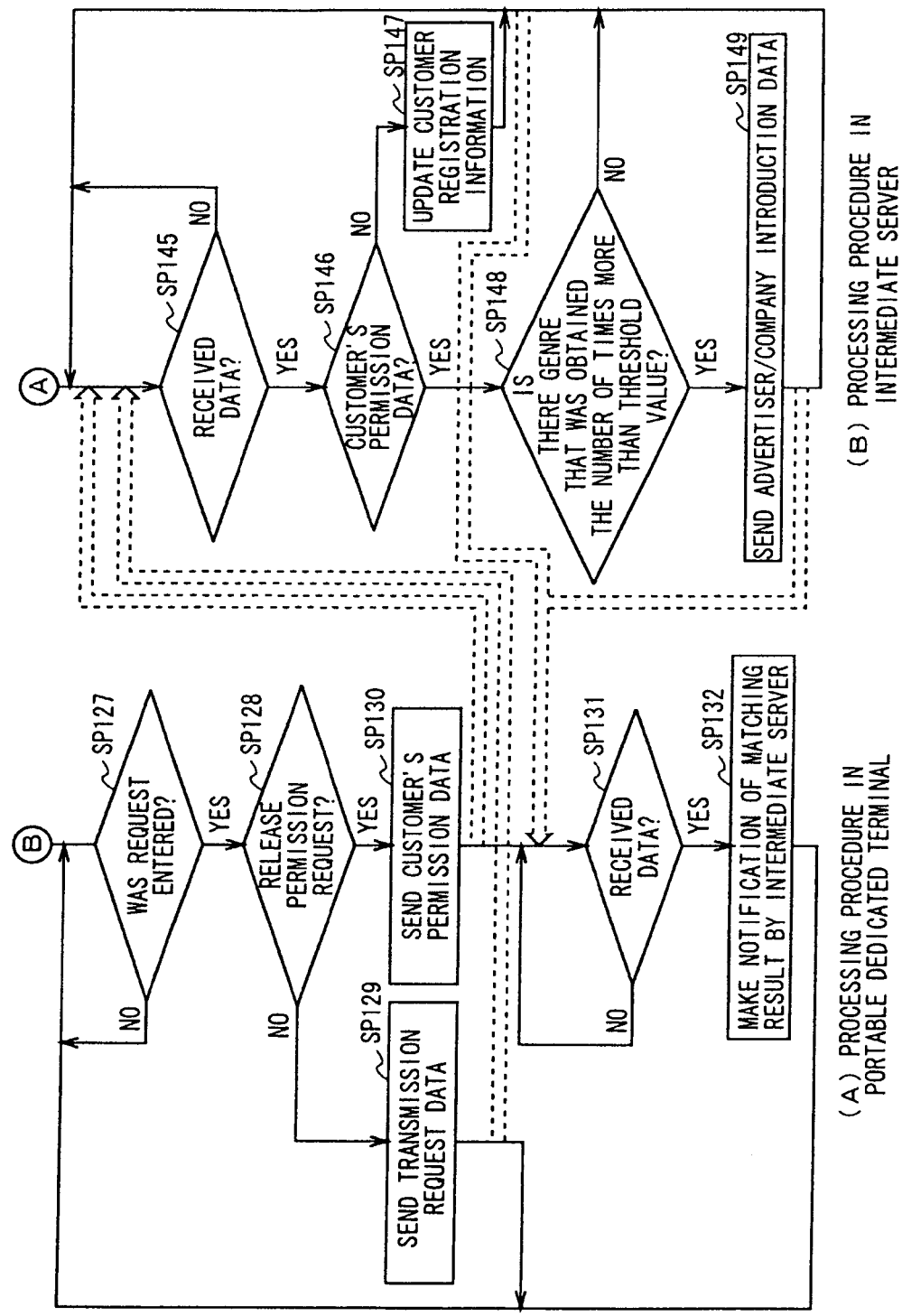
FIG. 23 is a flowchart showing an advertiser/company introduction processing procedure in the data providing system.

At this time, as shown in FIGS. 22(B) and 23(B), the intermediate server 201 enters routine RT13 from the starting step, and proceeds to step SP141 to wait for the registration request data to be sent from the portable dedicated terminal 202. When the intermediate server 201 receives the registration request data from the portable dedicated terminal 202 by the receiving part 212, the intermediate server 201 proceeds to step SP142.

In step SP142, the intermediate server 201 reads customer registration screen data from the customer database 210 by the customer information updating part 215, based on the registration request data, and sends this from the sending part 214 to the portable dedicated terminal 202, and proceeds to step SP143.

At this time, in step SP123, the portable dedicated terminal 202 waits for the customer registration screen data to be sent from the intermediate server 201. When the portable dedicated terminal 202 receives the above customer registration screen data by the receiving part 243, the portable dedicated terminal 202 proceeds to step SP124.

In step SP124, the portable dedicated terminal 202 sends customer information, which was entered on a customer registration screen based on the customer registration screen data by the customer with the operating part 240, as customer registration information data from the sending part 242 to the intermediate server 201 by the request data generating part 241, and proceeds to step SP125.

At this time, in step SP143, the intermediate server 201 waits for the customer registration information data to be sent from the portable dedicated terminal 202. When the intermediate server 212 receives the above customer registration information data by the receiving part 212, the intermediate server 201 proceeds to step SP144.

In step SP144, the intermediate server 201 issues a customer ID to the customer who has requested a registration by the customer information updating part 215, and sends this from the sending part 214 to the portable dedicated terminal 202. At the same time, the intermediate server 201 adds the customer ID to the customer information based on the above customer registration information data obtained from the portable dedicated terminal 202 and takes this as customer registration information, and stores this in the customer database 210 to register the above customer who has requested the registration. Then, the intermediate server 201 proceeds to step SP145.

At this time, in step SP125, the portable dedicated terminal 202 waits for the customer ID to be sent from the intermediate server 201. When the portable dedicated terminal 202 receives the customer ID by the receiving part 243, the portable dedicated terminal 202 proceeds to step SP126 to record that customer ID on the storage medium for customer 246, and proceeds to step SP127.

In step SP127, the portable dedicated terminal 202 waits for the customer to enter any request with the operating part 240. When the above request is entered, the portable dedicated terminal 202 proceeds to step SP128 to determine whether or not that request is a request to permit the release of the customer information.

Obtaining a negative result in this step SP128 means that customer's request is specifying information, for example, to obtain content data from various agencies. At this time, the portable dedicated terminal 202 proceeds to step SP129 to generate content specifying data representing the specifying information and including the customer ID by the request data generating part 241, and sends this from the sending part 242 to the agencies via the intermediate server 201, and returns to step SP127.

Thereafter, until the customer requests the permission of the release of the customer information, the portable dedicated terminal 202 repeats the processing loop of steps SP127-SP128-SP129 every time when content data specifying information is entered by the above customer.

Obtaining an affirmative result in step SP128 means that the customer wants to contract with the advertiser/company and requests the release of the customer information. At this time, the portable dedicated terminal 202 proceeds to step SP130 to generate customer's permission data representing a request for the release of that customer information and including the customer ID by the request data generating part 241, and sends this from the sending part 242 to the intermediate server 201. Then, the portable dedicated terminal 202 proceeds to step SP131.

On the other hand, in step SP145, the intermediate server 201 waits for any data to be sent from the portable dedicated terminal 202. When the intermediate server 201 receives the data from the above portable dedicated terminal 202 by the receiving part 212, the intermediate server 201 proceeds to step SP146 to determine whether or not the received data is customer's permission data.

Obtaining a negative result in step SP146 means that the intermediate server 201 received content specifying data from the portable dedicated terminal 202 for relay to the agency. At this time, the intermediate server 201 proceeds to step SP147 to update customer registration information based on that content specifying data by the customer information updating part 215. Then, the intermediate server 201 proceeds to step SP145.

In this manner, until customer's permission data is sent from the portable dedicated terminal 202, the intermediate server 201 repeats the processing loop of steps SP145-SP146-SP147 every time when content specifying data is received from the above portable dedicated terminal 202, and thereby sequentially updates the customer registration information.

Obtaining an affirmative result in step SP146 means that the customer permits the release of the customer information to contract with an advertiser/company and the intermediate server 201 received customer's permission data. At this time, the intermediate server 201 proceeds to step SP148 to determine whether there are genres showing the number of obtained times more than the threshold value, out of the content data obtained by the customer, based on customer registration information on the customer who permitted the release, by the matching part 216.

Obtaining a negative result in this step SP148 means that because there is no genre showing the number of obtained times more than the threshold value, regarding to the content data that the customer obtained, it is hard to specify customer's taste at the present time. At this time, the intermediate server 201 generates advertiser/company introduction impossibility data by the matching part 216, and sends this from the sending part 214 to the portable dedicated terminal 202 to notifying the customer that an advertiser/company which can be introduced to the customer could not be found at the present time. Then, the intermediate server 201 returns to step SP145.

On the contrary, obtaining an affirmative result in step SP148 means that there are genres having the number of obtained times more than the threshold value, regarding to the content data that the customer obtained, and that the genres are specified as customer's taste at the present time. At this time, the intermediate server 201 proceeds to step SP149.

In step SP149, the intermediate server 201 searches advertiser/company registration information in the advertiser/company database 211 based on customer's taste that was specified in step SP148, by the matching part 216, to read advertiser/company registration information on the advertiser/company providing distribution data meeting the above customer's taste.

The intermediate server 201 generates advertiser/company introduction information based on the advertiser/company registration information read from the advertiser/company database 211 by the matching part 216, and sends this as advertiser/company introduction data, from the sending part 214 to the portable dedicated terminal 202 to introduce the advertiser/company to the customer. Then, the intermediate server 201 returns to step SP145 and repeats the processing of steps SP145-SP146-SP147-SP148-SP149 again.

After sending the customer's permission data to the intermediate server 201, in step SP131, the portable dedicated terminal 202 waits the advertiser/company introduction data and advertiser/company introduction impossibility data to be sent from the intermediate server 201. When the portable dedicated terminal 202 receives the advertiser/company introduction data or the advertiser/company introduction impossibility data from the intermediate server 201 by the receiving part 243, the portable dedicated terminal 202 proceeds to the next step SP132.

When the portable dedicated terminal 202 receives the advertiser/company introduction impossibility data by the receiving part 243, in step SP132, the portable dedicated terminal 202 transmits this to the reproducing part 244 to notify the customer that the intermediate server 201 could not find an advertiser/company for the customer. Then, the portable dedicated terminal 202 returns to step SP127 and repeats the processing of steps SP127-SP128-SP129-SP130-SP131-SP132 again.

When the portable dedicated terminal 202 receives the advertiser/company introduction data by the receiving part 243, in step SP132, the portable dedicated terminal 202 transmits this to the reproducing part 244 to show the customer the advertisers/companies that were introduced from the intermediate server 201. Then, the portable dedicated terminal 202 returns to step SP127 and repeats the processing of steps SP127-SP128-SP129-SP130-SP131-SP132 again. As described above, the advertiser/company introduction processing procedure in the data providing system 200 is executed.

Figure 24:
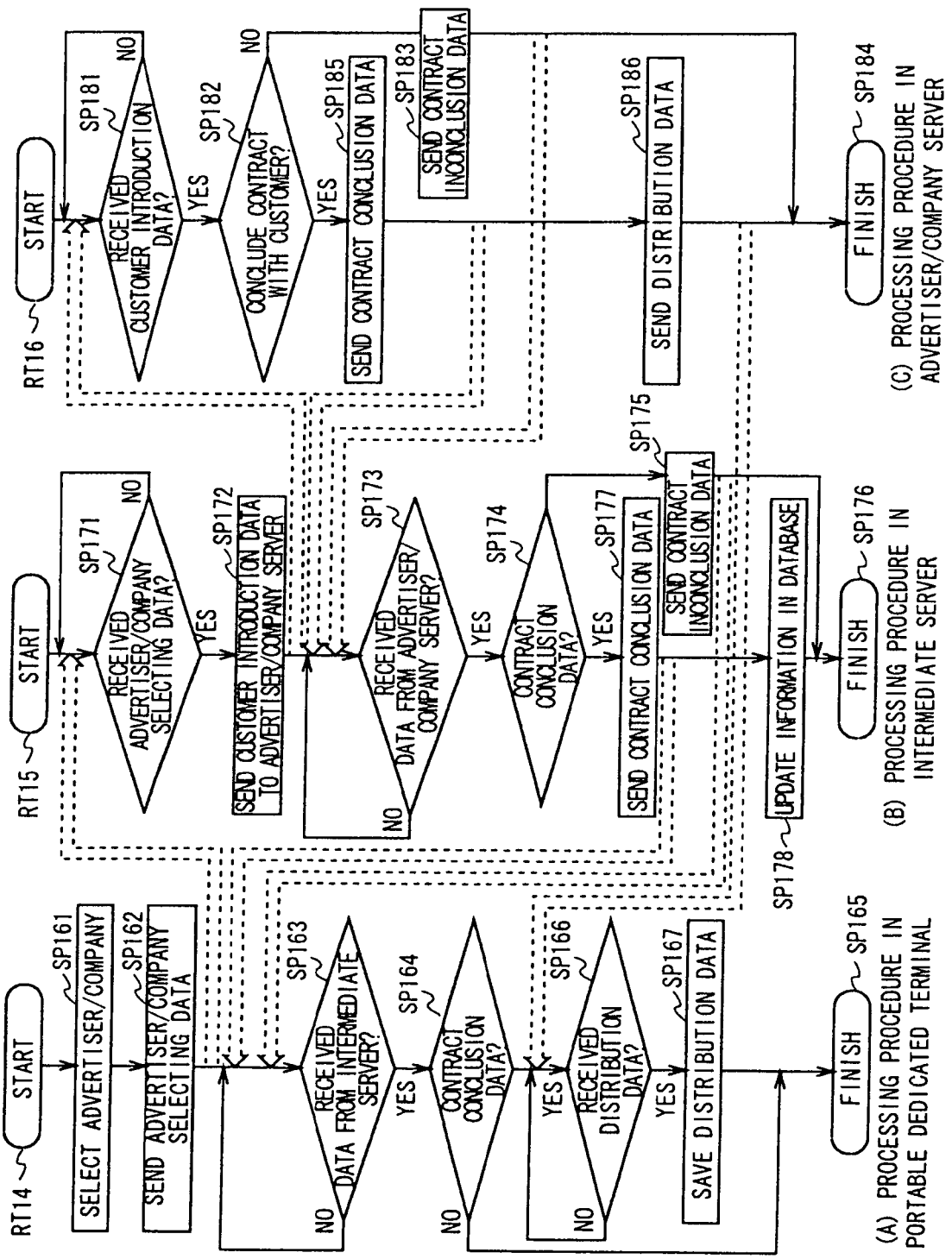
FIG. 24 is a flowchart showing a contract processing procedure in the data providing system.

A contract processing procedure by the intermediate server 201, the portable dedicated terminal 202 and the advertiser/company server 203 in the data providing system 200 will be described. First, as shown in FIG. 24(A), the portable dedicated terminal 202 which received advertiser/company introduction data from the intermediate server 201 enters routine RT14 from the starting step, and proceeds to step SP161.

In step SP161, the portable dedicated terminal 202 shows the customer the advertisers/companies that were introduced from the intermediate server 201 by the reproducing part 244. If the above customer selects an advertiser/company to contract with, with the operating part 240, the portable dedicated terminal 202 proceeds to step SP162.

In step SP162, the portable dedicated terminal 202 generates selected advertiser/company data representing the advertiser/company selected by the customer by the request data generating part 241, and sends this from the sending part 242 to the intermediate server 201 via the Internet 204. Then, the portable dedicated terminal 202 proceeds to the next step SP163.

At this time, as shown in FIG. 24(B), the intermediate server 201 enters routine RT15 from the starting step, and proceeds to step SP171 to wait for selected advertiser/company data to be sent from the portable dedicated terminal 202. When the intermediate server 201 receives the selected advertiser/company data from the portable dedicated terminal 202 by the receiving part 212, the intermediate server 201 proceeds to step SP172.

In step SP172, the intermediate server 201 generates customer introduction information from the customer registration information based on the selected advertiser/company data by the matching part 216, and sends this as customer introduction data, from the sending part 214 to the advertiser/company server 203 via the Internet 204. Then, the intermediate server 201 proceeds to step SP173.

At this time, as shown in FIG. 24(C), the advertiser/company server 203 enters routine RT16 from the starting step, and proceeds to step SP181 to wait for customer introduction data to be sent from the intermediate server 201. When the advertiser/company server 203 receives the customer introduction data from the intermediate server 201 by the receiving part 232, the advertiser/company server 203 proceeds to step SP182.

In step SP182, the advertiser/company server 203 judges whether or not to contract with the customer, by referring to the contract conditions and the usage state of the Internet 204 based on the customer introduction data by the customer selecting part 237.

Obtaining a negative result in step SP182 means that the contract conditions and the using state of the Internet 204, etc., shown by the customer did not meet the advertiser/company requirements and therefore a contract was abandoned. At this time, the advertiser/company server 203 proceeds to step SP183 to generate contract inconclusion data by the send data generating part 238, and sends this from the sending part 232 to the intermediate server 201 via the Internet 204. Then, the advertiser/company server 203 proceeds to step SP184 to finish the processing in the advertiser/company server 203.

On the contrary, obtaining an affirmative result in step SP182 means that the contract conditions and the using state of the Internet 204, shown by the customer, meet the advertiser/company requirements and the advertiser/company has decided to contract with the customer. At this time, the advertiser/company server 203 proceeds to step SP185 to generate contract conclusion data by the send data generating part 238, and sends this from the sending part 232 to the intermediate server 201 via the Internet 204. Then, the advertiser/company server 203 proceeds to step SP186.

In step SP186, the advertiser/company server 203 properly reads distribution data meeting the taste of the contracting customer from the distribution information database 236 by the sending control part 231, and sends this from the sending part 232 to the portable dedicated terminal 202 of that customer via the Internet 204. Then, the advertiser/ company server 203 proceeds to step SP184 to finish the processing in the advertiser/company server 203.

In step SP173, the intermediate server 201 waits for data representing the conclusion/inconclusion of a contract with the customer to be sent from the advertiser/company server 203. When the intermediate server 201 receives the above data from the advertiser/company server 203 by the receiving part 212, the intermediate server 201 proceeds to step SP174.

In step SP174, the intermediate server 201 determines whether the data received from the advertiser/company server 203 is contract conclusion data.

Obtaining a negative result in step SP174 means that the advertiser/company abandoned to contract with the customer and the intermediate server 201 received contract inconclusion data from the advertiser/company server 203. At this time, the intermediate server 201 proceeds to step SP175 to send that contract inconclusion data from the sending part 214 to the portable dedicated terminal 202 via the Internet 204 to notify the customer that a contract with the advertiser/company was not concluded. Then, the intermediate server 201 proceeds to step SP176 to finish the processing in the intermediate server 201.

On the contrary, obtaining an affirmative result in step SP174 means that the advertiser/company contracted with the customer and the intermediate server 201 received contract conclusion data from the advertiser/company server 203. At this time, the intermediate server 201 proceeds to step SP177 to send that contract conclusion data from the sending part 214 to the portable dedicated terminal 202 via the Internet 204 to notify the customer that the contract with the advertiser/the company was concluded. Then, the intermediate server 201 proceeds to step SP178.

In step SP178, the intermediate server 201 updates customer registration information in the customer database 210 based on the contract conclusion data by the customer information updating part 215, and also updates advertiser/company registration information in the advertiser/company database 211 based on that contract conclusion data by the advertiser/company information updating part 213. Then, the intermediate server 201 proceeds to step SP176 to finish the processing in the intermediate server 201.

Furthermore, in step SP163, the portable dedicated terminal 202 waits that data representing the conclusion/inconclusion of a contract with the advertiser/company to be sent from the intermediate server 201. When the portable dedicated terminal 202 receives the data from the above intermediate server 201, the portable dedicated terminal 202 proceeds to step SP164.

In step SP164, the portable dedicated terminal 202 determines whether the data received from the intermediate server 201 is contract conclusion data.

Obtaining a negative result in step SP164 means that the advertiser/company abandoned the contract and the portable dedicated terminal 202 received contract inconclusion data from the intermediate server 201. At this time, the portable dedicated terminal 202 transmits the above contract inconclusion data to the reproducing part 244 to notify the customer that the contract with the advertiser/company was not concluded. Then, the portable dedicated terminal 202 proceeds to step SP165 to finish the processing in the portable dedicated terminal 202.

On the contrary, obtaining an affirmative result in step SP164 means that the advertiser/company contracted with the customer and the portable dedicated terminal 202 received contract conclusion data from the intermediate server 201. At this time, the portable dedicated terminal 202 transmits that contract conclusion data to the reproducing part 244 to notify the customer that the contract with the advertiser/company was concluded. Then, the portable dedicated terminal 202 proceeds to step SP166.

In step SP166, the portable dedicated terminal 202 waits for distribution data to be sent from the advertiser/company server 203 of the advertiser/company that contracted with the customer. When the portable dedicated terminal 202 receives the distribution data from the advertiser/company server 203 by the receiving part 243, the portable dedicated terminal 202 proceeds to step SP167.

In step SP167, the portable dedicated terminal 202 recognizes and records the received distribution data on the storage medium only for customer 246 by the recording control part 245. Thereby, the distribution data can be freely reproduced and shown by the customer. Then, the portable dedicated terminal 202 proceeds to step SP165 to finish the processing in the portable dedicated terminal 202. As described above, all the contract processing procedures by the data providing system 200 are finished.

According to the above configuration, in this data providing system 200, by the intermediate server 201, advertiser/company information is obtained from the advertiser/company server 203 of an advertiser/company that provides distribution data to the customer via the Internet 204, stores this in the advertiser/company database 211 as advertiser/company registration information to register the above advertiser/company.

Furthermore, in the data providing system 200, the intermediate server 201 obtains customer information from the intermediate server 201 of the customer who wants to use the Internet 204 with the portable dedicated terminal 202, issues a customer ID, adds the customer ID to the obtained customer information, and stores this in the customer database 210 as customer registration information, to register the customer.

In this data providing system 200, to obtain content data or the like by the portable dedicated terminal 202, every time when content specifying data including the customer ID is sent from the portable dedicated terminal 202 to an agency, the content specifying data is relayed by the intermediate server 201, and the contents of the above content specifying data is added to the customer registration information in the customer database 210 and thereby the customer registration information is updated.

In this manner, in the data providing system 200, if customer permission data indicating the permission of the release of the customer information is sent from the portable dedicated terminal 202, customer's taste is determined based on the customer registration information in the customer database 210 by the intermediate server 201. Advertiser/company registration information in the advertiser/company database 211 is searched based on the above discriminated customer's taste, and thereby the advertiser/company registration information on an advertiser/company that provides distribution data meeting customer's taste is read. Then, advertiser/company introduction data is generated and sent to the portable dedicated terminal 202.

Accordingly, in this data providing system 200, the customer can easily select the advertiser/company which provides distribution data meeting his/her own taste with time and cost remarkably reduced.

In this data providing system 200, as the result of introducing an advertiser/company to the customer, if desired advertiser/company is selected by the customer, the intermediate server 201 provides only the advertiser/company server 203 of the advertiser/company selected by the customer, with customer introduction data generated from the customer registration information being personal information on that customer, in order to make the advertiser/company decide whether to contract with the customer. Therefore, it can be almost prevented that personal information on the customer is illegally released via the Internet.

In this data providing system 200, customers are introduced to an advertiser/company as the above manner. Therefore, also the advertiser/company can easily and properly select customers requesting distribution data provided by the advertiser/company, and can efficiently and properly provide that distribution data to the customers.

In this data providing system 200, the customer uses a portable dedicated terminal 202 which is only for agency, and the customer obtains distribution data provided by an advertiser/company by the above portable dedicated terminal 202. Thereby, the versatility of the portable dedicated terminal 202 can be expanded, and the usability can be remarkably improved.

In this data providing system 200, in the portable dedicated terminal 202, distribution data is obtained from an agency and is recorded on the storage medium for customer 246 different from the storage medium for agency 247 for storing the content data. Thereby, when the content data rented from the agency is erased, the distribution data can be almost prevented from being erroneously erased.

According to the above configuration, the intermediate server 201 has the customer database 210 for storing customer information provided by a portable dedicated terminal 202 from the customer to register the above customer, and the advertiser/company database 211 for storing advertiser/company information provided from an advertiser/company by the advertiser/company server 203 as advertiser/company registration information to register the above advertiser/company. Every time when content specifying data including a customer ID that was issued in the registration of the customer is sent from the portable dedicated terminal 202 to the agency, the contents of the above content specifying data are added to customer registration information in the customer database 210, and the customer registration information is updated by the intermediate server 201. When the intermediate server 201 receives customer's permission data from the above portable dedicated terminal 202, the intermediate server 201 searches advertiser/company registration information in the advertiser/company database 211 based on customer's taste that was determined based on the customer registration information in the customer database 210, generates advertiser/company introduction data based on advertiser/company registration information on an advertiser/company selected by the search, and sends this to the portable dedicated terminal 202. Thereby, the customer can easily select an advertiser/company that provides distribution data meeting his/her own taste. Thus, a data providing system in that customers can easily and accurately obtain desired distribution data can be realized.

Note that, in the aforementioned fourth embodiment, when the intermediate server 201 receives the customer's permission data from the portable dedicated terminal 202, the intermediate server 201 decides customer's taste based on the customer registration information in the customer database 210 and searches the advertiser/company database 211. This invention, however, is not limited to this and the intermediate server 201 may constantly decides customer's taste based on the customer registration information in the customer database 210, may inquire of the customer whether or not he/she intends to release the customer information, with the portable dedicated terminal 202 when the intermediate server 201 founds the above customer's taste (that is, when the number of obtained times of the content data by the customer is the threshold value or over), and if as a result, the customer's permission data to permit the release of the customer information is sent from the customer with the portable dedicated terminal 202, the intermediate server 201 may search advertiser/company registration information in the advertiser/company database 211. Thereby, when the customer permits the release of the customer information with the presumption to contract with and advertiser/company, it can be almost prevented that the above customer's taste cannot be found and thereby an advertiser/company cannot be introduced.

In the aforementioned fourth embodiment, when the intermediate server 201 received the customer's permission data, the intermediate server 201 searches advertiser/company registration information in the advertiser/company database 211 based on customer's taste found based on the customer registration information in the customer database 210. This invention, however, is not limited to this and in addition to the customer's taste that was found based on the customer registration information in the customer database 210, advertiser/company registration information in the advertiser/company database 211 may be searched also based on the contract conditions described in the above customer registration information. Thereby, when the customer introduction data is sent to the advertiser/company server 203, the cases where the advertiser/company abandons a contract with the customer owing to the contract conditions can be remarkably reduced. Thus, a probability that a contract is concluded between the customer and the advertiser/company is increased, and the request of the customer that wants to contract with an advertiser/company can be further accurately taken up.

In the aforementioned fourth embodiment, when the intermediate server 201 receives the customer's permission data, the intermediate server 201 searches advertiser/company registration information in the advertiser/company database 211 based on customer's taste that was found based on the customer registration information in the customer database 210. This invention, however, is not limited to this and advertiser/company registration information in the advertiser/company database 211 may be searched based on the taste information in the customer information being a basis for the customer registration information stored in the customer database 210. Thereby, in the matching part 216, excepting the processing for extracting customer's taste from the customer registration information can reduce load on the processing.

Furthermore, in the aforementioned fourth embodiment, the customer uses the intermediate server 201 with the portable dedicated terminal 202. This invention, however, is not limited to this and the customer may use the intermediate server 201 with other various kinds of data obtaining apparatuses, provided that the obtaining apparatus are apparatuses connectable to the Internet 204 by the customer, such as a personal computer, a portable telephone and a PDA (Personal Digital Assistance). Thereby, further more customers can use introduction by the intermediate server 201 to advertisers/companies, and the system can be widely popularized.

(6) Fifth Embodiment

Figure 25:
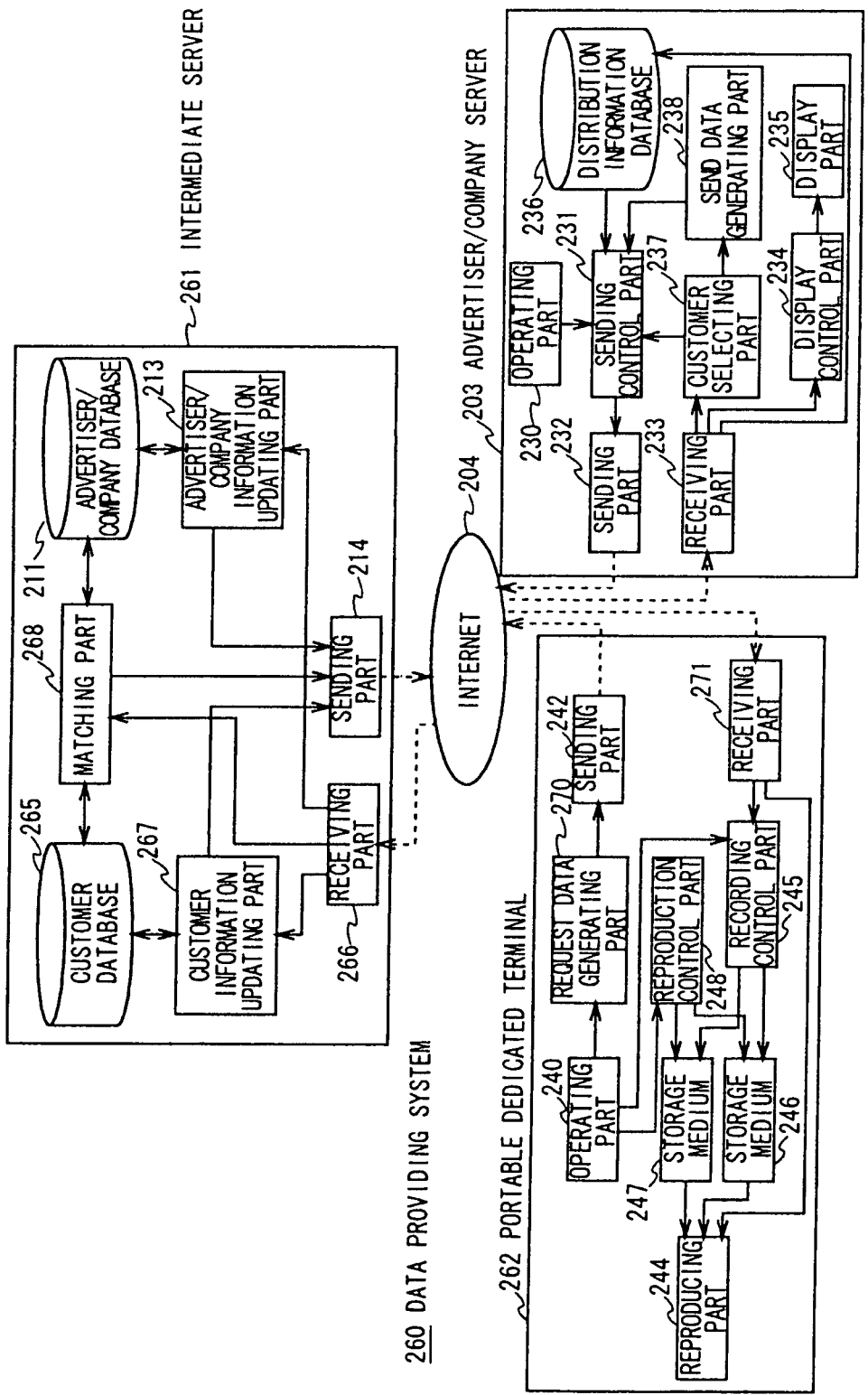
FIG. 25 is a block diagram showing the construction of a data providing system according to a fifth embodiment.

FIG. 25 in which the same reference numerals are added to corresponding parts to FIG. 11 shows a data providing system 260 according to a fifth embodiment. The data providing system 260 is constructed similarly to the aforementioned data providing system 200 according to the fourth embodiment, except for the construction of an intermediate server 261 corresponding to the system management site 2 described above with reference to FIGS. 1 to 3 and the construction of a portable dedicated terminal 262 corresponding to the portable dedicated terminals 7A to 7N described above with reference to FIGS. 1 to 3.

In this case, the intermediate server 261 registers the customer who uses the Internet 204 with the portable dedicated terminal 262 by storing customer registration information in a customer database 265 similarly to the intermediate server 201 described above with reference to FIG. 11, and also registers an advertiser/company that provides distribution data to the customer via the Internet 204 with the advertiser/company server 203 by storing advertiser/company registration information in the advertiser/company database 211.

Furthermore, the intermediate server 261 updates the customer registration information in the customer database 265 every time when the customer uses the Internet 204 to obtain content data or the like with the portable dedicated terminal 262, similarly to the intermediate server 201 described above with reference to FIG. 11.

In addition to the customer registration information and customer registration screen data, the intermediate server 261 previously stores customer information input screen data to input customer information in the customer database 265. When the intermediate server 261 receives customer's permission data that was sent from the portable dedicated terminal 262 by customer's operations, by a receiving part 266, the intermediate server 261 reads the customer information input screen data from the customer database 265 by a customer information updating part 267, and sends this from the sending part 214 to the portable dedicated terminal 262 via the Internet 204.

When customer information like the customer information described above with reference to FIG. 13(A), which was entered on the customer information input screen based on the customer information input screen data according to customer's operations, is sent from the portable dedicated terminal 262 as customer information data, the intermediate server 261 receives this by a receiving part 266 and takes this in a matching part 268.

Figure 26:
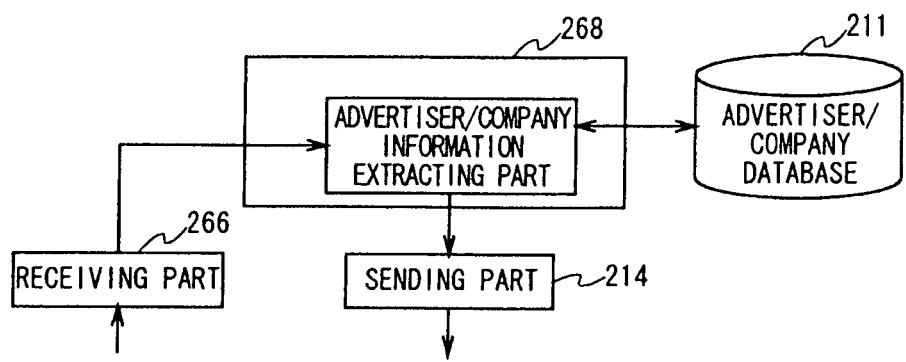
FIG. 26 is a block diagram showing the construction of a matching part.

Now, as shown in FIG. 26, the matching part 268 is constructed by an advertiser/company information extracting part. The matching part 268 extracts customer's taste genre information in the customer information data, which was taken in from the receiving part 266, as information representing customer's taste, searches advertiser/company registration information in the advertiser/company database 211 based on the above extracted customer's taste genre information, to read the advertiser/company registration information having distributed genre information in the same genre as the genre shown in the customer's taste genre information.

Then, the matching part 268 generates advertiser/company introduction information described above with reference to FIG. 17 from the advertiser/company registration information read from the advertiser/company database 211, and sends this from the sending part 214 to the portable dedicated terminal 262 via the Internet 204 as advertiser/company introduction data.

In this manner, the intermediate server 261 introduces an advertiser/company that can provide distribution data meeting customer's taste to the customer who has permitted the release of the customer information to the advertiser/company.

On the other hand, as shown in FIG. 25, the portable dedicated terminal 262 executes customer registration at the intermediate server 261, similarly to the portable dedicated terminal 202 described above with reference to FIG. 11, and also sends various requests to an agency or the like to obtain content data etc.

When a permission request indicating the permission of the release of customer information to the advertiser/company is entered with the operating part 240 by customer's operations, the portable dedicated terminal 262 generates customer's permission data by a request data generating part 270, and sends this from the sending part 242 to the intermediate server 261 via the Internet 204.

As a result, if customer information input screen data is sent from the intermediate server 261 via the Internet 204, the portable dedicated terminal 262 receives this by a receiving part 271, and transmits this to the reproducing part 244, to display a customer information input screen based on the above customer information input screen data.

If customer information is entered on the customer information input screen according to the operations of the operating part 240 by the customer, the portable dedicated terminal 262 generates customer information data representing the customer information, by the request data generating part 270, and sends this from the sending part 242 to the intermediate server 261 via the Internet 204.

In this manner, the portable dedicated terminal 262 can receive the introduction of an advertiser/company that provides distribution data meeting customer's taste, based on the advertiser/company introduction data provided from the intermediate server 261.

In this data providing system 260, the intermediate server 261 introduced the advertiser/company, the above intermediate server 261 executes a contract processing procedure similar to the contract processing procedure in the data providing system 200 (FIG. 11) described above with reference to FIG. 24, and the portable dedicated terminal 262 and the advertiser/company server 203. Thereby, the customer and the advertiser/company can make a contract.

Figure 27:
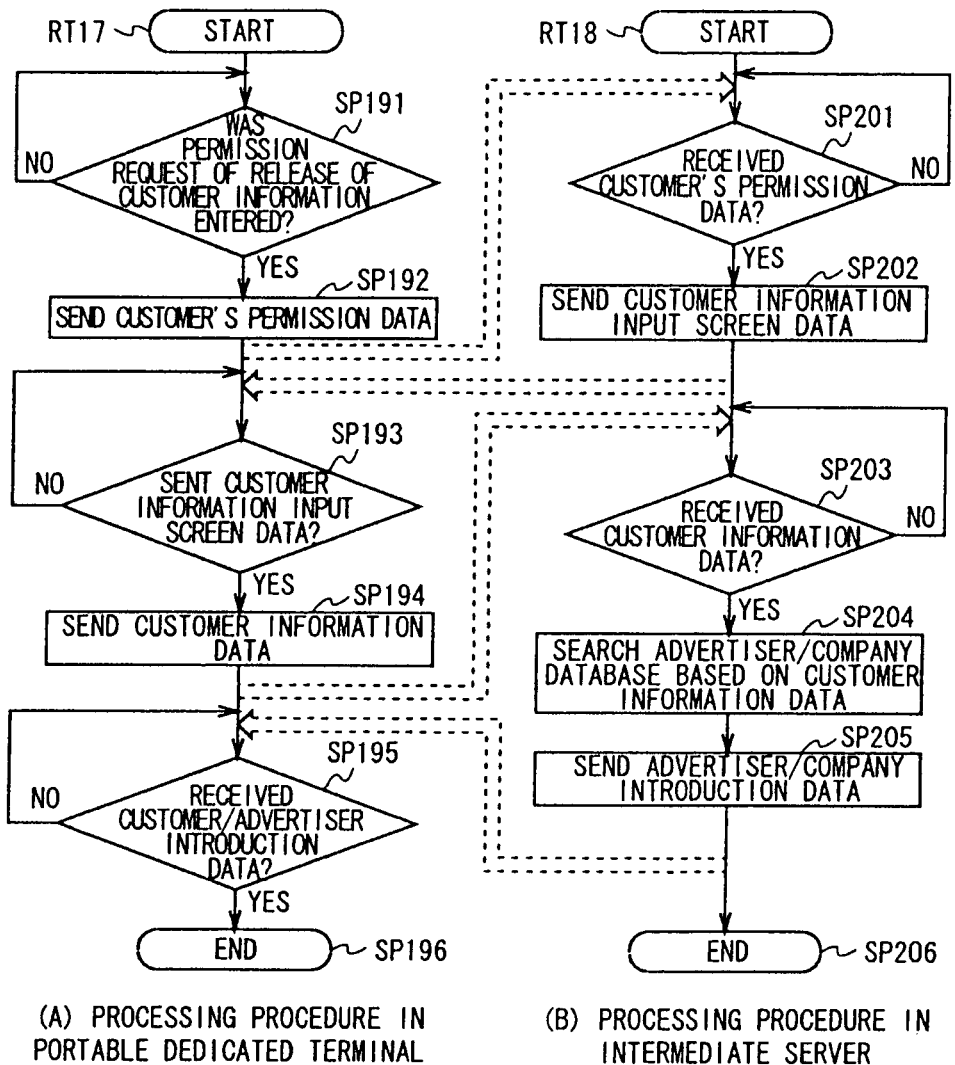
FIG. 27 is a flowchart showing an advertiser/company introduction processing procedure in the data providing system.

Now, an advertiser/company introduction processing procedure by the intermediate server 261 and the portable dedicated terminal 202 in the data providing system 260 will be collectively described. First, as shown in FIG. 27(A), the portable dedicated terminal 262 enters routine RT17 from the starting step, and proceeds to the next step SP191 to wait for a the permission request of the release of customer information to be entered. When the permission request is entered with the operating part 240 by customer's operations, the portable dedicated terminal 262 proceeds to step SP192.

In step SP192, the portable dedicated terminal 262 generates customer's permission data by the request data generating part 270 and sends this from the sending part 242 to the intermediate server 261, and then proceeds to step SP193.

At this time, as shown in FIG. 27(B), the intermediate server 261 enters routine RT18 from the starting step, and proceeds to the next step SP201 to wait for customer's permission data to be sent from the portable dedicated terminal 262. When the intermediate server 261 receives the above customer's permission data by the receiving part 266, the intermediate server 261 proceeds to step SP202.

In step SP202, the intermediate server 261 reads customer information input screen data from the customer database 265 based on the received customer's permission data by the customer information updating part 267, and sends this from the sending part 214 to the portable dedicated terminal 262, and then proceeds to step SP203.

At this time, in step SP193, the portable dedicated terminal 262 waits for customer information input screen data to be sent from the intermediate server 261. When the portable dedicated terminal 262 receives the above customer information input screen data by the receiving part 271, the portable dedicated terminal 262 proceeds to step SP194.

In step SP194, when customer information is entered by the customer via the operating part 240 in the state where the customer information input screen is displayed by transmitting the customer information input screen data to the reproducing part 244, the portable dedicated terminal 262 generates customer information data by the request data generating part 270 and sends this from the sending part 242 to the intermediate server 261, and then proceeds to step SP195.

At this time, in step SP203, the intermediate server 261 waits for the customer information data to be sent from the portable dedicated terminal 262. When the intermediate server 261 receives the above customer information data by the receiving part 266, the intermediate server 261 proceeds to step SP204.

In step SP204, the intermediate server 261 searches advertiser/company registration information in the advertiser/company database 211 based on customer's taste genre information in the customer information data, to reads advertiser/company registration information having distributed genre information having the same contents as the above customer's taste genre information, and then proceeds to step SP205.

In step SP205, the intermediate server 261 generates advertiser/company introduction data based on the advertiser/company registration information read from the advertiser/company database 211, and sends this from the sending part 214 to the portable dedicated terminal 262 to introduce the advertiser/company to the customer. Then, the intermediate server 261 proceeds to step SP206 to finish the processing in the intermediate server 261.

At this time, in step SP195, the portable dedicated terminal 262 waits for the advertiser/company introduction data to be sent from the intermediate server 261. When the portable dedicated terminal 262 receives the above advertiser/company introduction data by the receiving part 271, the portable dedicated terminal 262 transmits this to the reproducing part 244 to show the customer the advertisers/companies introduced from the intermediate server 261. Then, the portable dedicated terminal 262 proceeds to step SP196 to finish the processing in the portable dedicated terminal 262. Thereby, all the advertiser/company introduction processing procedure by the data providing system 260 is finished.

According to the above configuration, in this data providing system 260, when the customer permits the release of the customer information to the advertiser/company, the intermediate server 261 sends customer information input screen data to the portable dedicated terminal 262 in response to the customer's permission data sent from the portable dedicated terminal 262.

As a result, in the data providing system 260, the intermediate server 261 searches advertiser/company registration information in the advertiser/company database 211 based on the customer's taste genre information in the customer information data sent from the portable dedicated terminal 262, to read advertiser/company registration information having distributed genre information having the same contents as the customer's taste genre information, generates advertiser/company introduction data based on the above read advertiser/company registration information, and sends this to the portable dedicated terminal 262. Thereby, the advertiser/company that provides distribution data meeting customer's own taste can be introduced to the customer.

Accordingly, in this data providing system 260, when the customer permits the release of customer information to advertisers/companies, customer information is obtained, and advertiser/company registration information is searched based on the above obtained customer information. Therefore, when the customer wants to receive distribution data from an advertiser/company, the advertiser/company can be introduced according to the customer's interest.

That is, in this data providing system 260, even at the time when customer's interest has changed between his/her customer registration at the intermediate server 261 and the permission of the release of customer information to an advertiser/company, or even at the time when the number of the using times of the Internet 204 is relatively less than the time when the customer just began to use the portable dedicated terminal 262, customer's interest can be accurately grasped and the advertiser/company that provides distribution data desired by the above customer can be introduced to the customer.

According to the above configuration, the intermediate server 261 sends customer information input screen data to the portable dedicated terminal 262 in response to customer's permission data sent from the portable dedicated terminal 262, searches advertiser/company registration information in the advertiser/company database 211 based on customer's taste genre information in customer information data sent from the portable dedicated terminal 262 as the result of the sending, to read advertiser/company registration information having distributed genre information having the same contents as the above customer's taste genre information, generates advertiser/company introduction data based on that advertiser/company registration information and sends this to the portable dedicated terminal 262. Thereby, in addition to the effects obtained by the aforementioned fourth embodiment, advertisers/companies can be introduced to the customer while accurately reflecting customer's interest at the time point that the customer wants to receive distribution data from an advertiser/company. Thus, a data providing system in which the customer can further accurately obtain desired distribution data can be accomplished.

Note that, in the aforementioned fifth embodiment, the intermediate server 261 searches advertiser/company registration information in the advertiser/company database 211 based on customer's taste genre information in customer information data. This invention, however, is not limited to this and, instead of the customer's taste genre in the customer information data, advertiser/company registration information in the advertiser/company database 211 may be searched by matching comments or words in the comments representing customer's taste or the like in the above customer information data with comments or words in the comment such as the catchphrase of an advertiser/company in advertiser/company registration information, or advertiser/company registration information in the advertiser/company database 211 may be searched by using all or some of the above customer's taste genre information and the comments, and their contract conditions. Thereby, advertisers/companies can be introduced by further accurately reflecting customer's taste.

In the aforementioned fifth embodiment, the intermediate server 261 searches advertiser/company registration information in the advertiser/company database 211 based on the customer's permission data obtained when the customer permits the release of registration information. This invention, however, is not limited to this and the method that the intermediate server 261 searches advertiser/company registration information in the advertiser/company database 211 based on the customer's permission data obtained when the customer permitted the release of registration information, or the method that the intermediate server 261 searches advertiser/company registration information in the advertiser/company database 211 based on the customer registration information according to the aforementioned fourth embodiment may be arbitrary selected by the customer and executed. Thereby, a data providing system can be used by both types of customers who does not change his/her interests so much and who relatively change his/her interests, and thus the usability of the above data providing system can be improved.

Furthermore, in the aforementioned fifth embodiment, the customer uses the intermediate server 261 with the portable dedicated terminal 262. This invention, however, is not limited to this and a user may use the intermediate server 261 with other various kinds of data obtaining devices, provided that the data obtaining devices are devices connectable to the Internet 204 by the customer, such as a personal computer, a portable telephone and a PDA. Thereby, further more customers can use the introduction of advertisers/companies by the intermediate server 261, and thus the introduction can be widely popularized.

(7) Sixth Embodiment

Figure 28:
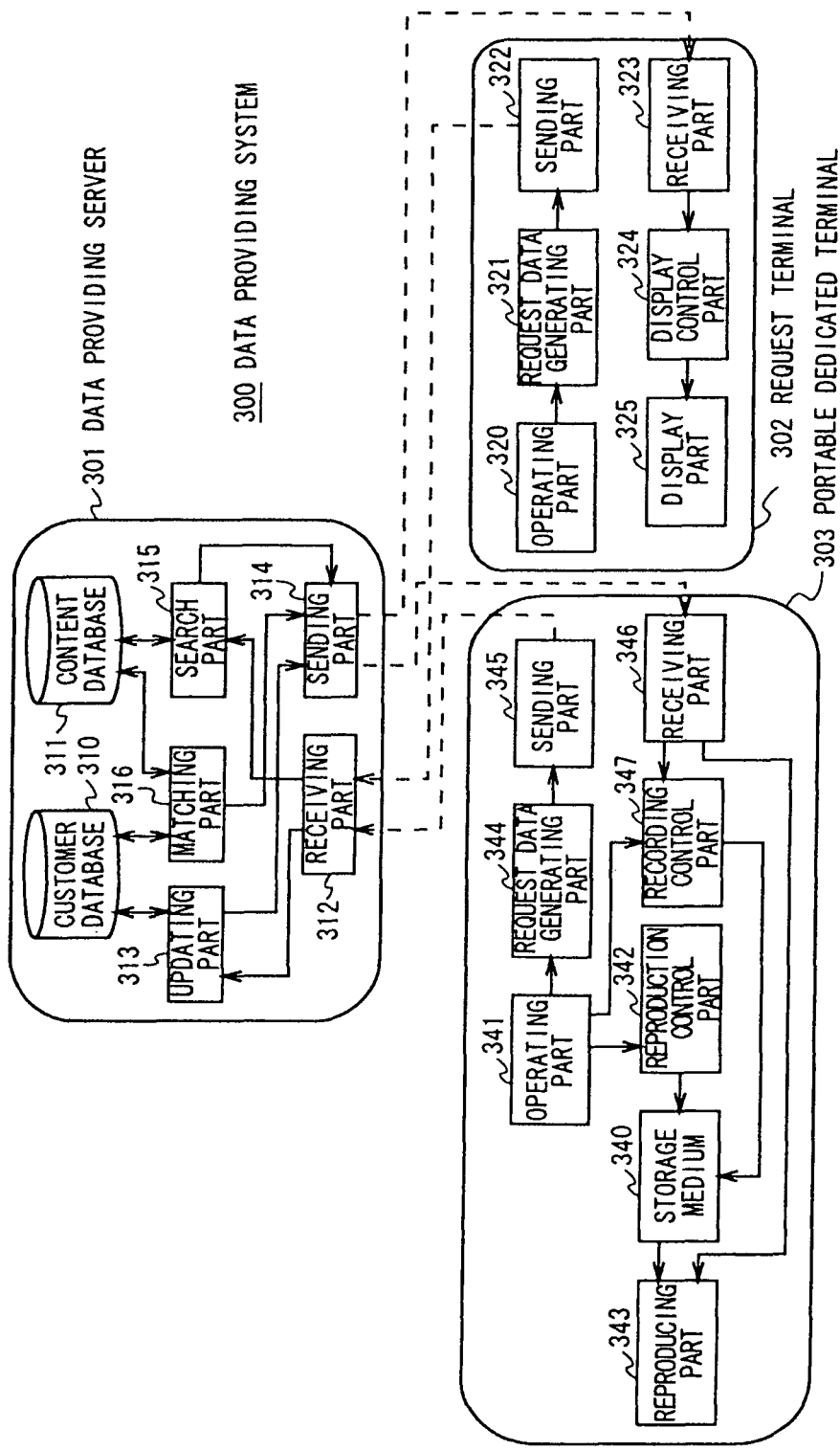
FIG. 28 is a block diagram showing the construction of a data providing system according to a sixth embodiment.

FIG. 28 shows a data providing system 300 according to a sixth embodiment. A request terminal 302 corresponding to the customer 3 described above with reference to FIGS. 1 to 3 (i.e., the request terminal used by the customer 3), and a portable dedicated terminal 303 corresponding to the portable dedicated terminals 7A to 7N described above with reference to FIGS. 1 to 3 and being only for the agencies 4A to 4N and accessible only to the data providing server 301 are connected to a data providing server 301 corresponding to the agencies 4A to 4N described above with reference to FIGS. 1 to 3 via the Internet (not shown).

The data providing server 301 has a customer database 310 for storing customer registration information and customer registration screen data, and a content database 311 for storing a lot of content data, content selection screen data, and customizing registration screen data to customize the above content selection screen data according to customer's request.

When registration request data to request registration of the customer is sent from the request terminal 302, the data providing server 301 receives this by a receiving part 312 and takes this in an updating part 313. The data providing server 301 reads customer registration screen data from the customer database 310 based on the registration request data by the above updating part 313, and sends this from a sending part 314 to the request terminal 302.

As a result, when customer information that was entered on a customer registration screen based on the customer registration screen data is sent from the request terminal 302, the data providing server 301 receives this by the receiving part 312 and takes this in the updating part 313. The data providing server 301 issues a customer ID to the customer requesting the registration and adds this to the customer information by the above updating part 313. The data providing server 301 stores the customer information with the added customer ID in the customer database 310 as customer registration information to register the customer.

In this connection, When registering the customer by the updating part 313, the data providing server 301 generates registration completion data including the customer ID and sends this from the sending part 314 to the request terminal 302, to notify the customer of the completion of the registration and the customer ID.

When transmission request data to request the transmission of content data is sent from the request terminal 302, the data providing server 301 receives this by the receiving part 312, and takes this in a search part 315, reads content selection screen data from the content database 311 based on the transmission request data by the above search part 315, and sends this from the sending part 314 to the request terminal 302.

As a result, when reservation information is entered on the content selection screen based on the content selection screen data and reservation data representing the above reservation information is sent from the request terminal 302, the data providing server 301 receives this by the receiving part 312.

The data providing server 301 reads the specified content data from the content database 311 based on the reservation data by the search part 315, and sends this from a dedicated terminal, not shown, to a portable dedicated terminal that is not still handed over to the customer (not shown) and is directly connected with a cable or the like to the dedicated terminal to record therein.

In this manner, the data providing server 301 previously prepares a portable dedicated terminal 303 by accepting an advance reservation for the purchase or rental of content data and the portable dedicated terminal 303 from the customer with the request terminal 302 and records the above content data that will be bought or rented in the portable dedicated terminal 303 that will be similarly bought or rented. Then, when the customer comes to an agency having the above data providing server 301, the portable dedicated terminal 303 is handed over to the customer and is sold or rented.

The data providing server 301 can be connected to the portable dedicated terminal 303 that was sold or rented to the customer via the Internet. If transmission request data to request the transmission of content data (purchase or rental) is sent from the above portable dedicated terminal 303 sold or rented, the data providing server 301 receives this by the receiving part 312 and takes this in the search part 315.

At this time, the data providing server 301 reads content selection screen data from the content database 311 based on that transmission request data by the search part 315, and sends this from the sending part 314 to customer's portable dedicated terminal 303.

As a result, when content data information to specify content data is entered on a content selection screen based on the content selection screen data and content specifying data representing the above specifying information is sent from the portable dedicated terminal 303, the data providing server 301 receives this by the receiving part 312 and takes this in the search part 315.

The data providing server 301 reads the specified content data from the content database 311 based on that content specifying data by the search part 315, and sends this from the sending part 314 to the portable dedicated terminal 303 to record this therein.

In this manner, the data providing server 301 sends the content data to the portable dedicated terminal 303 that was sold or rented to the customer, via the Internet. Thereby, the customer can buy or rent content data with that portable dedicated terminal 303.

Furthermore, if customizing request data to customize the portable dedicated terminal 303 that was sold or rented to the customer is sent, the data providing server 301 receives this by the receiving part 313, takes this in the search part 315, reads customizing registration screen data that has been previously stored in the content database 311 from this based on that customizing request data by the above search part 315, and sends this from the sending part 314 to the portable dedicated terminal 303.

As a result, when screen customizing information for the content selection screen, which was entered on the customizing registration screen based on the customizing registration screen data, is sent from the portable dedicated terminal 303 as screen customizing data, the data providing server 301 receives this by the receiving part 312, and takes this in the updating part 313 and the search part 315.

The data providing server 301 reads the content selection screen data from the content database 311 by the search part 315, processes this based on the screen customizing data obtained from the customer, and sends thus obtained customized screen data from the sending part 314 to the portable dedicated terminal 303.

In this manner, the data providing server 301 shows the customer the customized screen based on the customized screen data on the portable dedicated terminal 303 to make the customer confirm whether or not the content selection screen has been customized as requested. If confirmation data representing that the above content selection screen has been customized as wanted is sent, the data providing server 301 adds the customized screen data to customer registration information in the customer database 310 and updates the above customer registration information by the updating part 313.

Thereafter, when transmission request data is sent from the customer who requests the customizing of the content selection screen with the portable dedicated terminal 303, the data providing server 301 receives this by the receiving part 312, takes this in the updating part 313, reads the screen customizing information being added to customer registration information on the above customer from the customer database 310 by the above updating part 313, and transmits this to a matching part 316.

The data providing server 301 reads the content selection screen data from the content database 311 by the matching part 316, processes this based on the screen customizing information, and sends thus obtained customized screen data from the sending part 314 to the portable dedicated terminal 303.

Thereby, every time when transmission request data is sent from the customer who requests the customizing of the content selection screen with the portable dedicated terminal 303, the data providing server 301 makes the customer specify content data to buy or rent on the customized screen based on the customized screen data according to a customizing request by the above customer.

In this connection, in the portable dedicated terminal 303 being rented by the customer, also information to customize the color of the case of the above portable dedicated terminal 303 can be selected on the customizing registration screen. If case customizing information to specify the color of the case is sent from that portable dedicated terminal 303 as case customizing data, the data providing server 301 receives this by the receiving part 312, takes this in the updating part 313, adds the case customizing information to customer registration information in the customer database 310 and updates the above customer registration information by the above updating part 313.

Thereby, when the portable dedicated terminal 303 is rented to the customer again, or when the portable dedicated terminal 303 is sold to the above customer after that, the portable dedicated terminal 303 in a color specified by the case customizing information will be handed over.

On the other hand, if the customer enters customer registration information with an operating part 320, the request terminal 302 generates registration request data representing a registration request by a request data generating part 321, and sends this from a sending part 322 to the data providing server 301.

As a result, when the request terminal 302 receives customer registration screen data from the data providing server 301 by a receiving part 323, the request terminal 302 transmits this from a display control part 324 to a display part 325 to display a customer registration screen based on that customer registration screen data on the above display part 325.

When customer information is entered on the customer registration screen according to the operations of the operating part 320 by the customer, the request terminal 302 generates customer information data by the request data generating part 321 and sends this from the sending part 322 to the data providing server 301 to make the data providing server 301 execute customer registration.

When the customer enters a content data transmission request via the operating part 320, the request terminal 302 generates transmission request data representing that transmission request by the request data generating part 321 and sends this from the sending part 322 to the data providing server 301.

As a result, when the request terminal 302 receives content selection screen data from the data providing server 301 by the receiving part 323, the request terminal 302 transmits this from the display control part 324 to the display part 325 to display a content selection screen based on the content selection screen data on the above display part 325.

When reservation information is entered on the content selection screen according to the operations of the operating part 320 by the customer, the request terminal 302 generates reservation data by the request data generating part 321, and sends this from the sending part 322 to the data providing server 301. And the reservation of the purchase or the rental of the content data and the portable dedicated terminal 303 by the customer is finished.

With respect to the portable dedicated terminal 303 sold or rented to the customer in the state where the content data has been recorded in its internal storage medium 340, if a reproduction command is entered via an operating part 341, the portable dedicated terminal 303 reproduces the content data that the customer previously bought or rented from the storage medium 340 by a reproduction control part 342, and transmits this to a reproducing part 343 composed of a display control part, a display part, a speaker, etc to let the customer enjoy the content.

If the customer enters a content data transmission request with the operating part 341, the portable dedicated terminal 303 generates transmission request data representing that transmission request by a request data generating part 344, and sends this from a sending part 345 to the data providing server 301.

As a result, when the portable dedicated terminal 303 receives content selection screen data from the data providing server 301 by a receiving part 346, the portable dedicated terminal 303 transmits this to the reproducing part 343 to display a content selection screen based on the content selection screen data.

If information to specify content data is entered on the content selection screen according to the operations of the operating part 341, the portable dedicated terminal 303 generates content specifying data representing that specifying information by the request data generating part 344, and sends this from the sending part 345 to the data providing server 301.

When the portable dedicated terminal 303 receives the content data from the data providing server 301 by the receiving part 346, the portable dedicated terminal 303 records this on the storage medium 340 by a recording control part 347. Thereby, after that, the content data will be reproduced from the storage medium 340 by the reproduction control part 342 according to the operations of the operating part 341.

Furthermore, if the customer enters a customizing request with the operating part 341, the portable dedicated terminal 303 generates customizing request data representing that customizing request by the request data generating part 344, and sends this from the sending part 345 to the data providing server 301.

As a result, when the portable dedicated terminal 303 receives the customizing registration screen data from the data providing server 301 by the receiving part 346, the portable dedicated terminal 303 transmits this to the reproducing part 343 to display a customizing registration screen based on that customizing registration screen data.

If screen customizing information is entered on the customizing registration screen according to the operations of the operating part 341, the portable dedicated terminal 303 generates screen customizing data representing the screen customizing information by the request data generating part 344, and sends this from the sending part 345 to the data providing server 301.

As the result of that the screen customizing data was sent to the data providing server 301, when the portable dedicated terminal 303 receives customized screen data from the above data providing server 301 by the receiving part 346, the portable dedicated terminal 303 sends this to the reproducing part 343 to show the customer a customized screen based on the customized screen data.

As a result, if confirmation information to confirm that the content selection screen is customized as requested is entered by the customer with the operating part 341, the portable dedicated terminal 303 generates confirmation data by the request data generating part 344, and sends this from the sending part 345 to the data providing server 301 to store the screen customizing information representing the customizing contents that the customer wants in the above data providing server.

After the screen customizing data is stored in the data providing server 301, the portable dedicated terminal 303 sends content transmission request data to the data providing server 301. Then, the portable dedicated terminal 303 receives the customized screen data from the data providing server 301 by the receiving part 346, and transmits this to the reproducing part 343. Thereby, content data for purchase or for rental can be selected on the customized screen generated by customizing the content selection screen.

In this connection, if case customizing information to customize the color of the case of the portable dedicated terminal 303 is entered on the customizing registration screen according to the operations of the operating part 341, the portable dedicated terminal 303 generates case customizing data representing that case customizing information by the request data generating part 344, and sends this from the sending part 345 to the data providing server 301. Thus, the case customizing information for the case of the portable dedicated terminal 303 is stored in the data providing server 301.

In addition to the above configuration, in this sixth embodiment, when creating the content database 311 by obtaining a lot of content data from a content server (not shown) being the provider of the content data and corresponding to the system management site described above with reference to FIGS. 1 to 3, the data providing server 301 obtains a predetermined developmental tool for forming a content selection screen from the above content server.

The data providing server 301 generates content selection screen data in that the shop of the agency is displayed as three-dimensional virtual reality space images with the developmental tool and the customer can select content data as if he/she selects packaged media from shelves by actually walking in the shop of an agency by the above three-dimensional virtual reality space images, and stores the generated content selection screen data in the content database 311.

In this connection, the data providing server 301 stores the same content data as content data in a lot of packaged media actually being sold or rented at the agency in the content database 311, and generates the content selection screen data so that the layout of shelves, checkout counters, steps, etc. in the shop of the agency, and the layout of the packaged media in the above shelves or the like are almost faithfully reproduced.

The data providing server 301 updates the content selection screen data at constant timing or arbitrary timing by synchronizing with the time when new packaged media were put on the shelves in the shop of the agency (that is, it is also the time when new content data is obtained from a content server) and the time when the inside of the shop of the agency is remodeled. Thereby, the customer selecting content data on the content selection screen can have such feeling as to actually select packaged media in the shop of the agency.

Figure 29:
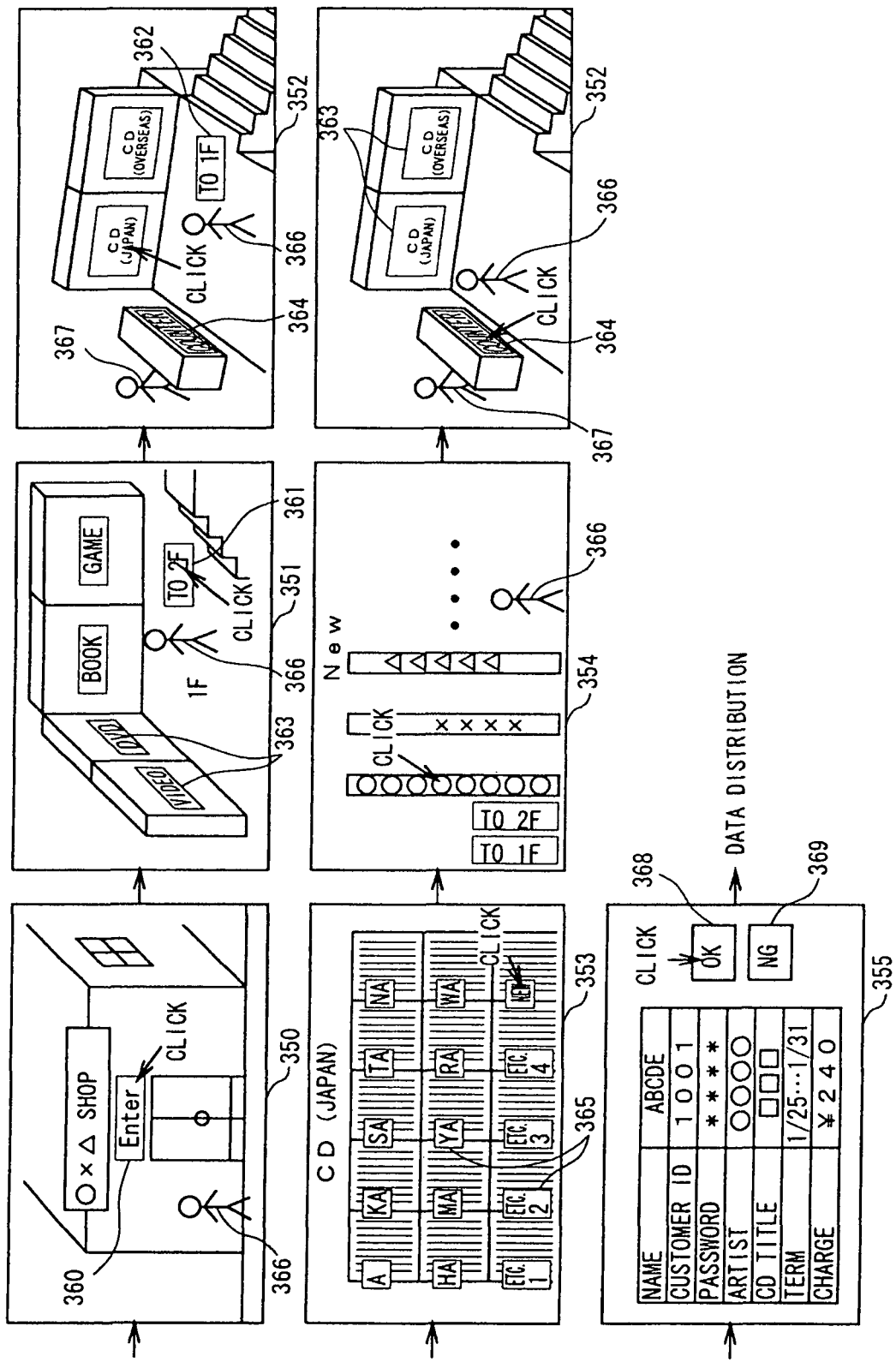
FIG. 29 is a schematic diagram showing the construction of content selection screens using three-dimensional virtual reality space images representing the shop of an agency.

Actually, as shown in FIG. 29, the content selection screen data is composed of plural image data by adding a selection confirmation image 355 being a two-dimensional image to confirm content data selected by the customer, to the three-dimensional virtual reality space images such as an "image of exterior of shop" 350 that represents the exterior of the agency (entrance), an "image of first floor in shop" 351 and an "image of second floor in shop" 352, which represent each floor in the shop, an "image of shelf in shop" 353 that represents each of plural shelves containing packaged media by genre in the shop with an enlargement, a content selection image 354 to select content data by enlarging the backbones of the packaged media aligned on the shelves, etc.

In this case, in the image of exterior of shop 350, an entering button 360 to enter the shop and switch the display to the image of first floor 351 is provided.

In the image of first floor 351 and the image of second floor 352, movement buttons 361 and 362 to switch the display to the image of second floor in shop 352 or the image of first floor in shop 351, which is another floor, a shelf selection button 363 to select a shelf by genre and switch the display to the image of shelf in shop 353, and a checkout counter button 364 to switch the display to a selection confirmation image 355 after the customer selected content data to buy or rent, are provided.

Furthermore, in the image of shelf in shop 353, the packaged media have been classified by the Japanese alphabet, and a detail button 365 to switch the display to the content selection image 354 by the above classified packaged media is provided.

In the image of exterior of shop 350, the image of first floor in shop 351, the image of second floor in shop 352 and the content selection image 354, the image of a human representing the customer (hereinafter, this is referred to as customer's image) 366 and the image of a human representing a clerk (hereinafter, this is referred to as clerk's image) 367 are displayed. By moving the above customer image 366 as if it is actually walking in the shop and by overlapping it on the entering button 360, the movement buttons 361 and 362, the shelf selection button 363, the checkout counter button 364, the backbone of packaged media in the content selection image 354, etc. or approximating it to them and selectively specifying (clicking) these buttons, image specifying commands previously allocated to the above buttons can be entered.

In addition to this, in the image of shelf in shop 353 and the selection confirmation image 355, a cursor to be inversely displayed on a detail button 365, a confirmation button 368, a cancel button 369, etc. (not shown) by overlapping. By moving the above cursor and selectively specifying (clicking) one of these buttons, a command previously allocated to the above button can be entered.

Specifically, the portable dedicated terminal 303 which received content selection image data first displays the image of exterior of shop 350 of a content selection screen by the reproducing part 343, moves the customer's image 366 on the image of exterior of shop 350 according to the operation of the operating part 341. If the entering button 360 is selectively specified, the portable dedicated terminal 303 displays the image of first floor in shop 351 instead of the image of exterior of shop 350.

The portable dedicated terminal 303 moves the customer's image 366 on the image of first floor in shop 351 according to the operation of the operating part 341. when the movement button 361 is selectively specified, the portable dedicated terminal 303 displays the image of first floor in shop 351 instead of the above image of first floor in shop 351.

In this manner, the portable dedicated terminal 303 moves the customer's image 366 on the image of first floor in shop 351 and the image of second floor in shop 352 according to the operation of the operating part 341. If one of the shelf selection buttons 363 is selectively specified, the portable dedicated terminal 303 displays the image of shelf in shop 353 corresponding to the above shelf selection button 363 selectively specified instead of the image of first floor in shop 351 or the image of second floor in shop 352.

The portable dedicated terminal 303 moves the cursor on the image of shelf in shop 353 according to the operation of the operating part 341. If one of the detail buttons 365 is selectively specified, the portable dedicated terminal 303 displays a corresponding content selection image 354 instead of the above image of shelf in shop 353.

After the customer's image 366 was moved on the content selection image 354 and content data was selectively specified as one of packaged media according to the operation of the operating part 341, if the movement buttons 361 or 362 is selectively specified, the portable dedicated terminal 303 displays the image of first floor in shop 351 or the image of second floor in shop 352 again instead of the above content selection image 354. In this manner, for instance, if the customer's image 366 is moved on the image of second floor in shop 352 and the checkout counter button 364 is selectively specified, the portable dedicated terminal 303 displays the selection confirmation image 355 instead of the above image of second floor in shop 352.

Here, in the selection confirmation image 355, the title of the content data selected by the customer, customer's name, customer ID, password, etc. are displayed. The portable dedicated terminal 303 moves the cursor according to the operation of the operating part 341, so that the rental term or purchase of content data can be entered. If the above rental term or purchase is entered, a charge for the rental or the buying of the content data is displayed responding to that.

If moving the cursor and on the selection confirmation image 355 and selectively specifying the confirmation button 368 according to the operation of the operating part 341, the portable dedicated terminal 303 generates content specifying data by the request data generating part 344 by using information in the selection confirmation image 355 as specification information by the request data generating part 344, and sends the above generated content specifying data from the sending part 345 to the data providing server 301. Thereby, the customer can obtain the content data that he/she specified.

On the contrary, if moving the cursor on the selection confirmation image 355 and selectively specifying the cancel button 369 according to the operation of the operating part 341, the portable dedicated terminal 303 displays for example the image of first floor in shop 351 instead of the above selection confirmation image 355. Thereby, the customer can select content data again.

Figure 30:
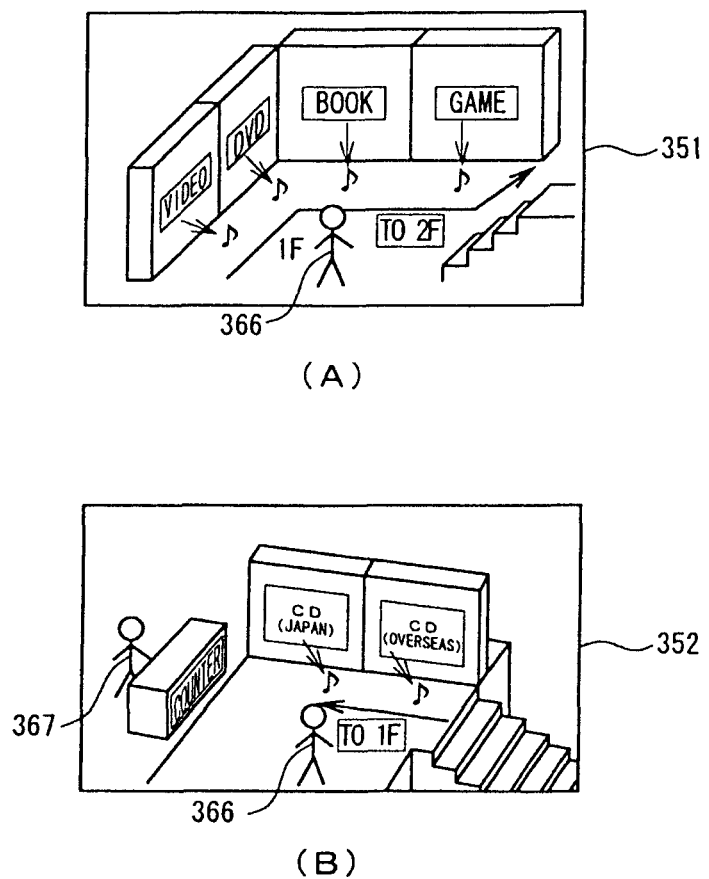
FIG. 30 is a schematic diagram for explaining the access to commercial data in a content selection screen.

In addition to this, as shown in FIGS. 30(A) and 30(B), if moving the customer's image 366 and passing it in front of each shelf on the image of first floor in shop 351 or the image of second floor in shop 352 according to the operation of the operating part 341, the portable dedicated terminal 303 reproduces content data of which the advertisement set by the agency is wanted, for few seconds by matching with the genre of each shelf. Thereby, the customer views the content data intended by the agency, and it can be advertised to the customer.

In this connection, the data quantity of such content selection screen data is relatively large. Therefore, when the data providing server 301 receives transmission request data from the portable dedicated terminal 303, the data providing server 301 first sends the data of the image of exterior of shop 350 to the above portable dedicated terminal 303 as content selection screen data. Then, if the entering button 360 is selectively specified on the above image of exterior of shop 350, the data providing server 301 receives that notification and sends the data of the image of first floor in shop 351. In this manner, the data providing server 301 receives a notification and sends corresponding image data, every time when the switching of the display to another image is specified from the portable dedicated terminal 303 by the entering button 360, the movement buttons 361 and 362, etc. on each image forming the content selection screen data.

Furthermore, if the customer's image 366 is moved to a specified coordinate position that has been previously specified to reproduce content data for advertisement on the image of first floor in shop 351 and the image of second floor in shop 352 and the data providing server 301 is notified of the specified coordinate position from the portable dedicated terminal 303, the data providing server 301 reads the predetermined part of the content data corresponding to the above specified coordinate position that has been previously stored in the content database 311 as commercial data by the search part 315, and sends this from the sending part 314 to the portable dedicated terminal 303.

The data providing server 301 divides the content selection screen data into the data of each image and content data for advertisement, and sequentially sends this to the portable dedicated terminal 303. Thereby, it can be prevented that the capacity of the storage medium 340 in the above portable dedicated terminal 303 becomes large.

By the way, in the data providing server 301, on a customizing registration screen to be provided to the portable dedicated terminal 303 according to a customizing request by the customer, various screen customizing information such as change of an image specifying command previously and addition of a new input part to an arbitrary image that have been previously allocated to the buttons (the entering button 360 etc.) in each image forming the content selection screen described above with reference to FIG. 29, and also the rearrangement of packaged media in the content selection image 354 into for example the order of created date of content data, arbitrary change of the background color of the above content selection image 354 and selection confirmation image 355 can be entered.

Figure 31:
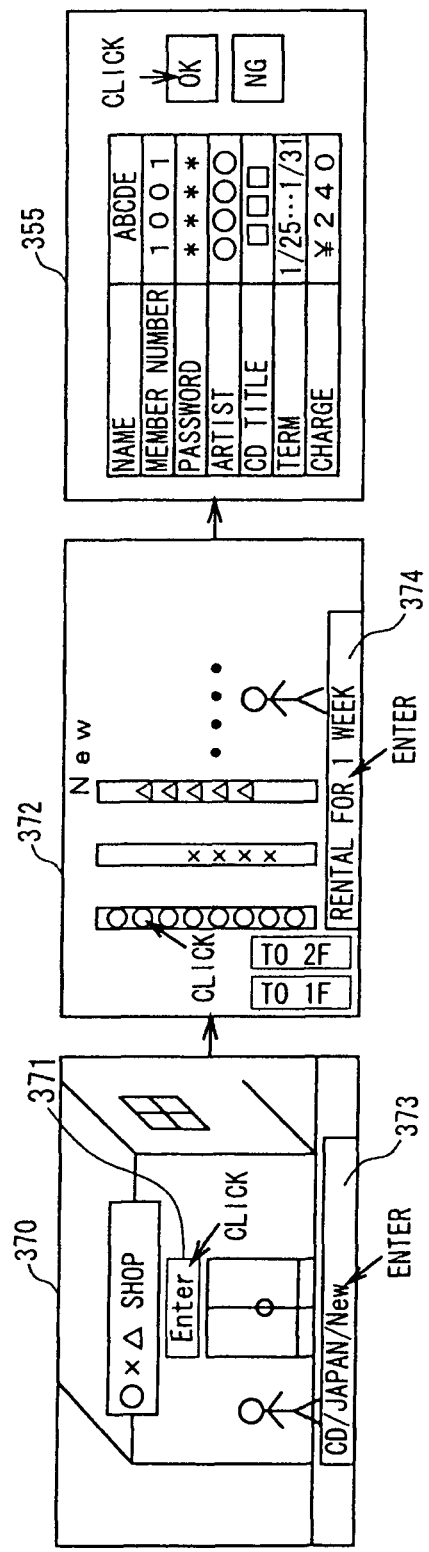
FIG. 31 is a schematic diagram showing the configuration of content selection screens customized in response to customer's requests.

Thereby, for instance, as shown in FIG. 31, the data providing server 301 switches the display of the content selection screen from the image of exterior of shop 370 to a content selection image 372 based on the screen customizing data obtained from the portable dedicated terminal 303 according to the selective specifying of an entry-to-shop button 371. Then, the data providing server 301 switches the display from the above content selection image 372 to the selection confirmation image 355, or provides a new input part 373 on the image of exterior of shop 370 to make the customer arbitrary enter the genre of content data and switching the display to the content selection image 372 corresponding to that input, or newly provides an input part 374 also on the content select image 372 to make the customer enter by specifying the rental or the buying of content data. In this manner, the display of the content selection screen can be customized according to customer's request.

Accordingly, in the data providing server 301, the usability of the content selection screen can be remarkably improved for the customer who frequently obtains content data with the portable dedicated terminal 303 and also the customer who obtains content data in the comparatively same genre.

In this connection, also when the data providing server 301 received transmission request data from the request terminal 302, the data providing server 301 sends content selection screen data composed of the data of each of the images described above with reference to FIG. 29, to the above request terminal 302.

Figure 32:
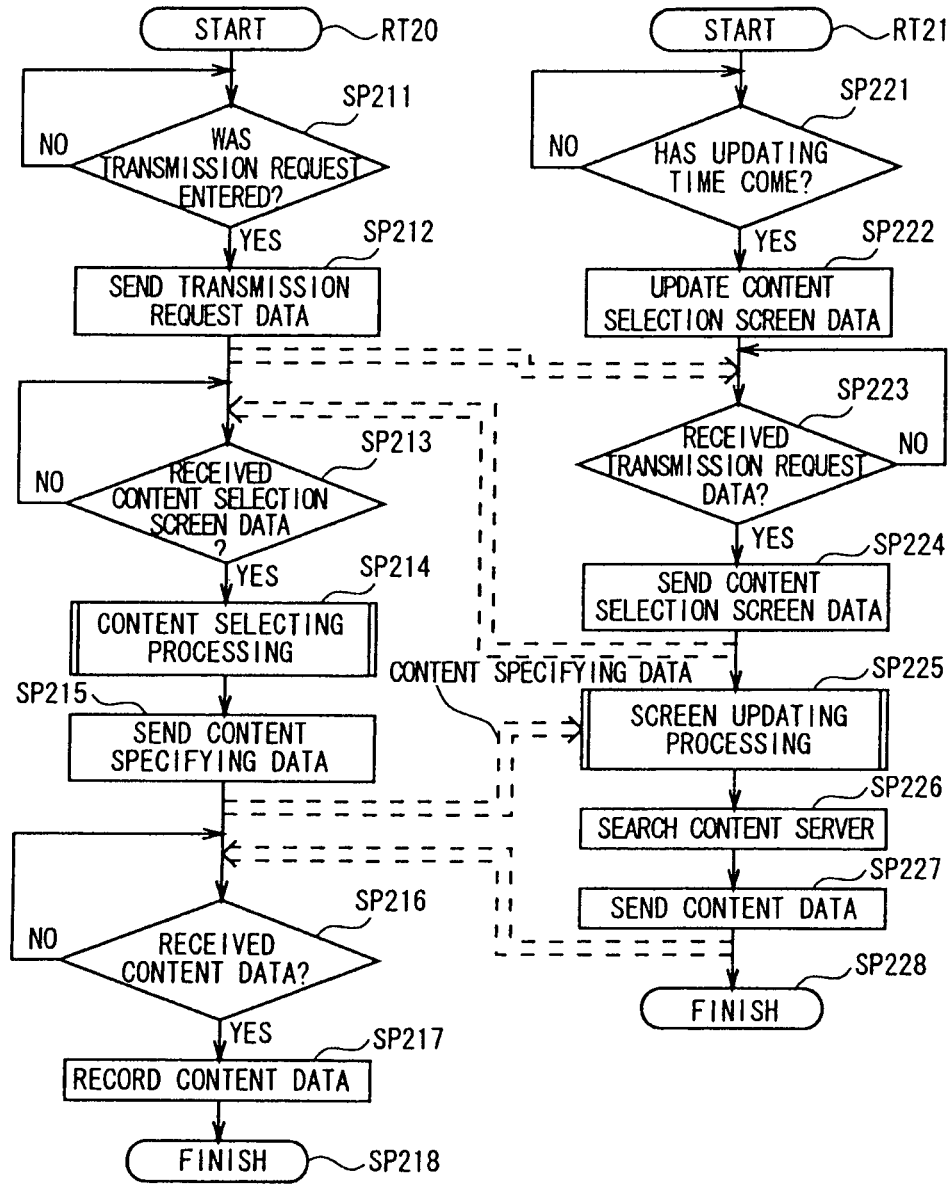
FIG. 32 is a flowchart showing a content providing processing procedure using content selection screen data in the data providing system.

Now, a content providing processing procedure using content selection screen data by the data providing server 301 and the portable dedicated terminal 303 in the data providing system 300 will be collectively described. First, as shown in FIG. 32(A), the portable dedicated terminal 303 enters routine RT20 from the starting step, and proceeds to step SP211.

In step SP211, the portable dedicated terminal 303 waits for a transmission request to be entered by customer's operations via the operating part 341. When the above transmission request is entered, the portable dedicated terminal 303 proceeds to step SP212.

In step SP212, the portable dedicated terminal 303 generates transmission request data by the request data generating part 344 and sends this from the sending part 345 to the data providing server 301, and proceeds to step SP213.

As shown in FIG. 32(B), the data providing server 301 enters routine RT21 from the starting step, and proceeds to step SP221. In step SP221, the data providing server 301 waits the time to update content selection screen data. If it arrives at the above time to update, the data providing server 301 proceeds to step SP222 to update the content selection screen data, and proceeds to step SP223.

In step SP223, the data providing server 301 waits for transmission request data to be sent from the portable dedicated terminal 303. When the data providing server 301 receives the transmission request data by the receiving part 312, the data providing server 301 proceeds to step SP224 to read the content selection screen data from the content database 311 by the search part 315 and sends this from the sending part 314 to the portable dedicated terminal 303, and proceeds to step SP225.

At this time, in step SP213, the portable dedicated terminal 303 waits for content selection screen data to be sent from the data providing server 301. When the portable dedicated terminal 303 receives the content selection screen data by the receiving part 346, the portable dedicated terminal 303 transmits that content selection screen data to the reproducing part 343 to display the image of exterior of shop 350 being the content selection screen, and then proceeds to step SP214.

In step SP214, the portable dedicated terminal 303 starts a subroutine described later. When specifying information is entered on each image forming the content selection screen according to the operations of the operating part 341 by the customer, the portable dedicated terminal 303 proceeds to step SP215.

In step SP215, the portable dedicated terminal 303 generates content specifying data by the request data generating part 344 and sends this from the sending part 345 to the data providing server 301, and proceeds to step SP216.

At this time, in step SP225, the data providing server 301 starts a subroutine described later. The data providing server 301 properly reads each image data forming content selection screen data and commercial data from the content database 311 by the search part 315, and sends this from the sending part 314 to the portable dedicated terminal 303. Then, when the data providing server 301 receives content specifying data from the above portable dedicated terminal 303, the data providing server 301 proceeds to step SP226.

In step SP226, the data providing server 301 searches content data in the content database 311 based on the content specifying data by the search part 315 to read the specified content data, and proceeds to step SP227.

In step SP227, the data providing server 301 sends the content data read from the content database 311 from the sending part 314 to the portable dedicated terminal 303, and then proceeds to step SP228 to finish the above processing by the data providing server 301.

On the other hand, in step SP216, the portable dedicated terminal 303 waits that the content data to be sent from the data providing server 301. When the portable dedicated terminal 303 receives the above content data, the portable dedicated terminal 303 proceeds to step SP217 to record that content data on the storage medium 340 by the recording control part 347. Then, the portable dedicated terminal 303 proceeds to step SP218 to finish the above processing by the portable dedicated terminal 303. Thus, the data providing server 301 finishes all the content providing processing procedure with the content selection screen data.

Figure 33:
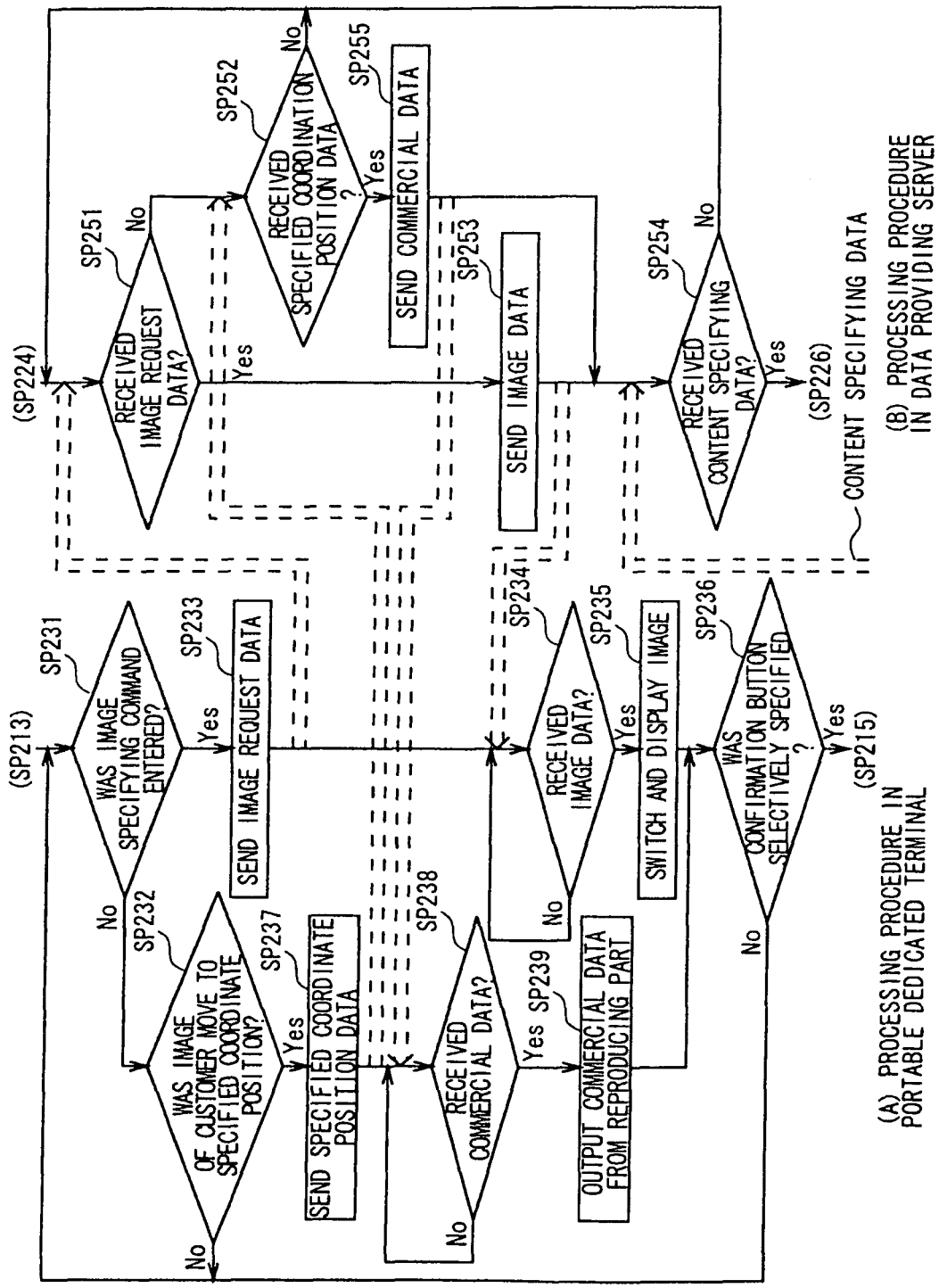
FIG. 33 is a flowchart showing the subroutine of the content providing processing procedure in the data providing system.

In this connection, as shown in FIG. 33(A), the portable dedicated terminal 303 starts a subroutine in step SP214 and enters step SP231. In the above step SP231 and the next step SP232, the portable dedicated terminal 303 waits for an image specifying command to be entered on each image such as the image of exterior of shop 350 forming the content selection screen displayed by the reproducing part 343 described above with reference to FIG. 29 according to the operations of the operating part 341 (that is, the entry-to-shop button 360 or the like is selectively specified), and waits for the customer's image 366 to be moved to the specified coordinate position on the above image (the image of first floor in shop 351 etc.)

In step SP231, if the image specifying command is entered by moving the customer's image 366 and selectively specifying the entry-to-shop button 360 or the like on the image of exterior of shop 350 or the like according to the operations of the operating part 341, the portable dedicated terminal 303 proceeds to step SP233 to generate image request data representing an image specifying command that has been previously allocated to the above selectively specified button by the request data generating part 344, and sends this from the sending part 345 to the data providing server 301, and proceeds to step SP234.

At this time, as shown in FIG. 33(B), the data providing server 301 starts a subroutine in step SP225 and enters step SP251. In the above step SP251 and the next step SP252, the data providing server 301 waits for image request data and specified coordinate position data to be sent from the portable dedicated terminal 303. In that step SP251, when the data providing server 301 receives the image request data sent from the portable dedicated terminal 303 by the receiving part 312, the data providing server 301 proceeds to step SP253.

In step SP253, the data providing server 301 searches content data in the content database 311 based on the image request data by the search part 315 to read the specified image data, and sends this from the sending part 314 to the portable dedicated terminal 303, and proceeds to step SP254.

At this time, in step SP234, the portable dedicated terminal 303 waits for the image data to be sent from the data providing server 301. When the portable dedicated terminal 303 receives the image data by the receiving part 346, the portable dedicated terminal 303 proceeds to step SP235.

In step SP235, the portable dedicated terminal 303 transmits the received image data to the reproducing part 343 to newly display an image based on the received image data instead of the image of the content selection screen being displayed at present. Then, the portable dedicated terminal 303 proceeds to step SP236 to determine whether or not the confirmation button 368 has been selectively specified on the selection confirmation image 355.

Obtaining a negative result in this step SP236 means that the selection confirmation image 355 has not been displayed yet by the reproducing part 343 by the reproducing part 343 or that although the above selection confirmation image 355 has been displayed, the confirmation button 368 has not been selectively specified because of in the middle of entering to specify buying or rental for the content data. At this time, the portable dedicated terminal 303 returns to step SP231.

In step SP232, the portable dedicated terminal 303 moves the customer's image 366 to the specified coordinate position on the image of first floor in shop 351 or the like according to the operation of the operating part 341, and proceeds to step SP237 to generate specified coordinate position data representing that specified coordinate position by the request data generating part 344 and sends this from the sending part 345 to the data providing server 301, and proceeds to step SP238.

At this time, in step SP252, the data providing server 301 waits for the specified coordinate position data to be sent from the portable dedicated terminal 303. When the data providing server 301 receives the specified coordinate position data by the receiving part 312, the data providing server 301 proceeds to step SP255 to search commercial data in the content database 311 based on the specified coordinate position data by the search part 315 and to read specified commercial data, and sends this from the sending part 314 to the portable dedicated terminal 303, and proceeds to step SP254.

In step SP254, the data providing server 301 determines whether or not it received content specifying data from the portable dedicated terminal 303, and sequential repeats the processing loop of steps SP251-SP252-SP253-SP254-SP255 until receiving the content specifying data, and sends image data and commercial data according to the image request data and the specified coordinate position data sent from the portable dedicated terminal 303.

When the data providing server 301 receives the content specifying data in step SP254, the data providing server 301 pulls out of this subroutine and proceeds to step SP226 in the processing procedure in the data providing server 301 described above with reference to FIG. 32(B).

On the other hand, in step SP238, the portable dedicated terminal 303 waits for commercial data to be sent from the data providing server 301. When the portable dedicated terminal 303 receives the commercial data by the receiving part 346, the portable dedicated terminal 303 proceeds to step SP239 to transmit that commercial data to the reproducing part 343. Thus, the customer views a part of content based on the commercial data and the above content are advertised to the customer. Then, the portable dedicated terminal 303 proceeds to step SP236.

Until obtaining an affirmative result in step SP236, the portable dedicated terminal 303 returns to step SP231 and sequentially repeats the processing loop of the above steps SP231-SP232-SP233-SP234-SP235-SP236-SP237-SP238-SP239. Thus, the portable dedicated terminal 303 makes the customer select desired content data by displaying each image of the content selection screen while properly switching the display with mixing the advertisement of content by the reproducing part 343.

Then, in step SP236, if confirming that the confirmation button 368 was selectively specified on the selection confirmation image 355 on the content selection screen, the portable dedicated terminal 303 pulls out of this subroutine and proceeds to step SP215 of the processing procedure in the portable dedicated terminal 303 described above with reference to FIG. 32(A).

Figure 34:
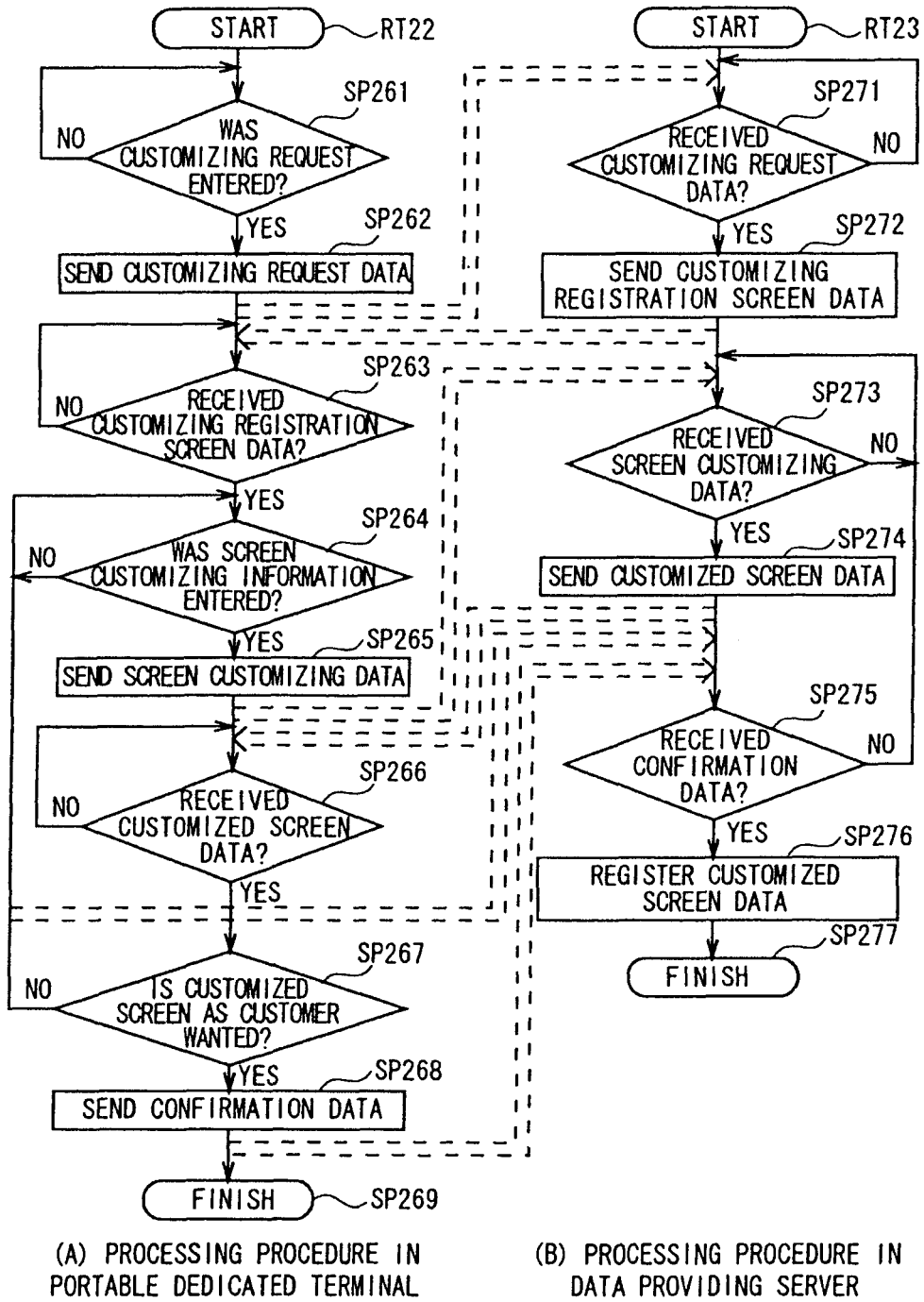
FIG. 34 is a flowchart showing a customizing processing procedure in the data providing system.

A content selection screen customizing processing procedure by the data providing server 301 and the portable dedicated terminal 303 in this data providing system 300 will be collectively described. First, as shown in FIG. 34(A), the portable dedicated terminal 303 enters routine RT22 from the starting step and proceeds to step SP261.

In step SP261, the portable dedicated terminal 303 waits for the customer to enter a customizing request via the operating part 341. When the customizing request is entered, the portable dedicated terminal 303 proceeds to step SP262 to generate customizing request data by the request data generating part 344 and sends this from the sending part 345 to the data providing server 301, and proceeds to step SP263.

At this time, as shown in FIG. 34(B), the data providing server 301 enters routine RT23 from the starting step and proceeds to step SP271 to wait for the customizing request data to be sent from the portable dedicated terminal 303. When the data providing server 301 receives the customizing request data by the receiving part 312, the data providing server 301 proceeds to step SP272 to read customizing registration screen data from the content database 311 by the search part 315 and sends this from the sending part 314 to the portable dedicated terminal 303, and proceeds to step SP273.

In step SP263, the portable dedicated terminal 303 waits for the customizing registration screen data to be sent from the data providing server 301. When the portable dedicated terminal 303 receives the customizing registration screen data by the receiving part 346, the portable dedicated terminal 303 transmits this to the reproducing part 343 to display a customizing registration screen based on the customizing registration screen data by the above reproducing part 343, and proceeds to step SP264.

In step SP264, the portable dedicated terminal 303 waits for screen customizing information to be entered on the customizing registration screen according to the operations of the operating part 341. When the above screen customizing information is entered, the portable dedicated terminal 303 proceeds to step SP265 to generate screen customizing data by the request data generating part 344 and sends this from the sending part 345 to the data providing server 301, and proceeds to step SP266.

At this time, in step SP273, the data providing server 301 waits for the screen customizing data to be sent from the portable dedicated terminal 303. When the data providing server 301 receives the above screen customizing data by the receiving part 312, the data providing server 301 proceeds to step SP274.

In step SP274, the data providing server 301 reads the content selection screen data from the content database 311 by the search part 315, processes this based on the screen customizing data, and sends thus obtained customized screen data from the sending part 314 to the portable dedicated terminal 303, and proceeds to step SP275.

On the other hand, in step SP266, the portable dedicated terminal 303 waits for that the customized screen data to be sent from the data providing server 301. When the portable dedicated terminal 303 receives the customized screen data by the receiving part 346, the portable dedicated terminal 303 sends this to the reproducing part 343 to display a customizing screen based on the customized screen data, and proceeds to step SP267.

In step SP267, as a result of that the customized screen was shown to the customer by the reproducing part 343, if that the present setting is not desired customizing is specified by the above customer with the operating part 341, the portable dedicated terminal 303 generates recustomizing data to regenerate the screen customizing information again by the request data generating part 344 and sends this from the sending part 345 to the data providing server 301, returns to step SP264, and repeats again the processing loop of steps SP264-SP265-SP266-SP267.

On the contrary, in step SP267, if that the present customizing is desired customizing is specified by the customer with the operating part 341, the portable dedicated terminal 303 proceeds to step SP268 to generate confirmation data by the request data generating part 344 and sends this from the sending part 345 to the data providing server 301, and proceeds to step SP269 to finish the above processing in the portable dedicated terminal 303.

On the other hand, in step SP275, the data providing server 301 receives the recustomizing data or the confirmation data from the portable dedicated terminal 303 by the receiving part 312. When the data providing server 301 receives the recustomizing data by the above receiving part 312, the data providing server 301 returns to step SP273, and repeats the processing loop of steps SP273-SP274-SP275 again.

In step SP275, when the data providing server 301 receives the confirmation data by the receiving part 312, the data providing server 301 proceeds to step SP276 to add the screen customizing data to the customer registration information in the customer database 310 and update the customer registration information by the updating part 313, and proceeds to step SP277 to finish the above processing of the data providing server 301. Thus, all the customizing processing procedure by the data providing system 300 is finished.

Figure 35:
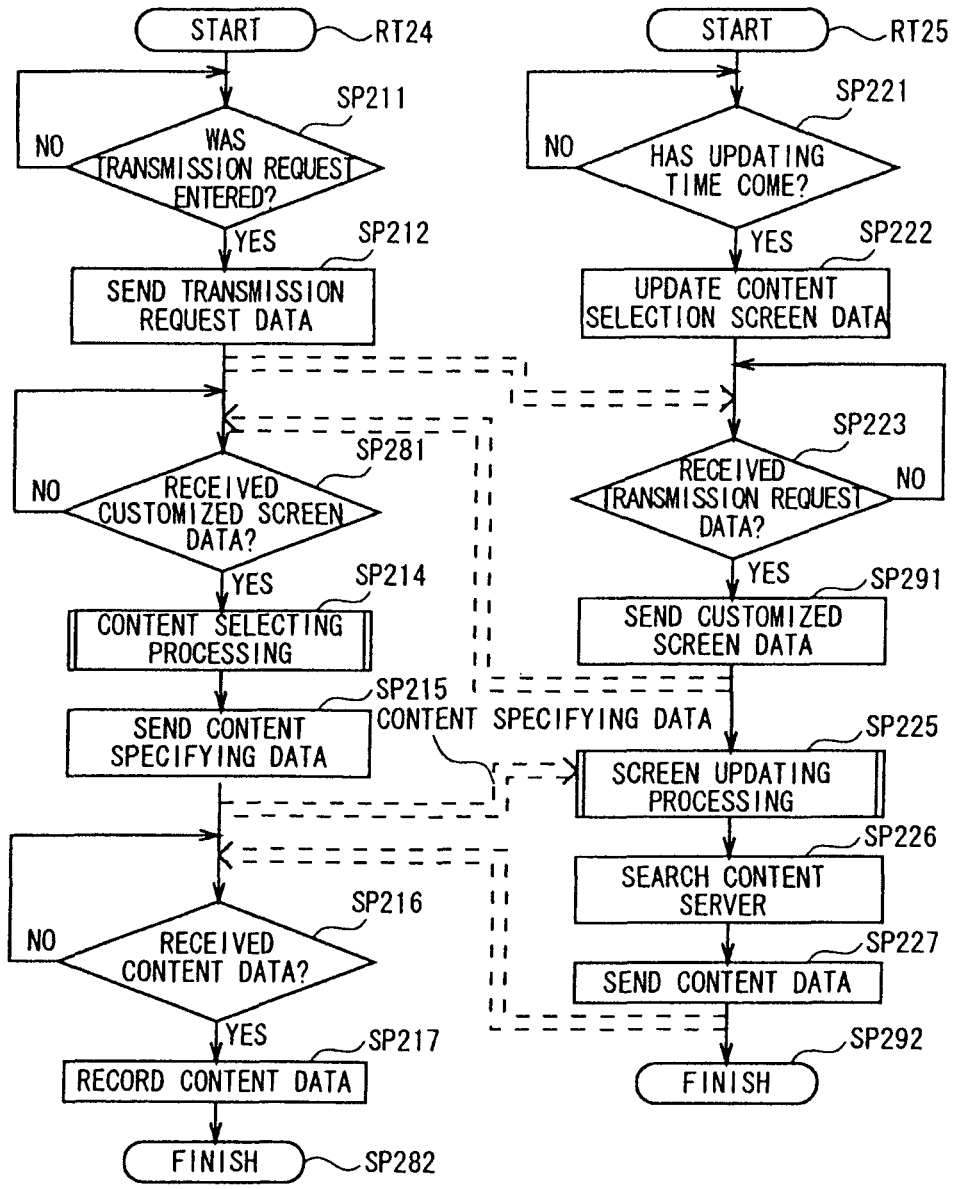
FIG. 35 is a flowchart showing a content providing processing procedure using customized screen data in the data providing system.

A content providing processing procedure using the customized screen data by the data providing server 301 and the portable dedicated terminal 303 in the data providing system 300 will be collectively described. Referring to FIG. 35(A) shown by adding the same reference numerals to corresponding parts in FIG. 32(A), the portable dedicated terminal 303 enters routine RT24 from the starting step, proceeds to step SP221, sequentially executes the processing of the above step SP221 and the following step SP222 to send transmission request data to the data providing server 301, and proceeds to step SP281.

At this time, referring to FIG. 35(B) shown by adding the same reference numerals to corresponding parts in FIG. 32(B), the data providing server 301 enters routine RT25 from the starting step, proceeds to step SP221, sequentially executes the processing of the above steps SP221 to SP223 to receive transmission request data from the portable dedicated terminal 303, and proceeds to step SP291.

In step SP291, the data providing server 301 reads screen customizing data being added to the customer registration information on the customer who requested to obtain the content data from the customer database 310 by the updating part 313, processes the content selection screen data read from the content database 311 based on the screen customizing data by the search part 315, and sends thus obtained customized screen data from the sending part 314 to the portable dedicated terminal 303, and proceeds to step SP225.

The data providing server 301 sequentially executes the processing of the above steps SP225, SP226 and SP227, and then proceeds to step SP292 to finish the above processing in the data providing server 301.

On the other hand, in step SP281, the portable dedicated terminal 303 waits for the customized screen data to be sent from the data providing server 301. When the portable dedicated terminal 303 receiving the customized screen data by the receiving part 346, the portable dedicated terminal 303 transmits that customized screen data to the reproducing part 343 to display for example the image of the exterior of the shop being a customized screen, and proceeds to step SP214.

In step SP214, the portable dedicated terminal 303 sequentially executes the processing of the above steps SP214 to SP217, and then proceeds to step SP282 to finish the above processing of the portable dedicated terminal 303.

Thus, all the content providing processing procedure by means of the customized screen data by the data providing system 300 is finished.

According to the above configuration, in this data providing system 300, if the data providing server 301 receives customizing request data from the portable dedicated terminal 303 that is only for agency and can access only the above data providing server 301, the data providing server 301 sends customizing registration screen data to the above portable dedicated terminal 303 according to this. If screen customizing information for a content selection screen that was entered on a customizing registration screen based on that customizing registration screen data is sent from the above portable dedicated terminal 303 as screen customizing data to the data providing server 301, the data providing server 301 receives and adds this to corresponding customer registration information in the customer database 310 and registering the screen customizing data.

Then, in this data providing system 300, if the data providing server 301 receives transmission request data from the portable dedicated terminal 303 of the customer who registered the screen customizing data by the data providing server 301, the data providing server 301 reads the above screen customizing data from the customer database 310, and also reads content selection screen data from the customer database 311, and processes the above read content selection screen data based on the screen customizing data and sends thus obtained customized screen data to the portable dedicated terminal 303. Thereby, the customer can select desired content data on the customized screen obtained by customizing the above content selection screen according to customer's request.

In this data providing system 300, since the portable dedicated terminal 303 can access only the data providing server 301 that provides content data, the content selection screen can be easily customized so as to meet the taste of the customer who uses the above portable dedicated terminal 303 for content data (that is, genre). Thus, the usability of the content selection screen can be remarkably improved.

Moreover, in this data providing system 300, a content selection screen previously generated by mixing a three-dimensional virtual reality space image that represents the inside of the shop of an agency is provided from the data providing server 301 to the portable dedicated terminal 303 so that the customer can easily select content data. And that content selection screen can be customized according to customer's request. Therefore, the usability of the above content selection screen can be further improved.

Furthermore, in this data providing system 300, when the data providing server 301 obtained screen customizing data from the portable dedicated terminal 303, the content selection screen data is customized based on the above screen customizing data, and the customer can confirm this on the portable dedicated terminal 303. Therefore, the above content selection screen can be properly customized as the customer desired.

In this data providing system 300, since the portable dedicated terminal 303 is accessible only to the data providing server 301 that provides content data and the content selection screen to be provided to the above portable dedicated terminal 303 at the time when the customer obtains the content data can be customized according to customer's request, the customer who uses the portable dedicated terminal 303 for the purpose of obtaining content data can remarkably easily use the above data providing system 300.

As a result, in this data providing system 300, the percentage of customers who use the data providing server 301 (also being an agency) for the purpose of obtaining content data can be remarkably improved.

Furthermore, in this data providing system 300, since the customer can use such portable dedicated terminal 303 accessible only to the data providing server 301 by either systems of purchase and rental, also the customer who does not own a device to use the Internet, the customer who although owns the above device, is inexperienced in operation to connect to the Internet, and the customer who almost does not have knowledge of the Internet itself, can easily obtain content data from the data providing server 301.

According to the above configuration, the data providing server 301 sends the customizing registration screen data according to the customizing request data that was sent from the portable dedicated terminal 303 being only for agency and accessible only to the above data providing server 301 to the portable dedicated terminal 303, and the data providing server 301 registers the screen customizing data sent from the above portable dedicated terminal 303 in the customer database 310. Then, the data providing server 301 processes the content selection screen data based on the screen customizing data read from the customer database 310 according to the transmission request data sent from the portable dedicated terminal 303, and sends thus obtained customized screen data to the portable dedicated terminal 303. Thereby, the content selection screen can be easily customized so as to meet the taste of the customer who uses the portable dedicated terminal 303 for content data, and the usability of the above content selection screen can be remarkably improved. Thus, a data providing system in which customers can easily select content data can be accomplished.

Note that, in the aforementioned sixth embodiment, the data providing server 301 is installed in an agency. This invention, however, is not only limited to this. The place to install the data providing server 301 may not be particularly prescribed, provided that the data providing server 301 is connected to the Internet. And by providing a database to manage plural agencies in the data providing server 301 and storing agency IDs peculiar to each agency, content selection screen data and customizing registration screen data in the above database by making a correspondence, the content selection screen data and the customizing registration screen data of an agency that has been previously corresponded or an agency that was arbitrary selected may be provided to the above portable dedicated terminal 303 according to an access from the portable dedicated terminal 303.

In the aforementioned sixth embodiment, in the data providing server 301, content selection screen data is generated by means of the developmental tool that was provided from the content server. This invention, however, is not limited to this and content selection screen data may be generated by entrusting it to a company for generating content selection screen data or the like from the data providing server 301.

In the aforementioned sixth embodiment, content selection screen data representing the inside of the shop of an agency by three-dimensional virtual reality space images is provided by the data providing server 301. This invention, however, is not limited to this and content selection screen data generated as a home page by listing the titles of a lot of content data or the like and displaying them in a list may be provided.

Figure 36:
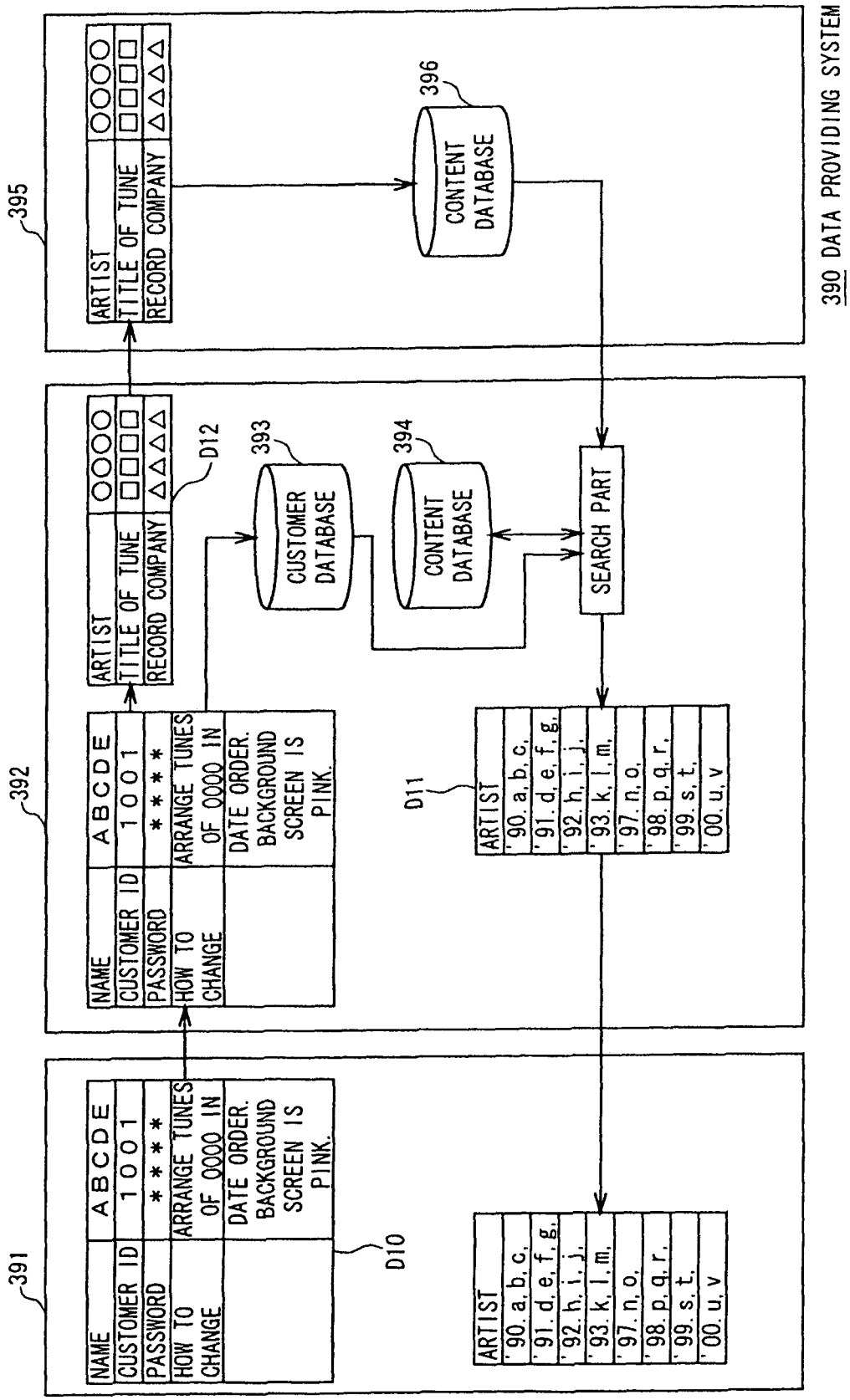
FIG. 36 is a conceptual view for explaining the customizing of a content selection screen according to another embodiment to the sixth embodiment.

By the way, as shown in FIG. 36, in a data providing system 390 for providing content selection screen data generated as a home page, as screen customizing data D10 that will be sent from a portable dedicated terminal 391 to a data providing server 392, customizing such that for instance tunes (i.e., content data) by an arbitrary artist (or genre) are arranged in date order and a background color is specified in an arbitrary color is possible for the content selection screen data. If the above data providing server 392 receives transmission request data from the portable dedicated terminal 391 after registered the received screen customizing data D10 in a customer database 393, the data providing server 392 processes the content selection screen data in a content database 395 based on the screen customizing data D10 read from the customer database 393 by a search part 394, and sends thus obtained customized screen data D11 to the portable dedicated terminal 391.

In this connection, in the above data providing system 390, if the data providing server 392 receives the screen customizing data D10, the data providing server 392 determines whether or not content data for an amount that can satisfy the request by the above screen customizing data D10 have been stored in a content database 394. If the content data for the amount that can satisfy the request by the above screen customizing data D10 has not been stored in the above content database 394, the data providing server 392 may generate content transmission request data D12 and send this to a content server 395, to read the specified content data from the content database 396 in the above content server 395 and supply this to the data providing server 392. Thereby, content selection screen data can be customized by further properly corresponding to customer's request. Note that, such supply of content data from the content server 395 to the data providing server 392 also can be applied to the aforementioned sixth embodiment.

Furthermore, in the aforementioned sixth embodiment, the data providing server 301 simply obtains a lot of content data provided from a content server and storing them in the content database 311. This invention, however, is not limited to this and the data providing server 301 may obtain compressed content data from a content server, store this in the content database 311 as it is, and provide the above compressed content data to the portable dedicated terminal 303. Thereby, the limited capacity of the content database 311 in the data providing server 301 and the storage medium 340 in the portable dedicated terminal 303 can be effectively used to record content data.

Figure 37:
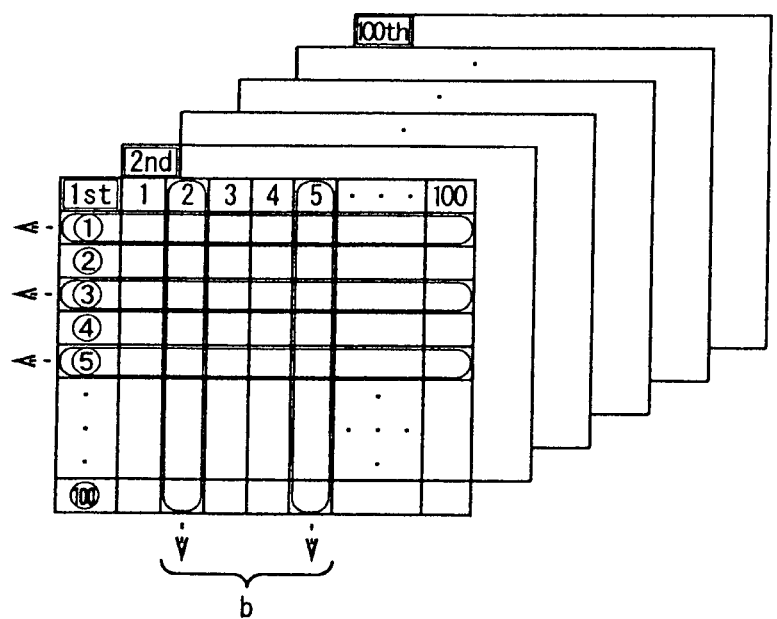
FIG. 37 is a schematic diagram for explaining a method of providing content data from a content server to a data providing server.

In this connection, as shown in FIG. 37, in a content server, as well as a lot of content data, many data tables 400 in which the above content data are represented by classifying by genre may have been stored in a content database. And if the genre of content data to be treated for providing is specified by preceding the start of the distribution of content data from a data providing server, content data in the specified genre may be selected from the above data table at random for each data providing server or agency respectively, and the above selected content data group "a" and "b" may be provided to respectively different data providing server or agency. Thereby, a part of or all different content data can be mutually provided between data providing servers for treating content data in the same genre. As a result, the customer can use many data providing servers dealing in content data in the same genre.

(8) Seventh Embodiment

Figure 38:
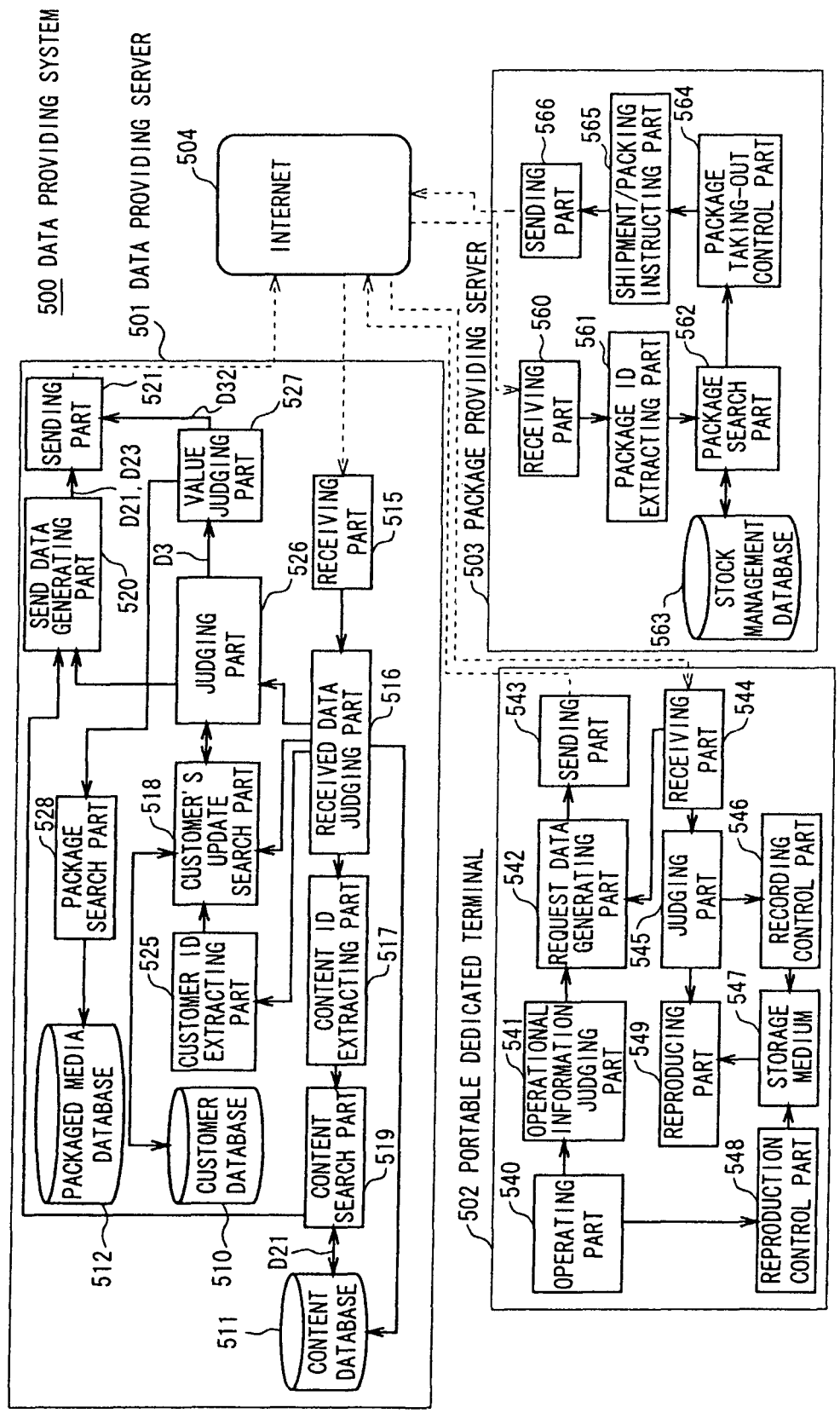
FIG. 38 is a block diagram showing the construction of a data providing system according to a seventh embodiment.

FIG. 38 shows a data providing system 500 according to a seventh embodiment. A portable dedicated terminal 502 that corresponds to the portable dedicated terminals 7A to 7N described above with reference to FIGS. 1 to 3 and is accessible only to the above data providing server 501, and a package providing server 503 that corresponds to the sales company 5 described above with reference to FIGS. 1 to 3 are respectively connected to a data providing server 501 corresponding to the agencies 4A to 4N described above with reference to FIGS. 1 to 3, via the Internet 504.

The data providing server 501 has a customer database 510, a content database 511 and a packaged media database 512. In the above customer database 510, customer registration information composed of customer information such as name, address, account number, etc., obtained from the customer who wants a registration, and a customer ID issued to the above customer is stored and the customer is registered. Thereby, the customer can use the data providing server 501.

In the content database 511, as content data to be provided to customers, content data composed of many single tunes (music) has been stored, and a data table generated by listing content additional information composed of content ID peculiar to each of the above content data, title (the title of tune), sale price, rental price, etc., has been stored.

Furthermore, the data providing server 501 makes the correspondence between content data being a single tune and packaged media storing the same content data as packaged media equivalently exchangeable. In the packaged media database 512, a data table formed by listing the title of the content data being a single tune, the title of the packaged media being a single CD storing the above content data, the sale price of the above packaged media, package identification information peculiar to the packaged media (hereinafter, this is referred to as package ID), etc. with making the correspondence between them according to that correspondence in equivalently exchange.

If for example, the registered customer sends specifying information on content data to rent from a portable dedicated terminal 502 (that he/she bought or rented) as content specifying data, the data providing server 501 receives this by a receiving part 515 and takes this in a received data judging part 516.

Figure 39:
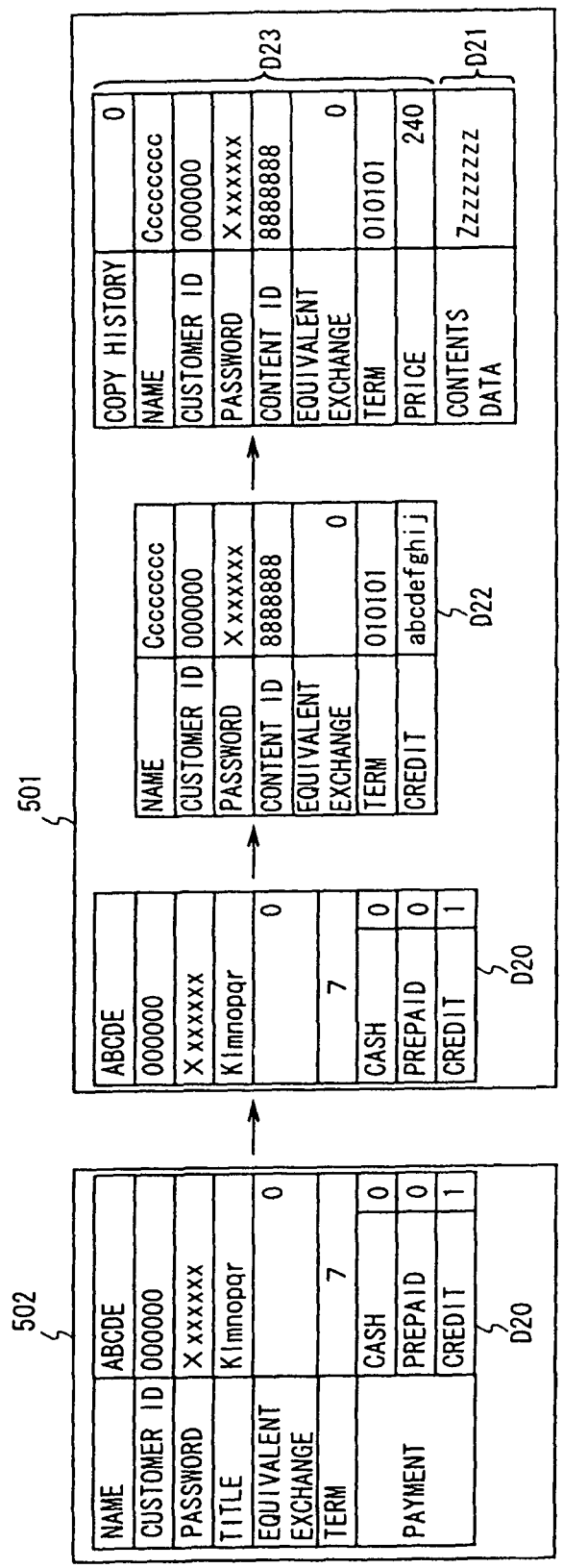
FIG. 39 is a schematic diagram for explaining the rental of content data.

Here, as shown in FIGS. 38 and 39, in the content specifying data D20 sent from the portable dedicated terminal 502, information such as customer's name, customer ID, password, the title of content data D21 that the customer wants to rent, equivalent exchange information representing whether or not equivalent exchange has been performed, rental term, method of payment for rental charge have been stored.

In this connection, the customer ID stored in the content specifying data D20 was issued when the customer was registered in the data providing server 501 and has been stored in the portable dedicated terminal 502 that the above customer is using. The customer ID is stored in various data sent from the above portable dedicated terminal 502 to identify the customer.

The equivalent exchange information stored in the content specifying data D20 shows for example, "0" when the customer's purpose is to obtain the content data D21 and the customer does not hope equivalent exchange. On the contrary, when the customer hoped equivalent exchange, the equivalent exchange information shows "1", for example.

The data providing server 501 identifies the above content specifying data D20 as data to obtain the content data D21 based on the equivalent exchange information stored in the content specifying data D20 by the received data judging part 516.

Then, by the received data judging part 516, the data providing server 501 searches the content database 511 for a data table based on the title of the content data D21 stored in the content specifying data D20, changes that title to a content ID, generates read-of-content control data D22, and sends this to a content ID extracting part 517.

In this connection, when the read-of-content control data D22 is generated from the content specifying data D20 by the received data judging part 516, by a customer's request search part 518, the data providing server 501 searches the customer database 510 based on the customer ID stored in the content specifying data D20 to detect the coded name of the customer stored therein as customer registration information by the customer's request search part 518. And if credit has been specified as the method of payment for rental charges, the data providing server 501 detects the account number of the customer. Then, the data providing server 501 stores the above detected customer's name and account number in the read-of-content control data D22 by the receiving data generating part 516.

The data providing server 501 extracts the content ID from the read-of-content control data D22 by the content ID extracting part 517, and transmits this to a content search part 519 with the read-of-content control data D22. The data providing server 501 searches the content database 511 to read the content data D21 specified by the customer by above content search part 519, and transmits the read content data D21 to a send data generating part 520 with the read-of-content control data D22.

The data providing server 501 adds copy history information to the read-of-content control data D22, generates header data D23, and adds the above generated header data D23 to the content data D21 by the send data generating part 520, and then sends this from a sending part 521 to the portable dedicated terminal 502 via the Internet 504. Thus, the customer can rent the content data D21 that he/she specified.

In this connection, the data providing server 501 has an accounting part not shown. When the customer specified payment for rental charges by credit, the data providing server 501 executes accounting by that accounting part before sending the specified content data D21 to the portable dedicated terminal 502 of the above customer. Therefore, the data providing server 501 generates accounting data based on the rental charge according to the term to rent the content data D21 (that is, charge amount to the customer), the account number of the customer in the customer registration information, and the account number of, for example, an agency following the data providing server 501.

As the result of that the data providing server 501 sent the account data generated by the accounting from the sending part 521 to a specified settlement processing server (not shown) via the Internet 504, if the data providing server 501 is notified of the completion of electronic settlement processing based on the account data by the above settlement processing server 104, the data providing server 501 adds information such as the title and the content ID of the content data D21 that the customer rented, the amount that the customer paid for that rental, to the customer registration information on the customer in the customer database 510, to update the customer registration information. Thereby, the data providing server 501 can grasp the information on the content data D21 that the customer rented, the state of payment for the above rental, or the like, by the customer registration information.

At this time, the data providing server 501 also notifies the send data generating part 520 of the notification received from the settlement processing server, and stores information on the amount that the customer paid for the rental of the content data D21 in the header data D23 instead of the account number by the above send data generating part 520. In this manner, if the customer completes payment of the rental charge, the data providing server 501 sends the content data D21 with the header data D23 added to the portable dedicated terminal 502. The portable dedicated terminal 502 is rented to the customer.

In this manner, in the data providing system 500, the content data D21 is rented to the customer from the data providing server 501 with the portable dedicated terminal 502. When the rental term of the above content data D21 is finished and the customer brings that portable dedicated terminal 502 into the agency, the rented content data D21 is deleted for return.

Furthermore, in this data providing system 500, if the portable dedicated terminal 502 is not brought into the agency although the rental term has passed, that content data D21 is deleted or made into the state not to be reproduced by the above portable dedicated terminal 502 for return.

By the way, if equivalent exchange request data that the customer hopes to equivalently exchange the content data that the customer owns by rental (single tune) for packaged media (single CD) is sent from the portable dedicated terminal 502, the data providing server 501 receives this by the receiving part 515 and takes this in the received data judging part 516.

Figure 40:
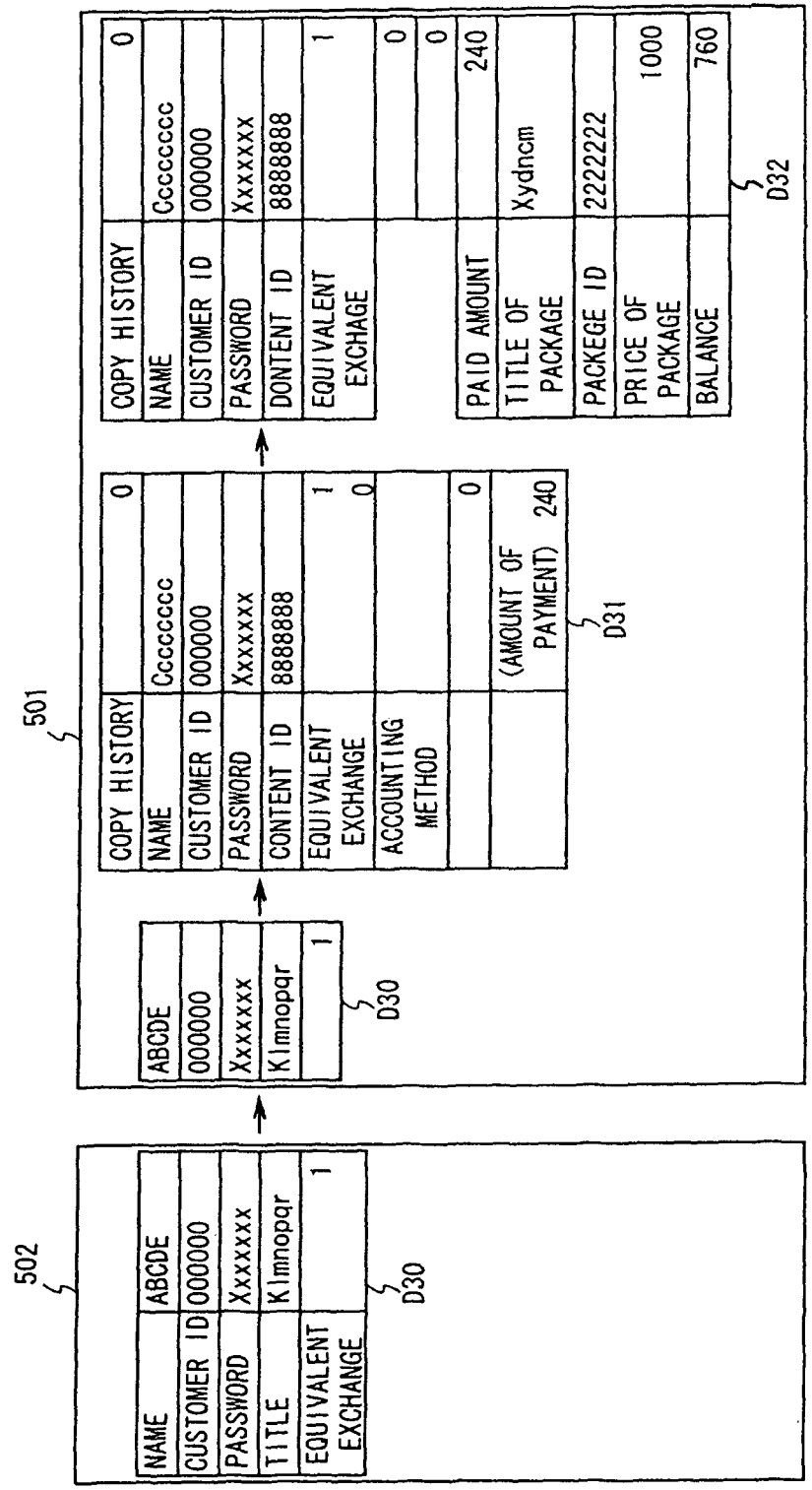
FIG. 40 is a schematic diagram for explaining the request of an equivalent exchange.

Now, as shown in FIGS. 38 and 40, in the equivalent exchange request data D30 sent from the portable dedicated terminal 502, equivalent exchange information representing the name of the customer, customer ID, password, the title of the content data D21 that the customer showed for equivalent exchange, and whether or not equivalent exchange was performed ("1" is shown) has been stored.

The data providing server 501 determines that the above equivalent exchange request data D30 is data to equivalently exchange the content data D21 for the packaged media, based on the equivalent exchange information stored in the equivalent exchange request data D30 by the received data judging part 516, and sends the above equivalent exchange request data D30 to a customer ID extracting part 525.

The data providing server 501 extracts the customer ID from the equivalent exchange request data D30 by the customer ID extracting part 525, and transmits this to a customer's update search part 518 with the above equivalent exchange request data D30.

Furthermore, the data providing server 501 searches in the customer database 510 based on the customer ID by the customer's update search part 518, and based on thus obtained customer registration information, detects the coded name of the customer, the content ID of the content data D21 shown for equivalent exchange, the payment method of the rental charge for the above content data D21, and whether or not the above rental charge was already paid, as well as whether the customer requesting the equivalent exchange did not do any illegality on the obtaining of the content data D21 in the past, and transmits the detected result to a judging part 526 with the equivalent exchange request data D30.

The data providing server 501 judges whether to permit the customer to perform the equivalent exchange, based on the detection result given from the customer's update search part 518 by the judging part 526.

Now, if the customer already paid the rental charge for the content data D21 for equivalent exchange and the customer especially did not do illegality in the past, the data providing server 501 permits the customer to perform the equivalent exchange and stores the data of the coded name of the customer, the content ID of the content data D21 shown for the equivalent exchange, the payment method of the rental charge, and the amount that the customer actually paid, detected by the customer's update search part 518, in the equivalent exchange request data D30, to generates equivalent exchange processing data D31 by the judging part 526, and transmits this to a value judging part 527.

The data providing server 501 searches a data table in the packaged media database 512 according to the search conditions previously set via a package search part 528, to detect packaged media (single CD) storing the same content data D21, as packaged media that the equivalent exchange of the content data D21 (single tune) that the customer owns and showed for equivalent exchange is possible for, and reads the title, the sale price and the package ID of the above detected packaged media by the value judging part 527.

Then, the data providing server 501 compares the rental charge that the customer paid for the content data D21 (that is, the obtaining price of the content data D21 which the customer owns) to the sale price of the found packaged media equivalently exchangeable to computes their balance by the value judging part 527. At this time, for instance, if the sale price of the packaged media is more expensive than the obtaining price of the content data, the conditions of equivalent exchange that the customer pays their balance are set to almost equalize the content data D21 that the customer owns with the packaged media in exchange value.

The data providing server 501 stores the title and the package ID of the packaged media equivalently exchangeable, and the conditions of the equivalent exchange (to almost equalize the content data that the customer owns with the packaged media in exchange value, on executing the equivalent exchange, the customer pays the balance between the obtaining price and the sale price) in the equivalent exchange request data D31, and generating equivalent exchange condition showing data D32, by the value judging part 527.

The data providing server 501 sends the equivalent exchange condition showing data D32 from the sending part 521 to the portable dedicated terminal 502 via the Internet 504 to notify the customer of the packaged media that the content data D21 can be equivalently exchanged for, and notify the customer of that when in equivalently exchanging the above content data D21 for the packaged media, the customer must pay the shown balance, as the conditions.

As a result, if exchange approval data representing that the customer approves the equivalent exchange is sent from the portable dedicated terminal 502, the data providing server 501 receives this by the receiving part 515, takes this in the received data judging part 516, and transmits this from the above received data judging part 516 to the judging part 526. The data providing server 501 confirms that the customer has approved the equivalent exchange based on the exchange acceptance data by the judging part 526.

Then, the data providing server 501 generates package delivery ordering information from the package ID of the packaged media for the equivalent exchange to be handed over the customer, the name of the customer, his/her address, etc., based on the customer registration information by the judging part 526, and transmits this to the send data generating part 520.

The data providing server 501 generates package delivery ordering data representing the package delivery ordering information by the send data generating part 520, and sends this from the sending part 521 to the package providing server 503 via the Internet 504 to order the above package providing server 503 to deliver the packaged media to the customer.

As a result, if delivery arrangement completion data representing that the arrangement of the delivery has completed is sent from the package providing server 503 via the Internet 504, the data providing server 501 receives this by the receiving part 515, and transmits this from the received data judging part 516 to the judging part 526.

At this time, as the payment method of the balance included in the exchange acceptance data, if the customer specified the payment by credit, the data providing server 501 performs accounting by the accounting part similarly to the aforementioned case, and then receives the notification of completion of electronic settlement from the settlement processing server.

The data providing server 501 transmits the equivalent exchange approval information representing the approval for the equivalent exchange and the delivery method of the packaged media by the judging part 526, and transmits this to the send data generating part 520. The data providing server 501 generates equivalent exchange approval data by the above send data generating part 520, and sends this from the sending part 521 to the portable dedicated terminal 502 via the Internet 504 to notify the customer that the equivalent exchange was approved.

If notifying the customer of the approval of the equivalent exchange, the data providing server 501 adds information such as the content ID of the content data D21 to be equivalently exchanged, the package ID of the packaged media, whether or not the customer paid the balance, and the balance (amount), to the customer registration information in the customer database 510, updating the customer registration information, and stors the history of the equivalent exchange, by the judging part 526 via the customer's update search part 518.

Figure 41:
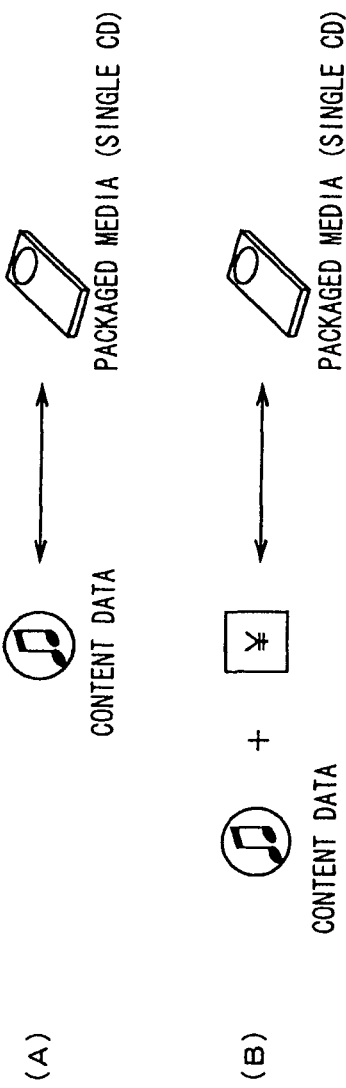
FIG. 41 is a conceptual view for explaining an equivalent exchange of the content data of a single tune for packaged media of a single CD.

In this manner, the content data D21 that the customer owned is deleted from the portable dedicated terminal 502 (or is made into not reproducible state) for return. And if the packaged media that the customer ordered the package providing server 503 its delivery is delivered to the customer, as shown in FIGS. 41(A) and 41(B), the data providing server 501 treats the packaged media storing the content data D21 that usually should be bought at the sale price as almost equivalent to the content data D21 that the customer owned, and exchanges the content data D21 for the packaged media.

In this connection, when the customer specified payment by cash for the balance between the obtaining price of the content data and the sale price of the packaged media that arose from the equivalent exchange, the customer uses the bank transfer. And when the customer specified payment by prepaid card, the customer uses a request terminal or the like.

When the data providing server 501 receives the equivalent exchange request data D30 from the portable dedicated terminal 502, if the customer has not paid the rental charge for the content data D21 shown for equivalent exchange, or if the customer did any illegality in the past, the data providing server 501 sends the send data generating part 520 equivalent exchange forbidding information representing the forbidding of the equivalent exchange so as not to forbid the customer the equivalent exchange, by the judging part 526.

The data providing server 501 generates equivalent exchange forbidding data representing that equivalent exchange forbidding information by the send data generating part 520, and sends this from the sending part 521 to the portable dedicated terminal 502 via the Internet 504 to notify the customer that the data providing server 501 cannot permit the equivalent exchange.

On the other hand, as shown in FIG. 38, if the customer enters specifying information on the content data to rent with an operating part 540, the portable dedicated terminal 502 identifies that the above specifying information as information to obtain content data for example, by the format of that specifying information, and adds equivalent exchange information showing "0" to that specifying information by an operational information judging part 541, and transmits this to a request data generating part 542.

The portable dedicated terminal 502 generates content specifying data D20 representing that specifying information and including the customer ID by the request data generating part 542, and sends this from a sending part 543 to the data providing server 501 via the Internet 504.

As a result, if the content data D21 with header data D23 added is sent from the data providing server 501, the portable dedicated terminal 502 receives this by a receiving part 544, and transmits this from a judging part 545 to a recording control part 546. The portable dedicated terminal 502 records that content data D21 and header data D23 on a storage medium 547 by the above recording control part 546. Thus, the customer rents the desired content data D21.

Thereafter, if the customer enters a reproduction command with the operating part 540, the portable dedicated terminal 502 reproduces the content data D21 from the storage medium 547 by a reproduction control part 548, and supplies the above reproduced content data D21 to a reproducing part 549 composed of a display control part, a display part, a speaker, etc, to let the customer enjoy the content such as the single tune.

In this connection, the portable dedicated terminal 502 manages the rental term of the content data D21 by detecting it from the header data D23 by the recording control part 545 and the reproduction control part 548. If the customer does not bring the portable dedicated terminal 502 into the agency although the rental term of the above content data D21 has finished, the portable dedicated terminal 502 deletes that content data D21 from the storage medium 547, or makes into a state where the content data D21 cannot be reproduced by the reproduction control part 548, for return.

Furthermore, if the customer enters an equivalent exchange request that specifies the content data D21 for equivalent exchange with the operating part 540, the portable dedicated terminal 502 identifies that the above equivalent exchange request as a request to equivalently exchange the content data D21 that the customer owns for packaged media by the format of that equivalent exchange request, and adds equivalent exchange information showing "1" to the above equivalent exchange request by the operational information judging part 541, and supplies this to the request data generating part 542.

In this case, the portable dedicated terminal 502 generates equivalent exchange request data D30 representing that equivalent exchange request and including the customer ID by the request data generating part 542, and sends this from the sending part 543 to the data providing server 501 via the Internet 504.

As a result, if equivalent exchange condition showing data D32 is sent from the data providing server 501 via the Internet 504, the portable dedicated terminal 502 receives this by the receiving part 544, and transmits this from the judging part 545 to the reproducing part 549 to notify the customer of the title of packaged media that the content data D21 can be equivalently exchanged for, and that the customer must pay the balance occurred by the equivalent exchange as the conditions of the equivalent exchange.

If the customer approves the equivalent exchange via the operating part 540, the portable dedicated terminal 502 adds equivalent exchange information representing "1" to that approval information and transmits them to the request data generating part 542 by the operational information judging part 541. The portable dedicated terminal 502 generates exchange approval data representing the above approval and the customer ID by the above request data generating part 542, and sends this from the sending part 543 to the data providing server 501 via the Internet 504.

If equivalent exchange approval data is sent from the data providing server 501 via the Internet 504, the portable dedicated terminal 502 receives this by the receiving part 544, and transmits this from the judging part 545 to the reproducing part 549 to notify the customer that the equivalent exchange was accepted, of the delivery method of the packaged media and so on.

In this connection, if equivalent exchange forbidding data is sent from the data providing server 501 via the Internet 504, the portable dedicated terminal 502 receives this by the receiving part 544, and transmits this from the judging part 545 to the reproducing part 549 to notify the customer that the equivalent exchange was not permitted.

If package delivery ordering data is sent from the data providing server 501 via the Internet 504, the package providing server 503 receives this by a receiving part 560, transmits this to a package ID extracting part 561, extracts the package ID from the package delivery ordering data by the above package ID extracting part 561, and supplies this to a package search part 562 with the above package delivery ordering data.

Then, the package providing server 503 searches a stock management database 563 based on the package ID to detect the stock of the packaged media specified by the data providing server 501 and the storage position on a package shelf not shown by the package search part 562, and transmits information on the above detected storage position to a package taking-out control part 564 with the package delivery ordering data.

After taking the specified packaged media out of the packaged media keeping shelf based on information on the storage position by the package taking-out control part 564, the package providing server 503 packs that extracted packaged media and instructs a delivery center, not shown, to deliver this to the address of the customer shown in the package delivery ordering data by a shipment/packing instructing part 565, and then, sends delivery arrangement completion data from a sending part 566 to the data providing server 501 via the Internet 504.

Figure 42:
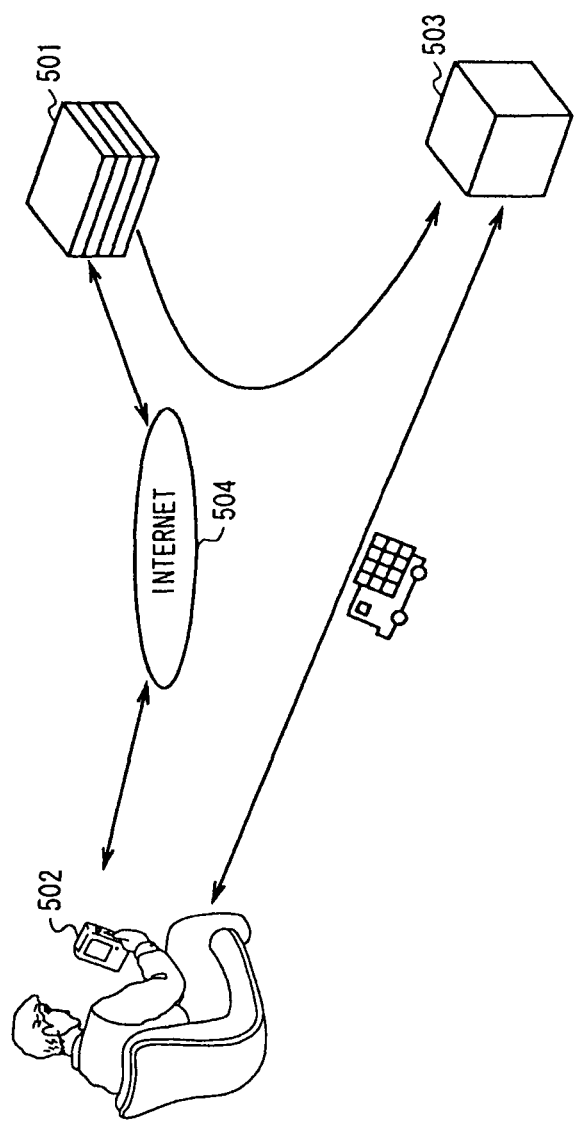
FIG. 42 is a conceptual view for explaining the delivery of packaged media for an equivalent exchange.

In this manner, as shown in FIG. 42, in the data providing system 500, if the equivalent exchange is approved between the customer and the data providing server 501, the package providing server 503 delivers the packaged media, which the content data is equivalently exchanged for, to the customer.

Figure 43:
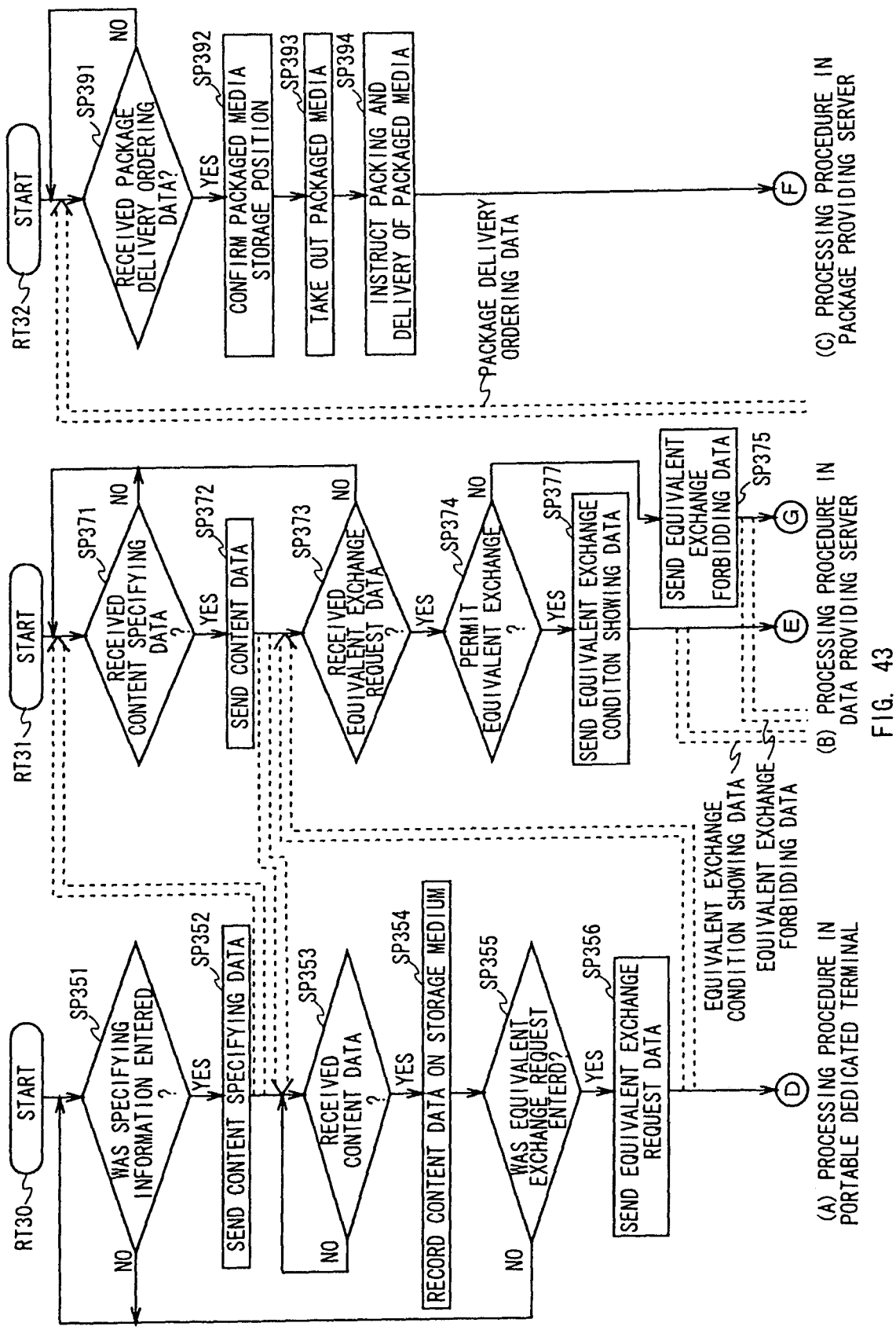
FIG. 43 is a flowchart showing an equivalent exchange processing procedure in the data providing system.
Figure 44:
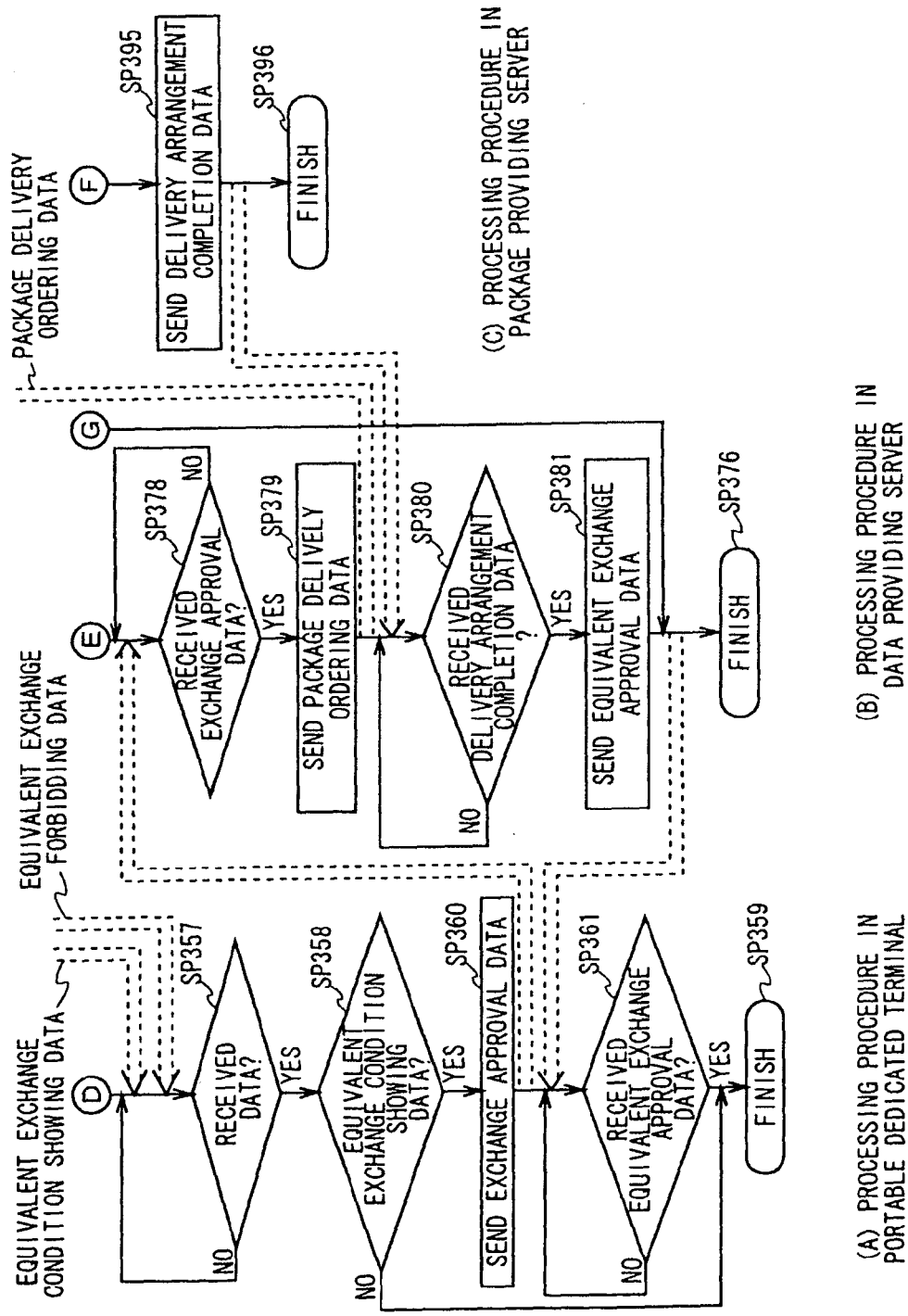
FIG. 44 is a flowchart showing the equivalent exchange processing procedure in the data providing system.

Here, an equivalent exchange processing procedure by the data providing server 501, the portable dedicated terminal 502 and the package providing server 503 in the data providing system 500 will be collectively described. As shown in FIGS. 43(A) and 44(A), first, the portable dedicated terminal 502 enters routine RT30 from the starting step, and proceeds to step SP351.

In step SP351, the portable dedicated terminal 502 waits for the customer to enter specifying information to rent the content data D21 with the operating part 540. When the above specifying information is entered, the portable dedicated terminal 502 proceeds to step SP352 to the generate content specifying data D20 by the request data generating part 542, and transmits this from the sending part 543 to the data providing server 501, and then proceeds to step SP353.

At this time, as shown in FIGS. 43(B) and 44(B), the data providing server 501 enters routine RT31 from the starting step, and proceeds to step SP371. In the above step SP371, the data providing server 501 waits for the content specifying data to be sent from the portable dedicated terminal 502. When the data providing server 501 receives the content specifying data from the receiving part 515, the data providing server 501 proceeds to step SP372.

In step SP372, the data providing server 501 reads the specified content data D21 from the content database 511 by the content search part 519, and sends this from the sending part 521 to the portable dedicated terminal 502, and then proceeds to step SP373.

Now, in step SP353, the portable dedicated terminal 502 waits for the content data D21 to be sent from the data providing server 501. When the portable dedicated terminal 502 receives the content data D21 by the receiving part 544, the portable dedicated terminal 502 proceeds to step SP354 to record that content data D21 on the storage medium 547 by the recording control part 546, and proceeds to step SP355.

Thereby, the portable dedicated terminal 501 rents the content data D21 specified by the customer, and reproduces the content data D21 in response to customer's request, so as to make the customer enjoy.

In step SP355, the portable dedicated terminal 502 waits for the customer to enter an equivalent exchange request with the operating part 540. Until the equivalent exchange request is entered, the portable dedicated terminal 502 returns to step SP351, and repeats the processing loop of the following steps SP352-SP353-SP354-SP355.

In step SP355, when the customer enters the equivalent exchange request with the operating part 540, the portable dedicated terminal 502 proceeds to step SP356 to generate the equivalent exchange request data D30 by the request data generating part 542, and sends this from the sending part 543 to the data providing server 501, and then proceeds to step SP357.

In step SP373, the data providing server 501 determines whether or not the equivalent exchange request data D30 was sent from the portable dedicated terminal 502. Until receiving the above equivalent exchange request data D30, the data providing server 501 returns to step SP371 and repeats the processing loop of the following steps SP372 and SP373. In step SP373, when the data providing server 501 receives the equivalent exchange request data D30 from the portable dedicated terminal 502 by the receiving part 515, the data providing server 501 proceeds to step SP374.

In step SP374, the data providing server 501 checks the customer's usage history based on the customer registration information on the customer who requested the equivalent exchange and judging whether to permit the equivalent exchange, by the judging part 526.

Obtaining a negative result in this step SP374 means that the rental charge of the content data D21 that the customer showed for equivalent exchange has not been paid yet or that the above customer might illegally use the equivalent exchange because he/she did any illegality in the past. At this time, the data providing server 501 proceeds to step SP375 to send the equivalent exchange forbidding information generated by the judging part 526 as equivalent exchange forbidding data, from the sending part 521 to the portable dedicated terminal 502 by the send data generating part 520. Then, the data providing server 501 proceeds to step SP376 to finish the above processing by the data providing server 501.

On the contrary, obtaining an affirmative result in step SP374 means that the customer will not illegally use the equivalent exchange because he/she already paid the rental charge for the content data D21 that the customer showed for equivalent exchange and he/she has not been done illegality in the past. At this time, the data providing server 501 proceeds to step SP377.

In step SP377, the data providing server 501 generates equivalent exchange condition showing data D32 representing the conditions to almost equalize the content data D21 that the customer owns with the packaged media equivalently exchangeable, in exchange value, by the value judging part 527, and sends this from the sending part 521 to the portable dedicated terminal 502, and then proceeds to step SP378.

At this time, in step SP375, the portable dedicated terminal 502 waits for the equivalent exchange condition showing data D32 or the equivalent exchange forbidding data to be sent from the data providing server 501. When the portable dedicated terminal 502 receives either data by the receiving part 544, the portable dedicated terminal 502 proceeds to step SP358.

In step SP358, the portable dedicated terminal 502 determines whether or not the data received by the receiving part 554 is the equivalent exchange condition showing data D32, by the judging part 545. When the above received data is equivalent exchange forbidding data, the portable dedicated terminal 502 makes a notice of what the equivalent exchange was not permitted, via the reproducing part 549 and then it proceeds to step SP359 to finish the processing by the above data providing server 501.

In step SP358, when the received data is the equivalent exchange condition showing data D32, the portable dedicated terminal 502 makes a notice of the permission of the equivalent exchange and the conditions of the equivalent exchange, via the reproducing part 549, and then it proceeds to step SP360 to send exchange approval data from the sending part 543 to the data providing server 501 according to the operations of the operating part 540 by the customer, and proceeds to step SP361.

In step SP378, the data providing server 501 waits for the exchange approval data to be sent from the portable dedicated terminal 502. When the data providing server 501 receives the above exchange approval data by the receiving part 515, the data providing server 501 proceeds to step SP379 to generate package delivery ordering data to deliver the packaged media to the customer by the judging part 526, and sends this from the sending part 521 to the package providing server 503, and then proceeds to step SP380.

At this time, as shown in FIGS. 43(C) and 44(C), the package providing server 503 enters routine RT32 from the starting step, and proceeds to step SP391. In the above step SP391, the package providing server 503 waits for the package delivery ordering data to be sent from the data providing server 501. When the package providing server 503 receives the package delivery ordering data by the receiving part 560, the package providing server 503 proceeds to step SP392.

In step SP392, the package providing server 503 confirms the storage position of the specified packaged media on the package storage shelf based on the package delivery ordering data by the package search part 562, and proceeds to step SP393 to take the specified packaged media out of the package storage shelf by the package taking-out control part 564, and then proceeds to step SP394.

In step SP394, the package providing server 503 instructs the delivery center to pack and deliver the packaged media to the customer by the shipment/packing instructing part 565, and proceeds to step SP395 to send delivery arrangement completion data from the sending part 566 to the data providing server 501. Then, the package providing server 503 proceeds to step SP396 to finish the above processing by the package providing server 503.

At this time, in step SP380, the data providing server 501 waits for the delivery arrangement completion data to be sent from the package providing server 503. When the data providing server 501 receives the delivery arrangement completion data by the receiving part 515, the data providing server 501 proceeds to step SP381 to generate equivalent exchange approval data by the judging part 526 and send this from the sending part 521 to the portable dedicated terminal 502. Then, the data providing server 501 proceeds to step SP376 to finish the above processing by the data providing server 501.

On the other hand, in step SP361, the portable dedicated terminal 502 waits for the equivalent exchange approval data to be sent from the data providing server 501. When the portable dedicated terminal 502 receives the equivalent exchange approval data by the receiving part 544, the portable dedicated terminal 502 notifies the customer that the equivalent exchange was approved via the reproducing part 549. Then, the portable dedicated terminal 502 proceeds to step SP359 to finish the above processing by the portable dedicated terminal 502. Thus, all the equivalent exchange processing procedures in the data providing system 500 is finished.

According to the above configuration, in this data providing system 500, when content specifying data that requests the rental of content data D21 is sent from the portable dedicated terminal 502, the data providing server 501 sends the specified content data D21 to the portable dedicated terminal 502 responding to this for recording. In this manner, the content data D21 is rented to the customer with the above portable dedicated terminal 502.

In this data providing system 500, if equivalent exchange request data D30 for the content data D21 (single tune) that the customer owns by rental is sent from the portable dedicated terminal 502, the data providing server 501 detects packaged media (single CD) storing the same content data D21 that can be equivalently exchanged for the content data D21 by the above data providing server 501, and almost equalizes the above detected packaged media with the content data D21 that the customer owns in exchange value, to compute the balance between the obtaining price of the content data that the customer owns and the sale price of the packaged media.

In this manner, in the data providing system 500, the data providing server 501 sends equivalent exchange condition showing data D32 to the portable dedicated terminal 502 to show the title of the packaged media that the content data D21 shown by the customer can be equivalently exchanged for, and the balance that the customer should pay for the above equivalent exchange as the conditions of the equivalent exchange.

As a result, in the data providing system 500, if equivalent exchange approval data that approves the equivalent exchange is sent from the portable dedicated terminal 502, the data providing server 501 makes the customer pay the balance occurred by the equivalent exchange, and deletes the content data D21 that the customer owned from the portable dedicated terminal 502 for return, and delivers the packaged media to the above customer. Thus, the content data D21 that the customer owns and the packaged media storing the content data D21 are almost equalized in exchange value, and the content data D21 is exchanged for that packaged media.

Accordingly, in this data providing system 500, when the customer who rented the content data D21 with the portable dedicated terminal 502 wants to enjoy that content data D21 by reproducing with another device, or when the customer became anxious about the safekeeping of the content data D21 by the portable dedicated terminal 502 and wanted the safekeeping by packaged media, the above content data D21 and the packaged media are almost equalized in exchange value, and the content data D21 can be provided to the customer at a minimum investment by exchanging the content data D21 for the packaged media.

As a result, in this data providing system 500, the customer can remarkably easily obtain the content data D21 distributed via the Internet.

In this data providing system 500, such equivalent exchange between the content data D21 and the packaged media is executed. Thus, the customer can remarkably easily use that system.

Furthermore, in this data providing system 500, only the customer who uses the portable dedicated terminal 502 only accessible to the data providing server 501 can use the equivalent exchange. Thereby, it can be almost prevented that the above customer illegally uses the equivalent exchange with content data that was obtained from a server other than the data providing server 501 at a different price from the offer price by the data providing server 501, or that the customer illegally uses the equivalent exchange with content data that was downloaded from packaged media.

According to the above configuration, the data providing server 501 sends the content data D21 that was specified according to the rental request from the portable dedicated terminal 502 that the customer uses to the portable dedicated terminal 502 for recording and rental. Then, if exchange of the rented content data D21 for packaged media is requested from the portable dedicated terminal 502, the data providing server 501 detects packaged media that the above content data D21 can be exchanged for, and shows the conditions to almost equalize the packaged media and the content data D21 that the customer owns in exchange value. Thereby, even if the customer obtained the content data D21 by distribution, the customer can exchange the content data D21 for the packaged media by a minimum investment. Thereby, the customer can remarkably easily obtain the content data D21 distributed via the Internet 504. Thus, a data providing system that can popularize the distribution of content data can be accomplished.

Note that, in the aforementioned seventh embodiment, the content data D21 that the customer rented is equivalently exchanged for packaged media from the data providing server 501. This invention, however, is not limited to this and content data that the customer bought may be equivalently exchanged for packaged media from the data providing server 501.

In this connection, in the aforementioned seventh embodiment, since the rented content data D21 is equivalently exchanged for the packaged media, the above content data D21 is deleted for return when the rental term passed. However, when content data that the customer bought is equivalently exchanged for packaged media storing the same content data, the above customer does not illegally own different content data. Therefore, the content data equivalently exchanged for the packaged media may be deleted, or the customer may hold that as it is.

In the aforementioned seventh embodiment, the packaged media, which the content data D21 owned by the customer is to be equivalently exchanged for, is delivered to the customer by the package providing server 503. This invention, however, is not limited to this and the packaged media, which the content data D21 owned by the customer is to be equivalently exchanged for, may be directly handed to the customer at the agency when the customer returns the content data D21.

Furthermore, in the aforementioned seventh embodiment, the content data D21 being a single tune that the customer owns is equivalently exchanged for the packaged media being a single CD. This invention, however, is not limited to this and the content data D21 being a single tune that the customer owns may be equivalently exchanged for packaged media being an album CD.

In the aforementioned seventh embodiment, the content data and the packaged media to be equivalently exchanged are both music data (a single tune and a single CD). This invention, however, is not limited to this and, as content data and packaged media to be equivalently exchanged, other various content such as movie, book, etc., can be adopted. Thereby, the convenience and the versatility of a data providing system can be remarkably improved, and the distribution of content data can be further popularized.

Further, in the aforementioned seventh embodiment, the portable dedicated terminal 502 notifies the data providing server 501 of the title as identification information on the content data D21 to be equivalently exchanged, and the data providing server 501 notifies the portable dedicated terminal 502 of the title as identification information on the packaged media which the content data 21 is equivalently exchangeable for. This invention is not limited to this and the portable dedicated terminal 502 may notify the data providing server 501 of the content ID as identification information on the content data D21 to be equivalently exchanged and the data providing server 501 may notify the portable dedicated terminal 502 of the package ID as identification information on packaged media which the content data D21 is equivalently exchangeable for.

In the aforementioned seventh embodiment, the customer pays the balance by money to almost equalize the content data D21 that the customer owns with the packaged media in exchange value, by the equivalent exchange. This invention, however, is not limited to this and the data providing server 501 may issue points to give a privilege such as a discount to the customer according to the rental and the purchase of the content data D21, and the customer may accumulate and use the points for the payment of the balance to almost equalize the content data D21 that the customer owns with the packaged media in exchange value, by the equivalent exchange, instead of a part of or all of the money.

In the aforementioned seventh embodiment, the customer rents the content data D21 from the data providing server 501 with the portable dedicated terminal 502 accessible only to the above data providing server 501, and equivalently exchanges the renting content data D21 for packaged media. This invention, however, is not limited to this and, the customer may buy or rent content data from the data providing server 501 with other various kinds of devices and then may equivalently exchange content data that the customer bought or rented for packaged media, provided that the devices are devices connectable to the Internet 504 such as a personal computer and a portable telephone.

In this connection, in the case of using the data providing server 501 with another device different from the portable dedicated terminal 502, like a personal computer, a portable telephone, etc., server identifying information to identify the data providing server 501 being the provider of content data is added to the content data that will be bought or rented from the data providing server 501 with the above device. If equivalent exchange is requested, when the data providing server 501 judges whether to permit the equivalent exchange to the customer, the data providing server 501 determines whether the content data shown for equivalent exchange was provided from the data providing server 501 by the server identifying information. If the customer shows content data that was obtained from another data providing server for equivalent exchange, the data providing server 501 forbids the equivalent exchange, which can prevent that the data providing server 501 suffers losses by performing the equivalent exchange of the content data provided by the other data providing server.

Furthermore, when the customer equivalently exchanges content data rented with a device different from the portable dedicated terminal 502 for packaged media, the data providing server 501 deletes the content data to be equivalently exchanged that has been recorded in the device, at the time of receiving exchange approval data from the above device, and on the confirmation of that, approves the equivalent exchange of the above content data for the packaged media. Thereby, it can be prevented that the customer illegally performs equivalent exchange by using again the content data for rental that was equivalently exchanged once by the device different from the portable dedicated terminal 502.

(9) Eighth Embodiment

Figure 45:
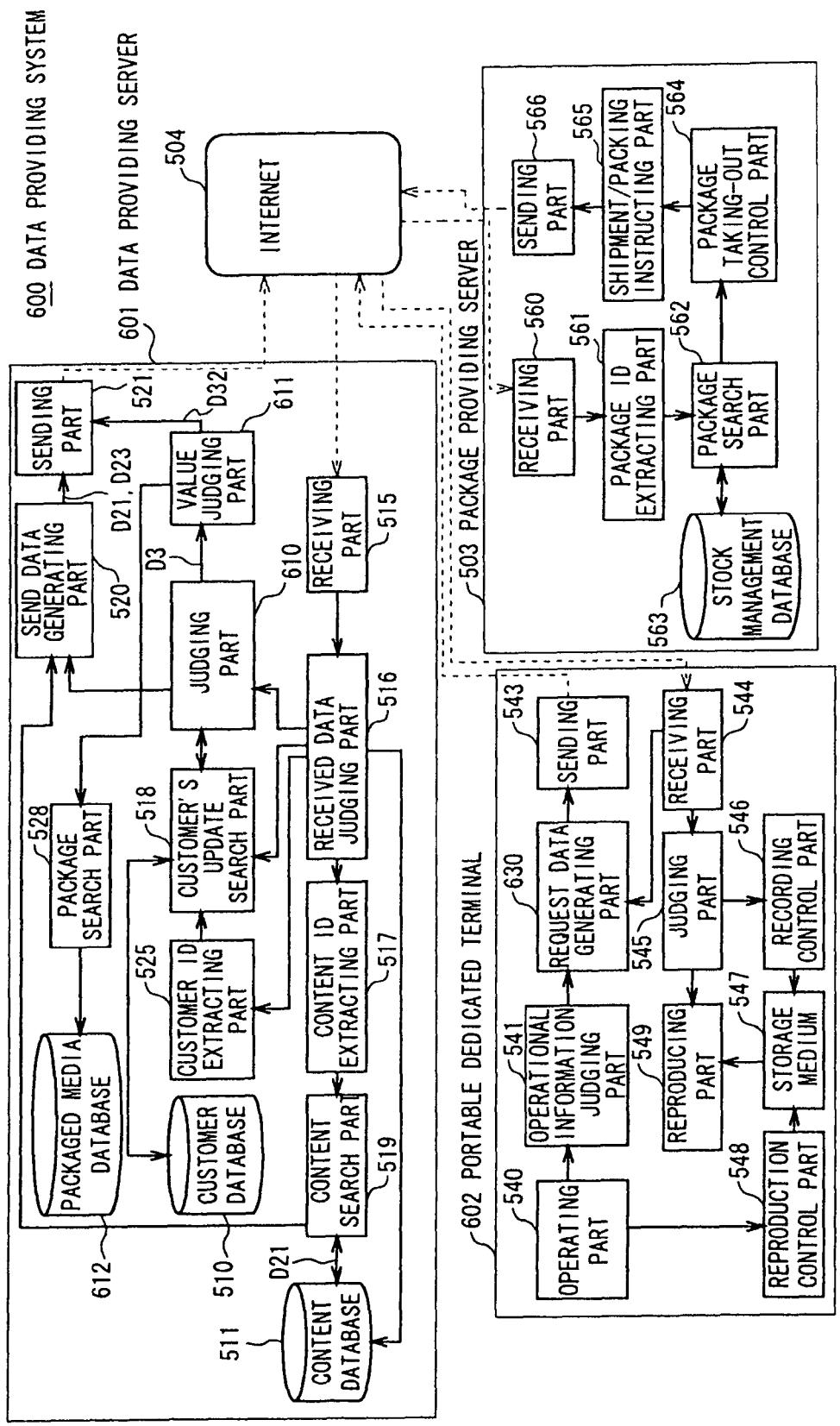
FIG. 45 is a block diagram showing the construction of a data providing system according to an eighth embodiment.

FIG. 45 in which the same reference numerals are added to corresponding parts in FIG. 38 shows a data providing system 600 according to an eighth embodiment. The data providing system 600 is constructed similarly to the aforementioned data providing system 500 according to the seventh embodiment, except for the constructions of the data providing server 601 and the portable dedicated terminal 602 accessible only to the above data providing server 601.

In this case, when the data providing server 601 receives content specifying data from the portable dedicated terminal 602 by the receiving part 515, the data providing server 601 performs processing similarly to the data providing server 501 according to the seventh embodiment described above with reference to FIGS. 38 and 39, and sends content data D21 with header data D23 added from the sending part 521 to the portable dedicated terminal 602 via the Internet 504. Thus, the specified content data D21 is rented to the customer.

In this connection, when the rental term of the content data D21 expired, if the customer brings the portable dedicated terminal 602 into an agency, the rented content data D21 is deleted for return. If the customer does not bring the portable dedicated terminal 602 into the agency although the above rental term expired, that content data D21 is deleted or made not to be reproducible from the portable dedicated terminal 602 for return.

By the way, in the data providing server 601, the customer can equivalently exchange one or plural content data D21 being a single tune, owned by the customer, for packaged media being a single CD or an album CD.

Specifically, if the customer sends equivalent exchange request data to request the equivalently exchange of, for example, a plurality of content data D21 (single tune) owned by rental for packaged media (album CD) from the portable dedicated terminal 602, the data providing server 601 receives this by the receiving part 515, and takes this in the received data judging part 516.

Figure 46:
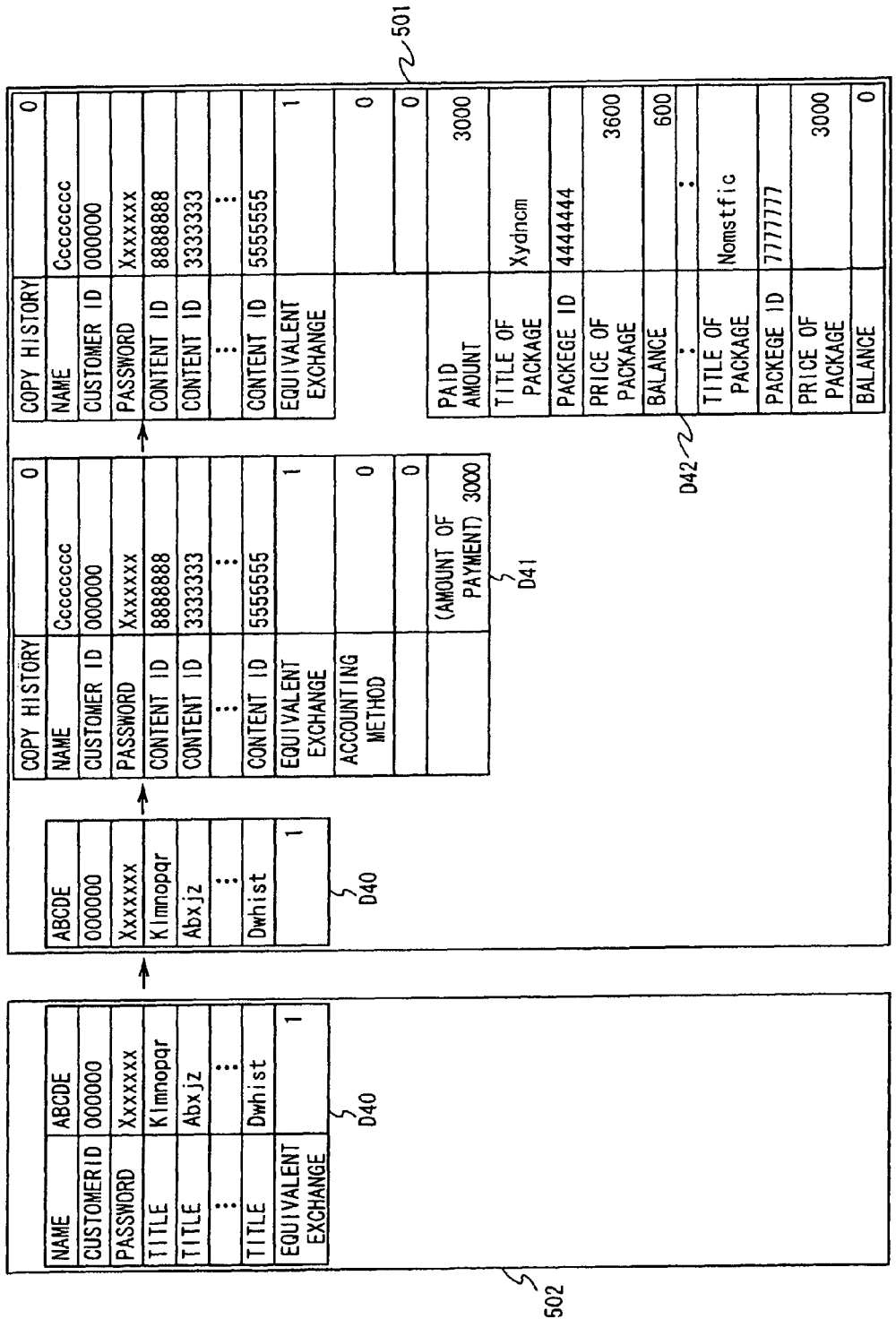
FIG. 46 is a schematic diagram for explaining the request for an equivalent exchange.

Now, as shown in FIGS. 45 and 46, in the equivalent exchange request data D40 sent from the portable dedicated terminal 602, equivalent exchange information representing customer's name, customer ID, password, the titles of the plural content data D21 that the customer showed for equivalent exchange, and whether or not equivalent exchange was performed ("1" is shown as contents) has been stored.

The data providing server 601 transmits the equivalent exchange request data D40 to a judging part 610 sequentially via the customer ID extracting part 525 and the customer's update search part 518 by the received data judging part 516.

The data providing server 601 judges whether to permit the customer the equivalent exchange similarly to the case described above with reference to FIGS. 38 and 40 by the judging part 610. When the data providing server 601 permitted the above customer the equivalent exchange, the data providing server 601 stores information about coded customer's name, the content ID of the content data D21 that the customer showed for equivalent exchange, the payment method of rental charge, and the amount that the customer actually paid in the equivalent exchange request data D40, and generates equivalent exchange processing data D41, and transmits this to a value judging part 611.

Now, as shown in FIGS. 47(A) to 47(C), a packaged media database 612 provided in the data providing server 601 previously stores a content data table 620 for content data D21, a single data table 621 for packaged media for packaged media being a single CD, and an album data table 622 for packaged media being an album CD.

In this case, the content data table 620 is formed by making correspondence between the title of the content data D21 that the data providing server 601 sells or rents and the content ID, as well as making correspondence for example, among points which are allocated according to the ranking of the year (hereinafter, this is referred to as ranking points) in such a manner that if the content data D21 is a tune that got the first rank in the ranking of the year, since there are comparatively many transmission requests, 10 points are allocated to that, and if the content data D21 is a tune at the lowest rank, since there are comparatively few transmission requests, 1 point is allocated, points which are allocated according to released date (hereinafter, this is referred to as date points) in such a way that if the content data D21 was released at first recently, since there are comparatively many transmission requests, 10 points are allocated, and if the content data D21 is a tune quite old, since there are comparatively few transmission requests, 1 point is allocated, total points obtained by totaling up these ranking points and date points, and the content data D21, with the ranking points, date points and total points as market value.

The single data table 621 is formed by making correspondence among the title of packaged media being a single CD, package ID, market value composed of ranking points and date points, and sale price. And the album data table 621 is formed by making correspondence among the title of packaged media being an album CD, package ID, market value composed of ranking points and date points, and sale price.

The data providing server 601 searches the content database 620 in the packaged media database 612 according to search conditions previously set via the package search part 528, to read out and add all of the total points respectively allocated to the plural content data D21 (single tunes) that the customer showed for equivalent exchange, and to compute the total points of these plural content data D21 (hereinafter, this is referred to as total points) by the value judging part 611.

The data providing server 601 searches the album database 622 in the packaged media database 612 based on the total points computed by the value judging part 611 via the package search part 528, to detect one or plural packaged media being an album CD having the same total points as the above total points, for equivalently exchanged, and reads the title, the package ID and the sale price of the above detected packaged media.

In this manner, if the data providing server 601 detects one or plural packaged media that the customer can equivalently exchange the plural content data D21 shown by the customer for, the data providing server 601 compares the sale price of the above packaged media with the rental charges that the customer paid for all of these plural content data D21 that the customer paid, and computes the balance, in order to almost equalize the above detected packaged media with the plural content data D21 that the customer showed by the value judging part 611, in exchange value.

Then, the data providing server 601 generates equivalent exchange condition showing data D42 by storing the title and the package ID of the one or plural packaged media exchangeable, the conditions of equivalent exchange set indicating that a customer pays a balance to almost equalize content data owned by the customer with packaged media in exchange value for equivalent exchange, the data providing server 601 pays a balance to a customer, or equivalent exchange is carried out even a balance is not paid because the sale price and rental price are the same.

Figure 48:
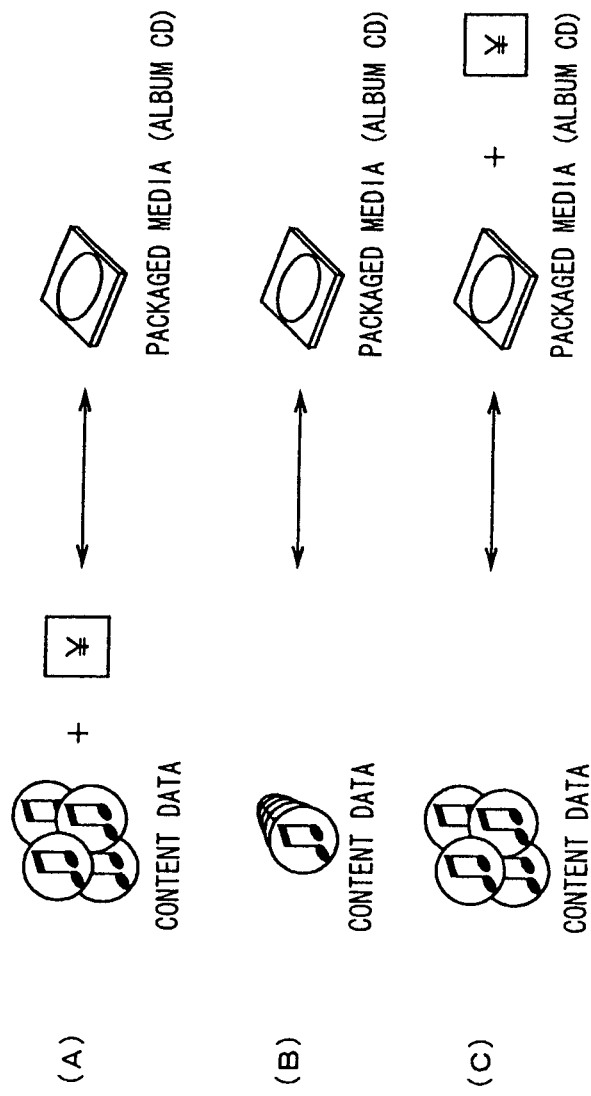
FIG. 48 is a conceptual view for explaining an equivalent exchange of a plurality of content data for packaged media of an album CD.

Then, the data providing server 601 sends the equivalent exchange condition showing data D42 from the sending part 521 to the portable dedicated terminal 602 via the Internet 504, to notify the customer of, as shown in FIGS. 48(A) to 48(C), one or plural packaged media that the customer can equivalently exchange the plural content data D21 for, as well as the conditions of equivalent exchange of the above content data D21 for the packaged media.

As a result, if the customer sends exchange approval data representing the approval of the equivalent exchange and when there are plural proposed packaged media equivalently exchangeable, packaged media that the customer selected from among these packaged media from the portable dedicated terminal 602, the data providing server 601 receives this by the receiving part 515, and transmits this from the received data judging part 516 to the judging part 610. The data providing server 601 confirms that the customer approved the equivalent exchange based on the exchange approval data as well as the packaged media selected for the equivalent exchange by the above judging part 610.

Then, the data providing server 601 generates package delivery ordering information with the package ID of the packaged media that the customer selected for equivalent exchange by the judging part 610, and transmits this to the send data generating part 520, generates package delivery ordering data by the above send data generating part 520, and transmits this from the sending part 521 to the package providing server 503 via the Internet 504.

Thereafter, the data providing server 601 performs processing similarly to the data providing server 501 according to the seventh embodiment described above with reference to FIG. 38, so as to equivalently exchange the plural content data D21 that the customer owns for one packaged media being an album CD by equalizing them in exchange value.

On the other hand, in the portable dedicated terminal 602 shown in FIG. 45, if the customer enters specifying information on content data that the customer wants to rent with the operating part 540, the portable dedicated terminal 602 executes the similar processing to the portable dedicated terminal 502 according to the seventh embodiment described above with reference to FIG. 38, and the content data D21 is rented to the customer from the data providing server 601.

Furthermore, if the customer enters an equivalent exchange request that specifies plural content data D21 for equivalent exchange, with the operating part 540, the portable dedicated terminal 602 generates the equivalent exchange request data D40 described above with reference to FIG. 46 by a request data generating part 630, and sends this from the sending part 543 to the data providing server 601 via the Internet 504.

As a result, when equivalent exchange condition showing data D42 is sent from the data providing server 601 via the Internet 504, the portable dedicated terminal 602 receives this by the receiving part 544, and transmits this from the judging part 545 to the reproducing part 549, to notify the customer of the title of one or plural packaged media that the content data D21 can be equivalently exchanged for, and the conditions to execute the equivalent exchange for each of these packaged media (payment or taking of balance, or no occurrence of balance).

If the customer sends the approval of the equivalent exchange and information showing the packaged media that the customer selected for the equivalent exchange from among the plural packaged media, with the operating part 540, the portable dedicated terminal 602 generates exchange approval data representing the above approval and selected packaged media by the request data generating part 630, and sends this from the sending part 543 to the data providing server 601 via the Internet 504.

Thereafter, when equivalent exchange approval data is sent from the data providing server 601 via the Internet 504, the portable dedicated terminal 602 receives this by the receiving part 544, and transmits this from the judging part 545 to the reproducing part 549 to notify the customer of the approval of the equivalent exchange, the delivery method of the packaged media and the like.

In this connection, if equivalent exchange forbidding data is sent from the data providing server 601 via the Internet 504, the portable dedicated terminal 602 receives this by the receiving part 544 and transmits this from the judging part 545 to the reproducing part 549, to notify the customer that the equivalent exchange was not permitted.

Figure 49:
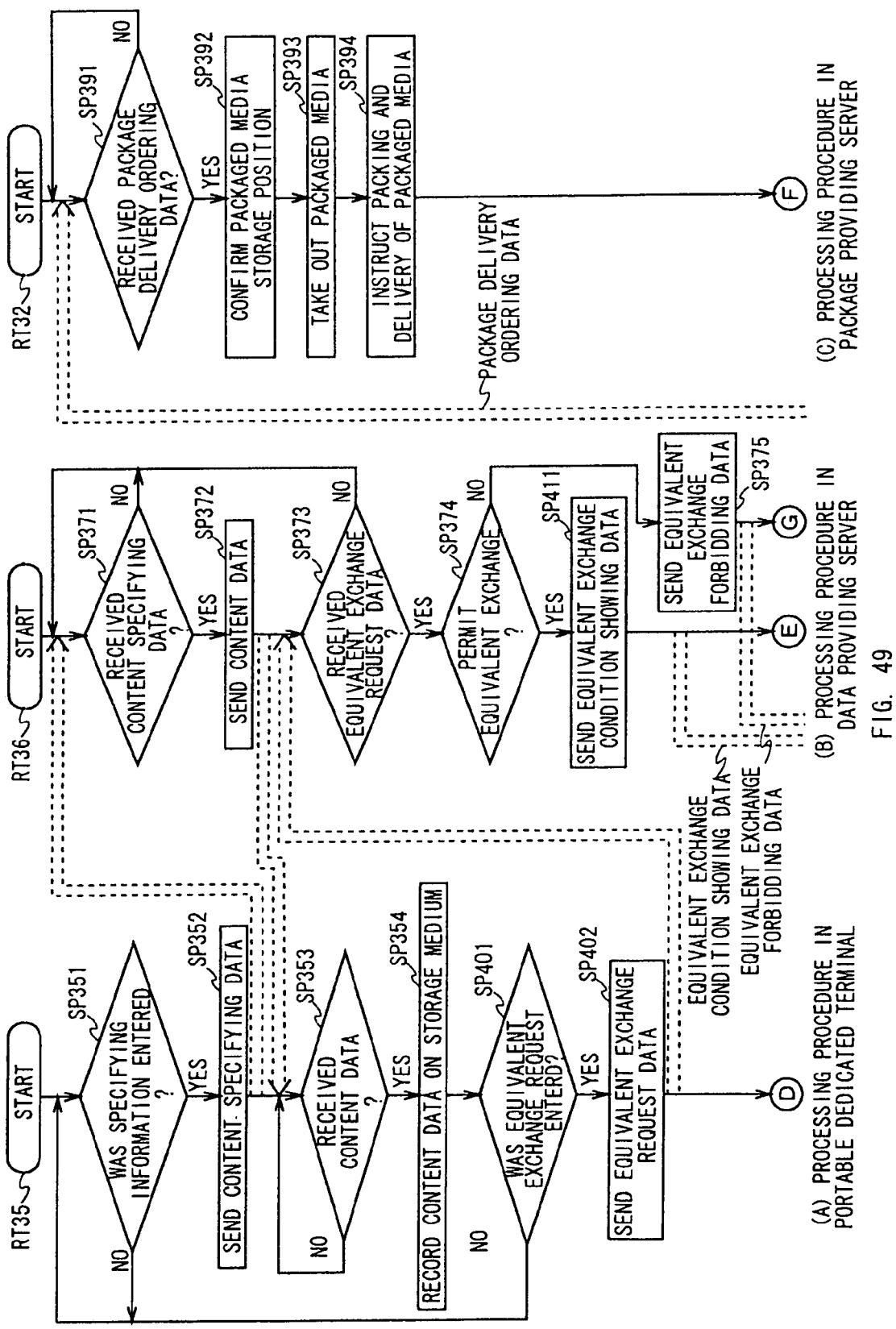
FIG. 49 is a flowchart showing an equivalent exchange processing procedure in the data providing system.
Figure 50:
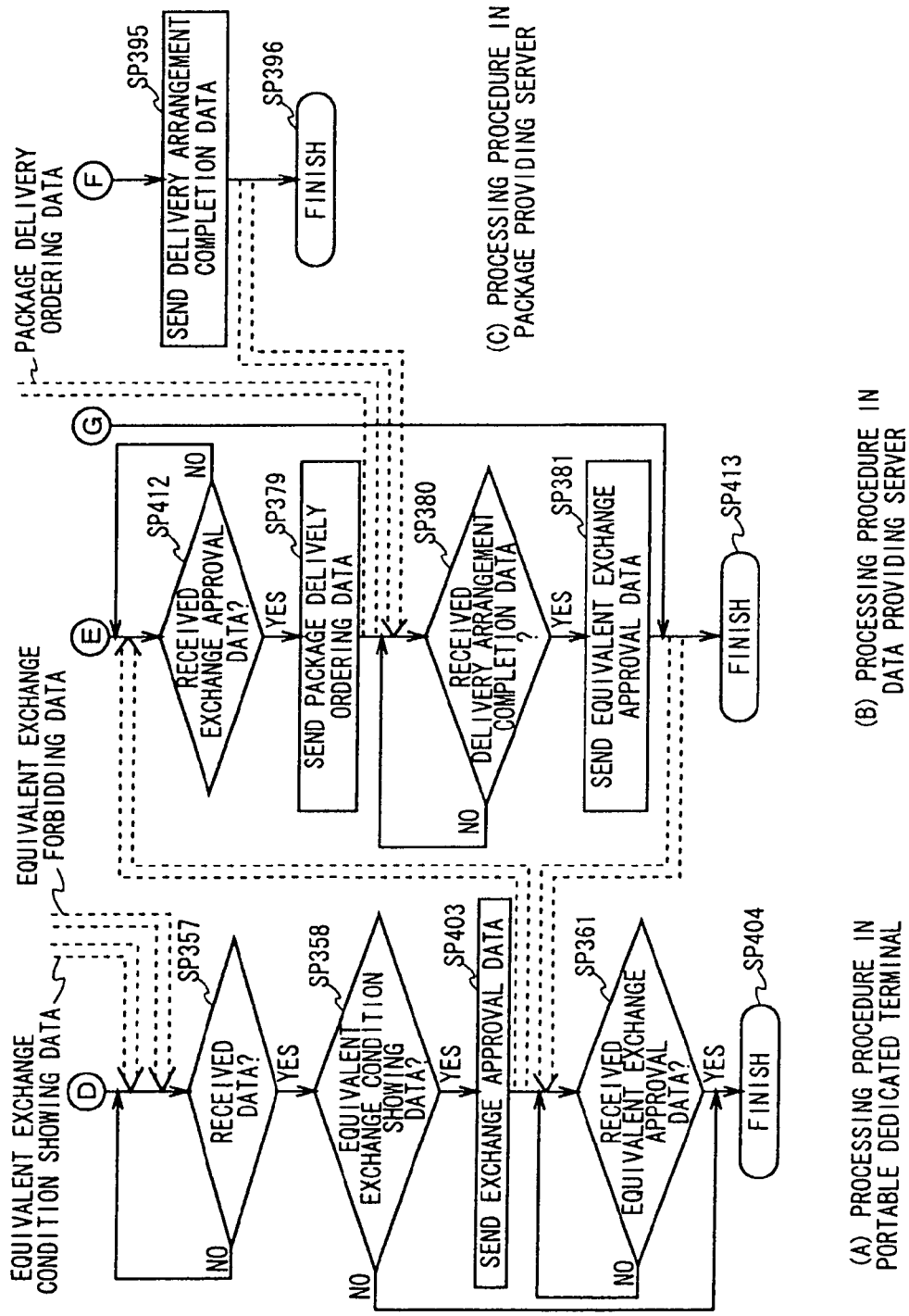
FIG. 50 is a flowchart showing the equivalent exchange processing procedure in the data providing system.

Now, an equivalent exchanging processing procedure by the data providing server 601, the portable dedicated terminal 602 and the package providing server 503 in the data providing system 600 will be collectively described. As shown in FIGS. 49(A) and 50(A) in that the same reference numerals are added to corresponding part in FIGS. 43(A) and 44(A), first, the portable dedicated terminal 602 enters routine RT35 from the starting step, proceeds to step SP351 and sequentially executes the processing of the above step SP351 to step SP354, and proceeds to step SP401.

In step SP401, the portable dedicated terminal 602 waits for the customer to enter an equivalent exchange request specifying plural content data D21 for equivalent exchange with the operating part 540. Until the above equivalent exchange request is entered, the portable dedicated terminal 602 returns to step SP351 and repeats the processing loop of the following steps SP352-SP353-SP354-SP401.

In step SP401, when the equivalent exchange request is entered via the operating part 540, the portable dedicated terminal 602 proceeds to step SP402 to generate equivalent exchange request data D40 by the request data generating part 630 and transmit this from the sending part 543 to the data providing server 601, and then proceeds to step SP357.

On the other hand, as shown in FIGS. 49(B) and 50(B) in that the same reference numerals are added to corresponding parts in FIGS. 43(B) and 44(B), the data providing server 601 enters routine RT36 from the starting step, proceeds to step SP371, and sequentially executes the processing of the above steps SP371 to SP375. In step SP374, when the data providing server 601 permits the customer the equivalent exchange, the data providing server 601 proceeds to step SP411.

In step SP411, the data providing server 601 detects one or plural packaged media having the same total points as the plural content data D21 that the customer owns, generates equivalent exchange condition showing data D42 representing the conditions to almost equalize the above detected packaged media with plural content data D21 in exchange value, by the value judging part 611, and transmits this from the sending part 521 to the portable dedicated terminal 602, and then proceeds to step SP412.

At this time, in step SP375, the portable dedicated terminal 602 waits for equivalent exchange condition showing data D32 or equivalent exchange forbidding data to be sent from the data providing server 601. When the portable dedicated terminal 602 receives either data by the receiving part 544, the portable dedicated terminal 602 proceeds to step SP358. If the above received data is the equivalent exchange condition showing data D42, the portable dedicated terminal 602 proceeds to step SP403.

In step SP403, the portable dedicated terminal 602 generates exchange approval data representing the approval of the equivalent exchange and packaged media that the customer selected for the equivalent exchange from among the plural packaged media according to the operations of the operating part 540 by the customer by the request data generating part 630, transmits the above generated exchange approval data from the sending part 543 to the data providing server 601, and proceeds to step SP361. Thereafter, when the portable dedicated terminal 602 receives equivalent exchange approval data by the receiving part 544, the portable dedicated terminal 602 proceeds to step SP404 to finish the above processing by the portable dedicated terminal 602.

Furthermore, in step SP412, the data providing server 601 waits for the exchange approval data to be sent from the portable dedicated terminal 602. When the data providing server 601 receiving the above exchange approval data by the receiving part 515, the data providing server 601 sequentially executes the processing of the following steps SP379 to SP381, and then proceeds to step SP413 to finish the above processing by the data providing server 601. Thus, all the equivalent exchange processing procedure by the data providing system 600 is finished.

According to the above configuration, in this data providing system 600, if content specifying data to request the rental of the content data D21 is sent from the portable dedicated terminal 602 to the data providing server 601, the data providing server 601 sends the specified content data D21 to the portable dedicated terminal 602 to record it therein accordingly. Thus, the customer can rent the content data D21 with the portable dedicated terminal 602.

Then, in this data providing system 600, if equivalent exchange request data D40 to request the equivalent exchange of the plural content data D21 (single tunes) that the customer owns by rental for one packaged media (album CD) is sent from the portable dedicated terminal 602 to the data providing server 601, the above data providing server 601 detects the total points of these plural content data D21, detects the packaged media (album CD) having the same total points as the above detected total points as a package media equivalently exchangeable, and sends equivalent exchange condition showing data D42 showing the conditions to almost equalize the above detected packaged media with the plural content data D21 that the customer owns, in exchange value, to the portable dedicated terminal 602.

As a result, in the data providing system 600, if equivalent exchange approval data showing the approval of the equivalent exchange and packaged media that the customer selected for equivalent exchange is sent from the portable dedicated terminal 602 to the data providing server 601, the balance in the equivalent exchange is settled, the plural content data D21 that the customer owned are deleted from the portable dedicated terminal 602 for return, and the packaged media is delivered to the above customer. In this manner, the content data D21 that the customer owns and the packaged media being an album CD are almost equalized in exchange value, and the content data D21 is exchanged for that packaged media.

Accordingly, in this data providing system 600, when the data server 601 searches for packaged media equivalently exchangeable, it matches the total points of the plural content data D21 with the total points of the packaged media. Therefore, the plural content data D21 that the customer owns can be equivalently exchanged for the packaged media being an album CD storing content data the same as or different from them.

Then, in this data providing system 600, by performing such matching by points by the data providing server 601, for instance, plural content data D21 can be equivalently exchanged for packaged media being one single CD, or even one content data D21 can be equivalently exchanged for packaged media being an album CD. Thus, the convenience of equivalent exchange can be remarkably improved.

As a result, in this data providing system 600, customers can further remarkably and easily use the system. If the number of the users of the present system increased by this, the distribution of content data D21 using the Internet can be further popularized.

According to the above configuration, the data providing server 601 sends the content data D21 specified according to the rental request from the portable dedicated terminal 602 that the customer uses to the above portable dedicated terminal 602 to record it therein for rental. Thereafter, if the customer requests to equivalently exchange the rented content data D21 for packaged media from the portable dedicated terminal 602, the data providing server 601 detects the packaged media that the above content data D21 can be exchanged for by matching points for the above content data D21 that was selected according to the market value with points for the packaged media that was selected according to the market value, and shows the conditions to almost equalize the above detected packaged media with the content data D21 that the customer owns in exchange value. Thereby, in addition to the effects obtained by the aforementioned seventh embodiment, the convenience equivalent exchange can be remarkably improved. Thus, a data providing system that can further popularize the distribution of content data via the Internet can be accomplished.

Note that, in the aforementioned eighth embodiment, points are respectively allocated to the content data, the packaged media being a single CD and the packaged media being an album CD according to the ranking of the year and the date that the media were released for the first time. This invention, however, is not limited to this and, in addition to the ranking of the year and the date that the media were released for the first time, 1 point may be allocated to media that has been comparatively sold a lot because its scarcity value is relatively low, and 10 points may be allocated to media that has not been almost sold because its scarcity value is relatively high. Furthermore, points may be allocated according to one or a combination of the ranking of the year, the date that the media were released for the first time, and the sales.

In the aforementioned eighth embodiment, the content data D21 that the customer rents is equivalently exchanged for the packaged media from the data providing server 601. This invention, however, is not limited to this and content data that the customer bought may be equivalently exchanged for packaged media from the data providing server 601.

In this connection, in the aforementioned eighth embodiment, since the rented content data D21 is equivalently exchanged for the packaged media, the above content data D21 is deleted for return when the rental term expires. However, when the customer equivalently exchanges the content data that the customer bought for packaged media storing the same content data as that, since the above customer does not illegally own different content data, the content data equivalently exchanged for the packaged media may be deleted or may be kept by the customer as it is.

In the aforementioned embodiment, the packaged media that the content data D21 owned by the customer is equivalently exchanged for is delivered to the customer by the package providing server 503. This invention, however, is not limited to this and the packaged media that the content data D21 owned by the customer is equivalently exchanged for may be directly handed to the customer at the agency.

Further, in the aforementioned eighth embodiment, the portable dedicated terminal 602 notifies the data providing server 601 of the title as identification information on the content data D21 to be equivalently exchanged and the data providing server 601 notifies the portable dedicated terminal 602 of the title as identification information on packaged media which the content data D21 is equivalently exchanged for. This invention, however, is not limited to this and the portable dedicated terminal 602 may notify the data providing server 601 of the content ID as identification information on the content data D21 to be equivalently exchanged and the data providing server 601 may notify the portable dedicated terminal 602 of the package ID as identification information on the packaged media which the content data D21 can be equivalently exchanged for.

Furthermore, in the aforementioned eighth embodiment, the portable dedicated terminal 602 notifies the data providing server 601 of only the tile of the content data D21 to be equivalently exchanged. This invention, however, is not limited to this and the portable dedicated terminal 602 may notify the data providing server 601 of information indicating the amount of additional fee arbitrary selected by the customer, together with the identification information on the content data D21 to be equivalently exchanged, and then perform the equivalent exchange processing. By this method, the content data D21 can be exchanged for packaged media within the budget desired by the customer.

In the aforementioned eighth embodiment, the content data and the package data equivalently exchanged are musical data (single tune and single CD). This invention, however, is not limited to this and as content data and packaged media to be equivalently exchanged, other various kinds of content such as movie and book can be applied. Thereby, the convenience and the versatility of a data providing system can be remarkably improved, and the distribution of content data can be further popularized.

In the aforementioned eighth embodiment, the balance that is to almost equalize the content data D21 that the customer owns with the packaged media in exchange value for equivalent exchange is settled by money. This invention, however, is not limited to this and points to give the customer a privilege such as a discount according to the rental and the purchase of the content data D21 may be issued and stored by the data providing server 601, and the difference in exchange value between the content data D21 that the above customer owns and the packaged media for equivalent exchange may be settled by the points that the customer obtains, instead of a part of or all of payment.

Furthermore, in the aforementioned eighth embodiment, the rental of the content data D21 is performed from the data providing server 601 with the portable dedicated terminal 602 that is accessible only to the above data providing server 601, and the above rented content data D21 is equivalently exchanged for packaged media. This invention, however, is not limited to this and, content data may be bought or rented from the data providing server 601 with other various kinds of devices and the above bought or rented content data may be equivalently exchanged for packaged media, provided that the devices are device connectable to the Internet 504 such as a personal computer and a portable telephone.

In this connection, when the data providing server 601 is used with another device such as a personal computer or a portable telephone, different from the portable dedicated terminal 602, server identification information to identify the data providing server 601 being the provider of the above content data is previously added to content data to be bought or rented from the data providing server 601 with the above device. And when the customer requests equivalent exchange and then it is judged whether to permit the customer the equivalently exchange, it is judged whether the content data shown by the customer for equivalent exchange was provided from the data providing server 601 based on the server identification information. if the customer showed the content data obtained from another data providing server for equivalent exchange, the equivalent exchange is not permitted. Thereby, it can be prevented that the data providing server suffers losses by performing the equivalent exchange of content data provided by another data providing server.

Furthermore, when the customer equivalently exchanges content data that the customer rented by a device different from the portable dedicated terminal 602 for packaged media, the portable dedicated terminal 602 deletes the content data to be equivalently exchanged that has been recorded in that device at the time point when the portable dedicated terminal 602 received exchange approval data from the above device, and approves the equivalent exchange of the above content data for the packaged media upon that confirmation has got. Thereby, that the customer performs illegal equivalent exchange by using again the content data for rental that was equivalently exchanged once by a device different from the portable dedicated terminal 602 can be prevented.

(10) Ninth Embodiment

Figure 51:
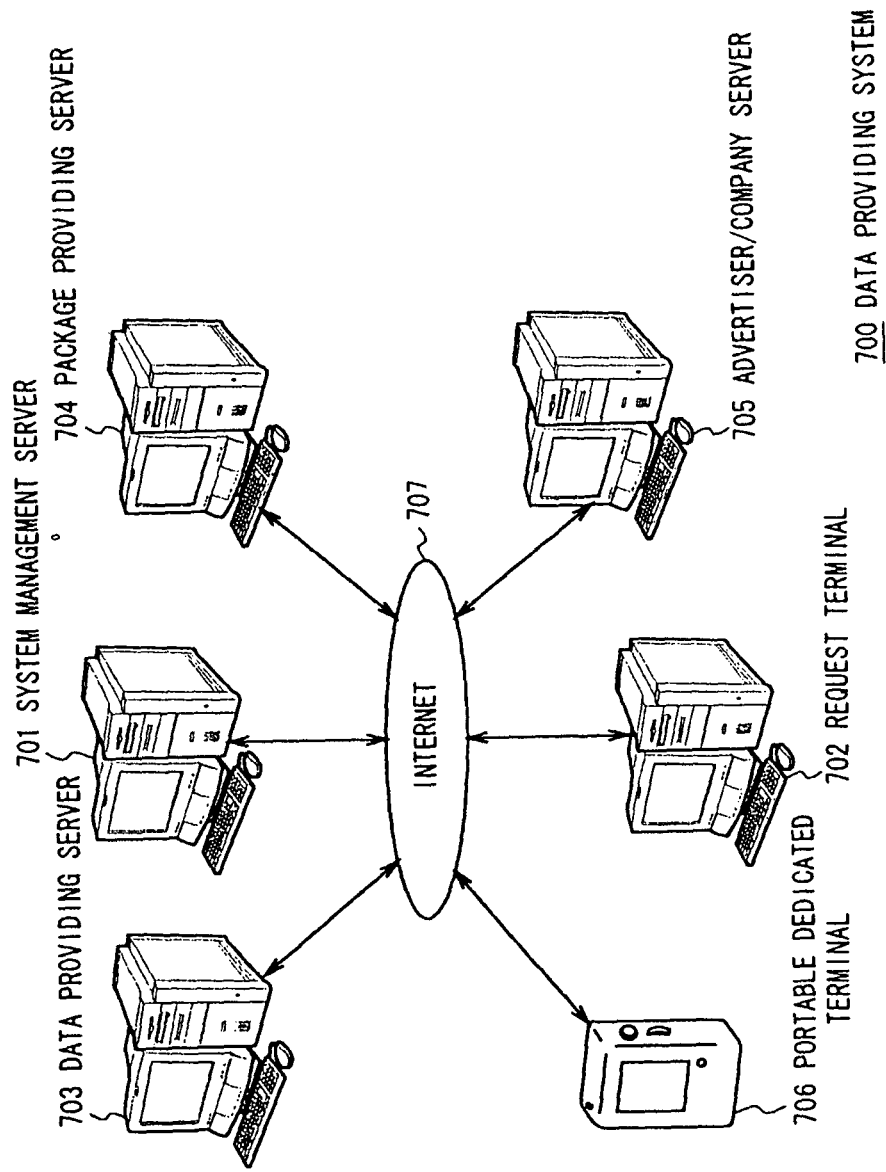
FIG. 51 is a schematic diagram showing the construction of a data providing system according to a ninth embodiment.

FIG. 51 shows a data providing system 700 according to a ninth embodiment. A request terminal 702 having the construction of a personal computer corresponding to the request terminal used by the customer 3, described above with reference to FIGS. 1 to 3, a data providing server 703 having the construction of a personal computer corresponding to the agencies 4A to 4N described above with reference to FIGS. 1 to 3, a package providing server 704 having the construction of a personal computer corresponding to the sales company 5 described above with reference to FIGS. 1 to 3, and an advertiser/company server 705 having the construction of a personal computer corresponding to the advertiser/company site 6 described above with reference to FIGS. 1 to 3, and a portable dedicated terminal 706 corresponding to the portable dedicated terminals 7A to 7N described above with reference to FIGS. 1 to 3 are connected to a system management server 701 having the construction of a personal computer corresponding to the system management site 2 described above with reference to FIGS. 1 to 3 via the Internet 707.

Figure 52:
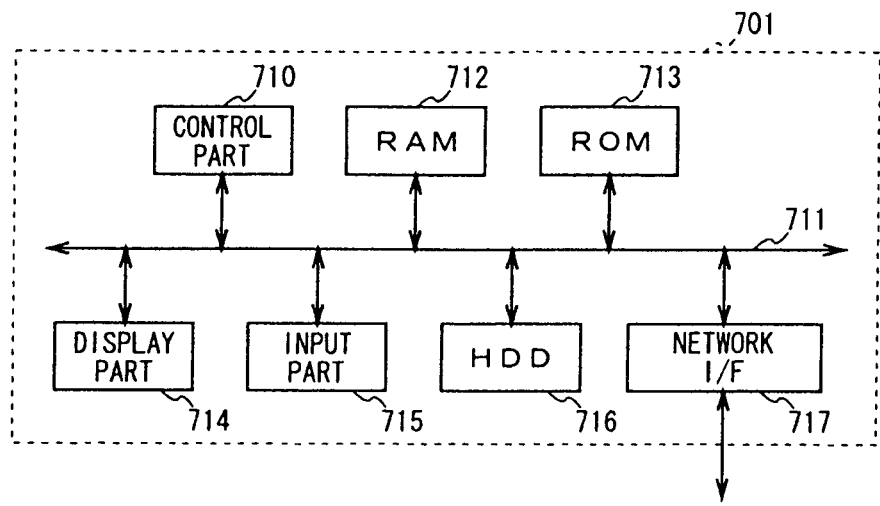
FIG. 52 is a block diagram showing the circuit construction of a system management server.

As shown in FIG. 52, in the system management server 701, a RAM (Random Access Memory) 712, a ROM (Read Only Memory) 713, a display part 714, an input part 715, a HDD (Hard Disk Drive) 716 and a network interface 717 are connected to a control part 710 such as a CPU (Central Processing Unit) with a bus 711.

In this case, the control part 710 reads various programs previously stored in the ROM 713 and puts them on the RAM 712. According to these various programs, the system management server 701 can execute similar processing to the updating part 60 and the matching part 63 described above with reference to FIG. 4, the accounting part 116 described above with reference to FIG. 5, the accounting part 156, the content ID extracting part 161, the content search part 162 and the send data generating part 164 described above with reference to FIG. 8, the advertiser/company information updating part 213, the customer information updating part 215 and the matching part 216 described above with reference to FIG. 11, and the matching part 268 described above with reference to FIG. 25.

In this connection, the system management server 701 executes the similar processing to them according to the various programs previously stored in the ROM 713. However, these various processing may be executed by installing a program storage medium storing these various programs in the system management server 701.

Note that, such program storage medium for installing the various programs to execute the aforementioned various processing in the system management server 701 and for making them executable is not only limited to packaged media such as a flexible disk, a CD-ROM or a DVD, but also may be a semiconductor memory, a magnetic disc, etc., in which the various programs can be temporarily or permanently stored. Furthermore, as means for storing the various programs in these program storage media, a cable or wireless communication medium such as a local area network, the Internet and digital satellite broadcasting can be used, and they may be stored via various communication interfaces such as a rooter and a modem.

The control part 710 records, stores and manages various information such as customer registration information and advertiser/company registration information, to be used in the whole system, on the hard disk of a hard disk drive 716.

Furthermore, the control part 710 can send/receive various information such as customer information, advertiser/company information, customer introduction information and advertiser/company introduction information, to/from the request terminal 702, the data providing server 703, the package providing server 704, the advertiser/company server 705 and the portable dedicated terminal 706 via the network interface 717.

In this manner, the system management server 701 having the construction of a personal computer can function in similar to the system management site 2 described above with reference to FIG. 1 according to the various programs.

In this connection, for instance, the system management server 701 uses the input part 715 and the display part 714 to confirm the various information or the like recorded on the hard disk drive 717.

Figure 53:
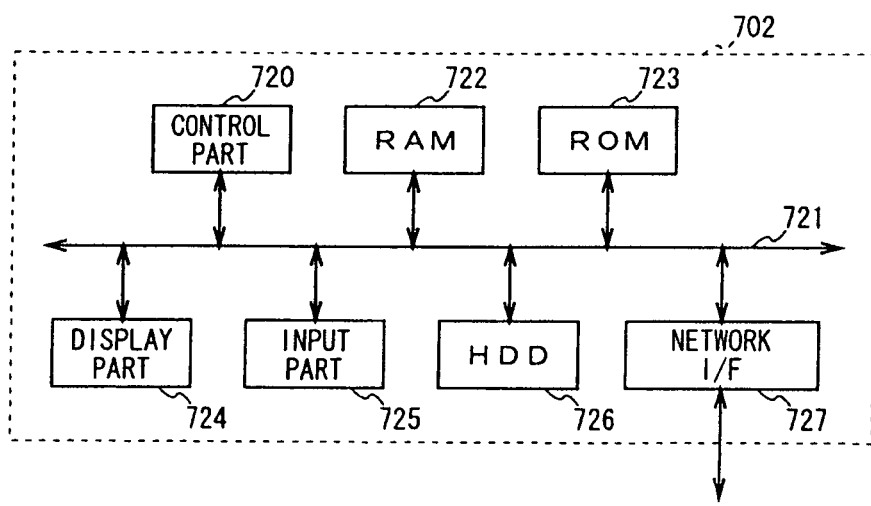
FIG. 53 is a block diagram showing the circuit construction of a request terminal.

As shown in FIG. 53, in the request terminal 702, a RAM 722, a ROM 723, a display part 724, an input part 725, a hard disk drive 726 and a network interface 727 are connected to a control part 720 such as a CPU with a bus 721.

In this case, the control part 720 reads various programs previously stored in the ROM 723 and puts them on the RAM 722. According to these various programs, the request terminal 702 can execute similar processing to the request data generating part 71 and the display control part 74 described above with reference to FIG. 4, the operating information judging part 121, the request data generating part 122, the judging part 125 and the accounting part 127 described above with reference to FIG. 5, and the request data generating part 321 and the display control part 324 described above with reference to FIG. 28.

In this connection, the request terminal 702 executes the similar processing to them according to the various programs previously stored in the ROM 723. However, these various processing may be executed by installing a program storage medium in that these various programs have been stored in the request terminal 702.

Note that, such program storage medium for installing the various programs to execute the aforementioned various processing in the system management server 702 and for making them executable is not only limited to packaged media such as a flexible disk, a CD-ROM or a DVD, but also may be a semiconductor memory, a magnetic disc, etc., in which the various programs can be temporarily or permanently stored. As means for storing the various programs in these program storage media, a cable or a radio communication medium such as a local area network, the Internet or digital satellite broadcasting may be used, and they may be stored via various communication interfaces such as a rooter and a modem.

The control part 720 records, stores and manages various information such as address information on an accessible system management server 701 and the data providing server 703 on the hard disk of the hard disk drive 726.

Furthermore, the control part 720 can send/receive various information such as customer information and a content data transmission request to/from the system management server 701 and the data providing server 703 via the network interface 727.

In this connection, in the request terminal 702, when the customer performs the rental reservation of content data and the portable dedicated terminal 706 to the data providing server 703 or the like, the input part 725 and the display part 724 are used.

Figure 54:
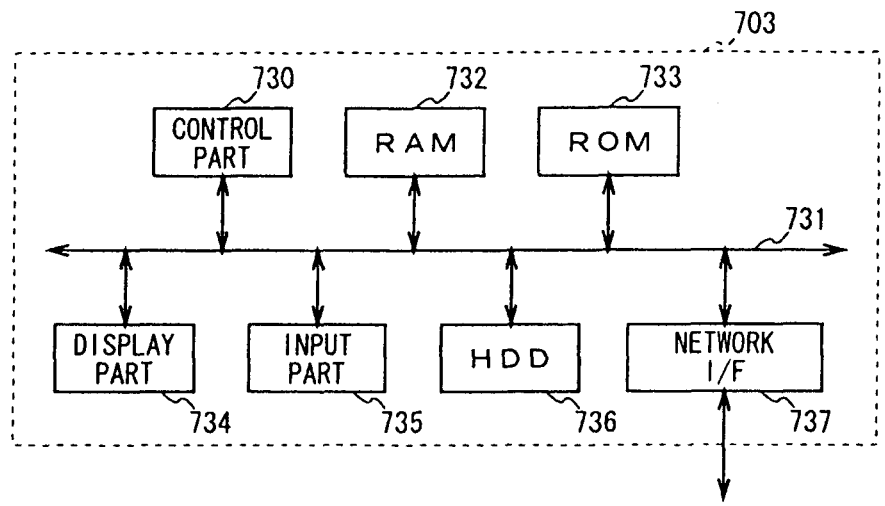
FIG. 54 is a block diagram showing the circuit construction of a data providing server.

As shown in FIG. 54, in the data providing server 703, a RAM 732, a ROM 733, a display part 734, an input part 735, a hard disk drive 736 and a network interface 737 are connected to a control part 730 such as a CPU with a bus 731.

In this case, the control part 730 reads various programs previously stored in the ROM 733 and puts them on the RAM 732. According to these various processing, the data providing server 703 can execute similar processing to the content search part 62 and the package search part 64 described above with reference to FIG. 4, the recording control part 117 described above with reference to FIG. 5, the received data judging part 155, the recording control part 157, the operating information judging part 158 and the request data generating part 159 described above with reference to FIG. 8, the search part 315 and the matching part 316 described above with reference to FIG. 28, the received data judging part 516, the content ID extracting part 517, the customer's update search part 518, the content search part 519, the send data generating part 520, the customer ID extracting part 525, the judging part 526, the value judging part 527 and the package search part 528 described above with reference to FIG. 38, and the judging part 610 and the value judging part 611 described above with reference to FIG. 45.

In this connection, the data providing server 703 performs, in accordance with the various programs previously stored in the ROM 733, the similar processing to the content search part 62 and package search part 64 as described with reference to FIG. 4, the recording control part 117 as described with reference to FIG. 5, the received data judging part 155, recording control part 157, operation information judging part 158 and request data generating part 159 as described with reference to FIG. 8, the search part 315 and the matching part 316 described above with reference to FIG. 28, the received data judging part 516, the content ID extracting part 517, the customer's update search part 518, the content search part 519, the send data generating part 520, the customer ID extracting part 525, the judging part 526, the value judging part 527 and the package search part 528 described above with reference to FIG. 38, and the judging part 610 and the value judging part 611 described above with reference to FIG. 45. However, these various processing may be performed by installing a program storage medium storing these various programs in the data providing server 703.

Note that, such program storage medium for installing the various programs to execute the aforementioned various processing in the data providing server 703 and for making them executable is not only limited to packaged media such as a flexible disk, a CD-ROM and a DVD, but also may be a semiconductor memory, a magnetic disk, etc., in which the various programs can be temporarily or permanently stored. Furthermore, as means for storing the various programs in these program storage media, a cable or a radio communication medium such as a local area network, the Internet and digital satellite broadcasting may be used, and they may be stored via various communication interfaces such as a rooter and a modem.

The control part 730 records, stores and manages various information such as customer registration information on the customer using the agency, content data to be provided to the portable dedicated terminal 706 on the hard disk of the hard disk drive 736.

Furthermore, the control part 730 can send/receive various information such as customer information, content data and package delivery ordering data to/from the system management server 701, the package providing server 704, and the request terminal 702 and the portable dedicated terminal 706 connected via the above system management server 701, via the network interface 737.

In this connection, in the data providing server 703, when the system management server 701 is requested for content data, when various information recorded on the hard disk drive 736 are confirmed, or the like, the input part 735 and the display part 734 are used.

Figure 55:
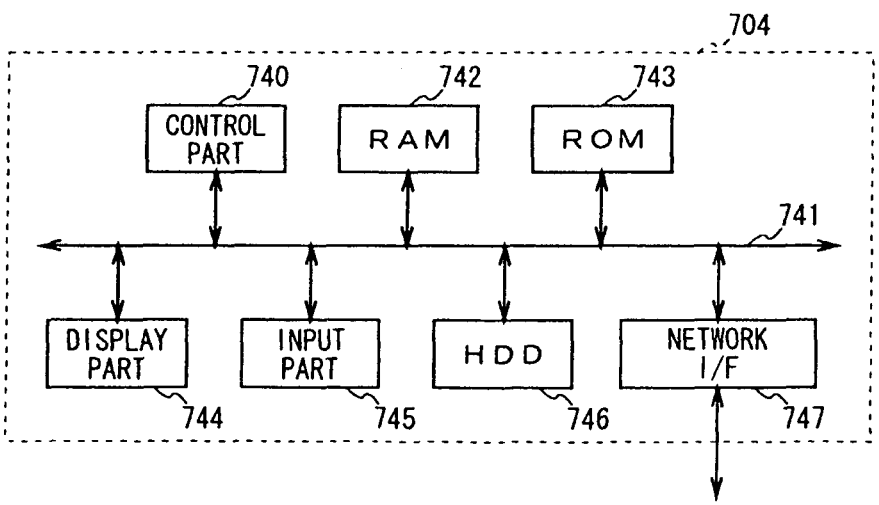
FIG. 55 is a block diagram showing the circuit construction of a package providing server.

As shown in FIG. 55, in the package providing server 704, a RAM 742, a ROM 743, a display part 744, an input part 745, a hard disk drive 746 and a network interface 747 are connected to a control part 740 such as a CPU with a bus 741.

In this case, the control part 740 reads various programs previously stored in the ROM 743 and puts them on the RAM 742. According to these various programs, the package providing server 704 can execute similar processing to the package ID extracting part 561, the package search part 562, the package taking-out control part 564 and the shipment/packing instructing part 565 described above with reference to FIG. 38.

In this connection, the package providing server 704 executes the similar processing to them according to the various programs previously stored in the ROM 743. However, these various processing may be executed by installing a program storage medium storing these various programs in the package providing server 704.

Note that, such program storage medium for installing the various programs to execute the aforementioned various processing in the package providing server 704 and for making them executable is not only limited to packaged media such as a flexible disk, a CD-ROM and a DVD, but also may be a semiconductor memory, a magnetic disk, etc., in which various programs can be temporarily or permanently stored. Furthermore, as means for storing the various programs in these program storage media, a cable or a radio communication medium such as a local area network, the Internet and digital satellite broadcasting may be used, and they may be stored via various communication interfaces such as a rooter and a modem.

The control part 740 records, stores and manages various information such as the stock of packaged media and storage information, on the hard disk of the hard disk drive 746.

Furthermore, the control part 740 can send/receive various information such as package delivery ordering data and delivery arrangement completion data to/from the data providing server 703 via the network interface 747.

In this connection, the package providing server 704, for instance, in confirming the various information stored in the network interface 747, uses the input part 745 and the display part 744.

Figure 56:
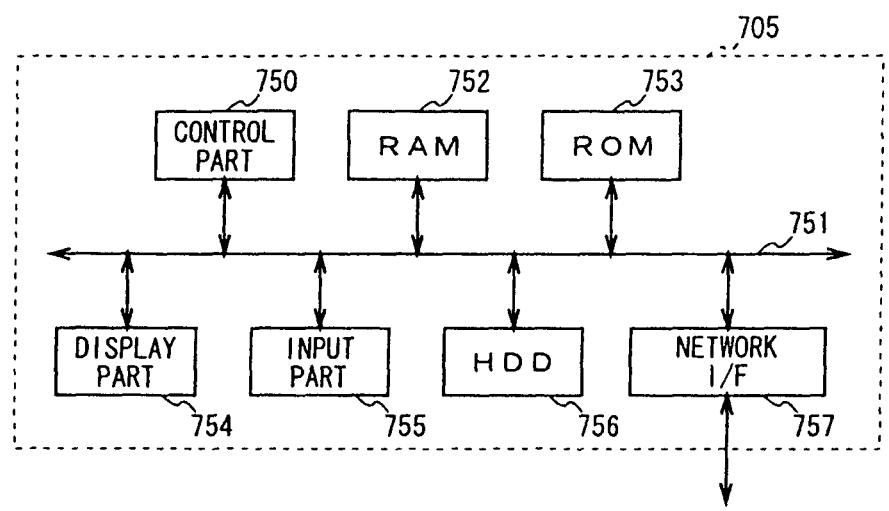
FIG. 56 is a block diagram showing the circuit construction of an advertiser/company server.

As shown in FIG. 56, in the advertiser/company server 705, a RAM 752, a ROM 753, a display part 754, an input part 755, a hard disk drive 756 and a network interface 757 are connected to a control part 750 such as a CPU via a bus 751.

In this case, the control part 750 reads various programs previously stored in the ROM 753 and puts them on the RAM 752. According to these various programs, the advertiser/company server 705 can execute similar processing to the sending control part 231, the display control part 234, the customer selecting part 237 and the send data generating part 238 described above with reference to FIG. 11.

In this connection, the advertiser/company server 705 executes the similar processing to them according to the various programs previously stored in the ROM 753. However, these various processing may be executed by installing a program storage medium storing these various programs in the advertiser/company server 705.

Note that, such program storage medium for installing the various programs to execute the aforementioned various processing in the advertiser/company server 705 and for making them executable is not only limited to packaged media such as a flexible disk, a CD-ROM and a DVD, but also may be a semiconductor memory, a magnetic disk, etc., in that various programs can be temporarily or permanently stored. Furthermore, as means for storing the various programs in these program storage media, a cable or a radio communication medium such as a local area network, the Internet and digital satellite broadcasting may be used, and they may be stored via various communication interfaces such as a rooter and a modem.

The control part 750 records, stores and manages various information such as distribution data to be provided via the Internet 707 on the hard disk of the hard disk drive 756.

Furthermore, the control part 750 can send/receive various information such as advertiser/company information and customer introduction information to/from the system management server 701 via the network interface 757.

In this connection, the package providing server 705, in entering the advertiser/company information or the like, uses the input part 755 and the display part 754.

Figure 57:
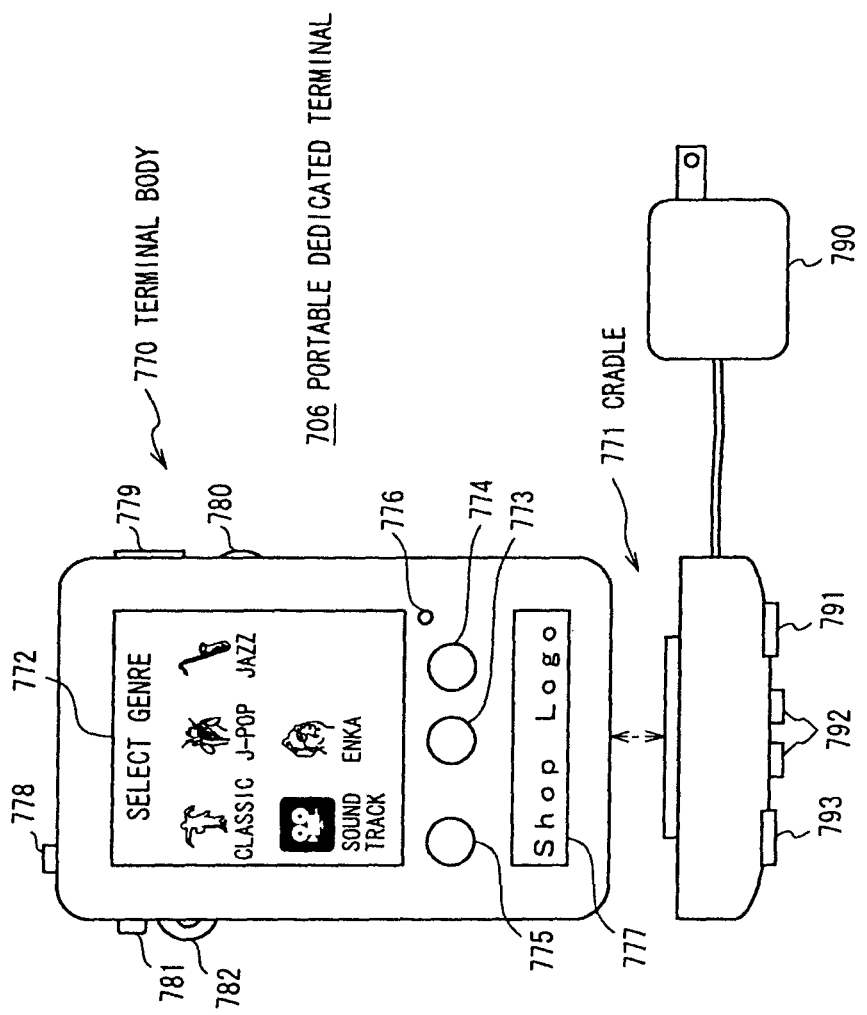
FIG. 57 is a schematic external view showing the construction of a portable dedicated terminal.

As shown in FIG. 57, the portable dedicated terminal 706 has a function to record/reproduce content data, and a terminal body 770 which can be carried freely can be detachably attached to a cradle 771 that has a charging function to the above terminal body 770 and a communication function using the Internet 707.

In this case, in the terminal body 770, a display part 772 being a liquid crystal display is provided at the front of the case. Images based on content data, various operational screens used to obtain the above content data, or the like can be displayed on the above display part 772.

At the lower side of the display part 772 on the front surface of the case, a reproducing start button 773, a play/stop button 774 and a send button 775 are provided. By means of these buttons, a reproducing starting command and a reproducing stop command of content data, and a send command to send various requests to the data providing server 703 or the like can be entered.

In this connection, on the front surface of the case, a charge lamp 776 that, when the terminal body 770 is on charging, notifies the customer of the charge is provided, and the logotype 777 of the agency selling and renting the portable dedicated terminal 706 is represented.

On the top surface of the case, a headphone jack 778 is provided. On the right surface of the case, a power button 779 and a volume control dial 780 are provided. In addition to this, on the left surface of the case, a cancel button 781 and a rotational operating button that can be rotated and pushed freely (hereinafter, this is referred to as jog dial) 782 are provided as slightly projecting from the surface of the case.

The terminal body 770 outputs sounds obtained by reproducing content data from the headphone jack 778 to the headphones, to allow the customer to listen to the sounds. At this time, the customer can control the volume by the volume control dial 780.

Furthermore, in the terminal body 770, when the operational screen or the like is displayed on the display part 772, if the customer rotates the jog dial 782, the operational screen is scrolled according to the operations. When the customer erroneously entered information or a command on the above operational screen, the customer can cancel it with the cancel button 781.

On the other hand, in the cradle 771, an AC (Alternating Current) adapter 790 is provided. If the AC adapter 790 is connected to main battery or the like in the state where the terminal body 770 is mounted, a battery in the terminal body 770 can be charged.

In the cradle 771, a modular jack 791, an audio output terminal 792 and a USB (Universal Serial Bus) terminal 793 are provided. Content data received by communicating with the system management server 701 and the data providing server 703 via the above modular jack 791 or the like is sent to the terminal body 770, audio data obtained from the terminal body 770 is outputted to an external speaker or the like from the audio output terminal 792, and content data obtained from the outside can be taken in from the USB terminal 793 and can be sent to the terminal body 770.

Figure 58:
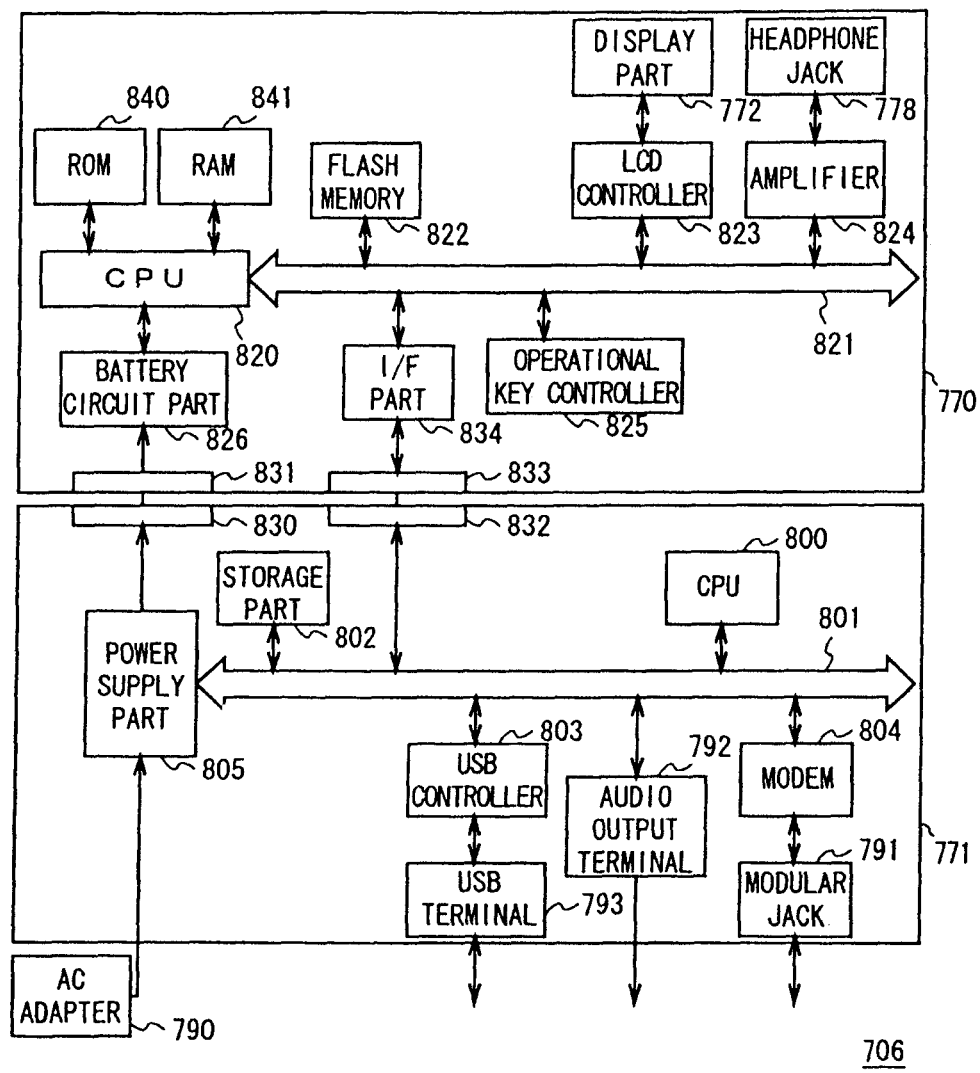
FIG. 58 is a block diagram showing the circuit construction of the portable dedicated terminal.

Now, the circuit construction of the portable dedicated terminal 706 will be described with reference to FIG. 58. First, in the cradle 771, a storing part 802, a USB controller 803, the audio output terminal 792 and a modem 804 are connected to a CPU 800 via a bus 801. Power supply voltage taken in from the AC adapter 790 is converted into the internal voltage of a predetermined voltage by a power supplying part 805, and the voltage is supplied to the CPU 800 and each circuit block, so that the whole of the cradle 771 is driven.

In the terminal body 770, a flash memory 822, a LCD (Liquid Crystal Display) controller 823, an amplifier 824, and an operational key controller 825 are connected to a CPU 820 via a bus 821. By supplying the internal voltage from a battery circuit part 826 to the CPU 820 and each circuit block, the whole of the terminal body 770 is driven.

When the terminal body 770 is mounted on the cradle 771, a power input terminal 831 is connected to a power supply terminal 830 in the cradle 771. Thereby, power supply voltage supplied from the power supplying part 805 in the above cradle 771 sequentially via the power supply terminal 830 and the power input terminal 831 is taken in the battery circuit part 826 and the battery is charged. Thus, even if the terminal body 770 is detached from the cradle 71, the portable dedicated terminal 706 can be freely used.

If the terminal body 770 is mounted on the cradle 771, a main-body-side information input/output terminal 833 is connected to a cradle-side information input/output terminal 832 provided in the cradle 771, so that data and various information can be sent to or received from the cradle 771.

Practically, in the portable dedicated terminal 706, the USB terminal 793 of the cradle 771 can be connected to the data providing server 703 via a USB cable (not shown). Content data sent from the data providing server 703 via the USB cable by customer's rental reservation or the like is taken in the USB controller 803 in the cradle 771 from the USB terminal 793, and the above taken-in content data is sent from the cradle-side information input/output terminal 832 to the terminal body 770.

In this case, the terminal body 770 takes the content data sent from the cradle-side information input/output terminal 832 of the cradle 771 in the CPU 820 from the main-body-side information input/output terminal 833 via an interface part 834, and records the content data in the flash memory 822.

In this manner, if recording the content data in the flash memory 882, the terminal body 770 takes a reproducing start command given from the operational key controller 825 in the CPU 820 according to the operation of the reproducing start button 773, reproduces the content data from the flash memory 822, and sends the above reproduced content data from the amplifier 824 to the headphone jack 778 as well as sending the above content data from the LCD controller 823 to the display part 772. Thereby, the customer can enjoy the content.

Furthermore, when various information such as a request to obtain content data is entered via the operational key controller 825, the terminal body 770 takes this in the CPU 820, and sends this from the above CPU 820 to the cradle 711 sequentially via the interface part 834 and the main-body-side information input/output terminal 833.

At this time, the cradle 711 takes in various information given from the terminal body 770 from the cradle-side information input/output terminal 832, and sends the above taken-in various information from the modem 804 to the data providing server 703 or the like via the modular jack 791 and the system management server 701.

As a result, when the various information such as content data is sent from the data providing server 703 or the like via the system management server 701, the cradle 711 takes this in the CPU 800 from the modular jack 791 via the modem 804, and supplies the above received various information from the cradle-side information input/output terminal 832 to the terminal body 770.

The terminal body 770 takes various information sent from the cradle 771 in the CPU 820 from the main-body-side information input/output terminal 833 via the interface part 834, and notifies the customer of the contents of that information via the display part 772 and the headphone jack 778, or records the various information in the flash memory 822.

In this manner, in the terminal body 770, the CPU 820 reads various programs previously stored in the ROM 840 and puts them on the RAM 841. According to these various programs, the terminal body 770 can execute similar processing to the recording control part 81, the reproduction control part 84 and the request data generating part 86 described above with reference to FIG. 4, the request data generating part 241, the recording control part 245 and the reproduction control part 248 described above with reference to FIG. 11, the request data generating part 270 described above with reference to FIG. 25, the reproduction control part 342, the request data generating part 344 and the recording control part 347 described above with reference to FIG. 28, the operational information judging part 541, the request data generating part 542, the judging part 545, the recording control part 546 and the reproduction control part 548 described above with reference to FIG. 38, and the request data generating part 630 described above with reference to FIG. 45.

In this connection, the terminal body 770 of the portable dedicated terminal 706 executes the similar processing to the recording control part 81, the reproduction control part 84 and request data generating part 86 described above with reference to FIG. 4, the request data generating part 241, the recording control part 245 and the reproduction control apart 248 described above with reference to FIG. 11, the request data generating part 270 described above with reference to FIG. 25, the reproduction control part 342, the request data generating part 344 and the recording control part 347 described above with reference to FIG. 28, the operational information judging part 541, the request data generating part 542, the judging part 545, the recording control part 546 and the reproduction control apart 548 described above with reference to FIG. 38, and the request data generating part 630 described above with reference to FIG. 45, according to the various programs previously stored in the ROM 840. However, these various processing may be executed by installing a program storage medium storing these various programs in the terminal body 770.

Note that, such program storage medium for installing the various programs to execute the aforementioned various processing in the terminal body 770 of the portable dedicated terminal 706 and for making it executable is not only limited to packaged media such as a flexible disk, a CD-ROM and a DVD, but also may be a semiconductor memory, a magnetic disk, etc., in which various programs can be temporarily or permanently stored. Furthermore, as means for storing the various programs in these program storage media, a cable or a radio communication medium such as a local area network, the Internet and digital satellite broadcasting, may be used, and the various programs may be stored via various communication interfaces such as a rooter and a modem.

The cradle 771 stores various information such as the addresses of accessible servers on a storage medium 802, so that the CPU 800 can communicate with the system management server 701 or the like according to the above various information in the storing part 802.

According to the above configuration, in this data providing system 700, each of the system management server 701, the request terminal 702, the data providing server 703, the package providing server 704 and the advertiser/company server 705 has the construction of a personal computer. Therefore, in this data providing system 700, it is unnecessary to newly create the system management server 701, request terminal 702, data providing server 703, package providing server 704 and advertiser/company server 705 as hardware. Thereby, only by installing various programs in existing personal computer, the system can be easily constructed with these personal computers.

In this data providing system 700, with respect to the portable dedicated terminal 706, hardware has been newly prepared on purpose without applying a personal computer. This is because, by making the portable dedicated terminal 706 portable and have simplified operational buttons, a person who does not have a personal computer and a person who is inexperienced in the operations of a personal computer can easily manage the portable dedicated terminal 706.

According to the above configuration, the system is constructed using the system management server 701, the request terminal 702, the data providing server 703, the package providing server 704 and the advertiser/company server 705 each having the configuration of a personal computer. Therefore, the system can be easily constructed by using existing personal computers as the system management server 701, request terminal 702, data providing server 703, package providing server 704 and advertiser/company server 705.

(11) Tenth Embodiment

Figure 59:
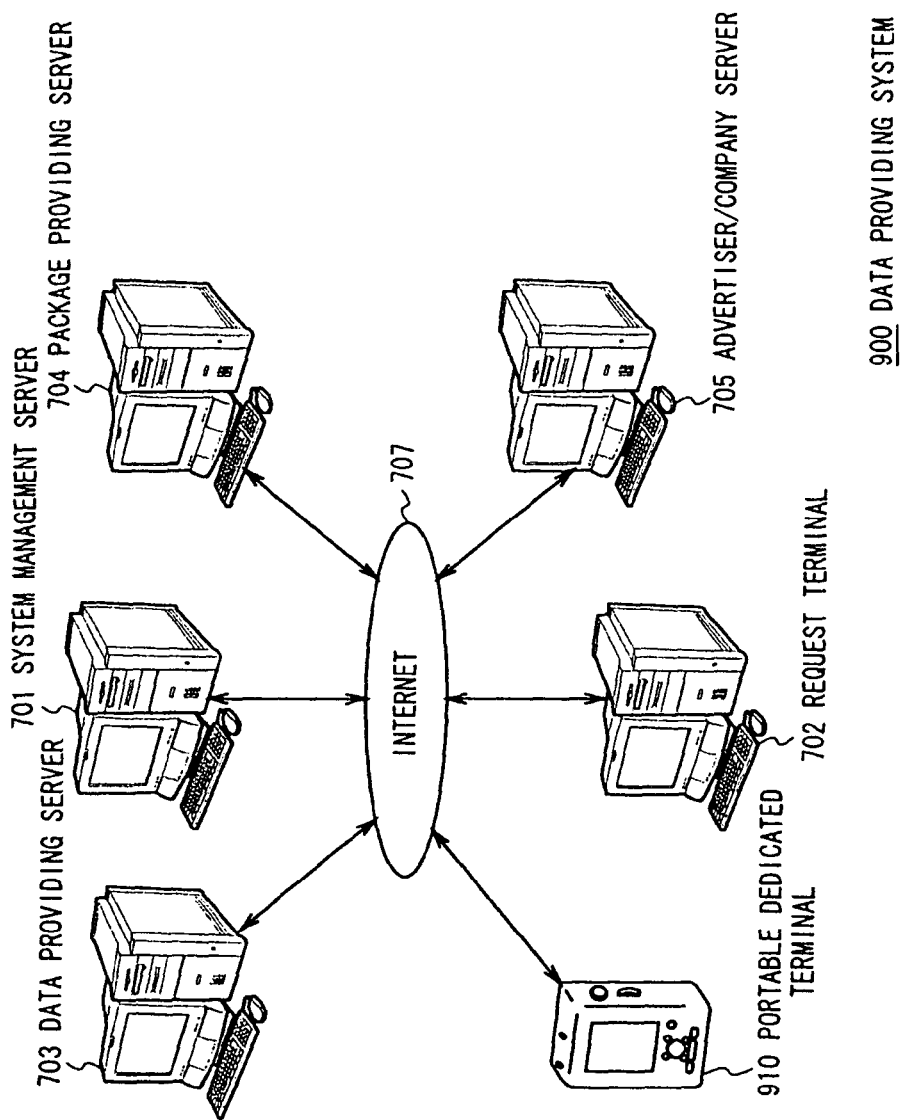
FIG. 59 is a schematic diagram showing the configuration of a data providing system according to a tenth embodiment.

FIG. 59 in which the same reference numerals are added to corresponding parts in FIG. 51 shows a data providing system 900 according to a tenth embodiment. The data providing system 900 is formed similarly to the data providing system 700 according to the ninth embodiment, except for the configuration of a portable dedicated terminal 910 that corresponds to the portable dedicated terminals 7A to 7N described above with reference to FIGS. 1 to 3.

Figure 60:
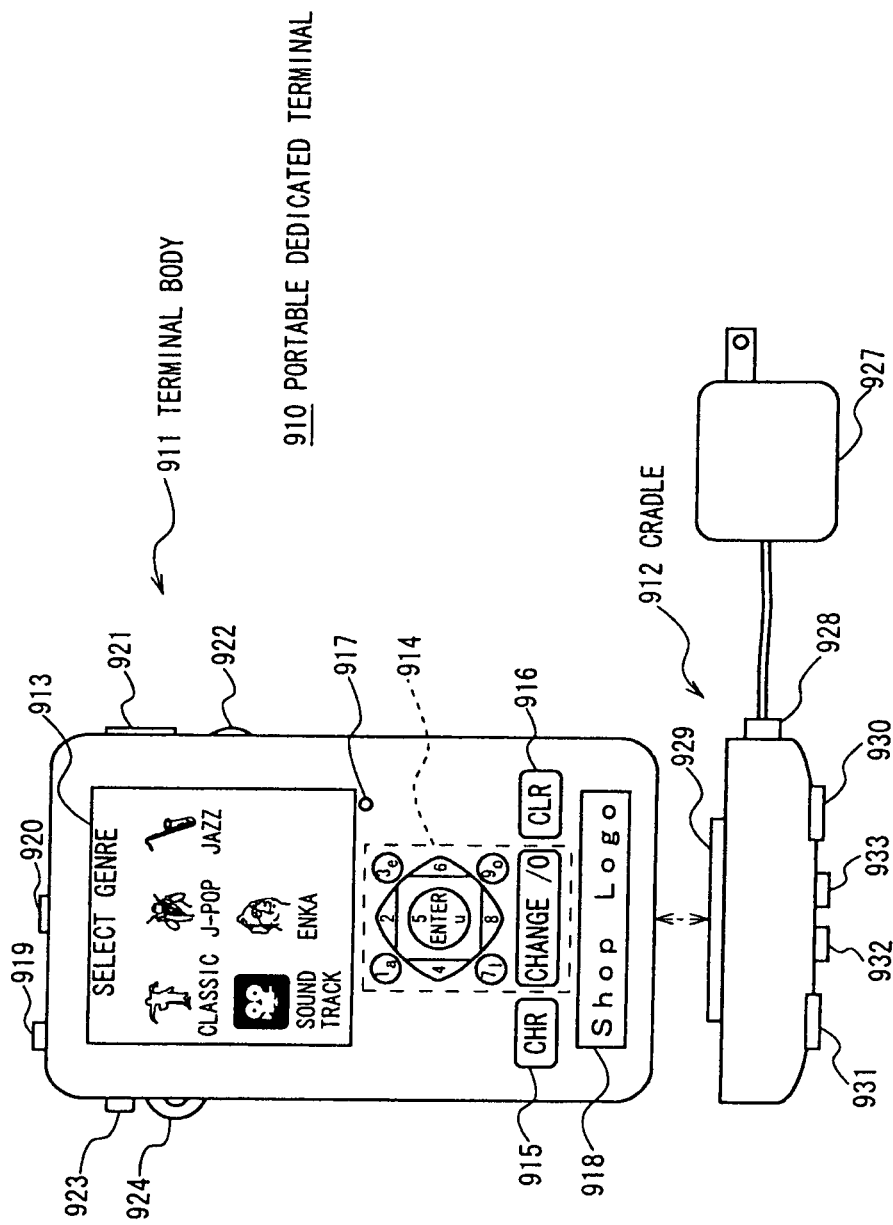
FIG. 60 is a schematic external view showing the construction of a portable dedicated terminal.

In this case, as shown in FIG. 60, the portable dedicated terminal 910 has a function to record/reproduce content data. A terminal body 911 freely portable can be freely detachably mounted on a cradle 912 having a charging function to the above terminal body 911 and a communication function using the Internet 707.

In the terminal body 911, a display part 913 being a liquid crystal display is provided on the front surface of the case. Video based on content data, various operating screens used to obtain the above content data, or the like can be displayed on the above display part 913.

Under the display part 913 on the front surface of the case, a character input key group 914 having the arrangement of ten keys "0" to "9", a character type change key 915 and a cancel key 916 are provided. By using the character input key group 914 as ten key in a state where a content selection screen is displayed on the display part 913, the customer can enter numerals for bar code as identification information previously corresponded to content and can selectively specify desired content. At the same time, by using the character input key group 914 together with the character type change key 915 and the cancel key 916, the customer can enter the title of the content and the like in Japanese characters (hiragana, katakana and Chinese characters), English letters (alphabets), numerals and symbols, etc., and can selectively specify desired content.

In this connection, on the front surface of the case, a charge lamp 917 that notifies, when the terminal body 911 is on charging, the customer of this charging is provided, and the logotype 918 of the agency which sells and rents the portable dedicated terminal 910 is represented.

On the top surface of the case, a headphone jack 919 and a microphone 920 are provided. On the right side of the case, a power button 921 and a volume control dial 922 are provided.

In addition to this, a send button 923 to send various requests to the data providing server 703 or the like is provided on the left side of the case, and a jog dial 924 which can be rotated and pushed freely is provided so as to slightly projecting from the surface of the above case.

Thereby, in the terminal body 911, by rotating and pushing the jog dial 924 in the state where an operating screen for the reproducing of content data is displayed on the display part 913, the customer can enter various commands such as a reproducing start command and a reproducing stop command of content data.

The terminal body 911 outputs voice thus obtained by reproducing the content data from the headphone jack 919 to headphones (not shown), and displays video thus obtained by reproducing the above content data on the display part 913. Thereby, the customer views the content. At this time, the customer can control the volume by turning the volume control dial 922.

Figure 61:
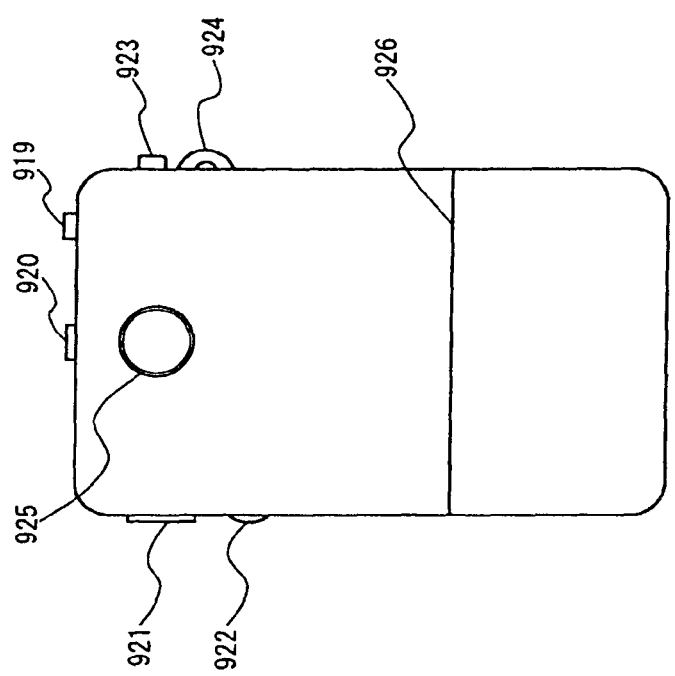
FIG. 61 is a schematic external view showing the construction of the back of the terminal.

As shown in FIG. 61, in the terminal body 911, a camera 925 for pattern recognition is provided at the upper center part of the back of the case. The terminal body 911 picks up the image of a bar code previously corresponded to the content by that camera 925, so that the customer can selectively specify desired content. And by using the above camera 925 together with the microphone 920, motion images and sound for a predetermined time (for several seconds) can be taken in for the memo of desired information.

Furthermore, at the lower part of the back of the case, a detachable battery pack 926 is mounted. Battery voltage is supplied from the above battery pack 926 to the internal various circuits according to the depression of the power button 921 so as to activate the portable dedicated terminal 910.

In this connection, on the bottom of the case, a connector that will be described later is provided, and the terminal body 911 can be electrically connected to the cradle 912 via the above connector. When the connector 928 of an AC adapter 927 connected to main power or the like is connected to that connector, the battery pack 926 can be directly charged without via the cradle 912.

On the other hand, in the cradle 912 (FIG. 60), a connector 929 is provided on the top surface of the case. By connecting the connector of the terminal body 911 to the above connector 929, that terminal body 911 can be electrically connected to the terminal body 911 (that is, the terminal body 911 can be mounted).

In the cradle 912, the connector 928 of the AC adapter 927 is mounted freely and detachably. If the AC adapter 927 is connected to mains power or the like, power supply voltage is supplied to each of the internal circuits from the above AC adapter 927, so as to activate the portable dedicated terminal 910. If the terminal body 911 is electrically connected to the cradle 912, power supply voltage is supplied from that AC adapter 927 to the battery pack 926 of the above terminal body 911 and the battery pack 926 is charged.

In the cradle 912, a modular jack 930 for public network that the communication speed is relatively slow, and a jack for Ethernet (trademark) 931 that the communication speed is much faster than the public network (hereinafter, this is referred to as Ethernet jack) are provided.

If the terminal body 911 is mounted on the cradle 912, the terminal body 911 makes the customer arbitrarily select one of the public network and the Ethernet (trademark) as communication line to be used, and communicates with the system management server 701 and the data providing server 703 via the modular jack 930 or the Ethernet jack 931 corresponding to the above selected public network or Ethernet (trademark).

In addition to this, in the cradle 912, a video output terminal 932 and an audio output terminal 933 are provided.

If the content data is reproduced in the state where the terminal body 911 is mounted on the cradle 912, the terminal body 911 sends video data and audio data composing the above content data to an external device such as a television receiving set via the video output terminal 932 and the audio output terminal 933, so that the customer can view the content.

Figure 62:
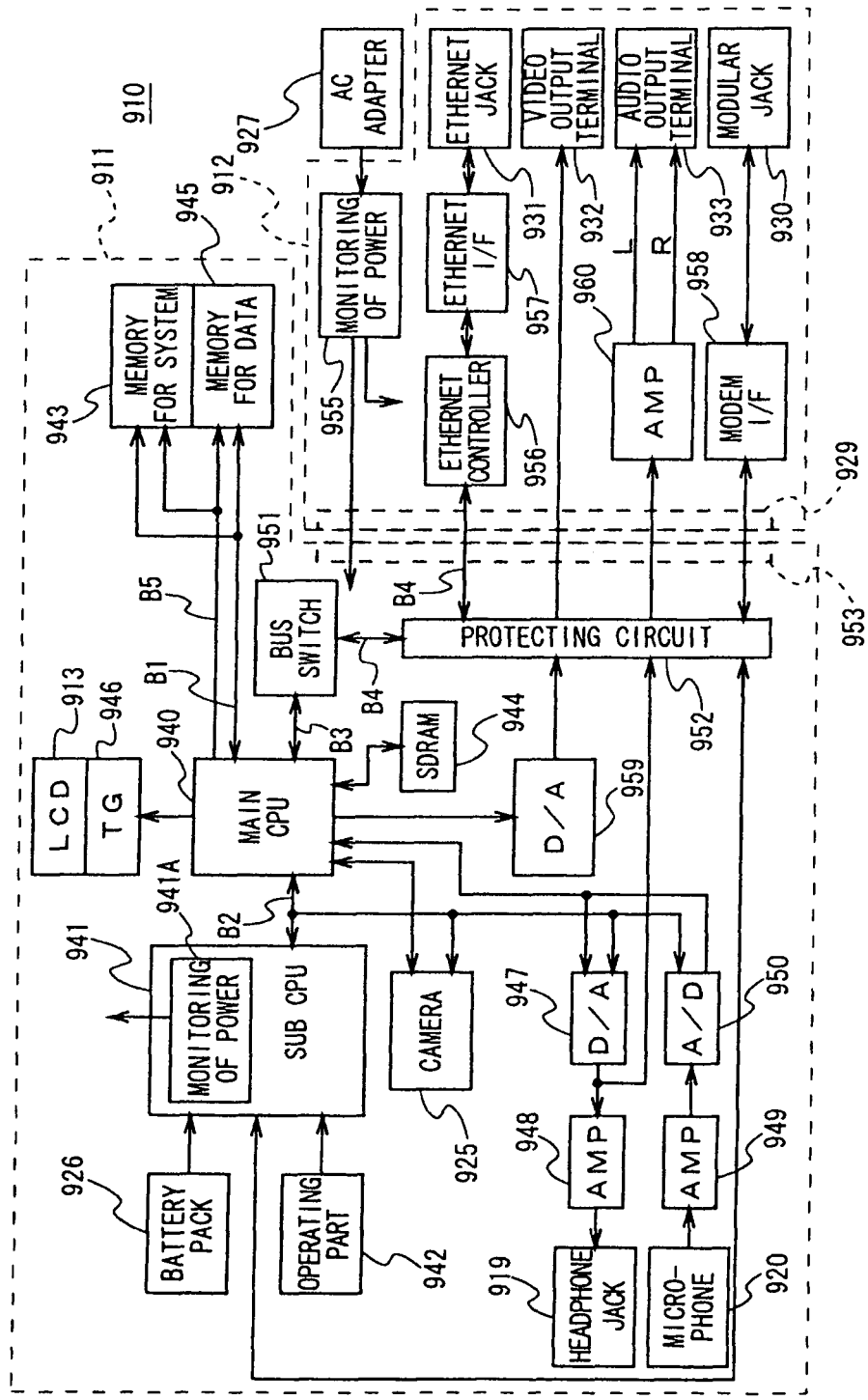
FIG. 62 is a block diagram showing the circuit construction of the portable dedicated terminal.

Here, the circuit construction of the portable dedicated terminal 910 will be described with reference to FIG. 62. First, in the terminal body 911, a main CPU 940 for integrally controlling the entire circuits in the above terminal body 911 and cradle 912 is provided.

Furthermore, in the terminal body 911, a sub CPU 941 that controls starting-up/stop of each circuit in the above terminal body 911 and also has a function as a human interface is provided.

When the power button 921 is depressed and a starting-up command is given from an operating part 942 composed of the above power button 921, the character input key group 914, the character type change key 915, the cancel key 916, the volume control dial 922, the send button 923 and the jog dial 924, the sub CPU 941 takes battery voltage supplied from the battery pack 926 in the internal power monitoring circuit 941A, converts the battery voltage into internal voltage at plural kinds of predetermined levels in the above power monitoring circuit 941A, and supplies them to corresponding circuits in the terminal body 911, to separately activate these circuits.

Then, the sub CPU 941 separately controls the starting-up/stop of each circuit in the terminal body 911 according to the content of the processing that the main CPU 940 executed. Thereby, wasteful consumption of battery voltage of the battery pack 926 can be reduced to the utmost.

When the terminal body 911 starts, the main CPU 940 reads various programs previously stored in a memory for system 943 being a flash ROM via a memory bus B1, and puts them on an SDRAM 944.

Thereby, the main CPU 940 can execute processing similar to the recording control part 81, the reproduction control part 84 and the request data generating part 86 described above with reference to FIG. 4, the request data generating part 241, the recording control part 245 and the reproduction control part 248 described above with reference to FIG. 11, the request data generating part 270 described above with reference to FIG. 25, the reproduction control part 342, the request data generating part 344 and the recording control part 347 described above with reference to FIG. 28, the operational information judging part 541, the request data generating part 542, the judging part 545, the recording control part 546 and the reproduction control part 548 described above with reference to FIG. 38, and the request data generating part 630 described above with reference to FIG. 45, according to the various programs.

Specifically, in the main CPU 940, in advance of the sale and the rental of the portable dedicated terminal 910 at the agency, content data that the customer specified for purchase and/or rental, header data added to the above content data, the customer ID issued in the customer registration, or the like, are recorded in a memory for data 945 being a flash ROM as compression-coded.

After the user buys or rents the portable dedicated terminal 910, if the customer enters a request to reproduce content data from the operating part 942 sequentially via the sub CPU 941 and an I$^2$C bus B2 being a serial bus (this is generally called SM (System Management) bus), the main CPU 940 reads reproducing operation screen data from the memory for system 943 via the memory bus B1 in response to the request, and sends the read reproducing operation screen data to a timing generator 946.

The timing generator 946 controls the display part 913 based on screen data and video data supplied from the main CPU 940 (controls the emitting timing of liquid crystal, emitting intensity, and so on, for each of plural pixels of one screen of the display part 913). Thereby, if the reproducing operation screen data is supplied from the above main CPU 940, a reproducing operation screen based on the reproducing operation screen data is displayed on the display part 913.

In this state, when content data to be reproduced and its reproducing are specified on the reproducing operation screen according to the operations of the operating part 942 and a content data specifying command and a reproducing start command are supplied from the operating part 942 to the main CPU 940 sequentially via the sub CPU 941 and the I$^2$C bus B2, the main CPU 940 reads the specified compression-coded content data (hereinafter, this is referred to as compressed content data) from the memory for data 945 via the memory bus B1.

Then, the main CPU 940 decodes the compressed content data read from the memory for data 945. In video data and audio data forming thus obtained content data, the main CPU 940 transmits the video data to the timing generator 946, and converts the audio data into an analog audio signal in a digital-to-analog converter 947 and then sends this to the headphone jack 919 via a headphone amplifier 948.

Thereby, the main CPU 940 displays the images of the content based on the video data on the display part 913 via the timing generator 946, and outputs the sound of the content based on the audio signal from headphones (not shown) connected to the headphone jack 919, so that the customer can view the content.

If a memo input command is given from the operating part 942 sequentially via the sub CPU 941 and the I$^2$C bus B2, the main CPU 940 picks up a subject by the camera 925 for a predetermined time and taking in thus obtained video data. At this time, the main CPU 940 picks up surrounding sound via the microphone 920 for the predetermined time, converts thus obtained audio signal into digital audio data sequentially via a microphone amplifier 949 and an analog-to-digital converter 950, and takes this in. The main CPU 940 compression-codes these video data and audio data as memo data, and then transmits them to the memory for data 945 via the memory bus B1 for recording.

In this connection, at this time, if a character string such as a comment on the memo is supplied as text data from the operating part 942 sequentially via the sub CPU 941 and the I²C bus B2 according to the operation of the character input key group 914, the character type change key 915 and the cancel key 916, the main CPU 940 adds the above text data to the memo data and compression-codes them, and recording it in the memory for data 945.

If a reproducing start command for the memo data is supplied from the operating part 942 sequentially via the sub CPU 941 and the I²C bus B2, the main CPU 940 performs processing similarly to the reproducing of the content data described above. Thereby, the customer can confirm the contents of the memo by the display part 913 and the headphones.

By the way, the main CPU 940 is electrically connected to a connector 953 provided on the bottom of the case sequentially via a peripheral component interconnect (PCI) bus B3, a bus switch 951, a specified bus based on the PCI standard (hereinafter, this is referred to as PCI-based bus) B4, and a protecting circuit 952.

The protecting circuit 952 has functions to protect each circuit in the terminal body 911 from the external static electricity and to prevent leakage of unnecessary radiation occurred by data (signal) processing in the terminal body 911 to the outside.

Furthermore, the protecting circuit 952 detects whether not the connector 929 of the regular cradle 912 has been connected to the connector 953, and notifies the main CPU 940 of the detection result.

The main CPU 940 controls the bus switch 951 according to the detection result given from the protecting circuit 952, so that until the connector 929 of the regular cradle 912 is connected to the connector 953, the main CPU 940 interrupts electrical connection to the protecting circuit 952, and only when the connector 929 of the regular cradle 912 has been connected to the above connector 953, the main CPU 940 electrically connects the terminal body 911 to the protecting circuit 952 via the bus switch 951.

Thereby, even if an electronic device different from the cradle 912 is erroneously connected to the connector 953 and the above connector 953 short-circuited, the main CPU 940 can protect itself from crash or the like.

Here, the cradle 912 takes power supply voltage supplied from the AC adapter 927 connected to mains power or the like in the internal power monitoring circuit 955, converts the power source voltage into the internal voltage at plural kinds of predetermined levels in the above power monitoring circuit 955, and supplies them to each corresponding circuit in the above cradle 912 to activate each of these circuits.

If the terminal body 911 is mounted on the cradle 912, the power source voltage is converted into charge voltage at a predetermined level in the power monitoring circuit 955, and the above charge voltage is supplied to the battery pack 926 from the connector 929 via the connector 953 of the terminal body 911 for charging.

If an operating request for communication is given from the operating part 942 sequentially via the sub CPU 941 and the I²C bus B2 in a state where the terminal body 911 is mounted on the cradle 912, the main CPU 940 reads communication operation screen data from the memory for system 943 via the memory bus B1 responding to that, transmits the above read communication operation screen data to the timing generator 946, to display a communication operation screen based on the communication operation screen data on the display part 913.

In this state, when the customer arbitrary selects one of the public network and the Ethernet (trademark) on the communication operation screen by operating the operating part 942 and specifies the URL (Uniform Resource Locator) of the communication party, and a command to selectively specify the communication line, the URL and a send command are given from the operating part 942 sequentially via the sub CPU 941 and the I²C bus B2 accordingly, and the main CPU 940 generates access request data to the communication party specified by the above URL.

When the Ethernet (trademark) is selected as the communication line to be used in communication, the main CPU 940 compression-codes the access request data and sends thus obtained compressed access request data from the connector 953 to the cradle 912 sequentially via a PCI bus B3, the bus switch 951, a PCI-based bus B4 and the protecting circuit 952. In the above cradle 912, the compressed access request data is sent from the Ethernet jack 931 to the communication party on the Ethernet (trademark), sequentially via the connector 929, an Ethernet controller 956 and an Ethernet interface 957.

As a result, when access confirmation data in response to the access request from the communication party is compression-coded and sent via the Ethernet (trademark), the main CPU 940 takes the above compression-coded access confirmation data (hereinafter, this is referred to as compressed access confirmation data) in the connector 953 from the Ethernet jack 931 of the cradle 912 sequentially via the Ethernet interface 957, the Ethernet controller 956 and the connector 929, and decodes the above access confirmation data from that connector 953 sequentially through the protecting circuit 952, the PCI-based bus B4, the bus switch 951 and the PCI bus B3.

Now, in the compressed access confirmation data sent from the system management server 701 that the portable dedicated terminal 910 can communicate to (that is, communication has been permitted) and the data providing server 703 at the agency, an identification code unique to the above system management server 701 and the data providing server 703 (or the agency) has been stored.

On the other hand, in the memory for data 945 in the terminal body 911, when the portable dedicated terminal 910 is sold or rented, the identification code peculiar to the communicable system management server 701 (that is, communication has been permitted) and the data providing server 703 (or the agency) has been recorded.

Therefore, when the access confirmation data is decoded and the access confirmation data is created, the main CPU 940 compares the identification code stored in the above access confirmation data to the identification code previously recorded in the memory for data 945.

As a result, if the compared identification codes coincide, the main CPU 940 determines that the specified communication party is the regular permitted communication party, and thus continues the communications. Thereby, the customer can request the transmission of content data, introduction of advertisers/companies, and so on.

On the contrary, if the compared identification codes are different or the identification code has not been stored in the access confirmation data, the main CPU 940 determines that the specified communication party is different from the permitted communication party, and then forcedly stops the communication. Thereby, it can be prevented that the communication party that is not allowed to communicate communicates with the portable dedicated terminal 910 and illegally uses content data and so on.

In this manner, the main CPU 940 can communicate only with the communication party that is previously permitted communications, via the Ethernet (trademark). As a result, if various screen data such as compression-coded advertiser/company introduction data and content selection screen data (hereinafter, these are referred to as various compressed screen data), compressed content data for advertisement and for obtaining are sent from the system management server 701 and the data providing server 703 being the regular communication party via the Ethernet (trademark), the main CPU 940 takes in these various data via the similar path to the aforementioned compressed access confirmation data, and decodes them as occasion demands.

In this connection, when the main CPU 940 takes in the various compressed screen data, the main CPU 940 decodes them, and then transmits it to the timing generator 946, to display screens based on the various screen data (screen for introducing advertisers/companies, content selection screen or the like) on the display part 913 via the timing generator 946.

While the main CPU 940 is communicating with the communication party, that has a permission of communications, via the Ethernet (trademark), if various requests such as the transmission of content are given from the operating part 942 sequentially via the sub CPU 941 and the I²C bus B2 and thereby the main CPU 940 generates request data according to that request, the main CPU 940 compression-codes the above generated request data, and sends thus obtained compressed request data to the regular communication party via the Ethernet (trademark) by the similar path to the aforementioned compressed access request data.

In this connection, in the main CPU 940, when selectively specifying desired content to obtain, the customer can enter the title of the desired content, the bar code number previously allotted to the above content, and so on, via the operating part 942 as described above.

At this time, the main CPU 940 can picks up the image of the bar code allotted to the content by the camera 925. In this case, the main CPU 940 can analyze the picked-up image of the bar code obtained from the camera 925 according to a predetermined image recognition program, so that the selectively specified content can be specified.

On the contrary, when the customer selects the public network as a communication line which is used for the communication, the main CPU 940 compression-codes the access request data, and transmits thus obtained compressed access request data as serial data, to the sub CPU 941 via the I²C bus B2.

The sub CPU 941 has a function as a UART (Universal Asynchronous Receiver Transmitter) device. The sub CPU 941 converts the compressed access request data supplied from the main CPU 940 into parallel data, and then transmits this from the connector 953 to the cradle 912 via the protecting circuit 952. In the above cradle 912, the compressed access request data is sent from the modular jack 930 to the communication party via the public network sequentially via the connector 929 and a modem interface 958.

As a result, if the compressed access confirmation data is sent from the communication party via the public network, the main CPU 940 takes this in the connector 953 from the modular jack 930 of the cradle 912 sequentially via the modem interface 958 and the connector 929, takes this in the sub CPU 941 from the connector 953 via the protecting circuit 952 to converts this into serial data, and then takes the serial data in via the I²C bus B2 to decode it.

In this manner, also when the public network is used, the main CPU 940 compares the identification code stored in the access confirmation data obtained by decoding the compressed access confirmation data, to the identification code recorded in the memory for data 945.

Only when thus compared identification codes are coincide, the main CPU 940 judges that the accessing communication party is the regular communication party having the permission of communications, and thus continues the communications using the public network.

Then, when the various compressed image data such as advertiser/company introduction data and content selection screen data and the compressed content data for advertisement and for obtaining are sent from the system management server 701 and the data providing server 703 being the above communication party in a state where the main CPU 940 is communicating with the communication party having the permission of communication, via the public network, the main CPU 940 takes these various data in the sub CPU 941 from the modular jack 930, and performs processing similar to the aforementioned case of using the Ethernet (trademark).

If various requests such as the transmission of content are given from the operating part 942 to the main CPU 940 sequentially via the sub CPU 941 and the I²C bus B2 in a state where the main CPU 940 is communicating with the communication party having the permission of communication, via the public network and thereby the main CPU 940 generates request data according to that requests, the main CPU 940 compression-codes the above generated request data, and transmits thus obtained compressed request data to the regular communication party via the public network through a path between the sub CPU 941 and the modular jack 930.

By the way, in either of the Ethernet (trademark) and the public network, for instance, when the content selection screen being a three-dimensional virtual reality space image described above with reference to FIGS. 29 to 31 is displayed on the display part 913, the main CPU 940 performs processing similarly to the aforementioned portable dedicated terminal 303 according to the sixth embodiment (FIGS. 28 to 37).

When the image of customer is moved to the specified coordinate position on the content selection screen (the image of first floor in shop and the image of second floor in shop), the main CPU 940 compression-codes specified coordinate position data representing that the above image of customer moved to the specified coordinate position, and then sends the compression-coded data to the data providing server 703 via the Ethernet (trademark) or the public network that is selected at this time.

At this time, when the data providing server 703 receives the specified coordinate position data from the portable dedicated terminal 910, the data providing server 703 compression-codes content data for advertisement (that is, commercial data) specified by the above specified coordinate position data, and sends thus obtained compressed content data to the portable dedicated terminal 910 via the Ethernet (trademark) or the public network that is the same path as the sending path of the compression-coded specified coordinate position data in streaming, according to the UDP/IP (User Datagram Protocol/Internet Protocol).

As a result, when taking in the compressed content data for advertisement sent from the data providing server 703, the main CPU 940 temporarily stores this in the SDRAM 944.

The main CPU 940 reads the compressed content data for advertisement from the SDRAM 944 and decodes this, and in video data and audio data forming the obtained content data, the main CPU 940 transmits the video data to the timing generator 946, and converts the audio data into an analog audio signal in the digital-to-analog converter 947, and then transmits the audio signal to the headphone jack 919 via the headphone amplifier 948.

Thereby, the main CPU 940 displays the image of content for advertisement based on the video data on the display part 913 by the timing generator 946, and outputs the sound of the content for advertisement based on the audio signal from the headphones connected to the headphone jack 919. Thus, the customer can view a part of the content and so on, for advertisement.

In this manner, the main CPU 940 reproduces in streaming the compressed content data for advertisement that was sent in streaming from the system management server 701 and the data providing server 703 being the regular communication party, by using the SDRAM 944 as buffer.

When desired content data is selectively specified on the content selection screen being a three-dimensional virtual reality space image displayed on the display part 913, the main CPU 940 compression-codes content specifying data representing the above selectively-specified content data, and then sends the compression-coded data to the data providing server 703 via the Ethernet (trademark) or the public network that is selected at this time.

At this time, when the data providing server 703 receives the content specifying data from the portable dedicated terminal 910, the data providing server 703 compression-codes the content data to be obtained, which is specified by the above content specifying data, and sends thus obtained compressed content data to the portable dedicated terminal 910 via the Ethernet (trademark) or the public network that is the same path as the sending path of the compression-coded content specifying data, according to the TCP/IP (Transmission Control Protocol/Internet).

When taking in the compressed content data for obtaining sent from the data providing server 7903, the main CPU 940 temporarily stores this in the SDRAM 944 as it is, and transmits this in the memory for data 945 via the memory bus B1 while using the above SDRAM 944 as a buffer for recording.

In this manner, when the main CPU 940 obtained various data such as compressed content data from the system management server 701 and the data providing server 703, the main CPU 940 uses the SDRAM 944 as a buffer. Thereby, these various data can be downloaded while preventing errors from occurring in the processing of these various data.

In addition to this, when the terminal body 911 is mounted on the cradle 912, the main CPU 940 can make the customer arbitrary select either the display part 913 and the headphone jack 919 of the terminal body 911 or an external device such as a television receiving set on the reproducing operation screen displayed on the display part 913, as the destination of reproduced content data.

When the customer selects the display part 913 and the headphone jack 919 of the terminal body 911 as the destination of the reproduced content data of the content data on the reproducing operation screen and a command to selectively specify the display part 913 and the headphone jack is given from the operating part 942 sequentially via the sub CPU 941 and the I²C bus B2 according to that (with a command to selectively specify content data and a reproducing start command), the main CPU 940 reproduces the compressed content data from the memory for data 945 and decodes the reproduced data similarly to the aforementioned case where the terminal body 911 is not mounted on the cradle 912. Thus, the customer can view the content by the display part 913 and the headphones.

On the contrary, if the customer selects the external device as the destination of reproduced content data on the reproducing operation screen and a command to selectively specify the external device is given from the operating part 942 according to that sequentially via the sub CPU 941 and the I²C bus B2 (with the command to selectively specify the content data and the reproducing start command), the main CPU 940 reads the specified compressed content data from the memory for data 945 via the memory bus B1.

The main CPU 940 decodes the compressed content data, and in video data and audio data forming thus obtained content data, the main CPU 940 converts the video data into an analog video signal in a digital-to-analog converter 959 for video, and then transmits the video signal from the connector 953 to the cradle 912 via the protecting circuit 952, and sends that video signal from the video output terminal 932 to the external device via the connector 929 in the above cradle 912.

At that time, the main CPU 940 converts the audio data forming the content data into an analog audio signal in the digital-to-analog converter 947, and then transmits the audio signal from the connector 953 to the cradle 912 via the protecting circuit 952, converts that audio signal into an analog audio signal of the left and the right two channels via a power amplifier 960 in the above cradle 912, and then sends the audio signal from the audio output terminal 933 to the external device.

Thereby, the customer can enjoy the content for example by a large screen display and a speaker with high quality sound, by using not only the terminal body 911 but also the external device.

Furthermore, when the terminal body 911 is mounted on the cradle 912, the main CPU 940 processes not only the content data but also memo data similarly to the above content data, so that the customer can confirm the contents of the memo by one of the display part 913 and the headphones of the terminal body 911 and the external device.

Note that, in this tenth embodiment, the main CPU 940 controls the memory for system 943 and the memory for data 945 via a control bus B5, and controls the digital-to-analog converter 947 and the analog-to-digital converter 950 for video and audio, via the I²C bus B2.

Furthermore, when the transmission request data for content data is generated, the main CPU 940 stores content specifying information that specifies desired content by its title, bar code and so on, whether or not the content data has been bought and/or rented, payment information on the purchase price and the rental charges for the content data (as paying method, for example, payment by credit), the customer ID, etc., in the above transmission request data.

Whenever the data providing server 703 receives the above transmission request data from the portable dedicated terminal 910, the data providing server 703 performs accounting based on customer information on the customer who is requesting for the transmission of the content (the account number of the customer), the sale price and the rental charges for the content data, and the bank account number of the agency.

As a result, the data providing server 703 generates accounting information on the sale and the rental of the content data, and sends the above generated accounting information to a settlement processing server on the Internet 707. In the above settlement-processing server, electronic settlement processing based on that accounting information is executed.

Accordingly, the portable dedicated terminal 910 enables the user to obtain content data and pay for the above content data and the rental charge for the content data at home, without going to the agency.

According to the above configuration, in this data providing system 900, the character input key group 914 having the ten-key arrangement is provided in the portable dedicated terminal 910. Thereby, the customer can selectively specify content to be obtained, by entering the bar code number previously allotted to the content with the above character input key group 914.

Furthermore, in this data providing system 900, the camera 925 is provided in the portable dedicated terminal 910. Thereby, the image of the bar code previously allotted to content can be picked up by the above camera 925, so that the customer can selectively specify the content to be obtained.

Accordingly, in this data providing system 900, when the customer selectively specifies content to be obtained in the portable dedicated terminal 910, the customer can easily and selectively specify desired content only by simply entering the number or picking up the image of the bar code by the camera 925, without entering plural characters such as the title of the above content or the like.

According to the above configuration, the portable dedicated terminal 910 provided with the character input key group 914 having the ten-key arrangement and the camera 925 for pattern recognition is used. Thereby, in the portable dedicated terminal 910, in addition to the effects obtained in the aforementioned ninth embodiment, the customer can easily and selectively specify desired content by simply entering the numerals with the character input key group 914 or only by picking up the image of the bar code by the camera 925. Thereby, a data providing system in that the portable dedicated terminal offers improved usability and is easier to use can be realized.

Note that, in the aforementioned tenth embodiment, in the portable dedicated terminal 910, the main CPU 940 of the terminal body 911 executes similar processing to the recording control part 81, the reproduction control part 84 and the request data generating part 86 described above with reference to FIG. 4, the request data generating part 241, the recording control part 245 and the reproduction control part 248 described above with reference to FIG. 11, the request data generating part 270 described above with reference to FIG. 25, the reproduction control part 342, the request data generating part 344 and the recording control part 347 described above with reference to FIG. 28, the operational information judging part 541, the request data generating part 542, the judging part 545, the recording control part 546 and the reproduction control part 548 described above with reference to FIG. 38, and the request data generating part 630 described above with reference to FIG. 45, according to the various programs previously stored in the memory for system 943. This invention, however, is not limited to this and these various processing may be executed by installing a program storage medium storing these various programs in the terminal body 911.

In this connection, such program storage medium for installing the various programs to execute the aforementioned various processing in the terminal body 911 of the portable dedicated terminal 910 to make them executable is not only limited to packaged media such as a flexible disk, a CD-ROM or a DVD, but also may be a semiconductor memory, a magnetic disk, etc., in that the various programs can be temporarily or permanently stored. Furthermore, as a means for storing the various programs in these program storage media, also a cable or a radio communication medium such as a local area network, the Internet and digital satellite broadcasting may be used, and they may be stored via various communication interfaces such as a rooter and a modem.

In the aforementioned tenth embodiment, the portable dedicated terminal 910 can communicate only with the specified communication party previously permitted communications, based on the identification code. This invention, however, is not limited to this and, after the user starts to use the portable dedicated terminal 910, the customer may newly contract with an agency or the like and obtain an identification code unique to the agency so that the user can communicate with plural agencies or the like with one portable dedicated terminal 910. Thereby, for instance, it is unnecessary to prepare a portable dedicated terminal 910 for each agency, and one portable dedicated terminal 910 can be used as a common dedicated terminal for the plural agencies and so on. Thus, the usability of the portable dedicated terminal 910 can be further improved.

In the aforementioned tenth embodiment, the terminal body 911 of the portable dedicated terminal 910 works by battery voltage supplied from the detachable battery pack 926. This invention, however, is not limited to this and the terminal body 911 of the portable dedicated terminal 910 may work by mounting an exchangeable primary battery therein, or the terminal body 911 may work either of the battery pack and the primary battery. Thereby, the customer can easily exchange the primary battery when the customer is going out, and can use the portable dedicated terminal 910 for a longer time.

Furthermore, in the aforementioned tenth embodiment, the data providing server 703 generates accounting information every time when the data providing server 703 receives content transmission request data, and electronic settlement processing based on that accounting information is executed in the settlement processing server. This invention, however, is not limited to this and the data providing server 703 or the system management server 701 may constantly and collectively generate accounting information, for example, once a month, once two weeks or the like, or may integrate accounting information generated every time when the data providing server 703 received transmission request data, and settlement processing may be executed in the settlement processing server at the constant timing.

(12) Eleventh Embodiment

Figure 63:
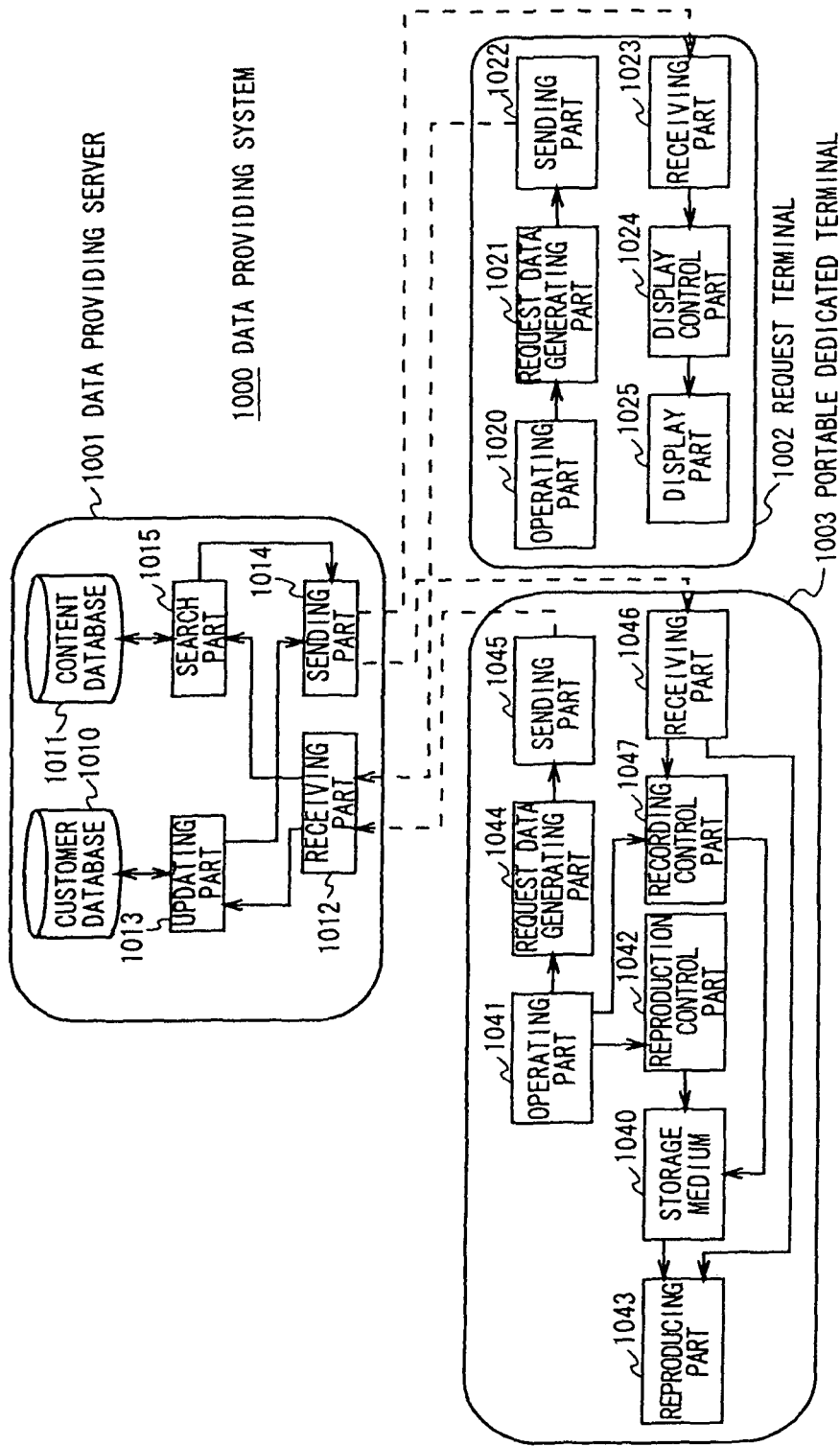
FIG. 63 is a schematic diagram showing the construction of a data providing system according to an eleventh embodiment.

FIG. 63 shows a data providing system 1000 according to an eleventh embodiment. A request terminal 1002 corresponding to the customer 3 described above with reference to FIGS. 1 to 3 (that is, the request terminal used by the customer), and a portable dedicated terminal 1003 that corresponds to the portable dedicated terminals 7A to 7N described above with reference to FIGS. 1 to 3, is only for the agencies 4A to 4N and is accessible only to a data providing server 1001 are connected to the data providing server 1001 corresponding to the agencies 4A to 4N described above with reference to FIGS. 1 to 3, via the Internet (not shown).

The data providing server 1001 has a customer database 1010 for storing customer registration information and customer registration screen data, and a content database 1011 for storing a lot of content data and content selection screen data.

When registration request data to request a customer registration is sent from the request terminal 1002, the data providing server 1001 receives this by a receiving part 1012 and takes this in the updating part 1013, reads customer registration screen data from the customer database 1010 based on the registration request data by the above updating part 1013, and sends the above read customer registration screen data from a sending part 1014 to the request terminal 1002.

As a result, when customer information that the customer entered on the customer registration screen based on the customer registration screen data is sent from the request terminal 1002, the data providing server 1001 receives this by the receiving part 1012 and takes this in the updating part 1013, issues a customer ID to the customer requesting the registration and adds this to the customer information by the above updating part 1013, and stores them in the customer database 1010 as customer registration information, so as to register the customer.

In this connection, when registering the customer by the updating part 1013, the data providing server 1001 generates registration completion data including the customer ID and sends this from the sending part 1014 to the request terminal 1002.

In this manner, the data providing server 1001 notifies the customer of the completion of the registration and the customer ID via the request terminal 1002.

When transmission request data to request the transmission of content data is sent from the request terminal 1002, the data providing server 1001 receives this by the receiving part 1012 and takes this in a search part 1015.

The data providing server 1001 reads content selection screen data from the content database 1011 based on the transmission request data by the search part 1015, and sends the above read content selection screen data from the sending part 1014 to the request terminal 1002.

As a result, when the customer enters reservation information on the content selection screen based on content selection screen data and reservation data representing the above reservation information is sent from the request terminal 1002, the data providing server 1001 receives this by the receiving part 1012 and takes this in the search part 1015.

The data providing server 1001 reads content data specified by the reservation data from the content database 1011 based on that reservation data by the search part 1015, and sends the above read content data for recording from a dedicated terminal, not shown, to a portable dedicated terminal (not shown), directly connected to the above dedicated terminal via a cable or the like, before it is delivered to the customer.

In this manner, the data providing server 1001 accepts an advance reservation of the purchase or the rental of the content data and the portable dedicated terminal 1003 from the customer, and prepares them by recording the above content data to be bought or rented in the portable dedicated terminal 1003 that will be bought or rented as well. Thus, when the customer comes to an agency having the above data providing server 1001 installed therein, that portable dedicated terminal 1003 is handed to the customer for sale or rental.

Then, when transmission request data for content data (buy or rent) is sent from the portable dedicated terminal 1003 that the customer bought or rented, via the Internet, the data providing server 1001 receives this by the receiving part 1012 and takes this in the search part 1015.

At this time, the data providing server 1001 reads the content selection screen data from the content database 1011 based on that transmission request data by the search part 1015, and sends the above read content selection screen data from the sending part 1014 to the portable dedicated terminal 1003 of the customer.

As a result, when content data specifying information is entered on the content selection screen based on the content selection screen data and content specifying data representing the above specifying information is sent from the portable dedicated terminal 1003, the data providing server 1001 receives this by the receiving part 1012 and takes this in the search part 1015.

The data providing server 1001 reads the specified content data from the content database 1011 based on that content specifying data by the search part 1015, and sends the above read content data from the sending part 1014 to the portable dedicated terminal 1003 according to the TCP/IP (Transmission Control Protocol/Internet Protocol) for recording therein.

In this manner, the data providing server 1001 can sell and rent desired content data to the customer using the portable dedicated terminal 1003.

On the other hand, if the customer enters a customer registration request via an operating part 1020, the request terminal 1002 generates registration request data representing the registration request by a request data generating part 1021, and sends this from a sending part 1022 to the data providing server 1001.

As a result, when the request terminal 1002 receives customer registration screen data from the data providing server 1001 by a receiving part 1023, the request terminal 1002 sends this from a display control part 1024 to a display part 1025 to display a customer registration screen based on that customer registration screen data on the above display part 1025.

Then, when the customer enters customer information on the customer registration screen by operating the operating part 1020, the request terminal 1002 generates customer information data by the request data generating part 1021, and sends this from the sending part 1022 to the data providing server 1001 and makes the data providing server 1001 execute the customer registration.

In this connection, when registration completion data is sent from the data providing server 1001 as the result of the customer registration, the request terminal 1002 receives this by the receiving part 1023, and then transmits this from the display control part 1024 to the display part 1025 to notify the customer of the completion of customer registration and the customer ID via the above display part 1025.

Furthermore, when the customer enters content data transmission request via the operating part 1020, the request terminal 1002 generates transmission request data representing that transmission request by the request data generating part 1021, and sends the above generated transmission request data from the sending part 1022 to the data providing server 1001.

As a result, when the request terminal 1002 receives content selection screen data from the data providing server 1001 by the receiving part 1023, the request terminal 1002 transmits this from the display control part 1024 to the display part 1025, to display a content selection screen based on the content selection screen data on the above display part 1025.

Then, when the customer enters reservation information on the content selection screen by operating the operating part 1020, the request terminal 1002 generates reservation data by the request data generating part 1021, and sends this from the sending part 1022 to the data providing server 1001. Thereby, the customer finishes the advance reservation for the purchase or the rental of the content data and the portable dedicated terminal 1003.

By the way, if a reproduction command is entered via an operating part 1041, the portable dedicated terminal 1003 sold or rented to the customer in the state where the content data has been recorded in the internal recording medium 1040 reproduces the content data that the customer previously bought or rented from the recording medium 1040 by a reproduction control part 1042, and transmits the above reproduced content data to a reproducing part 1043 that is composed of a display control part, a display part, a speaker, etc, so that the customer can enjoy the content.

When the customer enters a content data transmission request via the operating part 1041, the portable dedicated terminal 1003 generates transmission request data representing that transmission request by a request data generating part 1044, and sends this from a sending part 1045 to the data providing server 1001.

As a result, when the portable dedicated terminal 1003 receives the content selection screen data from the data providing server 1001 by a receiving part 1046, the portable dedicated terminal 1003 transmits this to the reproducing part 1043 to display a content selection screen based on the content selection screen data.

Then, when content specifying information is entered on the content selection screen according to the operations of the operating part 1041, the portable dedicated terminal 1003 generates content specifying data representing that specifying information by the request data generating part 1044, and sends this from the sending part 1045 to the data providing server 1001.

Thereby, the portable dedicated terminal 1003 receives the content data from the data providing server 1001 by the receiving part 1046, and records this on the recording medium 1040 by a recording control part 1047.

In this manner, the portable dedicated terminal 1003 can obtain (buy or rent) the content data from the data providing server 1001 via the Internet, and can reproduce this from the recording medium 1040 similarly to the aforementioned content data obtained by the advance reservation.

By the way, when creating the content database 1011 by obtaining a lot of content data from a content server (not shown) that is a provider of the content data and corresponds to the system management site described above with reference to FIGS. 1 to 3, the data providing server 1001 obtains a specified development tool to form a content selection screen from the above content server.

The data providing server 1001 represents the inside of an agency by three-dimensional images (hereinafter, these are especially referred to as three-dimensional virtual reality space images) with that development tool to generate content selection screen data by that the customer can select content data as if the customer practically walks around in the shop of the agency and selects packaged media from a shelf by the above three-dimensional virtual reality space images, and stores the above generated content selection screen data in the content database 1011.

In this connection, the data providing server 1001 generates the content selection screen data by almost faithfully reproducing shelves in the shop of the agency, checkout counters, the position of stairs, the arrangement of packaged media in the above shelves, and the like, by the three-dimensional virtual reality space images.

In the data providing server 1001, the same content data as the content data in a lot of packaged media that are practically sold and rented at the agency have been stored in the content database 1011, corresponding to the three-dimensional virtual reality space images forming the content selection screen data.

Furthermore, the data providing server 1001 updates the content selection screen data constantly or at arbitrary timing, by synchronizing with the time when new packaged media are put on the shelves in the agency (that is, it is also the time when new content data are obtained from the content server), the time when the inside of the agency is remodeled, or the like.

Thereby, the data providing server 1001 provides the customer selecting content data on the content selection screen with the feeling as if the customer is practically selecting packaged media in the shop of the agency.

Figure 64:
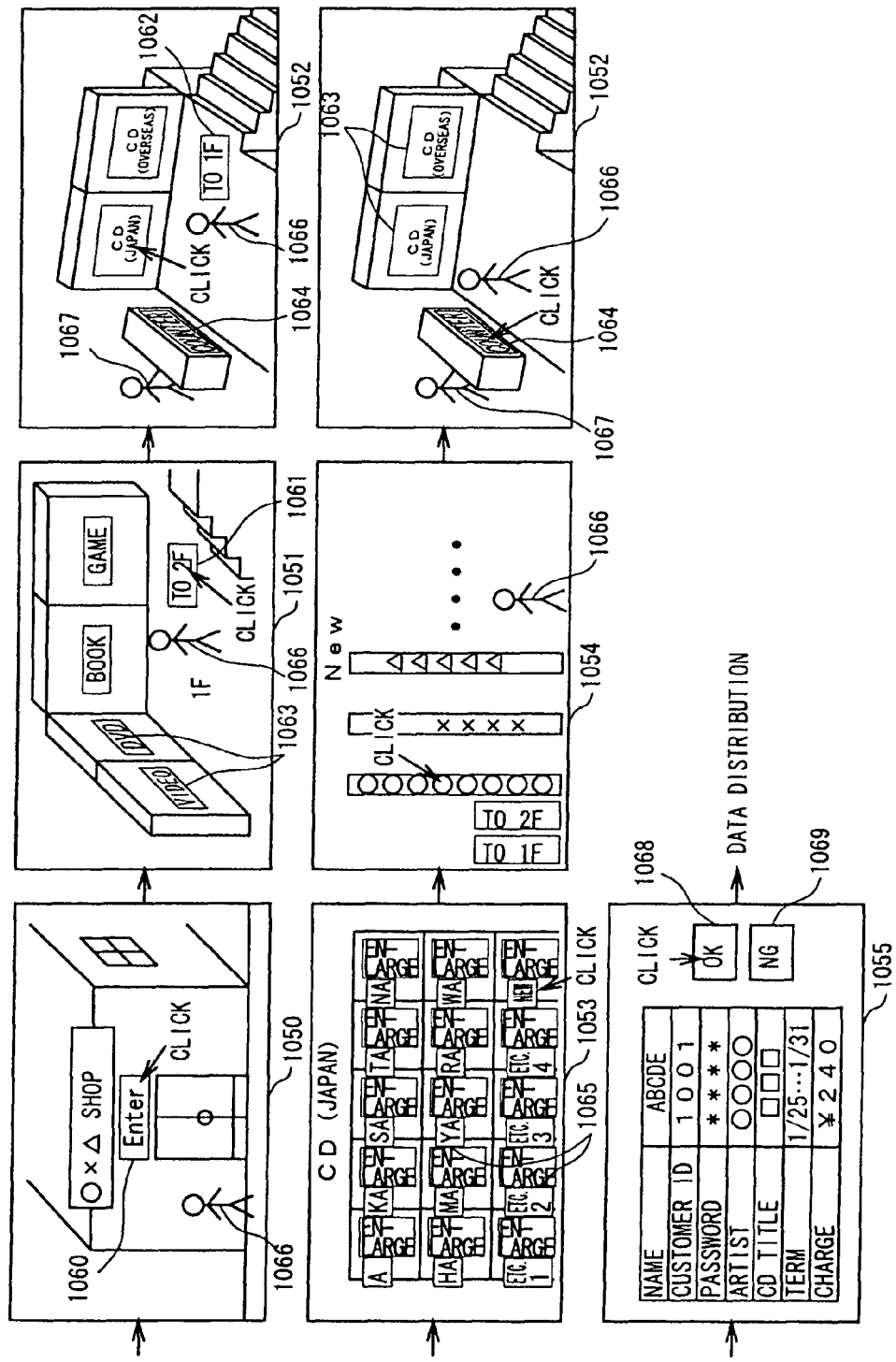
FIG. 64 is a schematic diagram showing the construction of content selection screens using three-dimensional virtual reality space image.

Practically, as shown in FIG. 64, the content selection screen data is composed of plural image data in that a selection confirmation image 1055 being a two-dimensional image used to confirm content data that the customer selected is added to the three-dimensional virtual reality space images such as an image of exterior of shop 1050 representing the exterior (entrance) of the agency, an image of first floor 1051 and an image of second floor 1052 representing each floor of the shop, an image of shelf 1053 represented by enlarging a plurality of shelves having packaged media arranged thereon for each genre in the shop, and a content selection image 1054 that shows the enlarged backbones of the packaged media on a shelf so that the customer can select content data.

In this case, in the image of exterior of shop 1050, an entering button 1060 to enter the shop and switch the display to the image of first floor 1051 is provided.

In the image of first floor 1051 and the image of second floor 1052, movement buttons 1061 and 1062 to switch the display to the image of second floor 1052 or the image of first floor 1051 being the other floor, a shelf selection button 1063 to select a shelf for each genre located in the image of first floor 1051 and the image of second floor 1052 and to switch the display to the image of shelf 1053, and a checkout counter button 1064 to switch the display to the selection confirmation image 1055 after the customer selects the content data to buy or rent, are provided.

In the image of shelf 1053, a detail button 1065 in that packaged media are classified by the Japanese alphabet to switch the display to the content selection image 1054 by the above classified packaged media, is provided.

In the image of exterior of shop 1050, the image of first floor in shop 1051, the image of second floor in shop 1052 and the content selection image 1054, the image of a human being representing the customer (hereinafter, this is referred to as customer's image) 1066 and the image of a human being representing a clerk (hereinafter, this is referred to as clerk's image) 1067 are displayed. By moving the above customer's image 1066 as if it is actually walking in the shop and by overlapping it on the entering button 1060, the movement buttons 1061 and 1062, the shelf selection button 1063, the checkout counter button 1064, the backbone of packaged media in the content selection image 1054, etc. or approximating it to them and selectively specifying (clicking) any of these buttons, the customer can enter image specifying commands previously allocated to the above buttons.

In addition to this, in the image of shelf in shop 1053 and the selection confirmation image 1055, a cursor to be inversely displayed on the detail button 1065, a confirmation button 1068, a cancel button 1069, etc. (not shown) by respectively overlapping are displayed. By moving the above cursor and selectively specifying (clicking) any of these buttons, the customer can enter commands allocated to the above buttons.

Specifically, the portable dedicated terminal 1003 that has received content selection image data first displays the image of exterior of shop 1050 of the content selection screen by the reproducing part 1043. If the customer moves the customer's image 1066 in the image of exterior of shop 1050 by operating the operating part 1041 and selectively specifying the entering button 1060, the portable dedicated terminal 1003 displays the image of first floor in shop 1051 instead of the image of exterior of shop 1050.

If the customer moves the customer's image 1066 in the image of first floor in shop 1051 by operating the operating part 1041 and selectively specifying the movement button 1061, the portable dedicated terminal 1003 displays the image of first floor in shop 1051 instead of the above image of first floor in shop 1051.

In this manner, if the customer moves the customer's image 1066 in the image of first floor in shop 1051 or the image of second floor in shop 1052 by operating the operating part 1041 and selectively specifies one of the shelf selection buttons 1063, the portable dedicated terminal 1003 displays the image of shelf in shop 1053 corresponding to the above selectively-specified shelf selection button 1063 instead of the image of first floor in shop 1051 or the image of second floor in shop 1052.

If the customer moves the cursor on the image of shelf 1053 and selectively specifies one of the detail buttons 1065 by operating the operating part 1041, the portable dedicated terminal 1003 displays a content selection image 1054 corresponding to the button instead of the above image of shelf 1053.

After the customer moves the customer's image 1066 in the content selection image 1054 and selectively specified content data as one of packaged media by operating the operating part 1041, if the customer selectively specifies the movement button 1061 or 1062, the portable dedicated terminal 1003 displays the image of first floor in shop 1051 or the image of second floor in shop 1052 again instead of the above content selection image 1054.

In this manner, for instance, after the customer selectively specifies the desired content data, if the customer moves the customer's image 1066 in the image of second floor in shop 1052 and selectively specifies the checkout counter button 1064, the portable dedicated terminal 1003 displays the selection confirmation image 1055 instead of the above image of second floor in shop 1052.

Now, in the selection confirmation image 1055, the title of the content data that the customer selected, customer's name, customer ID, password, etc. are displayed. By moving the cursor by operating the operating part 1041, the customer can enter the rental term or the purchase of the content data. If the customer enters the above rental term or the purchase, the portable dedicated terminal 1003 displays a charge for the rental or the purchase of the content data accordingly.

If the customer moves the cursor on the selection confirmation image 1055 and selectively specifies the confirmation button 1068 by operating the operating part 1041, the portable dedicated terminal 1003 generates content specifying data by the request data generating part 1044 by using information in the selection confirmation image 1055 as specifying information, and sends the above generated content specifying data from the sending part 1045 to the data providing server 1001. Thereby, the customer can obtain the content data that the customer specified.

On the contrary, if the customer moves the cursor on the selection confirmation image 1055 and selectively specifies the cancel button 1069 by operating the operating part 1041, the portable dedicated terminal 1003 displays, for example, the image of first floor in shop 1051 instead of the above selection confirmation image 1055. Thereby, the customer can select content data again.

In this connection, the data quantity of such content selection screen data is relatively large. Therefore, when the data providing server 1001 receives transmission request data from the portable dedicated terminal 1003, the data providing server 1001 first sends the data of the image of exterior of shop 1050 to the above portable dedicated terminal 1003 as content selection screen data. Then, when the customer selectively specifies the entering button 1060 on the above image of exterior of shop 1050, the data providing server 1001 receives that notification and sending the data of the image of first floor in shop 1051 to the portable dedicated terminal 1003. In this manner, the data providing server 1001 receives a notification and sends corresponding image data to the portable dedicated terminal 1003, every time when the switching of the display to another image is specified from the portable dedicated terminal 1003 by the entering button 1060, the movement buttons 1061 and 1062, etc., on each image forming the content selection screen data.

In addition to this, as shown in FIGS. 65(A) and 65(B), in the image of first floor 1051 and the image of second floor 1052, an advertisement view area 1080 is respectively set in front of the shelves by genre as the customer cannot see this on the image.

Furthermore, in the advertisement view area 1080 in front of each shelf, one item of content data selected by the agency for each genre for its advertisement (that is, the agency recommends) is allocated to the corresponding shelf.

When the customer moves the customer's image 1066 in the image of first floor 1051 or the image of second floor 1052 to the advertisement view area 1080 in front of each shelf by operating the operating part 1041, the portable dedicated terminal 1003 generates genre advertisement request data representing the advertisement view area 1080 including the above customer's image 1066 by the request data generating part 1044, and sends this from the sending part 1045 to the data providing server 1001.

At this time, the data providing server 1001 receives the genre advertisement request data from the portable dedicated terminal 1003 by the receiving part 1012, and takes this in the search part 1015.

The data providing server 1001 reads a predetermined part of content data (a part reproducible only for few seconds) that has been allocated to the advertisement view area 1080 and that is represented by that genre advertisement request data as commercial data by the retrieving part 1015, and sends this from the sending part 1014 to the portable dedicated terminal 1003 in streaming according to the UDP/IP (User Datagram Protocol/Internet Protocol).

The portable dedicated terminal 1003 receives the commercial data from the data providing server 1001 by the receiving part 1046, transmits this to the reproducing part 1043, temporarily records this on a specified recording medium for buffer provided in the above reproducing part 1043, and reproduces the commercial data from that recording medium and outputs the reproduced commercial data to a display part and a speaker.

When the customer moves the customer's image 1066 to in front of the shelf of each genre in the image of first floor 1051 or the image of second floor 1052, the portable dedicated terminal 1003 reproduces, in streaming, content that belong to the genre allocated to the above shelf for several seconds. Thus, the customer views the content that the agency recommends.

Here, when the portable dedicated terminal 1003 obtains video such as a movie based on the commercial data (hereinafter, this is referred to as commercial video), the portable dedicated terminal 1003 displays that commercial video by overlapping this on a part of the image of first floor 1051 or the image of second floor 1052 by the reproducing part 1043.

At this time, the customer can move the customer's image 1066 in the image of first floor 1051 and the image of second floor 1052. Before the display of the previously-set commercial video for several seconds is finished, if the customer gets out the customer's image 1066 from the above advertisement view area 1080, the portable dedicated terminal 1003 finishes the above display of the commercial video at that time.

In this connection, also when the portable dedicated terminal 1003 obtains sound based on the commercial data (hereinafter, this is referred to as commercial sound), the customer can move the customer's image 1066 in the image of first floor 1051 and the image of second floor 1052. Before the output of the preset commercial sound for several seconds is finished, if the customer gets out the customer's image 1066 from the advertisement view area 1080, the portable dedicated terminal 1003 finishes the above output of the commercial sound at that time.

In the portable dedicated terminal 1003, the customer who hopes the viewing of content by genre makes the customer's image 1066 stay within the advertisement view area 1080 in the image of first floor 1051 and the image of second floor 1052 by operating the operating part 1041. Thereby, the customer can view the above content for preset several seconds.

On the contrary, in the portable dedicated terminal 1003, if the customer who does not hope the viewing of the content by genre moves the customer's image 1066 in the image of first floor 1051 and the image of second floor 1052 by detouring the advertisement view area 1080 by operating the operating part 1041, the customer can avoid the view of the above content. Furthermore, even if the customer makes the customer's image 1066 enter the advertisement view area 1080, the portable dedicated terminal 1003 make the above customer's image 1066 speedily get out of the advertisement view area 1080. Thereby, the customer can avoid the view of the above content.

Figure 66:
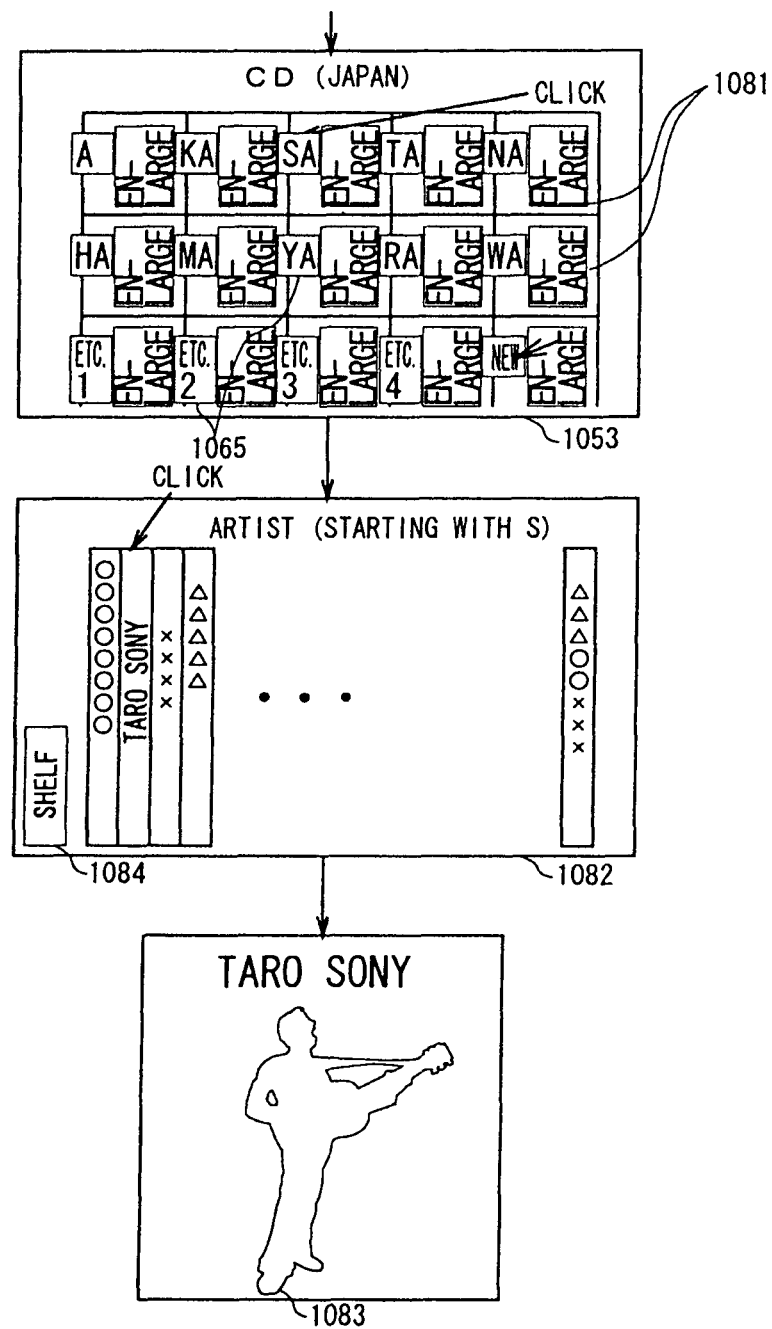
FIG. 66 is a schematic diagram for explaining the reproduction of commercial data for each artist on a content selection screen.

As shown in FIG. 66, in the image of shelf 1053, an enlarging button 1081 is provided for each frame by that packaged media have been classified by the Japanese alphabet.

If the customer moves the cursor on the image of shelf 1053 by operating the operating part 1041 and selectively specifies (clicks) one of the enlarging buttons 1081, the portable dedicated terminal 1003 takes in a commercial content specifying image 1082 that forms a content selection screen and corresponds to the selectively-specified enlarging button 1081 from the data providing server 1001, and displays this instead of the image of shelf 1053.

In this case, the commercial content specifying image 1082 displays, for example, a list of the names of artists classified by the Japanese alphabet, and a cursor to inversely display the letters of the name of an artist (not shown). One item of content data such as a new song or a hit song that the agency selected for its advertisement for each artist (that is, the agency recommends) is allocated to the name of each artist.

Therefore, when the customer moves the cursor on the commercial content specifying image 1082 and selectively specifies the name of an artist of that the advertisement is hoped by operating the operating part 1041, the portable dedicated terminal 1003 generates individual advertisement request data representing the above selectively-specified artist's name by the request data generating part 1044, and sends this from the sending part 1045 to the data providing server 1001.

At this time, the data providing server 1001 receives the individual advertisement request data from the portable dedicated terminal 1003 by the receiving part 1012, and takes this in the search part 1015.

The data providing server 1001 reads a predetermined part of the content data (a part reproducible only for several seconds) allocated to the artist's name represented by that individual advertisement request data as commercial data by the search part 1015, and sends the above read commercial data in streaming from the sending part 1014 to the portable dedicated terminal 1003 according to the UDP/IP.

The portable dedicated terminal 1003 receives the commercial data from the data providing server 1001 by the receiving part 1046 and transmits this to the reproducing part 1043, temporarily records this on the recording medium for buffering the above reproducing part 1043, and reproduces the commercial data from that recording medium and outputs this to the display part and the speaker.

Thereby, the portable dedicated terminal 1003 displays video for advertisement 1083 based on the commercial data reproduced in streaming (for example, music video) for several seconds, instead of the commercial content specifying image 1082, and also outputs music for advertisement based on the above commercial data for the same time as the video for advertisement. Thus, the customer views the new song, the hit song, etc., of the desired artist, that the agency recommends.

In this connection, when the display of the video for advertisement is finished, the portable dedicated terminal 1003 displays the commercial content specifying image 1082 again by the reproducing part 1043.

In this commercial content specifying image 1082, a shelf button 1084 is provided.

When the customer moves the cursor on the commercial content specifying image 1082 and selectively specifies a shelf button 1084 by operating the operating part 1041, the portable dedicated terminal 1003 displays the image of shelf 1053 corresponding to the button, instead of the above commercial content specifying image 1082.

Thereby, the customer can selectively specify an artist of which the advertisement the customer wants to view again, with the portable dedicated terminal 1003, after the customer practically views the new song, the hit song, etc., of the above selectively-specified the artist, the customer can selectively specify the content data for purchase or for rental.

In this manner, in the portable dedicated terminal 1003, when the customer moves the customer's image 1066 within the image of first floor 1051 and the image of second floor 1052 represented by the three-dimensional virtual reality space, the customer can obtain a predetermined part of the content data of a movie, a book, a game, etc, as commercial data, and can view these movie, book, game, etc., for several seconds, similarly to the aforementioned case where the customer views a part of the new song and the hit song of the artist.

Note that, in the eleventh embodiment as described above, the data providing server 1001 divides the content selection screen data into each image data and sequentially sends them to the portable dedicated terminal 1003, and also sends the commercial data in the streaming form. Thereby, the capacity of the recording medium 1040 in the above portable dedicated terminal 1003 can be prevented from becoming large.

When the portable dedicated terminal 1003 takes in the commercial data, the portable dedicated terminal 1003 starts the reproducing of the video for advertisement and the sound for advertisement based on the above commercial data by performing fade-in processing, and finishes the reproducing by performing fade-out processing.

Therefore, in the portable dedicated terminal 1003, the content that the agency recommends can be shown to the customer softly with the eyes and the ears of the above customer, without suddenly emitting it at a large volume and with high brightness. At the same time, when the customer moved the customer's image 1066 in the image of first floor 1051 and the image of second floor 1052 over a plurality of advertisement view areas 1080, the above content that the agency recommends can be shown to the customer according to that, by clearly showing partitions among the successively-reproduced video for advertisement and the music for advertisement.

In this connection, when reproducing the commercial data in streaming, the portable dedicated terminal 1003 monitors the position of the customer's image 1066 in the image of first floor 1051 and the image of second floor 1052, and performs fade-in processing and fade-out processing to the video for advertisement and the sound for advertisement by a predetermined software for video/audio processing according to the above monitored result and the data quantity of the commercial data.

In the portable dedicated terminal 1003, the fade-in processing and the fade-out processing of video for advertisement and of sound for advertisement can be easily executed by using such software for vide/audio processing.

Furthermore, also when the data providing server 1001 receives transmission request data from the request terminal 1002, the data providing server 1001 sends content selection screen data composed of the data of each image described above with reference to FIGS. 64 and 66 to the above request terminal 1002.

Thereby, in the data providing server 1001, also when the customer reserves in advance the purchase or the rental of content data with the request terminal 1002, content that the agency recommends can be shown to the customer.

Figure 67:
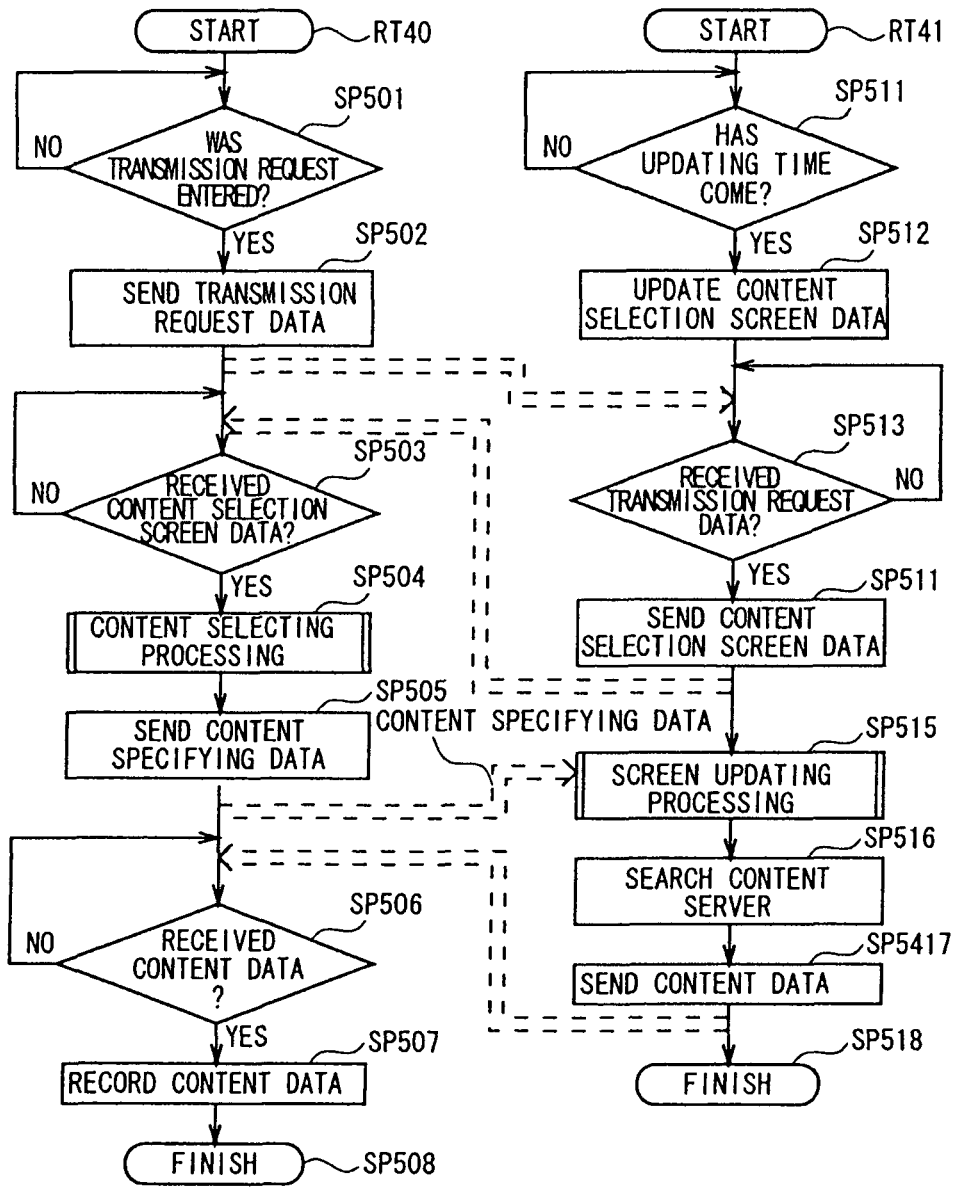
FIG. 67 is a flowchart showing a content providing processing procedure using content selection screen data in a data providing system.

Now, a content providing processing procedure using the content selection screen data by the data providing server 1001 and the portable dedicated terminal 1003 in the data providing system 1000 will be collectively described. As shown in FIG. 67(A), first, the portable dedicated terminal 1003 enters routine RT40 from the starting step, and proceeds to step SP501.

In step SP501, the portable dedicated terminal 1003 waits for the customer to enter a transmission request by operating the operating part 1041. When the above transmission request is entered, the portable dedicated terminal 1003 proceeds to step SP502.

In step SP502, the portable dedicated terminal 1003 generates transmission request data by the request data generating part 1044 and sends this from the sending part 1045 to the data providing server 1001, and proceeds to step SP503.

Now, as shown in FIG. 67(B), the data providing server 1001 enters routine RT41 from the starting step, and proceeds to step SP511. In step SP511, the data providing server 1001 waits the time to update content selection screen data. When the update time comes, the data providing server 1001 proceeds to step SP512 to update the content selection screen data, and proceeds to step SP513.

In step SP513, the data providing server 1001 wait for transmission request data to be sent from the portable dedicated terminal 1003. When the data providing server 1001 receives the transmission request data by the receiving part 1012, the data providing server 1001 proceeds to step SP514 to read the content selection screen data from the content database 1011 by the search part 1015 and sends this from the sending part 1014 to the portable dedicated terminal 1003, and proceeds to step SP515.

At this time, in step SP503, the portable dedicated terminal 1003 waits for content selection screen data to be sent from the data providing server 1001. When the portable dedicated terminal 1003 receives the content selection screen data by the receiving part 1046, the portable dedicated terminal 1003 transmits that content selection screen data to the reproducing part 1043 to display the image of exterior of shop 1050 being the content selection screen, and then proceeds to step SP504.

In step SP504, the portable dedicated terminal 1003 starts a subroutine described later. When specifying information is entered on each image forming the content selection screen by customer's operations of the operating part 1041, the portable dedicated terminal 1003 proceeds to step SP505.

In step SP505, the portable dedicated terminal 1003 generates content specifying data by the request data generating part 1044 and sends this from the sending part 1045 to the data providing server 1001, and proceeds to step SP506.

At this time, in step SP515, the data providing server 1001 starts a subroutine described later. The data providing server 1001 properly reads each image data forming content selection screen data and commercial data from the content database 1011 by the search part 1015, and sends this from the sending part 1014 to the portable dedicated terminal 1003. Then, when the data providing server 1001 receives content specifying data from the above portable dedicated terminal 1003, the data providing server 1001 proceeds to step SP516.

In step SP516, the data providing server 1001 searches the content database 1011 based on the content specifying data by the search part 1015 to read the specified content data, and proceeds to step SP517.

In step SP517, the data providing server 1001 sends the content data read from the content database 1011, from the sending part 1014 to the portable dedicated terminal 1003, and then proceeds to step SP518 to finish the above processing by the data providing server 1001.

On the other hand, in step SP506, the portable dedicated terminal 1003 wait for the content data to be sent from the data providing server 1001. When the portable dedicated terminal 1003 receives the above content data, the portable dedicated terminal 1003 proceeds to step SP507 to record that content data on the recording medium 1040 by the recording control part 1047. Then, the portable dedicated terminal 1003 proceeds to step SP508 to finish the above processing by the portable dedicated terminal 1003.

Thus, the data providing server 1001 finishes all the content providing processing procedure with the content selection screen data.

Figure 68:
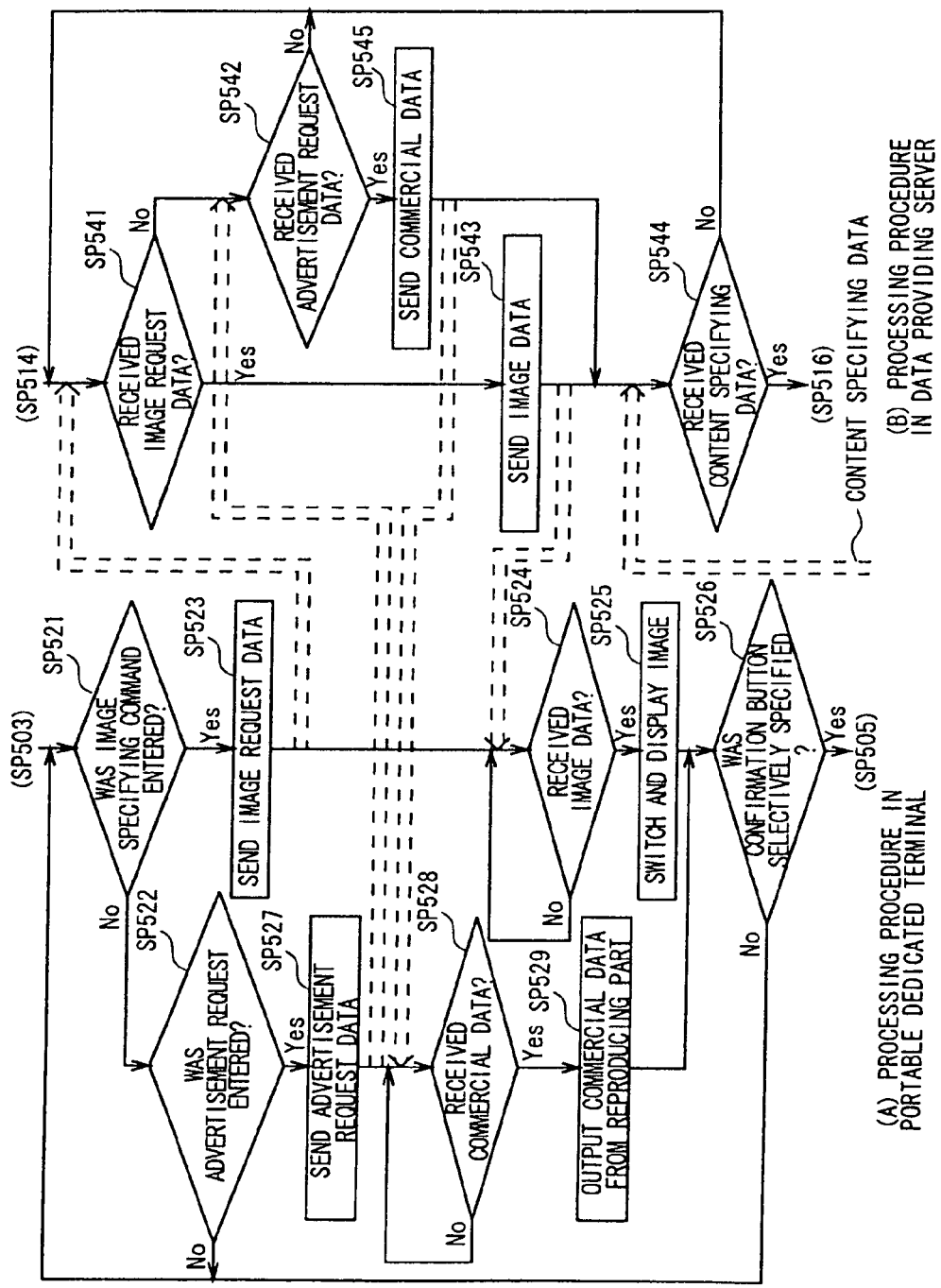
FIG. 68 is a flowchart showing the subroutine of the content providing processing procedure in the data providing system.

In this connection, as shown in FIG. 68(A), the portable dedicated terminal 1003 starts a subroutine in step SP504 and enters step SP521. In the above step SP521 and the next step SP522, the portable dedicated terminal 1003 wait for an image specifying command to be entered on each image such as the image of exterior of shop 1050, forming the content selection screen displayed by the reproducing part 1043, described above with reference to FIGS. 64 and 66 according to the operation of the operating part 1041 (that is, that the entry-to-shop button 1060 or the like is selectively specified), and that an advertisement request is entered on the above image (the image of first floor in shop 1051 etc.).

In step SP521, when the customer moves the customer's image 1066 and selectively specifies the entry-to-shop button 1060 or the like in the image of exterior of shop 1050 or the like and enters the image specifying command by operating the operating part 1041, the portable dedicated terminal 1003 proceeds to step SP523 to generate image request data representing an image specifying command that has been previously allocated to the above selectively-specified button by the request data generating part 1044, and sends this from the sending part 1045 to the data providing server 1001, and proceeds to step SP524.

At this time, as shown in FIG. 68(B), the data providing server 1001 starts a subroutine in step SP515 and enters step SP541. In the above step SP541 and the next step SP542, the data providing server 1001 awaits that image request data, advertisement-by-genre request data or individual advertisement request data are sent from the portable dedicated terminal 1003. In that step SP541, when the data providing server 1001 receives the image request data from the portable dedicated terminal 1003 by the receiving part 1012, it proceeds to step SP543.

In step SP543, the data providing server 1001 searches the content database 1011 based on the image request data by the search part 1015 and reads the specified image data, and sends this from the sending part 1014 to the portable dedicated terminal 1003, and proceeds to step SP544.

At this time, in step SP524, the portable dedicated terminal 1003 waits for the image data to be sent from the data providing server 1001. When the portable dedicated terminal 1003 receives the image data by the receiving part 1046, the portable dedicated terminal 1003 proceeds to step SP525.

In step SP525, the portable dedicated terminal 1003 transmits the received image data to the reproducing part 1043 to display a new image based on the received image data instead of the image of the content selection screen being displayed at present. Then, the portable dedicated terminal 1003 proceeds to step SP526 to determine whether or not the confirmation button 1068 was selectively specified on the selection confirmation image 1055.

Obtaining a negative result in this step SP526 means that the selection confirmation image 1055 has not been displayed yet by the reproducing part 1043 or that although the above selection confirmation image 1055 has been displayed, the confirmation button 1068 has not been selectively specified because it is in the middle of entering to specify the purchase or the rental of the content data. At this time, the portable dedicated terminal 1003 returns to step SP521.

In step SP522, if the customer moves the customer's image 1066 to the advertisement view area 1080 in the image of first floor in shop 1051 or the image of second floor by operating the operating part 1041, the portable dedicated terminal 1003 proceeds to step SP527 to generate advertisement-by-genre request data representing the advertisement view area 1080 that the customer's image 1066 entered by the request data generating part 1044, and sends this from the sending part 1045 to the data providing server 1001, and proceeds to step SP528.

Furthermore, in step SP522, also when the customer selectively specifies the name of an artist, the title of content or the like, that the customer wants to see the advertisement, on the commercial content specifying image 1082 by operating the operating part 1041, the portable dedicated terminal 1003 generates individual advertisement request data representing the above selectively-specified name of the artist, the title of the content or the like by the request data generating part 1044, and sends this from the sending part 1045 to the data providing server 1001, and then proceeds to step SP528.

At this time, in step SP542, the data providing server 1001 waits that the advertisement-by-genre request data or the individual advertisement request data to be sent from the portable dedicated terminal 1003. When the data providing server 1001 receives the advertisement-by-genre request data or the individual advertisement request data by the receiving part 1012, the data providing server 1001 proceeds to step SP545.

In step SP545, the data providing server 1001 searches the content database 1011 based on the advertisement-by-genre request data or the individual advertisement request data by the search part 1015 to read thus specified commercial data, and sends this from the sending part 1014 to the portable dedicated terminal 1003, and then proceeds to step SP544.

In step SP544, the data providing server 1001 determines whether or not the data providing server 1001 received content specifying data from the portable dedicated terminal 1003, and sequentially repeats the processing loop of steps SP541-SP542-SP543-SP544-SP545 until receiving the content specifying data, and sends the image data and the commercial data according to the image request data, the advertisement-by-genre request data and the individual advertisement request data sent from the portable dedicated terminal 1003.

Then, in step SP544, when the data providing server 1001 receives the content specifying data, the data providing server 1001 leaves this subroutine and proceeds to step SP516 in the processing procedure in the data providing server 1001 described above with reference to FIG. 67(B).

On the other hand, in step SP528, the portable dedicated terminal 1003 waits for commercial data to be sent from the data providing server 1001. When the portable dedicated terminal 1003 receives the commercial data by the receiving part 1046, the portable dedicated terminal 1003 proceeds to step SP529 to transmit that commercial data to the reproducing part 1043. Thus, the customer views a part of content based on the commercial data and the above content is advertised to the customer. Then, the portable dedicated terminal 1003 proceeds to step SP526.

Until obtaining an affirmative result in step SP526, the portable dedicated terminal 1003 returns to step SP521 and sequentially repeats the processing loop of the above steps SP521-SP522-SP523-SP524-SP525-SP526-SP527-SP528-

SP529. Thus, the portable dedicated terminal 1003 makes the customer select desired content data by displaying each image of the content selection screen while properly switching the display with mixing the advertisement of content by the reproducing part 1043.

Then, in step SP526, when confirming that the confirmation button 1068 has been selectively specified on the selection confirmation image 1055 of the content selection screen, the portable dedicated terminal 1003 leaves this subroutine and proceeds to step SP505 of the processing procedure in the portable dedicated terminal 1003 described above with reference to FIG. 67(A).

According to the above configuration, in this data providing system 1000, when the data providing server 1001 receives transmission request data from the portable dedicated terminal 1003, the data providing server 1001 sends content selection screen data having three-dimensional virtual reality space images that reproduce the inside of the shop of the agency as graphic images to the above portable dedicated terminal 1003 responding to that.

In this data providing system 1000, if the customer moves the customer's image 1066 to the advertisement view area 1080 in the image of first floor 1051 or the image of second floor 1052 based on the content selection screen data by operating the operating part 1041, the portable dedicated terminal 1003 sends advertisement-by-genre request data to the data providing server 1001.

As a result, in this data providing system 1000, a specified part of content data allocated to the advertisement view area 1080 represented by the advertisement-by-genre request data is sent from the data providing server 1001 to the portable dedicated terminal 1003 as commercial data. In the portable dedicated terminal 1003; the commercial data is reproduced in streaming, so that the customer views the part of the content as advertisement.

Thus, in this data providing system 1000, the title list of obtainable content data is not simply shown to the customer using the portable dedicated terminal 1003 but the customer can practically view or listen to a part of content.

Therefore, in the data providing system 1000, before obtaining content, the customer can confirm the contents of the content based on the content data, and can accurately judge whether or not the content meets his/her own taste.

Then, in this data providing system 1000, when the customer moves the customer's image 1066 to in front of a shelf by genre in the three-dimensional virtual reality space image for selecting content, the portable dedicated terminal 1003 makes the customer view a part of content that belongs to the genre of that shelf as advertisement. Therefore, the customer can select packaged media while confirming the contents of the content as if the customer practically is in the shop of the agency. Thus, the customer can select content while enjoying the content data.

In this connection, in this data providing system 1000, even if the customer moves the customer's image 1066 in the three-dimensional virtual reality space image, if the customer moves the above customer's image 1066 as detouring around the advertisement view area 1080 in front of a shelf, the portable dedicated terminal 1003 does not reproduce in streaming commercial data. And even if the customer moves the customer's image 1066 to the advertisement view area 1080, if the customer immediately moved the above customer's image 1066 to the outside of the advertisement view area 1080, the portable dedicated terminal 1003 stops to reproduce the commercial data in streaming. Accordingly, in this data providing system 1000, it can be prevented that the customer who does not want to see the advertisement of content becomes hard to easily select content data due to the interruption of that advertisement of content.

Furthermore, in this data providing system 1000, if the customer selectively specifies the name of an artist, the title of content data or the like, of which the advertisement the customer wants to see, on the commercial content specifying image 1082 forming a content selection screen by operating the operating part 1041, the portable dedicated terminal 1003 sends individual advertisement request data to the data providing server 1001.

As a result, in this data providing system 1000, a predetermined part of content allocated to the name of the artist, the title of the content data or the like, represented by the individual advertisement request data is sent from the data providing server 1001 to the portable dedicated terminal 1003 as commercial data. In the portable dedicated terminal 1003, the commercial data is reproduced in streaming, and the customer views the part of the content as advertisement.

Accordingly, in this data providing system 1000, content by genre are not one-sidedly advertised to the customer from the data providing server 1001. The customer can practically listen to and view also a part of the content that the customer requested by showing it for advertisement.

Therefore, in the data providing system 1000, before obtaining content data, the customer can confirm also the contents of content based on the content data that the customer requested.

According to the above configuration, content selection screen data including three-dimensional virtual reality space images is sent from the data providing server 1001 to the portable dedicated terminal 1003. When the customer moves the customer's image 1066 to an arbitrary predetermined area in that three-dimensional virtual reality space images in the above portable dedicated terminal 1003, commercial data being a part of content data corresponded to the predetermined area is sent from the above data providing server 1001 to the portable dedicated terminal 1003 for reproducing it in streaming. Thereby, the customer can practically listen to and view the part of the content and can confirm the contents of the above content. As a result, the customer can accurately judge whether or not the content meets his/her own taste. Thus, a data providing system that the customer can easily select content data can be accomplished.

In the portable dedicated terminal 1003, if the customer selectively specifies desired content data on the commercial content specifying image 1082 forming a content selection screen, commercial data being a part of that selectively-specified content data is sent from the data providing server 1001 to the portable dedicated terminal 1003 for reproducing it in streaming. Thereby, the customer can practically listen to or view also a part of the content that the customer requested, and can confirm the contents of the above content. Thus, a data providing system that the customer can remarkably easily select content data can be accomplished.

Note that, in the aforementioned eleventh embodiment, when commercial data is reproduced in streaming, video for advertisement and sound for advertisement are subjected to fade-in processing and fade-out processing. This invention, however, is not limited to this and when the commercial data is reproduced in streaming, the video for advertisement and the sound for advertisement may be fixedly reproduced with the original brightness and at the original volume without subjecting them to the fade-in processing and the fade-out processing. Thereby, when the portable dedicated terminal 1003 reproduces commercial data in streaming, processing load on the portable dedicated terminal 1003 can be reduced.

In the aforementioned eleventh embodiment, when the customer moves the customer's image 1066 to the advertisement view area 1080 in the image of first floor 1051 and the image of second floor 1052 being three-dimensional virtual reality space images representing the inside of the shop of the agency, commercial data is reproduced in streaming. This invention, however, is not limited to this and by preparing a plurality of three-dimensional virtual reality space images to that one or a plurality of commercial data have been previously allocated respectively, when the portable dedicated terminal 1003 updates these three-dimensional virtual reality space images according to the operation of the operating part 1041 (that is, when the portable dedicated terminal 1003 switched the display), the commercial data allocated to the above displayed three-dimensional virtual reality space image may be reproduced in streaming. Thereby, the same effects as the aforementioned eleventh embodiment can be obtained.

In the aforementioned eleventh embodiment, one item of content data is allocated to each advertisement view area 1080 for advertisement, and also one item of content data is allocated to each selection item such as the name of an artist on the commercial content specifying image 1082 for advertisement. This invention, however, is not limited to this and a plurality of content data may be respectively allocated to each advertisement view area 1080 and each selection item for advertisement. Thereby, the customer can practically listen to or view a part of many content, and can further easily select content data.

In the aforementioned eleventh embodiment, the data providing server 1001 generates commercial data from content data according to advertisement request data, every time when the advertisement request data is given from the portable dedicated terminal 1003. This invention, however, is not limited to this and data to be viewed for a predetermined time (about several seconds) that was previously generated based on the content data may have been stored in the content database 1011 in the data providing server 1001 as commercial data, and the above data providing server 1001 may read corresponding commercial data from the content database 1011 according to advertisement request data given from the portable dedicated terminal 1003 and may send this to the portable dedicated terminal 1003. Thereby, processing load on the data providing server 1001 in generating commercial data can be reduced.

In the aforementioned eleventh embodiment, when the customer moves the customer's image 1066 into the advertisement view area 1080 in the image of first floor 1051 or the image of second floor 1052 being three-dimensional virtual reality space images representing the inside of the shop of the agency, commercial data is reproduced in streaming. This invention, however, is not limited to this and although the customer moves the customer's image 1066 in the image of first floor 1051 or the image of second floor 1052, when the above customer's image 1066 turns to the front of a shelf by genre (that is, when the eyes of the customer's image 1066 are turned to the front of the shelf), the commercial data may be reproduced in streaming. Thereby, the data providing system 1000 can accurately cope with whether or not the customer hopes to view the advertisement of the content, similarly to the aforementioned eleventh embodiment.

In the aforementioned eleventh embodiment, the content database 1011 is provided in the data providing server 1001, and the above data providing server 1001 sends the corresponding content data in the content database 1011 to the portable dedicated terminal 1003 according to content specifying data sent from the portable dedicated terminal 1003. This invention, however, is not limited to this and the data providing server 1001 may send the corresponding content data for example from a system management site, to the portable dedicated terminal 1003, according to the content specifying data sent from the portable dedicated terminal 1003.

In the aforementioned eleventh embodiment, a content selection screen containing three-dimensional virtual reality space images which faithfully reproduce the inside of the shop of the agency as three-dimensional virtual reality space is used to obtain content. This invention, however, is not limited to this and a content selection screen containing three-dimensional images which reproduce the inside of the agency as simplified three-dimensional space or being the three-dimensional images, and a content selection screen containing three-dimensional images that were arbitrary created without concerning with the inside of the agency or being the three-dimensional images may be used. Even if using such content selection screen, by providing the customer with data for viewing content based on content data (commercial data), the same effects as the aforementioned eleventh embodiment can be obtained.

Further, in the aforementioned eleventh embodiment, commercial data obtained from the data providing server 1001 is reproduced by streaming. This invention, however, is not limited to this and commercial data obtained from the data providing server 1001 may be recorded on the storage medium 1040 of the portable dedicated terminal 1003, so that the customer can view and preview content by reproducing it at arbitrary timing.

Furthermore, in the aforementioned eleventh embodiment, the data providing server 1001 and the portable dedicated terminal 1003 execute the content providing processing procedure described above with reference to FIGS. 67 and 68. This invention, however, is not limited to this and programs to execute the content providing processing procedure may have been previously stored respectively in the data providing server 1001 and the portable dedicated terminal 1003 and the content providing processing procedure may be executed according to these programs, or the above content providing processing procedure may be executed by installing a program storage medium storing these programs in the data providing server 1001 and the portable dedicated terminal 1003.

In this connection, such program storage medium for installing the various programs to execute the content providing processing procedure in the data providing server 1001 and the portable dedicated terminal 1003 to make them executable is not only limited to packaged media such as a flexible disk, a CD-ROM and a DVD, but also may be a semiconductor memory, a magnetic disk, etc., in that the various programs can be temporarily or permanently stored. Furthermore, as means for storing the various programs in these program storage media, also a cable or a radio communication medium such as a local area network, the Internet, digital satellite broadcasting, etc, may be used, and they may be stored via various communication interfaces such as a rooter and a modem.

(13) Other Embodiments

Note that, in the aforementioned first to eleventh embodiments, the data providing servers 101 and 151 described above with reference to FIGS. 5 to 10 are applied as content providing apparatuses which provide content data in this invention. This invention, however, is not limited to this and content providing apparatuses having other various constructions can be widely applied, such as a content providing apparatus constructed by integrating a data providing server and content server, provided that they can provide a content obtaining apparatus with content data in response to customer reservation information given from a prescribed terminal device.

Further, in the aforementioned first to eleventh embodiments, the portable dedicated terminals 53 and 102 described above with reference to FIGS. 4 to 10 are applied as content obtaining apparatuses which obtain content data given from a content providing apparatus in this invention. This invention, however, is not limited to this and content obtaining apparatuses having other various kinds of constructions can be widely applied, provided that they can obtain content data which is given from a content providing apparatus for a reservation from a terminal device.

Still further, in the aforementioned first to eleventh embodiments, the data providing systems 100 and 150 described above with reference to FIGS. 5 to 10 are applied as content providing/obtaining systems of this invention, each composed of a content providing apparatus which provide content data and a content obtaining apparatus which obtains content data given from the content providing apparatus. This invention, however, is not limited to this and content providing/obtaining systems having other various kinds of constructions can be widely applied, provided that a content providing apparatus can send content data to a content obtaining apparatus in response to a reservation given from a terminal device in these systems.

Still further, in the aforementioned first to eleventh embodiments, the request terminal 103 described above with respect to FIGS. 5 to 10 is applied as a prescribed terminal device. This invention, however, is not limited to this and other various kinds of terminal devices can be widely applied, such as a personal computer, portable telephone, and PDA (Personal Digital Assistance), provided that they can access a content providing apparatus.

Still further, in the aforementioned first to eleventh embodiments, the content databases 111, 153, and 154 described above with reference to FIGS. 5 to 10 are applied as content data storage means for storing a plurality of content data. This invention, however, is not limited to this and other various kinds of content data storage means can be widely applied depending on a storage medium to be used, provided that they can store a plurality of content data.

Still further, in the first to eleventh embodiments, the receiving part 115 described above with reference to FIGS. 5 to 10 is applied as a customer reservation information receiving means which receives the customer identification information on a customer accessing the content providing apparatus with a prescribed terminal device and content identification information on customer desired content data desired by the customer, as customer reservation information. This invention, however, is not limited to this and other various kinds of customer reservation information receiving means can be widely applied depending on a communications method to be applied, provided that they can receive customer reservation information transmitted from a terminal device.

Still further, in the aforementioned first to eleventh embodiments, the recording control parts 117 and 157 and content search part 162 described above with reference to FIGS. 5 to 10 are applied as search means for searching content data storage means for customer desired content data corresponding to the content identification information. This invention, however, is not limited to this and other various kinds of search means can be widely applied depending on a storage medium to be used, provided that they can search a content data storage medium for customer desired content data based on content identification information.

Still further, in the aforementioned first to eleventh embodiments, the recording control parts 117 and 157 described above with reference to FIGS. 5 to 10 are applied as content data sending means for sending customer desired content data found by the search means to the content obtaining apparatus. This invention, however, is not limited to this and other various kinds of content data sending means can be widely applied, such as a sending means having a wired- or wireless-connection to the content obtaining apparatus, provided that they can send customer desired content data to a content obtaining apparatus to provide it to a customer.

Still further, in the aforementioned first to eleventh embodiments, the receiving part 80 and sending part 87 connected to the Internet, described above with reference to FIGS. 4 to 10 are applied as interface means which is accessible to the content providing means only. This invention, however, is not limited to this and interface means employing other various kinds of wired- and wireless-communications method can be widely applied, provided that they can access a content obtaining apparatus only.

Still further, in the aforementioned first to eleventh embodiments, the recording control part 81 described above with reference to FIGS. 4 to 10 is applied as a content data recording means for recording customer desired content data received via the interface means from the content providing apparatus, on a storage medium. This invention, however, is not limited to this and other various kinds of content data recording means can be widely applied depending on a storage medium to be used, provided that they can record customer desired content data on a storage medium.

Still further, the storage medium 82 built in each of the portable dedicated terminals 53 and 102, described above with reference to FIGS. 4 to 10, is applied as a storage medium on which customer desired content data is recorded. This invention, however, is not limited to this and other various kinds of storage medium can be widely applied, such as a storage medium which can be detachably attached to a content obtaining apparatus.

Still further, the reproduction control means 84 and reproducing part 85 described above with reference to FIGS. 4 to 10 are applied as reproducing/outputting means for reproducing and outputting customer desired content data from a storage medium. This invention, however, is not limited to this and other various kinds of reproducing/outputting means can be widely applied, provided that they can reproduce and output customer desired content data from a storage medium.

Still further, in the aforementioned first to eleventh embodiments, the sending part 118 described above with reference to FIGS. 5 to 10 is applied as a content obtaining apparatus identification information sending means which sends content obtaining apparatus identification information which is identification information unique to the content obtaining apparatus, to a prescribed terminal device. This invention, however, is not limited to this and other various kinds of content obtaining apparatus identification information sending means can be widely applied, provided that they can send content obtaining apparatus identification information to the content obtaining apparatus to notify a customer of a content obtaining apparatus to be sold or rented.

Still further, in the aforementioned first to eleventh embodiments, the accounting parts 116 and 156 described above with reference to FIGS. 5 to 10 are applied to as accounting information generating means for generating accounting information according to customer identification information and the charge based on the payment information which specifies the method of payment for rental or purchase of customer desired content data, and sending the generated accounting information to the external settlement processing device. This invention, however, is not limited to this and accounting information generating means having other various kinds of constructions can be widely applied, provided that they can generate accounting information according to customer identification information and charge based on the payment information which specifies the payment of charge for the rental or purchase of customer desired content data and sends the generated accounting information to an external settlement processing device.

Still further, in the aforementioned first to eleventh embodiments, the data providing server 1001 described above with reference to FIGS. 63 to 68 is applied to a content providing apparatus for providing content data according to this invention. This invention, however, is not limited to this and content providing apparatuses having other kinds of constructions can be widely applied, such as a personal computer, provided that they can provide preview data generated based on content data in response to a preview request given from a data obtaining apparatus.

Still further, in the aforementioned first to eleventh embodiments, the portable dedicated terminal 1003 described above with reference to FIGS. 63 to 68 is applied as a content obtaining apparatus for obtaining content data provided from a content providing apparatus according to this invention. This invention, however, is not limited to this and content obtaining apparatuses having the other various kinds of constructions can be widely applied, such as a personal computer, a PDA and a portable telephone, provided that they can request preview content data from the content providing apparatus and thus can obtain preview data sent from the content providing apparatus and reproduce this.

Still further, in the aforementioned first to eleventh embodiments, the data providing system 1000 described above with reference to FIGS. 63 to 68 is applied to a content providing/obtaining system according to this invention, composed of a content providing apparatus for providing content data and a content obtaining apparatus for obtaining the content data provided from the above content providing apparatus. This invention, however, is not limited to this and content providing/obtaining systems having other various kinds of constructions can be widely applied, such as a LAN (Local Area Network), a data providing/obtaining system constructed with optical communication technology, provided that they are systems in that the content providing apparatus can send preview data generated based on content data to the above content obtaining apparatus according to a preview request given from the content obtaining apparatus.

Still further, in the aforementioned first to eleventh embodiments, as an image storage means for holding three-dimensional images to be used to make a customer select desired content data from among a plurality of content data, the content database 1011 described above with reference to FIGS. 63 to 68 is applied. This invention, however, is not limited to this and, other various kinds of image storage means can be widely applied, such as an optical disc, a magneto-optical disk and a semiconductor memory, provided that they can hold the three-dimensional images to be used to make a customer select desired content data from among a plurality of content data.

Still further, in the aforementioned first to eleventh embodiments, as a transmission request receiving means for receiving an image request from the content obtaining apparatus, the receiving part 1012 described above with reference to FIGS. 63 to 68 is applied. This invention, however, is not limited to this and, other various kinds of transmission request receiving means can be widely applied depending on a communications method to be used, provided that they can receive an image request sent from a content obtaining apparatus.

Still further, in the aforementioned first to eleventh embodiments, as an image sending means for sending three-dimensional images to a content obtaining apparatus in response to an image request, the sending part 1014 described above with reference to FIGS. 63 to 68 is applied. This invention, however, is not limited to this and, other various kinds of image sending means can be widely applied depending on a communications method to be used, provided that they can send three-dimensional images to a content obtaining apparatus in response to an image request.

Still further, in the aforementioned first to eleventh embodiments, as a preview request receiving means for receiving a preview request sent from a content obtaining apparatus according to the display state of three-dimensional images, the receiving part 1012 described above with reference to FIGS. 63 to 68 is applied. This invention, however, is not limited to this and other various kinds of preview request receiving means can be widely applied depending on a communications method to be used, provided that they can receive a preview request sent from a content obtaining apparatus according to the display state of three-dimensional images.

In the aforementioned first to eleventh embodiments, as a data sending means for sending content preview data based on content data corresponding to a preview request to a content obtaining apparatus, the sending part 1014 described above with reference to FIGS. 63 to 68 is applied. This invention, however, is not limited to this and other various kinds of data sending means can be widely applied depending on a communications method to be used, provided that they can send content preview data based on content data corresponding to the preview request to a content obtaining apparatus.

Still further, in the aforementioned first to eleventh embodiments, as an input means for entering various operational commands, the operating part 1041 described above with reference to FIGS. 63 to 68 is applied. This invention, however, is not limited to this and, other various kinds of input means can be widely applied, such as operational keys, a touch panel and a pointing device, provided that they can enter various operational commands.

Still further, in the aforementioned first to eleventh embodiments, as an image request sending means for sending an image request to a content providing apparatus in response to an image request command entered via an input means, the sending part 1045 described above with reference to FIGS. 63 to 68 is applied. This invention, however, is not limited to this and, other various kinds of image request sending means can be widely applied depending on a communications method to be used, provided that they can send an image request to a content providing apparatus in response to an image request command entered via an input means.

In the aforementioned first to eleventh embodiments, as an image receiving means for receiving three-dimensional images which are sent from a content providing apparatus in response to an image request, the receiving part 1046 described above with reference to FIGS. 63 to 68 is applied. This invention, however, is not limited to this and, other various kinds of image receiving means can be widely applied depending on a communications method to be used, provided that they can receive three-dimensional images which are sent from a content providing apparatus in response to an image request.

Still further, in the aforementioned first to eleventh embodiments, as a display control means for displaying the three-dimensional images on a predetermined display means and for changing the display state of the three-dimensional images according to a displaying-state changing command entered via an input means, the reproducing part 1043 described above with reference to FIGS. 63 to 68 is applied. This invention, however, is not limited to this and other various kinds of display control means can be widely applied, such as a CPU and a microprocessor, provided that they can display three-dimensional images on a predetermined display means and can change the displaying state of the three-dimensional images according to a displaying-state changing command entered via an input means.

Still further, in the aforementioned first to eleventh embodiments, as a display means for displaying the three-dimensional images, the reproducing part 1043 described above with reference to FIGS. 63 to 68 is applied. This invention, however, is not limited to this and other various kinds of display means can be widely applied, such as a display means which is an external device for the content obtaining apparatus, provided that they can display three-dimensional images.

Still further, in the aforementioned first to eleventh embodiments, as a preview request sending means for sending a preview request to a content providing apparatus according to the display state of the three-dimensional images on a display means, the sending part 1045 described above with reference to FIGS. 63 to 68 is applied. This invention, however, is not limited to this and, other various kinds of preview request sending means can be widely applied depending on a communications method to be used, provided that they can send a preview request to a content providing apparatus according to the display state of the three-dimensional images on a display means.

Still further, in the aforementioned first to eleventh embodiments, as a data receiving means for receiving preview data which was sent from a content providing apparatus in response to a preview request, the receiving part 1046 described above with reference to FIGS. 63 to 68 is applied. This invention, however, is not limited to this and, other various kinds of receiving means can be widely applied depending on a communications method to be used, provided that they can receive preview data which was sent from a content providing apparatus in response to a preview request.

Still further, in the aforementioned first to eleventh embodiments, as a reproducing means for reproducing preview data and making a customer view the contents of the content, the reproducing part 1043 described above with reference to FIGS. 63 to 68 is applied. This invention, however, is not limited to this and other various kinds of reproducing means can be widely applied, such as a reproducing means which is an external device for a content obtaining apparatus, provided that they can reproduce preview data and can make a customer view the contents of the content.

Still further, in the aforementioned first to eleventh embodiments, as a recording means for recording preview data received by a data receiving means on a storage means, the storage medium for buffer of the reproducing part 1043 described above with reference to FIGS. 63 to 68 is applied. This invention, however, is not limited and other various kinds of storage media can be widely applied, such as the storage medium built in the portable dedicated terminal 1003 and a storage medium which can be detachably attached to the portable dedicated terminal.

INDUSTRIAL APPLICABILITY

This invention can be used in a content providing/obtaining system composed of a content server on the Internet, portable dedicated terminals, personal computers and portable telephones, which are connectable to the content server via the Internet.

The invention claimed is:

1. A content obtaining apparatus for obtaining content data provided by a content providing apparatus and reserved by a customer for purchase or rental, the content obtaining apparatus comprising:
   image requesting means configured to generate an image request and to send the image request to the content providing apparatus;
   response image receiving means configured to receive a plurality of response images created in accordance with the image request;
   image display means configured to display the plurality of response images to the customer;
   customer response image selection means configured to receive from the customer a selection of one or more images of the plurality of response images;
   preview request means configured to send to the content providing apparatus a preview request corresponding to the one or more images of the plurality of response images selected by the customer;
   preview data receiving means configured to receive from the content providing apparatus preview data corresponding to the preview request;
   preview display means configured to display to the customer the preview data;
   customer preview data selection means configured to receive from the customer a preview data selection in accordance with a selection made by the customer of the preview data indicating customer desired content data to be reserved for the customer;
   data reservation means configured to send to the content providing apparatus customer request data corresponding to the preview data selection;
   interface means configured to access said content providing apparatus only, and further configured to receive from said content providing apparatus the customer desired content data;
   content data recording means for recording said customer desired content data on a storage medium; and
   reproducing/outputting means for reproducing and outputting said customer desired content data from said storage medium.

2. The content obtaining apparatus according to claim 1, wherein said storage means is built in the content obtaining apparatus.

3. The content obtaining apparatus according to claim 1, wherein said content obtaining apparatus is a portable device.

4. The content obtaining apparatus according to claim 1, wherein said interface means is further configured to receive, along with said customer desired content data, rental period information indicating a rental period of said customer desired content data, and wherein said reproducing/outputting means is configured to prevent reproducing said customer desired content data when said rental period expires.

5. A content obtaining method for obtaining content data provided by a content providing apparatus and reserved by a customer for purchase or rental, the content obtaining method comprising:

generating an image request;
send the image request to the content providing apparatus;
receiving a plurality of response images created in accordance with the image request;
displaying the plurality of response images to the customer;
receiving from the customer a selection of one or more images of the plurality of response images;
sending to the content providing apparatus a preview request corresponding to the one or more images of the plurality of response images selected by the customer;
receiving from content providing apparatus preview data corresponding to the preview request;
displaying to the customer the preview data;
receiving from the customer a preview data selection in accordance with a selection made by the customer of the preview data indicating customer desired content data to be reserved for the customer;
sending to the content providing apparatus customer request data corresponding to the preview data selection;
receiving from said content providing apparatus, via interface means configured to access said content providing apparatus only, the customer desired content data;
recording said customer desired content data on a storage medium; and
reproducing and outputting said customer desired content data via a reproducing/outputting means.

6. The content obtaining method according to claim 5, wherein said interface means and said storage medium are built in a content obtaining apparatus.

7. The content obtaining method according to claim 6, wherein said content obtaining apparatus is a portable device.

8. The content obtaining method according to claim 5 further comprising:

receiving, along with said customer desired content data, rental period information indicating a rental period of said customer desired content data; and
preventing reproduction of said customer desired content data when said rental period expires.

9. A non-transitory computer-readable storage medium encoded with instructions, that when executed by a content obtaining apparatus, cause the content obtaining apparatus to execute the following steps:

generating an image request; sending the image request to the content providing apparatus; receiving a plurality of response images created in accordance with the image request; displaying the plurality of response images to the customer;
receiving from a customer a selection of one or more images of the plurality of response images;
sending to the content providing apparatus a preview request corresponding to the one or more images of the plurality of response images selected by the customer;
receiving from the content providing apparatus preview data corresponding to the preview request;
displaying to the customer the preview data;
receiving from the customer a preview data selection in accordance with a selection made by the customer of the preview data indicating customer desired content data to be reserved for the customer;
sending to the content providing apparatus customer request data corresponding to the preview data selection;
receiving from the content providing apparatus, via interface means configured to access said content providing apparatus only, the customer desired content data;
recording said customer desired content data on a storage medium; and
reproducing and outputting said customer desired content data.

10. The non-transitory storage medium according to claim 9, wherein said interface means and said storage medium are built in a content obtaining apparatus.

11. The non-transitory storage medium according to claim 10, wherein said content obtaining apparatus is a portable device.

12. The non-transitory storage medium according to claim 9, wherein the content obtaining program further comprises:

receiving, along with said customer desired content data, rental period information indicating a rental period of said customer desired content data; and
preventing reproduction of said customer desired content data when said rental period expires.

* * * * *